United States Patent [19]
Imai et al.

[11] Patent Number: 5,930,004
[45] Date of Patent: Jul. 27, 1999

[54] IMAGE PROCESSING APPARATUS CAPABLE OF CONNECTING EXTERNAL INFORMATION PROCESSING TERMINAL, AND INCLUDING PRINTER UNIT AND DATA PROCESSING UNIT

[75] Inventors: Takashi Imai, Yokohama; Yasuhide Ueno, Fuchu; Nobuyuki Hirai, Tokyo; Atsushi Ikeda, Tokorozawa; Koji Okamura, Yokohama, all of Japan

[73] Assignee: Canon Kabushiki Kaisha, Tokyo, Japan

[21] Appl. No.: 08/822,616

[22] Filed: Mar. 20, 1997

Related U.S. Application Data

[62] Division of application No. 08/557,477, Nov. 14, 1995, Pat. No. 5,726,769.

[30] Foreign Application Priority Data

Nov. 14, 1994 [JP] Japan ..................................... 6-279326
Nov. 14, 1994 [JP] Japan ..................................... 6-279499

[51] Int. Cl.[6] ...................................................... H04N 1/21
[52] U.S. Cl. ............................................ 358/442; 358/296
[58] Field of Search ..................................... 358/442–444, 358/468, 296, 400–401, 407, 437

[56] References Cited

U.S. PATENT DOCUMENTS

| | | | |
|---|---|---|---|
| 4,930,017 | 5/1990 | Izawa | 358/296 |
| 5,072,303 | 12/1991 | Silverberg | 358/296 |
| 5,218,458 | 6/1993 | Kochis et al. | 358/448 |
| 5,280,585 | 1/1994 | Kochis et al. | 395/275 |
| 5,349,448 | 9/1994 | Hirai | 358/444 |
| 5,383,030 | 1/1995 | Seo | 358/442 |
| 5,465,162 | 11/1995 | Nishii et al. | 358/442 |
| 5,535,266 | 7/1996 | Nishii | 358/400 |

OTHER PUBLICATIONS

User's Manual: The HP LaserJet 4L Printer, Hewlett–Packard Company, 1993.

Primary Examiner—Thomas D. Lee
Assistant Examiner—Stephen Brinich
Attorney, Agent, or Firm—Fitzpatrick Cella Harper & Scinto

[57] ABSTRACT

This invention has as its object to provide an image processing apparatus which has a printer unit and a data processing unit, and allows an external information processing terminal to freely operate the printer unit and the data processing unit. More specifically, the image processing apparatus has a print emulation command set for controlling the printer unit from the external information processing terminal, and a command set for controlling the data processing unit from the external information processing terminal. The print emulation command set is used when the printer unit is controlled, and the designated command set is used when the data processing unit is controlled.

20 Claims, 73 Drawing Sheets

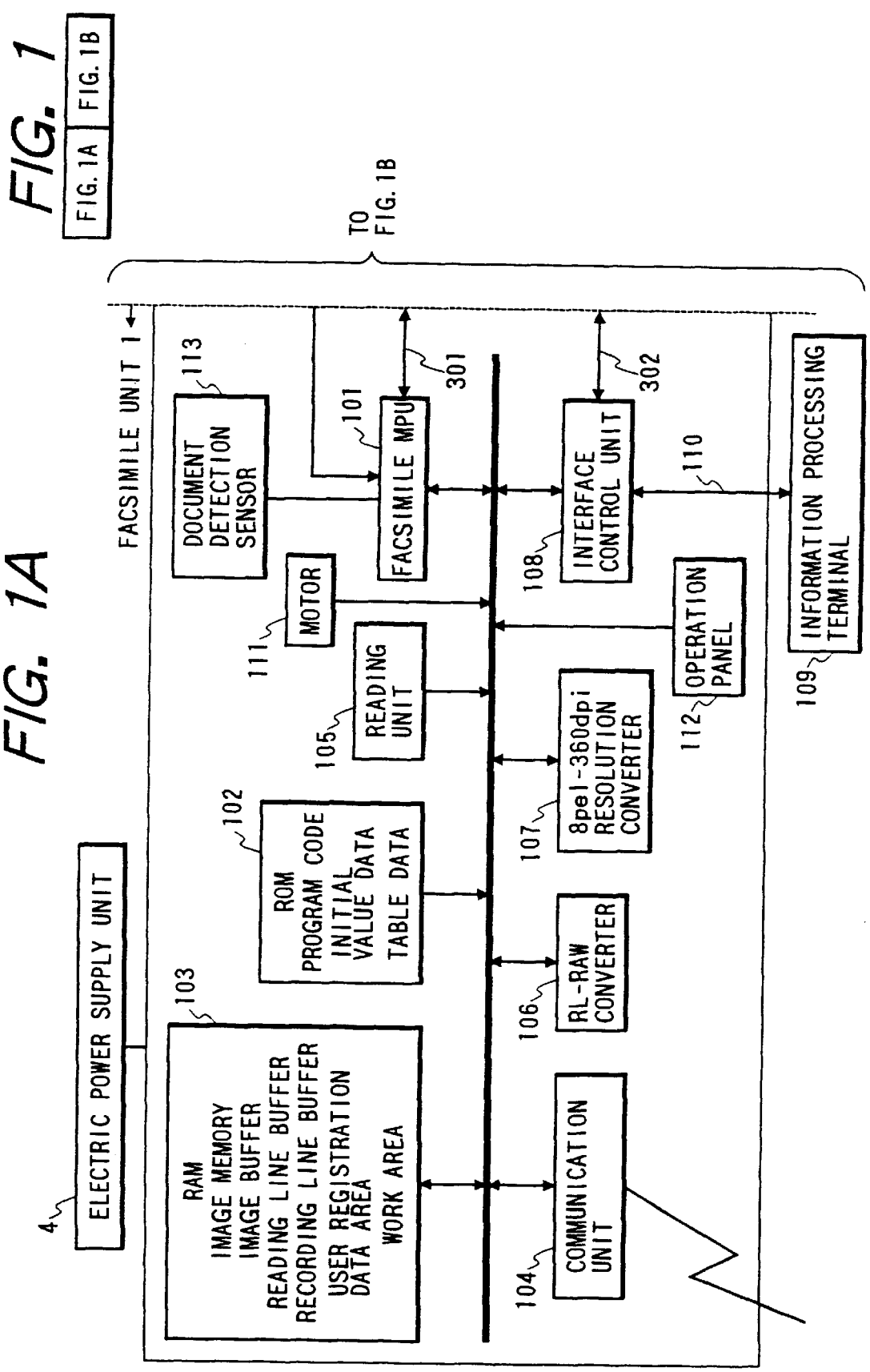

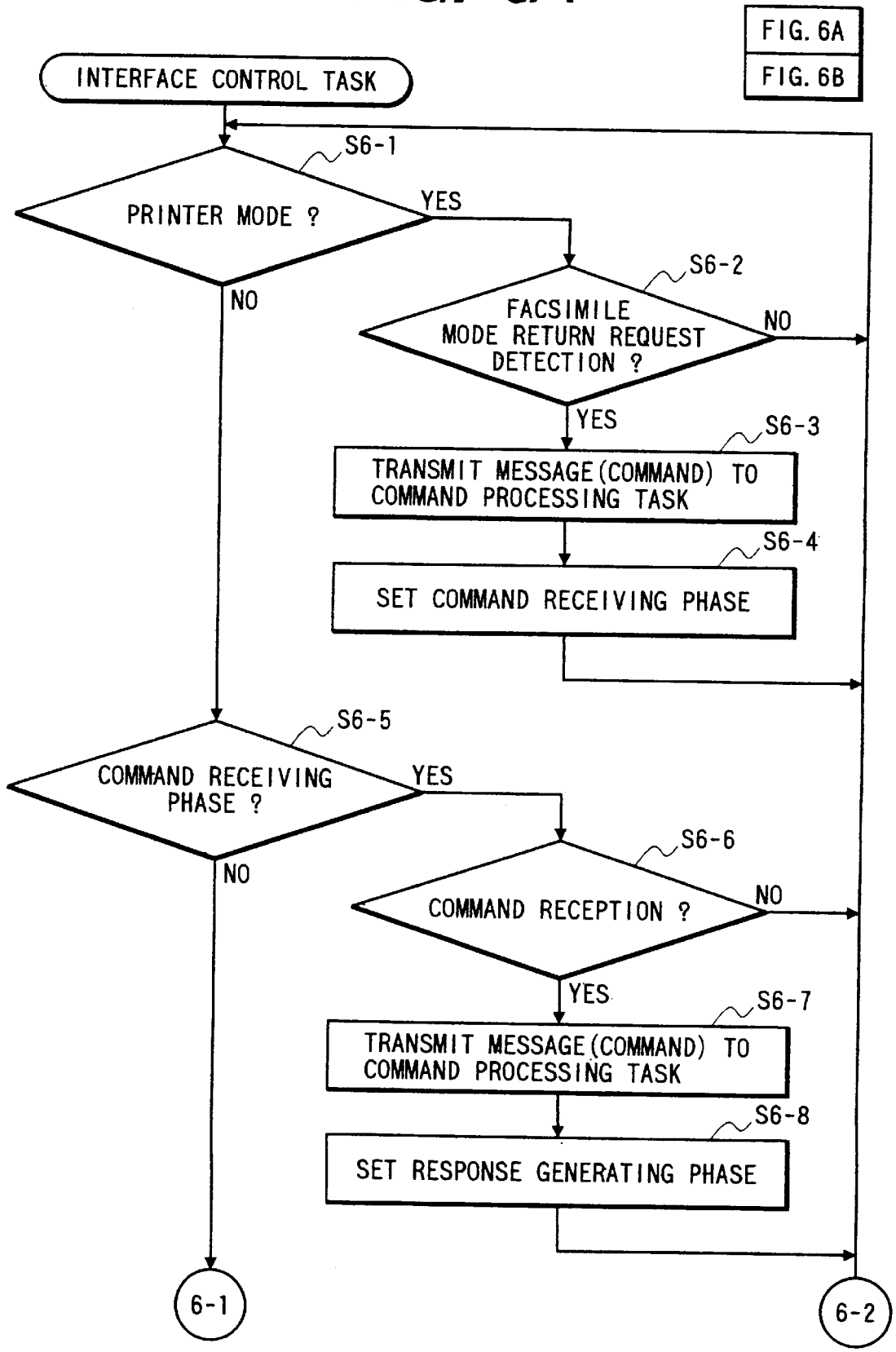

| FIG. 8A |
|---|
| FIG. 8B |

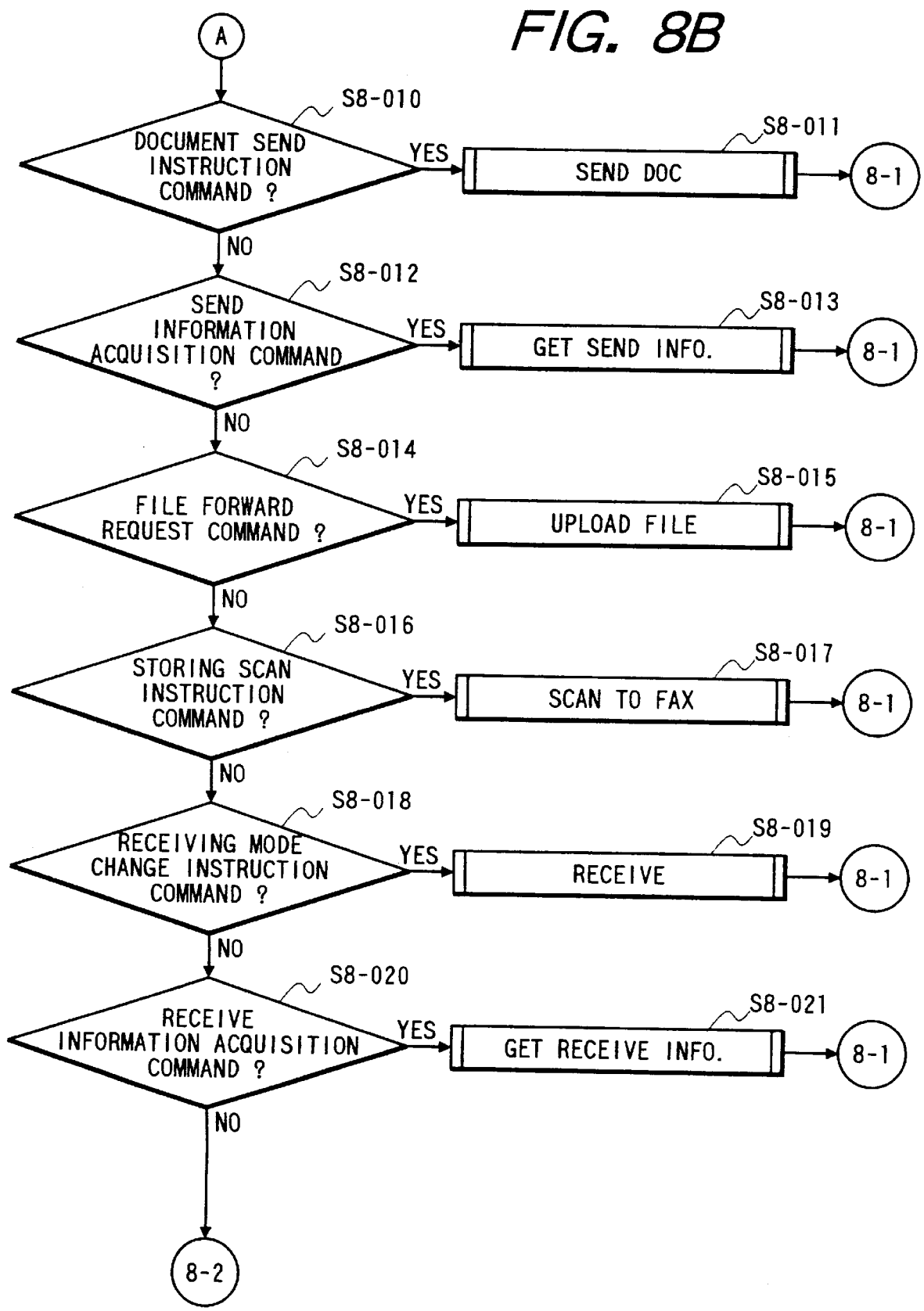

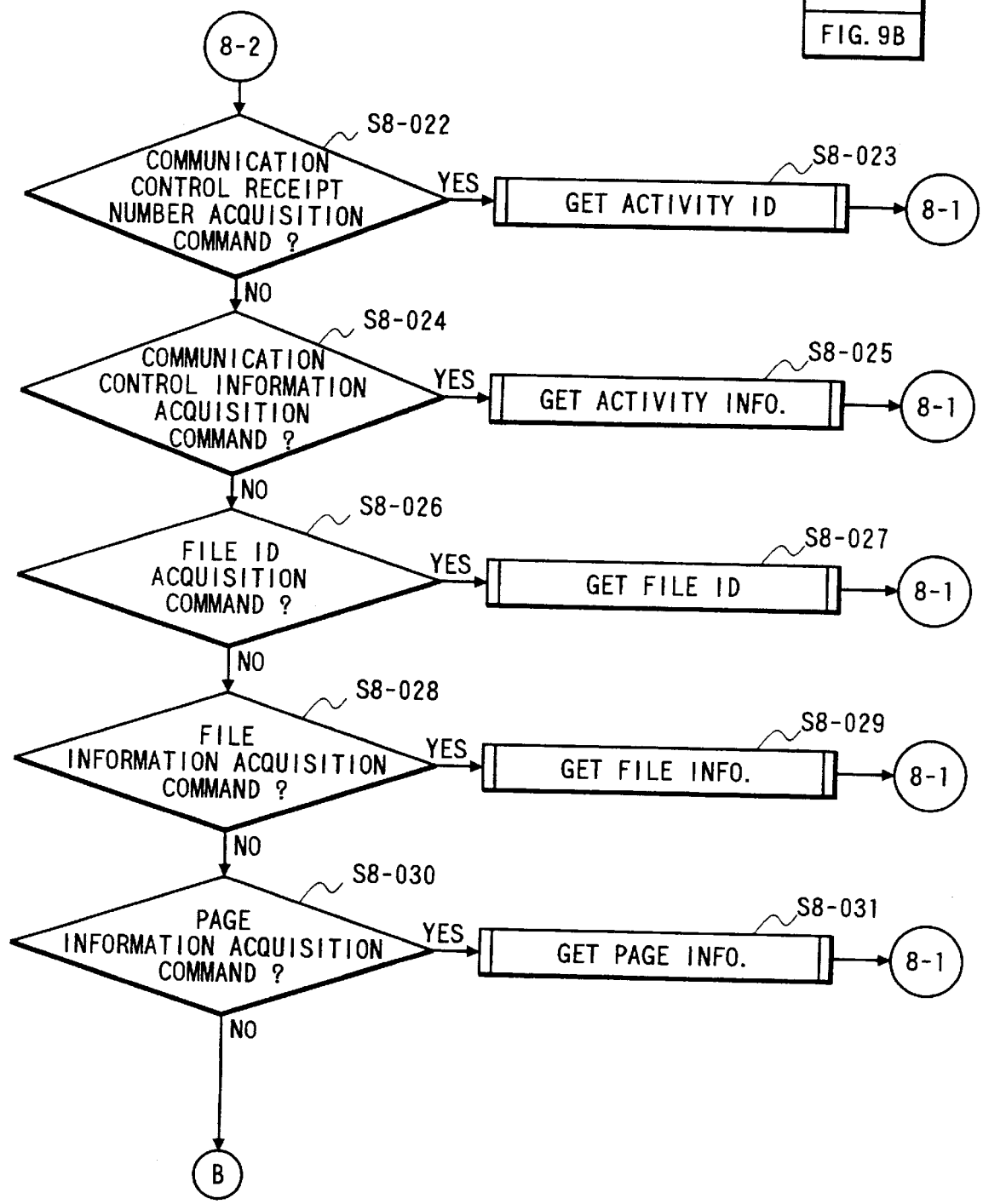

FIG. 48

\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*
\*\*\*\*\*\*\*\* COMMUNICATION CONTROL REPORT \*\*\*\*\*\*\*\*
\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*\*

| COMMUNICATION KIND PROTOCOL COMMUNICATION CONTROL REPORT OUTPUT RECORD | ADDRESSEE TELEPHONE NUMBER | ADDRESSEE ABBREVIATED NAME | COMMUNI-CATION START TIME | COMMUNI-CATION TIME PERIOD | NUMBER OF PAGES | COMMUNI-CATION RESULT |
|---|---|---|---|---|---|---|
| *SEND | 110 | POLICE | 10/07 11:16 | 00'00 | 0 | NG |
| *SEND | 177 | WEATHER | 10/07 11:18 | 00'11 | 1 | OK |
| *RECEIVE | 104 | INFORMATION | 10/07 11:20 | 00'20 | 2 | OK |
| *MANUAL SEND | 110 | POLICE | 10/18 11:20 | 00'18 | 1 | OK |
| SEND ECM | 177 | WEATHER | 10/18 11:22 | 00'22 | 1 | OK |
| SEND | 104 | INFORMATION | 10/18 11:24 | 00'00 | 0 | NG |

48-1

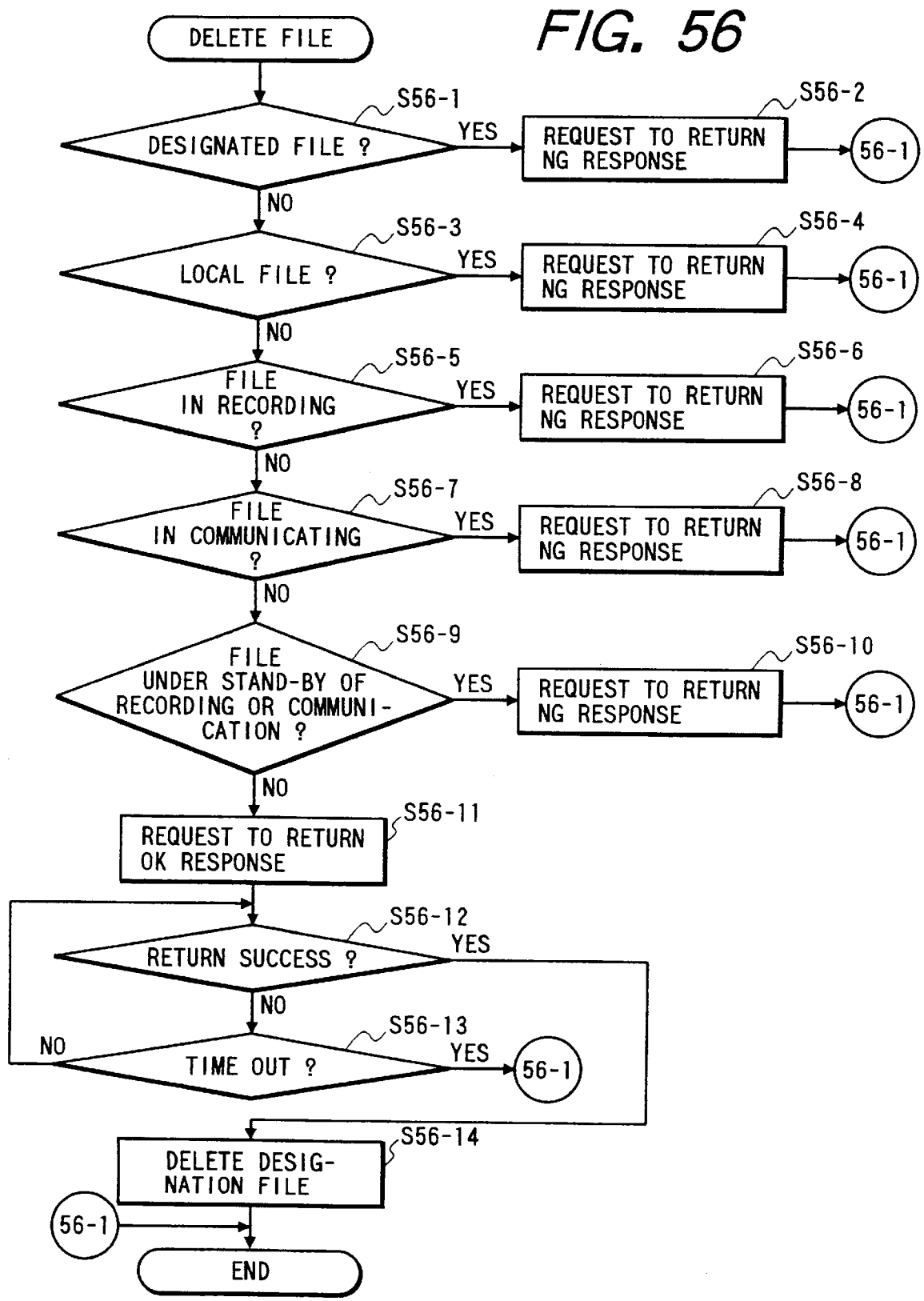

IMAGE PROCESSING APPARATUS CAPABLE OF CONNECTING EXTERNAL INFORMATION PROCESSING TERMINAL, AND INCLUDING PRINTER UNIT AND DATA PROCESSING UNIT

This application is a division of Application Ser. No. 08/557,477 filed Nov. 14, 1995, now U.S. Pat. No. 5,726,769, issued Mar. 10, 1998.

BACKGROUND OF THE INVENTION

1. Field of the Invention

The present invention relates to an image processing apparatus capable of connecting an external information processing terminal, and including a printer unit and a data processing unit.

2. Related Background Art

As a conventional apparatus of this type, a facsimile apparatus having an interface used for connecting an external information processing terminal (computer) is known. Such a facsimile apparatus performs a facsimile communication or prints out image data supplied from the information processing terminal in accordance with a request from the information processing terminal. The conventional facsimile apparatus has a command set exclusively used for the facsimile apparatus in interfacing with the external information processing terminal.

When the information processing terminal prints out data using a printer, it uses a command set exclusively used for the printer. As the command set exclusively used for the printer, various kinds of command sets have already been generally used.

When the external information processing terminal uses the above-mentioned facsimile apparatus as a printer, the terminal uses the command set exclusively used for the facsimile apparatus, but cannot use a command set for a general printer.

The facsimile apparatus may perform dialling using its dialling function in accordance with a request from the information processing terminal. On the other hand, the facsimile apparatus itself has a time designated dialling (timer transmission) function, a re-dialling function, and the like. When the facsimile apparatus receives a dialling request from the information processing terminal in the waiting state of the timer transmission function set by an operation unit of the facsimile apparatus or in the re-dialling waiting state, the apparatus performs a dialling operation corresponding to the received dialling request. When the designated time of the timer transmission function has reached or the re-dialling waiting period has elapsed during the dialling operation corresponding to the request from the information processing terminal, the timer transmission function or the re-dialling function may cause an error termination.

SUMMARY OF THE INVENTION

The present invention has been made in consideration of the above-mentioned problems, and its object is to improve an image processing apparatus.

It is another object of the present invention to provide an image processing apparatus which can use various kinds of command sets in interfacing with an information processing terminal.

It is still another object of the present invention to provide an image processing apparatus, which comprises a printer unit and a data processing unit, and allows an external information processing terminal to operate the printer unit and the data processing unit using different command sets.

It is still another object of the present invention to provide an image processing apparatus which inhibits a dialling operation designated by an operation unit of the image processing apparatus in response to a dialling request from an information processing terminal.

Other objects of the present invention will become apparent from the following detailed description of the embodiments taken in conjunction with the accompanying drawings.

BRIEF DESCRIPTION OF THE DRAWINGS

FIG. 1, comprising FIGS. 1A and 1B, is a block diagram showing the arrangement of a facsimile apparatus according to an embodiment of the present invention;

FIG. 6, comprising FIGS. 6A and 6B, is a flow chart showing the operation of an interface control task;

FIG. 8, comprising FIGS. 8A and 8B, is a flow chart showing the operation of a command processing task;

FIG. 9, comprising FIGS. 9A and 9B, is a flow chart showing the operation of the command processing task;

FIG. 48 is a view showing an example of a communication control report;

FIG. 56 is a flow chart showing the operation of file delete processing;

DETAILED DESCRIPTION OF THE PREFERRED EMBODIMENT

The preferred embodiment of the present invention will be described in detail hereinafter with reference to the accompanying drawings.

Figure 1B:
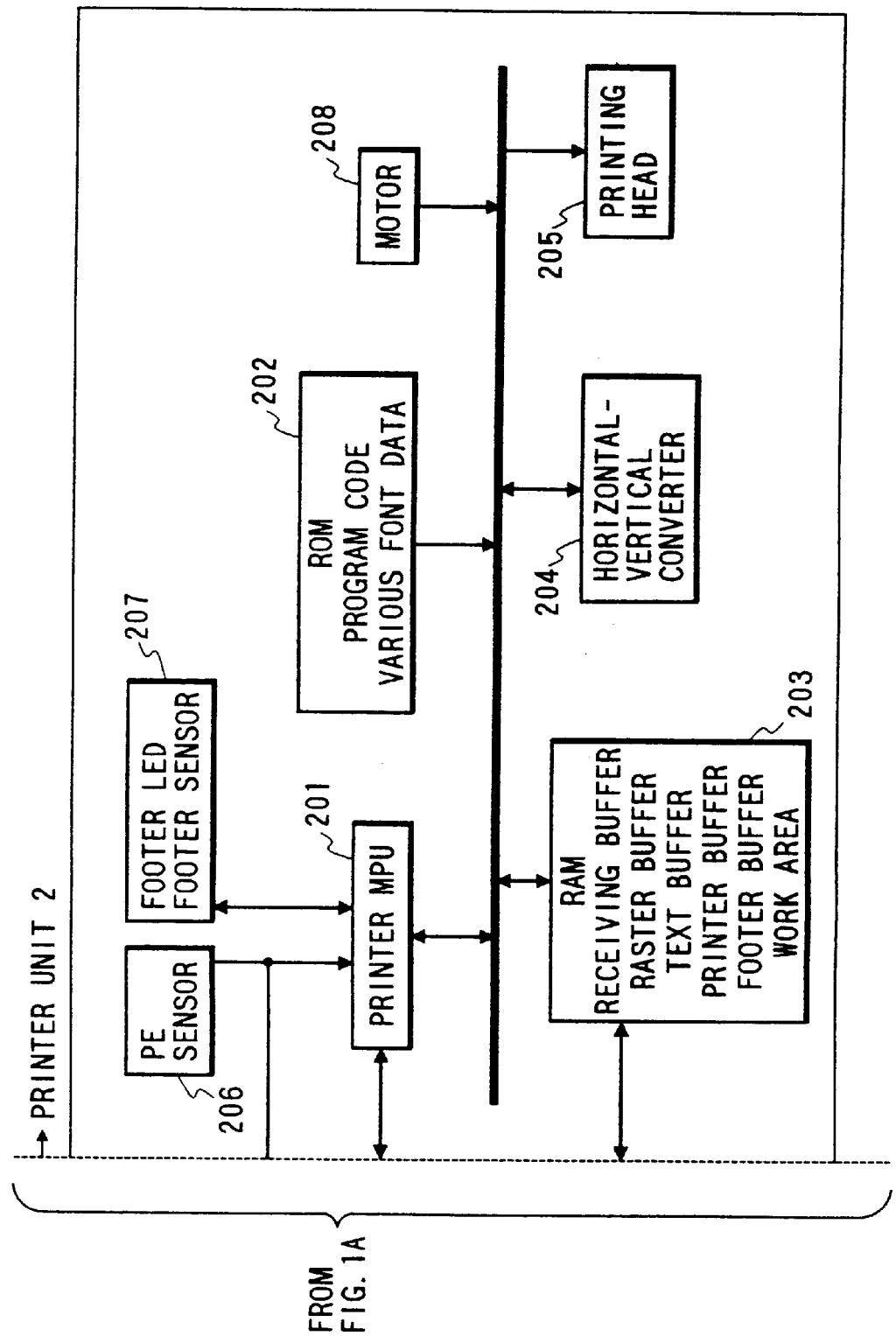

FIGS. 1A and 1B show block diagrams of an example of the arrangement of a facsimile apparatus of this embodiment. The facsimile apparatus of this embodiment is constituted by a facsimile unit 1 shown in FIG. 1A, and a printer unit 2 shown in FIG. 1B.

The facsimile unit 1 executes various functions of facsimile operations such as a facsimile communication, image reading, image memory control, user registration, and the like, except for a recording operation. The printer unit 2 executes a recording operation of image data which is sent via an internal interface signal line 302 and stored in an image memory in a RAM 103, and data supplied from an information processing terminal 109.

The facsimile unit 1 comprises the following arrangement. That is, a facsimile MPU 101 controls the operation of the facsimile unit 1.

A ROM 102 stores program codes, initial value data, table data, and the like.

The RAM 103 is assigned to, e.g., an image memory, image buffer, reading line buffer, recording line buffer, user registration data area, work area, and the like. The image memory stores, as files, image data received via a communication unit 104, image data read by a reading unit 105, and image data supplied from the information processing terminal 109. The image buffer temporarily holds image data upon transmission/reception via the communication unit 104. The image buffer is also used as a buffer upon transmission/reception of a large volume of data (in download file processing, upload file processing, and communication control information acquisition processing to be described later) with the information processing terminal. The reading line buffer has a capacity for four lines of read raw image data (216 bytes×4 lines). The recording line buffer has a capacity for four lines of raw image data including commands before recording (400 bytes×4 lines).

The communication unit 104 comprises a modem, an NCU (network control unit), and the like, and is connected to a communication line, a telephone set, and the like.

The reading unit 105 comprises an image sensor such as a CS (contact type image sensor), an image processing controller, and the like. The unit 105 optically reads a document image, converts an optical image into electrical image data, performs various kinds of image processing such as binarization processing, halftone processing, and the like of the image data, and outputs high-definition image data.

A converter 106 converts image data in a run-length (RL) format, which is software-decoded by the facsimile MPU 101, into raw image (RAW) data.

A resolution conversion 107 converts raw image data having a main-scan resolution of 8 pel/mm on the facsimile unit 1 side into raw image data having a main scan resolution of 360 dpi (dots per inch) on the printer unit 2 side.

An interface control unit 108 controls an external interface signal line 110, the internal interface signal line 302, and the like, and will be described in detail later.

The information processing terminal 109 is externally connected to the facsimile unit 1, and comprises, e.g., a personal computer, a wordprocessor, or the like.

The external interface signal line 110 connects the interface control unit 108 and the information processing terminal 109. This embodiment adopts a signal line complying with a bidirectional parallel interface described in the IEEE P1284 standard.

A motor 111 is used for picking up a document or a recording sheet.

An operation panel 112 comprises various keys, LCDs, LEDs, and the like, and performs various display operations and various input operations by an operator. A printer key for switching the operation mode between a facsimile mode and a printer mode (both the modes will be described later), a printer LED indicating that the printer mode is currently selected, and an interface LED indicating that the facsimile unit 1 is operating in accordance with an instruction from the information processing terminal 109 and a local operation is inhibited, are arranged on the operation panel 112.

A document detection sensor 113 detects a document.

The arrangement of the printer unit 2 will be described below. The printer unit 2 comprises the following arrangement.

A printer MPU 201 controls the operation of the printer unit 2. A ROM 202 stores program codes, initial value data, table data, various font data, and the like.

A RAM 203 includes a receiving buffer, raster buffer, text buffer, printer buffer, footer buffer, work area, and the like. The receiving buffer temporarily holds received data since data is transferred from the interface control unit 108 of the facsimile unit 1 at high speed. The raster buffer is used by the printer MPU 201 to analyze data in the receiving buffer in units of bytes and to extract only print data. The text buffer is used by the printer MPU 201 to analyze data in the receiving buffer in units of bytes and to extract only character codes. The printer buffer is a print data buffer used immediately before a print operation, has areas having capacities for two scans (360 bytes×64 nozzles×2 scans), and uses these areas alternately. The footer buffer is a character code buffer used for printing footer characters.

A horizontal-vertical converter 204 is used for storing print data of the raster buffer in the horizontal format in the printer buffer in the vertical format. A printing head 205 ejects an ink using a heater driver.

A recording sheet trailing end (PE) sensor 206 detects the trailing end of a recording sheet.

A footer sensor 207 comprises a LED light source for detecting a footer, and a light-receiving element for detecting light reflected by a footer mark. The footer sensor is a sensor for detecting the ink remaining amount in an ink cartridge, and detects whether or not a predetermined pattern (footer mark) is printed at a predetermined position on a recording sheet.

A motor 208 is used for feeding a recording sheet.

Interfacing between the facsimile unit 1 and the printer unit 2 will be described below.

A signal line 301 connects the facsimile MPU 101 and the printer MPU 201, and will be described in detail later.

The internal interface signal line 302 connects the interface control unit 108 and the RAM 203, and this embodiment adopts a CENTRONICS interface. The signal line 302 will be described in detail later.

An electric power supply unit 4 is connected to the facsimile unit 1.

Figure 2:
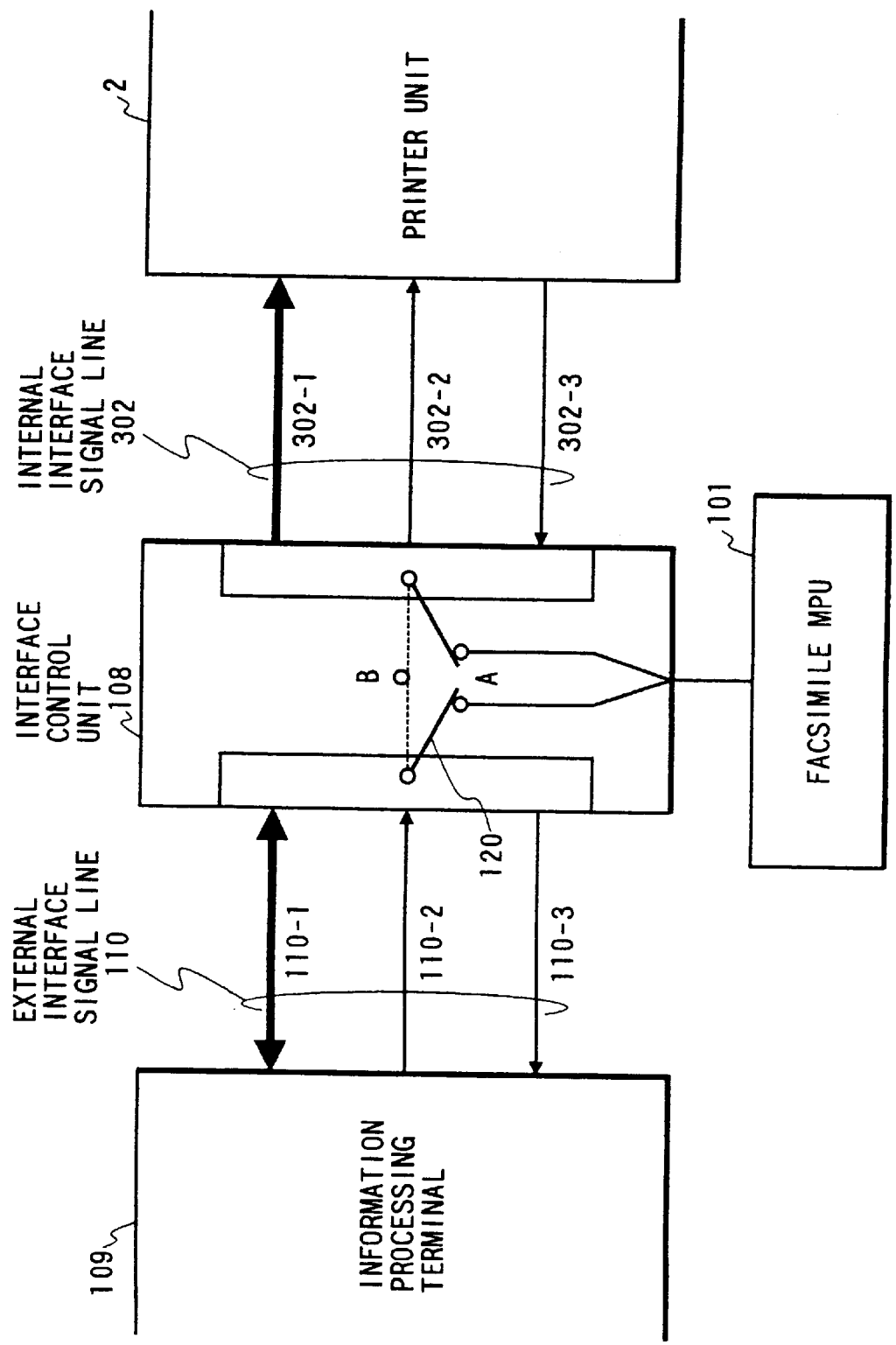
FIG. 2 is a block diagram showing the arrangement of an interface control unit 108.

FIG. 2 is a diagram showing in detail the interface control unit 108 and its peripheral circuits. The interface control unit 108 controls the external interface signal line 110 for transmitting/receiving data with the information processing terminal 109, and also controls the internal interface signal line 302 for transmitting data to the printer unit 2.

The external interface signal line 110 comprises an external data signal line 110-1, an external control signal line 110-2, and an external response signal line 110-3. The external data signal line 110-1 is a data bus used for transferring data between the information processing terminal 109 and the interface control unit 108. The external control signal line 110-2 is a signal line controlled by the information processing terminal 109 side, and corresponds to an nSelectIn signal, nStrobe signal, nAutoFd signal, nInit signal, and the like described in the IEEE P1284 standard. The external response signal line 110-3 is a signal line controlled by the interface control unit 108 side, and corresponds to a Busy signal, nAck signal, nFault signal, PError signal, Select signal, and the like described in the IEEE P1284 standard. The operations of these signal lines comply with the IEEE P1284 standard, and bidirectional data transfer can be performed between the information processing terminal and the interface control unit 108.

On the other hand, the internal interface signal line 302 connecting the interface control unit 108 and the printer unit 2 comprises an internal data signal line 302-1, an internal control signal line 302-2, and an internal response signal line 302-3. The internal data signal line 302-1 is a data bus. The internal control signal line 302-2 is a signal line controlled by the interface control unit 108 side, and corresponds to the same signals as the external control signal line 110-2. The internal response signal line 302-3 is a signal line controlled by the printer unit 2 side, and corresponds to the same signals as the external response signal line 110-3. The operations of these signal lines comply with the Centronics standard, and data transfer can be performed in only the direction from the interface control unit 108 to the printer unit 2.

This facsimile apparatus has the facsimile mode in which the printer unit 2 serves as a recording system of the facsimile unit 1, and the printer mode in which the printer unit 2 serves as a printer of the information processing terminal 109. These modes are switched in accordance with an instruction from the facsimile MPU 101.

The switching operation between the facsimile mode and the printer mode is attained in response to the depression of the printer key or a command set switching instruction command from the information processing terminal 109. Upon depression of the printer key, if the current mode is the printer mode, the facsimile mode is selected, and vice versa. Upon switching, the ON/OFF switching operation of a software power supply of the printer unit 2, the ON/OFF switching operation of the printer LED, and the switching operation of an interface signal line control selection SW 120 are performed. Processing in response to the command set switching instruction command will be described in detail later. The interface control unit 108 comprises the interface signal line control selection SW 120 which is switched between the facsimile mode and the printer mode.

In the facsimile mode, the interface signal line control selection SW 120 is connected to the A side, and the external interface signal line 110 and the internal interface signal line 302 are under the control of the facsimile MPU 101. Therefore, the printer unit 2 can serve as a recording system of the facsimile unit 1 while performing bidirectional data transfer with the information processing terminal 109 via the external interface signal line 110. At this time, the facsimile unit 1 transfers control commands, image data, and character code data to the printer unit 2 in accordance with a general command set and a facsimile command set.

On the other hand, in the printer mode, the interface signal line control selection SW 120 is connected to the B side, and the external interface signal line 110 is directly connected to the internal interface signal line 302. More specifically, the signal lines 110-1 and 302-1, 110-2 and 302-2, and 110-3 and 302-3 are respectively directly connected to each other, and the information processing terminal 109 can directly transfer data to the printer unit 2. At this time, the information processing terminal 109 transfers control commands, image data, and character code to the printer unit 2 in accordance with the general command set. The facsimile MPU 101 cannot control the above-mentioned signal lines, and hence, cannot use the printer unit 2 as the recording system of the facsimile unit 1.

Figure 3:
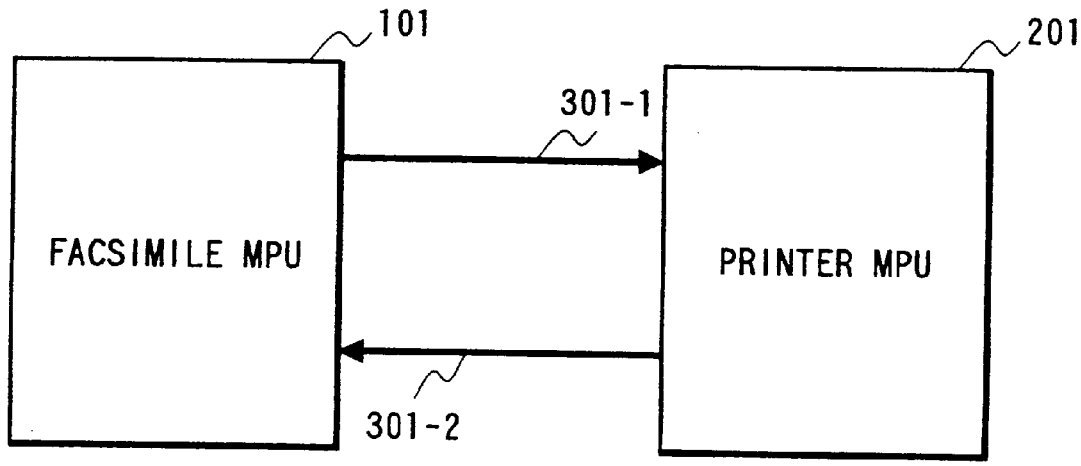
FIG. 3 is a diagram showing signal lines between a facsimile unit 1 and a printer unit 2.

FIG. 3 is a diagram showing in detail the signal line 301. The signal line 301 includes two different types of signal line groups, i.e., a signal line group 301-1 for transferring signals from the facsimile MPU 101 to the printer MPU 201 and a signal line group 301-2 for transferring signals from the printer MPU 201 to the facsimile MPU 101.

The signal line group 301-1 for transferring signals from the facsimile MPU 101 to the printer MPU 201 includes the following signal lines.

(1) Reset Signal Line

This signal line is used when the power supply is turned on, and when an abnormality of the printer unit 2 is removed.

(2) Automatic Recovery Inhibition Signal Line

This signal line is used when the automatic recovery operation of the printer unit 2 is inhibited.

(3) Facsimile Mode Signal Line

This signal line is used for informing the printer unit 2 that the apparatus is operating in the facsimile mode. The facsimile command set (to be described later) can be used only when the facsimile mode signal line is active. The printer MPU 201 discriminates using this facsimile mode signal line whether data or a command supplied to the printer unit 2 via the internal interface signal line 302 is one from the facsimile unit 1 or one from the information processing terminal 109.

(4) Emulation Mode Signal Line

This signal line is used for informing the printer unit 2 of the type of emulation mode in the printer mode. The emulation mode can be changed in a user registration operation. That is, this signal line is used for selecting a command set since a command set to be used in the printer varies depending on the type of information processing terminal 109.

(5) Software Power Supply Switch Signal Line

This signal line controls the ON/OFF state of the power supply of the printer unit 2 in a software manner. The power supply of the printer unit 2 is turned on in a software manner using this software power supply switch signal line when the power supply is turned on in a hardware manner, before and after a printing operation, when a printer setting registration is changed, and when the operation mode is switched to the printer mode.

(6) On-line Switch

This signal line controls the on-line/off-line state between the facsimile unit 1 and the printer unit 2.

The signal line group 301-2 for transferring signals from the printer MPU 201 to the facsimile MPU 101 will be described below.

(7) Idle Signal Line

This signal line is used for informing the facsimile unit I of an idle state of the printer unit 2. The idle state means a state wherein the printer unit 2 has processed all the received control commands. If the printer unit 2 is not in the idle state, the facsimile unit 1 may not perform a software power OFF operation of the printer unit 2.

(8) Sheet Feed Request Signal Line

This signal line is used for informing the facsimile unit 1 that the printer unit 2 performs a sheet feed operation of a recording sheet. The sheet feed request signal line is used in the facsimile mode when the printer unit 2 receives data to be printed from the facsimile unit 1 or when printing data exceeds one recording sheet, i.e., in printing an elongated document. In the printer mode as well, the sheet feed request signal line is used when the printer unit 2 receives data to be printed from the information processing terminal 109 or when printing data exceeds one recording sheet, i.e., in printing an elongated document.

(9) Ink Remaining Amount Detection Output Signal Line

This signal line is used for informing the facsimile unit 1 that the ink presence/absence result can be discriminated.

This signal line achieves its function in combination with an ink remaining amount detection result signal line in item (10) below. The facsimile apparatus of this embodiment has an ink remaining amount detection function as a function effective during only a printing operation of a received image in the facsimile mode. In consideration of the nature of the received image, the received image must be reliably printed. Therefore, when an ink is used up, a message indicating this is supplied to the facsimile unit 1. The facsimile unit 1 stores the received image in the memory, and performs, e.g., a display for prompting a user to exchange an ink cartridge. Thereafter, the facsimile unit 1 proceeds to print the received image again. As the detection method of the ink remaining amount, footer printing/detection is performed. In the footer printing/detection, an ink remaining amount detection mark (footer) is printed at a predetermined position on the trailing end of each page on which the received image is printed, and the mark is detected by a photosensor. If the output from the photosensor indicates black, the presence of an ink is determined; if the output from the photosensor indicates white, the absence of an ink is determined.

(10) Ink Remaining Amount Detection Result Signal Line

This signal line is used for informing the facsimile unit 1 of the ink presence/absence result. This signal line can achieve its function in combination with the ink remaining amount detection output signal line in item (9) above. Upon detection of the absence of an ink, this ink remaining amount detection result is output, and the ink remaining amount detection output signal line in item (9) is activated. Therefore, the facsimile unit 1 can detect the presence/absence of an ink with reference to this ink remaining amount detection result after it confirms the status of the ink remaining amount detection signal line in item (9).

(11) Recording Sheet Color Paper Signal Line

This signal is used for informing the facsimile unit 1 that the recording sheet is color paper. This signal lines achieves its function in combination with the ink remaining amount detection output signal line in item (9). When it is detected that the recording sheet is color paper, this recording sheet color paper signal is output, and thereafter, the ink remaining amount detection output signal line is activated. Therefore, the facsimile unit 1 can detect whether or not the recording sheet is color paper, with reference to this recording sheet color paper signal after it confirms the status of the ink remaining amount detection output signal line in item (9).

(12) Cartridge Presence/absence Signal Line

This signal line is used for informing the facsimile unit 1 of the presence/absence of an ink cartridge. When a cartridge absence or presence state is consecutively detected 16 times in a 100-msec timer interrupt, the printer unit 2 changes the status of the cartridge presence/absence signal line. When the facsimile unit 1 detects the absence of a cartridge with reference to this cartridge presence/absence signal line, it prompts to mount a cartridge by means of, e.g., an LCD display, and inhibits a printing operation in the facsimile mode.

(13) Correct/wrong Cartridge Signal Line

This signal line is used for informing the facsimile unit 1 as to whether the cartridge is correct or wrong. When a wrong or correct cartridge mount state is consecutively detected 16 times in a 100-msec timer interrupt, the printer unit 2 changes the status of the correct/wrong cartridge signal line. When the facsimile unit 1 detects a wrong cartridge with reference to this correct/wrong cartridge signal line, it prompts to mount a correct cartridge by means of, e.g., an LCD display.

(14) Software Power Supply Signal Line

This signal line indicates a software power state of the printer unit 2. In the facsimile mode, the printer unit is set in the ON state during a printing operation and recovery operation. On the other hand, in the printer mode, the printer unit 2 is always set in the ON state independently of a standby state.

(15) On-line Signal Line

This signal line indicates the on-line or off-line state of the printer unit 2 in the facsimile mode. In the off-line state, the printer unit 2 does not accept commands using the internal interface signal line 302.

(16) Error Signal Line

This signal line indicates the error state of the printer unit 2.

(17) Facsimile Mode Return Request Signal Line

This signal line is used for informing the facsimile MPU 101 that a facsimile mode return request command is received from the information processing terminal 109 in the printer mode. The facsimile MPU 101 which received this information controls to switch the printer mode to the facsimile mode. The switching control will be described in detail later.

Command sets will be described in detail below.

Command sets using the internal interface signal line 302 include a command set for a general printer (general command set), and a facsimile command set. The command set for a general printer is a command set (e.g., X24E, IBM; PCL, Hewlett Packard; and the like) exclusively used for a printer, which is normally used, and can be used in both the facsimile and printer modes. The command set in the printer mode can be changed by user registration.

The facsimile command set is a special command set which is prepared in association with functions that cannot be realized by only the general command system. Due to specific functions, this command set is supported in only the facsimile mode. The printer unit 2 ignores a command of this command set if it receives the command in the printer mode.

The facsimile command set includes the following commands.

(1) Printer Setting Command

This command is associated with initial setting of the printer unit 2. This command is used when the power supply is turned on, when the printer setting registration is to be changed, when a sheet feed operation is performed in the facsimile mode, when a recording sheet is discharged in the facsimile mode, and when the facsimile mode results in an error termination.

(2) Bidirectional Printing Correction Command

This command is used for correcting a deviation between forward and backward scans upon execution of bidirectional printing. This command is used when the power supply is turned on and when a recording sheet is fed in the facsimile mode. Since the printer unit 2 adopts a shuttle printing system for recording an image while moving the head with a plurality of ink ejection orifices in the main scan direction using a carriage, a correction value of a printing deviation between forward and backward scans is transferred to the printer unit 2 as a value in units of printing modes or a value in units of apparatuses. The printer unit 2 performs bidirectional printing correction based on the bidirectional printing correction value when the power supply is turned on in a software manner and immediately before the printing operation is started.

(3) Bidirectional Printing Command

This command is associated with bidirectional printing and unidirectional printing. This command is used when a recording sheet is fed in the facsimile mode. This command transfers, to the printer unit, the bidirectional or unidirectional mode (that can be independently set in an image printing operation and a character code printing operation in the facsimile mode) selected by user registration. The printer mode ignores user registration.

(4) Footer Printing Command

This command is a group of commands including a command for designating the ON/OFF state of a receive information footer printing operation, a command for designating the ON/OFF state of the ink remaining amount detection, a command for designating the number of PE detection start scans, and footer character codes. This command is used in a sheet feed operation in units of pages of received images.

The receive information footer means information character data including the date of reception of an image by its own apparatus, receipt number, received image page, and the like. When the receive information footer printing operation is set in the ON state by user registration, the printer unit prints information character data developed using font data of the printer unit on the trailing end of a recording sheet immediately before the recording sheet is discharged. When the ink remaining amount detection is set in the ON state by user registration, an ink remaining amount detection mark for the ink remaining amount detection is printed in the same scan as the receive information footer, and the ink remaining amount detection processing is performed.

(5) Facsimile Image Command

This command transfers the conversion ratio of resolution conversion in the sub-scan direction together with image data for one line. This command is used when a received image, a copy image, and a non-transmitted image are printed. The resolution conversion in the main scan direction is attained by a hardware circuit (8 pel—360 dpi resolution converter 107). On the other hand, the resolution conversion in the sub-scan direction is realized in a software manner. A software program in the facsimile unit 1 calculates the conversion ratio, and transfers the conversion ratio of the resolution conversion together with image data for one line in this command. On the other hand, upon receiving the image data for one line and the conversion ratio, a software program of the printer unit 2 expands the image data for one line based on the conversion ratio, and prints the converted image.

(6) Facsimile Reset Command

This command is used for initializing various flags of the printer unit used in the printer mode. This command is used when a recording sheet is discharged in the facsimile mode.

Figure 4:
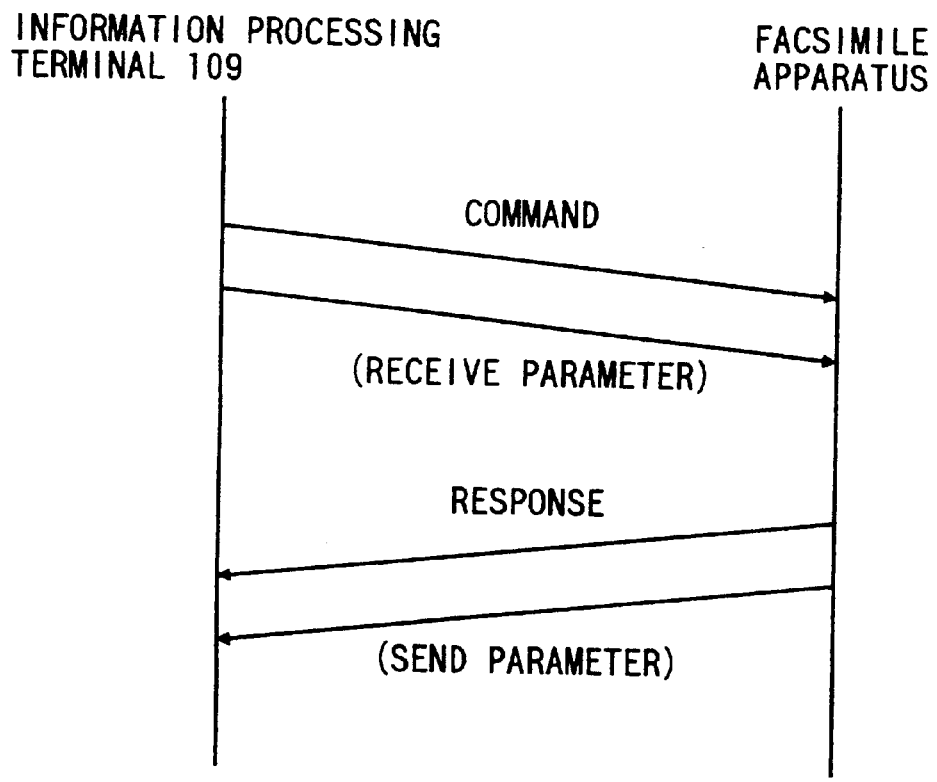
FIG. 4 is a schematic chart showing the data transmission/reception procedure between an information processing terminal and the facsimile apparatus in the facsimile mode.

FIG. 4 is a schematic chart of data transmission/reception between the information processing terminal 109 and the interface control unit 108 in the facsimile mode.

Commands, responses, and the like are transmitted/received between the information processing terminal 109 and the facsimile apparatus in accordance with a predetermined interface protocol in each of various operations. First, the information processing terminal 109 sends a command corresponding to an operation to be executed to the facsimile apparatus. At this time, a receive parameter may often be attached depending on the type of command. The command stores a command code for identifying the command, the size of a receive parameter following the command, and the like. The receive parameter stores a setting value (file ID, resolution, or the like) required for executing an operation corresponding to the command, and image data. In this facsimile apparatus, the interface control unit 108 normally stores such command and receive parameter at a predetermined address in the work area of the RAM 103 in turn by DMA processing. In this case, the image buffer in the RAM 103 is used for a specific receive parameter with a large data volume.

Upon reception of the command, the facsimile apparatus generates and sends a response to the command. The types of response include an OK response indicating that the received command is accepted, an NG response indicating that the received command is not accepted due to its error, and a BUSY response indicating that the received command is not currently accepted since, e.g., another operation is being performed. In the case of the OK response, a send parameter may often be attached. The send parameter stores information such as a transmission/print result, a file attribute, and the like, in the facsimile apparatus in correspondence with the received command. In this facsimile apparatus, these response and send parameter are normally sequentially sent from the predetermined address in the work area in the RAM 103 to the information processing terminal 109 via the interface control unit 108 by DMA processing. In this case, the image buffer in the RAM 103 is used for a specific send parameter with a large data volume.

Figure 5:
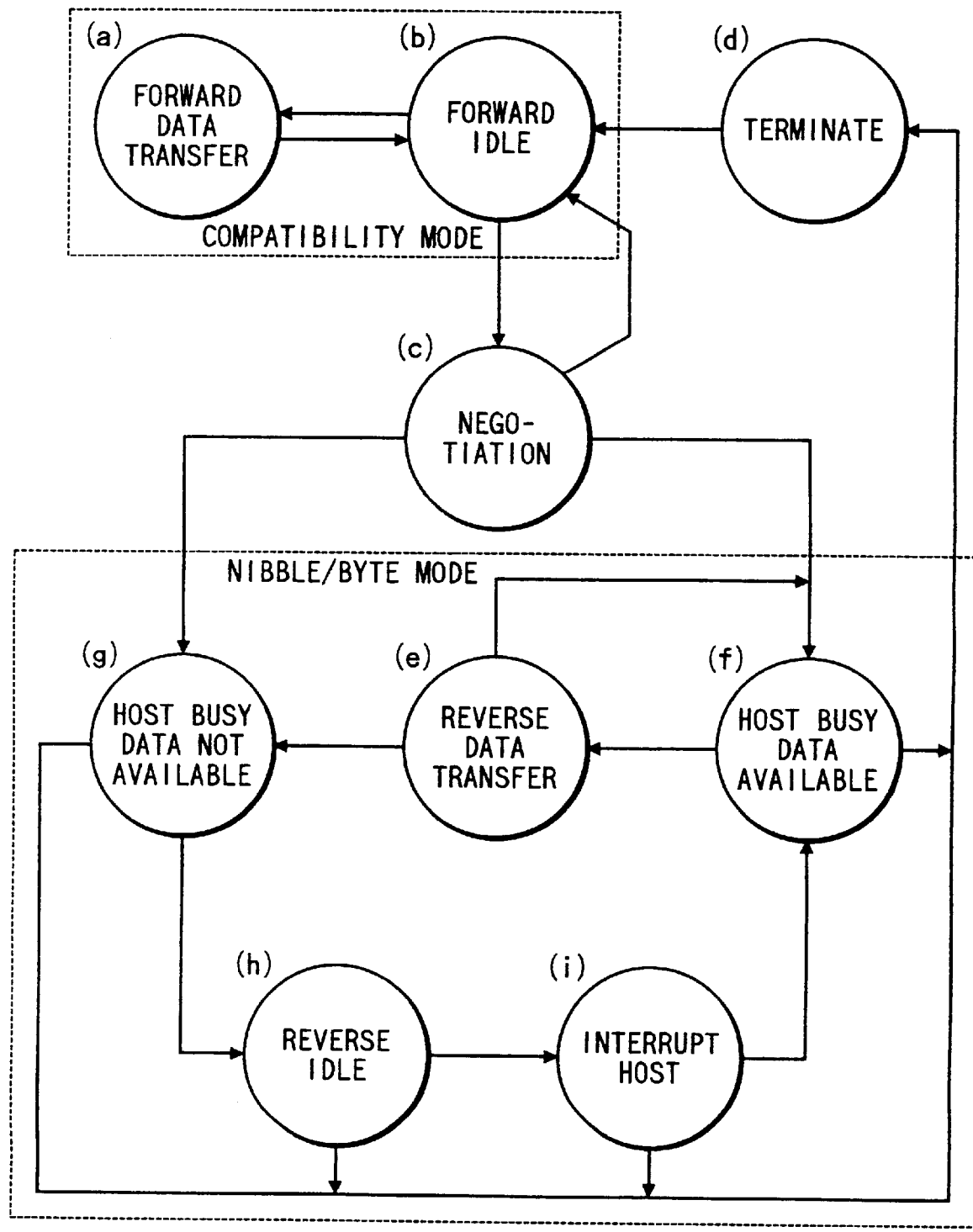
FIG. 5 is a phase transition diagram of an IEEE P1284 standard bidirectional parallel interface.

FIG. 5 is a phase transition diagram in a Nibble Mode and a Byte Mode described in the IEEE P1284 standard.

Processing in each phase and transition from a given phase to another phase are executed by handshake control using the external interface signal line 110 between the information processing terminal 109 and the interface control unit 108. Therefore, the information processing terminal 109 and the facsimile apparatus can always be in an identical phase. In a Compatibility Mode in FIG. 5, data transfer is performed in a direction from the information processing terminal 109 to the interface control unit 108 (to be referred to as a forward direction hereinafter). In the Nibble/Byte Mode, data transfer is performed in a direction from the interface control unit 108 to the information processing terminal 109 (to be referred to as a reverse direction hereinafter).

In the facsimile mode of this facsimile apparatus, an interrupt is generated in response to a change in signal line of the external control signal line 110-2 during processing other than a data transfer operation, and handshake control is attained by changing the external response signal line 110-3 in the interrupt processing. In the data transfer operation, the handshake control is automatically executed in a hardware manner in combination with DMA processing.

Since the details in the respective phases are described in the IEEE P1284 standard, the respective phases will be briefly described below.

(a) Forward Data Transfer Phase

In this phase, data transfer for one byte is performed in the forward direction.

(b) Forward Idle Phase

In this phase, a transition to data transfer in the forward direction or to a Negotiation Phase is allowed. The above-mentioned command and receive parameter are transferred from the information processing terminal 109 to the interface control unit 108 by repeating (a) and (b) in units of byte.

(c) Negotiation Phase

In this phase, a mode transition from the Compatibility Mode to the Nibble/Byte Mode is allowed.

(d) Termination Phase

In this phase, a mode transition from the Nibble/Byte Mode to the Compatibility Mode is allowed.

(e) Reverse Data Transfer Phase

In this phase, data transfer for one byte is performed in the reverse direction.

(f) Host Busy Data Available Phase

In this phase, there is data to be sent in the reverse direction, but the information processing terminal 109 is busy (cannot receive data). The above-mentioned response and send parameter are transferred from the interface control unit 108 to the information processing terminal 109 by repeating (e) and (f) in units of byte.

(g) Host Busy Data Not Available Phase

In this phase, there is no data to be sent in the reverse direction, and the information processing terminal 109 is busy.

(h) Reverse Idle Phase

In this phase, the control waits for generation of data in the reverse direction in the facsimile apparatus.

(i) Interrupt Host Phase

In this phase, a message indicating that data to be sent to the information processing terminal 109 (data in the reverse direction) is generated in the facsimile apparatus is supplied from the facsimile apparatus to the information processing terminal 109.

Of phase transitions of (a) to (i), the facsimile apparatus can activate only the phase transition from (h) to (i), and all other phase transitions are started by activation from the information processing terminal 109. Therefore, even when data to be sent is present in the facsimile apparatus, it is not always sent immediately.

This standard allows a transition to (f) if data to be sent (e.g., a response) is already present in the facsimile apparatus at the time of (c). However, this facsimile apparatus does not allow a transition from (c)→ (f), and must transit phases in the order of (c)→ (g)→ (h). If data to be sent is generated in the facsimile apparatus at the time of (h), the facsimile apparatus activates a transition from (h) to (i), and then repeats (f) and (e) to perform data transfer. A sending start possible flag (to be described later) in the work area of the RAM 103 is a flag indicating that the control is in the Reverse Idle Phase, and is set in the ON state upon a transition from (g) to (h); the OFF state upon a transition from (h) to (i) or (d).

As described above, in the printer mode, the external interface signal line 110 and the internal interface signal line 302 are directly connected to each other, and only unidirectional data transfer complying with the Centronics standard is allowed. This operation corresponds to the Compatibility Mode shown in FIG. 5. Therefore, the information processing terminal 109 activates the Negotiation Phase (c), and can identify the current mode of the facsimile apparatus on the basis of the presence/absence of a response to the activation. More specifically, if a response is detected, the information processing terminal 109 can identify that the current mode of the facsimile apparatus is the facsimile mode; if no response is detected, the current mode is the printer mode.

Figure 6B:
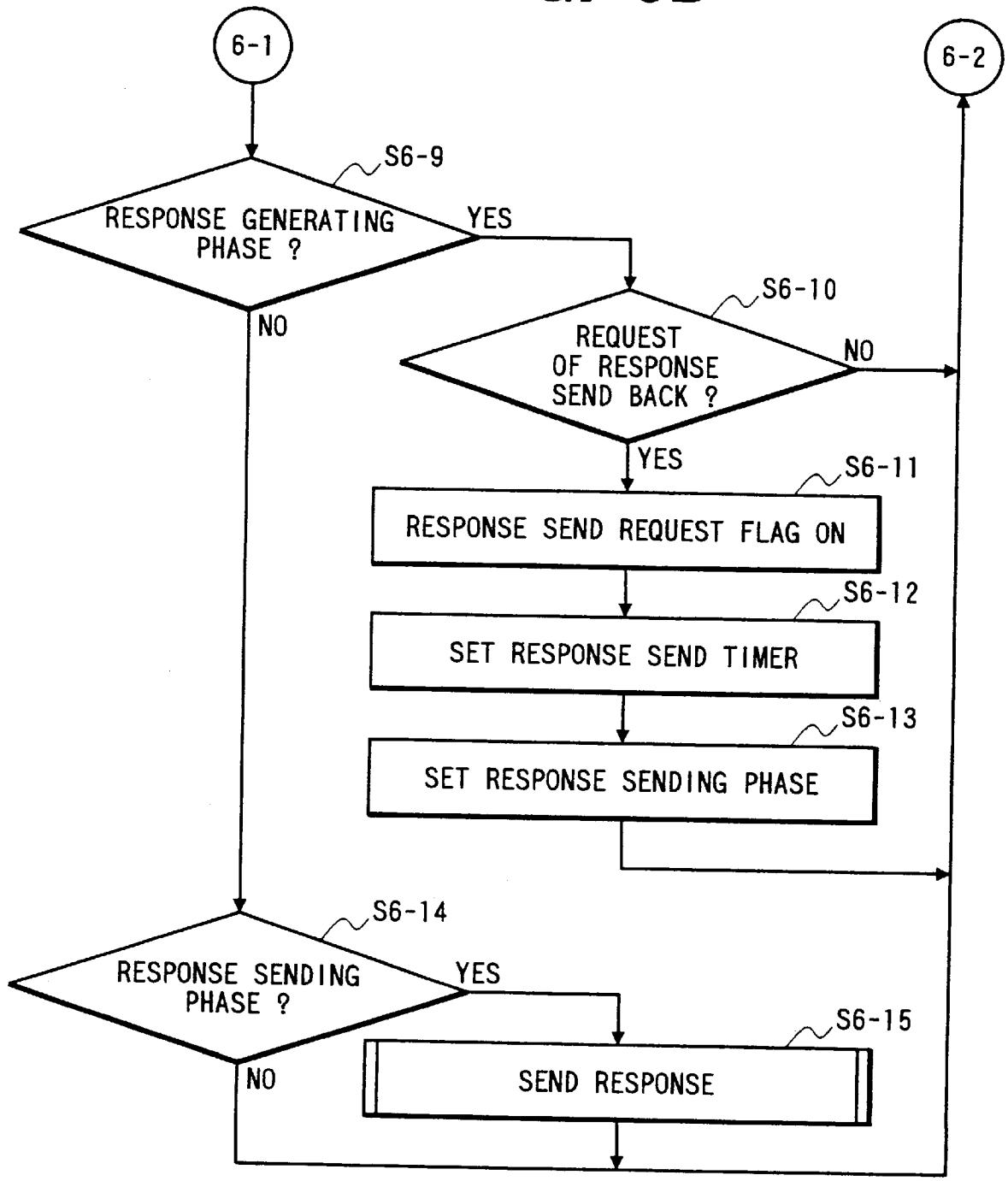

FIGS. 6A and 6B show flow charts of the operation of an interface control task.

In step S6-1, it is checked if the facsimile apparatus is in the printer mode. If YES in step S6-1, it is checked in step S6-2 if a return request to the facsimile mode is detected. The presence/absence of a return request can be determined by checking the facsimile mode return request signal line (17) in the signal line 301 from the printer MPU 201 to the facsimile MPU 101. If YES in step S6-2, a message indicating a command set switching instruction command is transmitted to a command processing task, and a value indicating a command receiving phase is stored at a predetermined address (to be referred to as a phase control RAM hereinafter) in the work area of the RAM 103, in step S6-3. Thereafter, the flow returns to step S6-1. On the other hand, if NO in step S6-2, the flow also returns step S6-1.

If it is determined in step S6-1 that the facsimile apparatus is not in the printer mode, it is checked in step S6-5 based on the value in the phase control RAM if the command receiving phase is set. If YES in step S6-5, it is checked in step S6-6 if a command and a receive parameter attached thereto are received from the information processing terminal 109. If NO in step S6-6, the flow returns to step S6-1. However, if YES in step S6-6, a message including information associated with the command and receive parameter is transmitted to the command processing task in step S6-7, and a value indicating a response generating phase is stored in the phase control RAM in step S6-8. Thereafter, the flow returns to step S6-1.

If it is determined in step S6-5 that the command receiving phase is not set, it is checked in step S6-9 based on the value in the phase control RAM if the response generating phase is set. If YES in step S6-9, it is checked in step S6-10 if a response return request (message) is received from the command processing task. If NO in step S6-10, the flow returns to step S6-1. On the other hand, if YES in step S6-10, a response send request flag in the work area of the RAM 103 is set in the ON state in S6-11. The response send request flag indicates that data to be sent to the information processing terminal 109 is present in the facsimile apparatus, and is set in the OFF state after all the data are sent. In step S6-12, a predetermined value is stored in a response send timer in the work area of the RAM 103. Note that the response send timer is decremented every predetermined period of time. With this timer, a time-out state is detected when data cannot be sent within the predetermined period of time. In step S6-13, a value indicating a response sending phase is stored in the phase control RAM, and the flow returns to step S6-1.

If it is determined in step S6-9 that the response generating phase is not set, it is checked in step S6-14 based on the value in the phase control RAM if the response sending phase is set. If YES in step S6-14, the flow advances to step S6-15 to perform response sending processing; otherwise, the flow returns to step S6-1.

Figure 7:
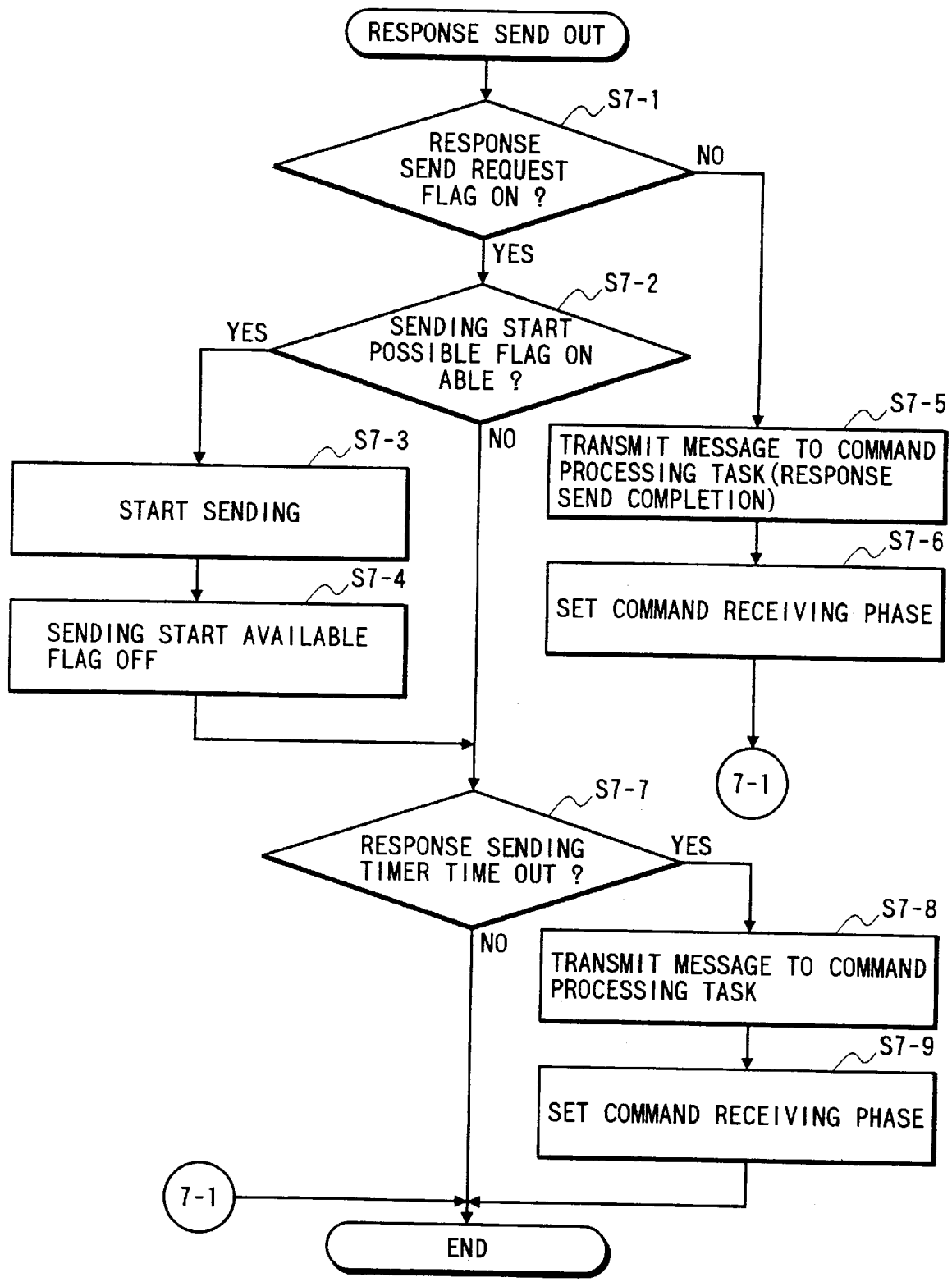
FIG. 7 is a flow chart showing the operation of response sending processing.

FIG. 7 is a flow chart showing the operation of the response sending processing.

In step S7-1, it is checked if the response send request flag is ON. If YES in step S7-1, this indicates that data to be sent to the information processing terminal 109 is present in the facsimile apparatus, and it is then checked in step S7-2 if the sending start possible flag in the work area of the RAM 103 is ON. As described above, the sending start possible flag is a flag indicating that the control is in the Reverse Idle Phase. If NO in step S7-2, the flow advances to step S7-7. On the other hand, If YES in step S7-2, the sending operation of data is started by activating a transition from (h) to (i) in FIG. 5 in step S7-3, and the sending start possible flag is set in the OFF state in step S7-4. Thereafter, the flow advances to step S7-7. On the other hand, if it is determined in step S7-1 that the response send request flag is OFF, this means that sending of all data to the information processing terminal 109 is completed, and a message indicating response send completion is transmitted to the command processing task in step S7-5. In step S7-6, the value indicating the command receiving phase is stored in the phase control RAM, thus ending the response sending processing.

It is checked in step S7-7 if the response send timer has reached a time-out state. If NO in step S7-7, the response sending processing ends. On the other hand, if YES in step S7-7, a message indicating the time-out state is transmitted to the command processing task in step S7-8, and the value indicating the command receiving phase is stored in the phase control RAM in step S7-9, thus ending the response sending processing.

With the above-mentioned processing, since processing is interrupted when the interface does not become ready for transfer within a predetermined period of time, the image processing apparatus which uses a parallel interface allowing high-speed data transfer and allows good operability can be provided.

Since exclusive control is performed using the buffers, the memory can be effectively used.

FIGS. 8A to 9B are flow charts showing the operation of the command processing task.

In step S8-001, the control waits for a message associated with a command from the interface control task. If no message associated with a command is received, step S8-001 is repeated. On the other hand, if a message associated with a command is received, the flow advances to step S8-002.

It is checked in step S8-002 if the received message indicates a file transfer instruction command. If YES (y) in step S8-002, the flow advances to step S8-003, and download file (DOWNLOAD FILE) processing is executed. Note that the details of this processing will be described later. Upon completion of the DOWNLOAD FILE processing in step S8-003, the flow returns to step S8-001.

On the other hand, if it is determined in step S8-002 that the message does not indicate a message transfer instruction command, the flow advances to step S8-004.

It is checked in step S8-004 if the received message indicates a file print instruction command. If YES in step S8-004, the flow advances to step S8-005, and file print (PRINT FILE) processing is executed. Note that the details of this processing will be described later. Upon completion of the PRINT FILE processing in step S8-005, the flow returns to step S8-001.

On the other hand, if it is determined in step S8-004 that the message does not indicate a print file instruction command, the flow advances to step S8-006.

It is checked in step S8-006 if the received message indicates a print information acquisition command. If YES in step S8-006, the flow advances to step S8-007, and print information acquisition (GET PRINT INFO.) processing is executed. Note that the details of this processing will be described later. Upon completion of the GET PRINT INFO. processing in step S8-007, the flow returns to step S8-001.

On the other hand, if it is determined in step S8-006 that the message does not indicate a print information acquisition command, the flow advances to step S8-008.

It is checked in step S8-008 if the received message indicates a file send instruction command. If YES in step S8-008, the flow advances to step S8-009, and file send (SEND FILE) processing is executed. Note that the details of this processing will be described later. Upon completion of the SEND FILE processing in step S8-009, the flow returns to step S8-001.

On the other hand, if it is determined in step S8-008 that the message does not indicate a file send instruction command, the flow advances to step S8-010.

It is checked in step S8-010 if the received message indicates a document send instruction command. If YES in step S8-010, the flow advances to step S8-011, and document send (SEND DOC) processing is executed. Note that the details of this processing will be described later. Upon completion of the SEND DOC processing in step S8-011, the flow returns to step S8-001.

On the other hand, if it is determined in step S8-010 that the message does not indicate a document send instruction command, the flow advances to step S8-012.

It is checked in step S8-012 if the received message indicates a send information acquisition command. If YES in step S8-012, the flow advances to step S8-013, and send information acquisition (GET SEND INFO.) processing is executed. Note that the details of this processing will be described later. Upon completion of the GET SEND INFO. processing in step S8-013, the flow returns to step S8-001.

On the other hand, if it is determined in step S8-012 that the message does not indicate a send information acquisition command, the flow advances to step S8-014.

It is checked in step S8-014 if the received message indicates a file forward request command. If YES in step S8-014, the flow advances to step S8-015, and upload file (UPLOAD FILE) processing is executed. Note that the details of this processing will be described later. Upon completion of the UPLOAD FILE processing in step S8-015, the flow returns to step S8-001.

On the other hand, if it is determined in step S8-014 that the message does not indicate a file forward request command, the flow advances to step S8-016.

It is checked in step S8-016 if the received message indicates a storing scan instruction command. If YES in step S8-016, the flow advances to step S8-017, and facsimile storing scan (SCAN TO FAX) processing is executed. Note that the details of this processing will be described later. Upon completion of the SCAN TO FAX processing in step S8-017, the flow returns to step S8-001.

On the other hand, if it is determined in step S8-016 that the message does not indicate a storing scan instruction command, the flow advances to step S8-018.

It is checked in step S8-018 if the received message indicates a receiving mode change instruction command. If YES in step S8-018, the flow advances to step S8-019, and receiving (RECEIVE) processing is executed. Note that the details of this processing will be described later. Upon completion of the RECEIVE processing in step S8-019, the flow returns to step S8-001.

On the other hand, if it is determined in step S8-018 that the message does not indicate a receiving mode change instruction command, the flow advances to step S8-020.

It is checked in step S8-020 if the received message indicates a receive information acquisition command. If YES in step S8-020, the flow advances to step S8-021, and receive information acquisition (GET RECEIVE INFO.) processing is executed. Note that the details of this processing will be described later. Upon completion of the GET RECEIVE INFO. processing in step S8-021, the flow returns to step S8-001.

On the other hand, if it is determined in step S8-020 that the message does not indicate a receive information acquisition command, the flow advances to step S8-022.

It is checked in step S8-022 if the received message indicates a communication control receipt number acquisition command. If YES in step S8-022, the flow advances to step S8-023, and communication control receipt number acquisition (GET ACTIVITY ID) processing is executed. Note that the details of this processing will be described later. Upon completion of the GET ACTIVITY ID processing in step S8-023, the flow returns to step S8-001.

On the other hand, if it is determined in step S8-022 that the message does not indicate a communication control receipt number acquisition command, the flow advances to step S8-024.

It is checked in step S8-024 if the received message indicates a communication control information acquisition command. If YES in step S8-024, the flow advances to step S8-025, and communication control information acquisition (GET ACTIVITY INFO.) processing is executed. Note that the details of this processing will be described later. Upon completion of the GET ACTIVITY INFO. processing in step S8-025, the flow returns to step S8-001.

On the other hand, if it is determined in step S8-024 that the message does not indicate a communication control information acquisition command, the flow advances to step S8-026.

It is checked in step S8-026 if the received message indicates a file ID acquisition command. If YES in step S8-026, the flow advances to step S8-027, and file ID acquisition (GET FILE ID) processing is executed. Note that the details of this processing will be described later. Upon completion of the GET FILE ID processing in step S8-027, the flow returns to step S8-001.

On the other hand, if it is determined in step S8-026 that the message does not indicate a file ID acquisition command, the flow advances to step S8-028.

It is checked in step S8-028 if the received message indicates a file information acquisition command. If YES in step S8-028, the flow advances to step S8-029, and file information acquisition (GET FILE INFO.) processing is executed. Note that the details of this processing will be described later. Upon completion of the GET FILE INFO. processing in step S8-029, the flow returns to step S8-001.

On the other hand, if it is determined in step S8-028 that the message does not indicate a file information acquisition command, the flow advances to step S8-030.

It is checked in step S8-030 if the received message indicates a page information acquisition command. If YES in step S8-030, the flow advances to step S8-031, and page information acquisition (GET PAGE INFO.) processing is executed. Note that the details of this processing will be described later. Upon completion of the GET PAGE INFO. processing in step S8-031, the flow returns to step S8-001.

On the other hand, if it is determined in step S8-030 that the message does not indicate a page information acquisition command, the flow advances to step S8-032.

It is checked in step S8-032 if the received message indicates a file delete instruction command. If YES in step S8-032, the flow advances to step S8-033, and file delete (DELETE FILE) processing is executed. Note that the details of this processing will be described later. Upon completion of the DELETE FILE processing in step S8-033, the flow returns to step S8-001.

On the other hand, if it is determined in step S8-032 that the message does not indicate a file delete instruction command, the flow advances to step S8-034.

It is checked in step S8-034 if the received message indicates a FAX information acquisition command. If YES in step S8-034, the flow advances to step S8-035, and facsimile information acquisition (FAX INFO.) processing is executed. Note that the details of this processing will be described later. Upon completion of the FAX INFO. processing in step S8-035, the flow returns to step S8-001.

On the other hand, if it is determined in step S8-034 that the message does not indicate a FAX information acquisition command, the flow advances to step S8-036.

It is checked in step S8-036 if the received message indicates a phone dialling (or calling) instruction command. If YES in step S8-036, the flow advances to step S8-037, and phone dialling (SIMPLE DIAL) processing is executed. Note that the details of this processing will be described later. Upon completion of the SIMPLE DIAL processing in step S8-037, the flow returns to step S8-001.

On the other hand, if it is determined in step S8-036 that the message does not indicate a phone dialling instruction command, the flow advances to step S8-038.

It is checked in step S8-038 if the received message indicates a dialling interrupt command. If YES in step S8-038, the flow advances to step S8-039, and dialling interrupt (RELEASE LINE) processing is executed. Note that the details of this processing will be described later. Upon completion of the RELEASE LINE processing in step S8-039, the flow returns to step S8-001.

On the other hand, if it is determined in step S8-038 that the message does not indicate a dialling interrupt command, the flow advances to step S8-040.

It is checked in step S8-040 if the received message indicates a command set switching instruction command. If YES in step S8-040, the flow advances to step S8-041, and command set switching (SWITCH COMMAND SET) processing is executed. Note that the details of this processing will be described later. Upon completion of the SWITCH COMMAND SET processing in step S8-041, the flow returns to step S8-001.

On the other hand, if it is determined in step S8-040 that the message does not indicate a command set switching instruction command, the flow advances to step S8-042.

If the received command indicates none of the above-mentioned commands, an NG response indicating a sequence error is sent as a message to the interface control task to request it to send back the NG response to the external information processing terminal in step S8-042. Thereafter, the flow returns to step S8-001.

With the above-mentioned processing, the command processing task receives a message associated with a command from the interface control task, and distributes the received message to processing corresponding to its contents.

The respective processing operations shown in FIGS. 8A to 9B will be explained below in the following order.

1. Download file (DOWNLOAD FILE) processing
2. File print (PRINT FILE) processing
3. Print information acquisition (GET PRINT INFO.) processing
4. File send (SEND FILE) processing
5. Send information acquisition (GET SEND INFO.) processing
6. Upload file (UPLOAD FILE) processing
7. Receiving (RECEIVE) processing
8. Receive information acquisition (GET RECEIVE INFO.) processing
9. Communication control receipt number acquisition (GET ACTIVITY ID) processing
10. Communication control information acquisition (GET ACTIVITY INFO.) processing 11. File ID acquisition (GET FILE ID) processing
12. File information acquisition (GET FILE INFO.) processing
13. Page information acquisition (GET FILE INFO.) processing
14. File delete (DELETE FILE) processing
15. Facsimile information acquisition (FAX INFO.) processing
16. Phone dialling (SIMPLE DIAL) processing
17. Dialling interrupt (RELEASE LINE) processing
18. Command set switching (SWITCH COMMAND SET) processing
19. Facsimile storing scan (SCAN TO FAX) processing
20. Document send (SEND DOC) processing The respective processing operations will be described below.

1. Download File (DOWNLOAD FILE) Processing

This operation is a function of storing image data transferred (forwarded) from the external information processing terminal in the image memory of the RAM 103 in the facsimile apparatus as image data.

This operation is realized by three commands, i.e., a file forward instruction command, page information instruction command, and image data forward instruction command. The file forward instruction command is used for informing that image data is to be forwarded from the external information processing terminal to the facsimile apparatus, and actual image data forward processing is executed in response to the image data forward instruction command. The page information instruction command is used for instructing attributes such as the data format, resolution, and the like of a page from the external information processing terminal to the facsimile apparatus in units of pages of image data. Actual image data forward processing is executed in response to the image data forward instruction command. The image data forward instruction command is used for actually forwarding image data from the external information processing terminal to the facsimile apparatus.

The downloaded image data is used in a recording operation attained by the file print (PRINT FILE) function, a sending operation attained by the file sending (SEND FILE) function, an upload operation attained by the upload file (UPLOAD FILE) function, and a deletion operation attained by the file delete (DELETE FILE) function.

Figure 10:
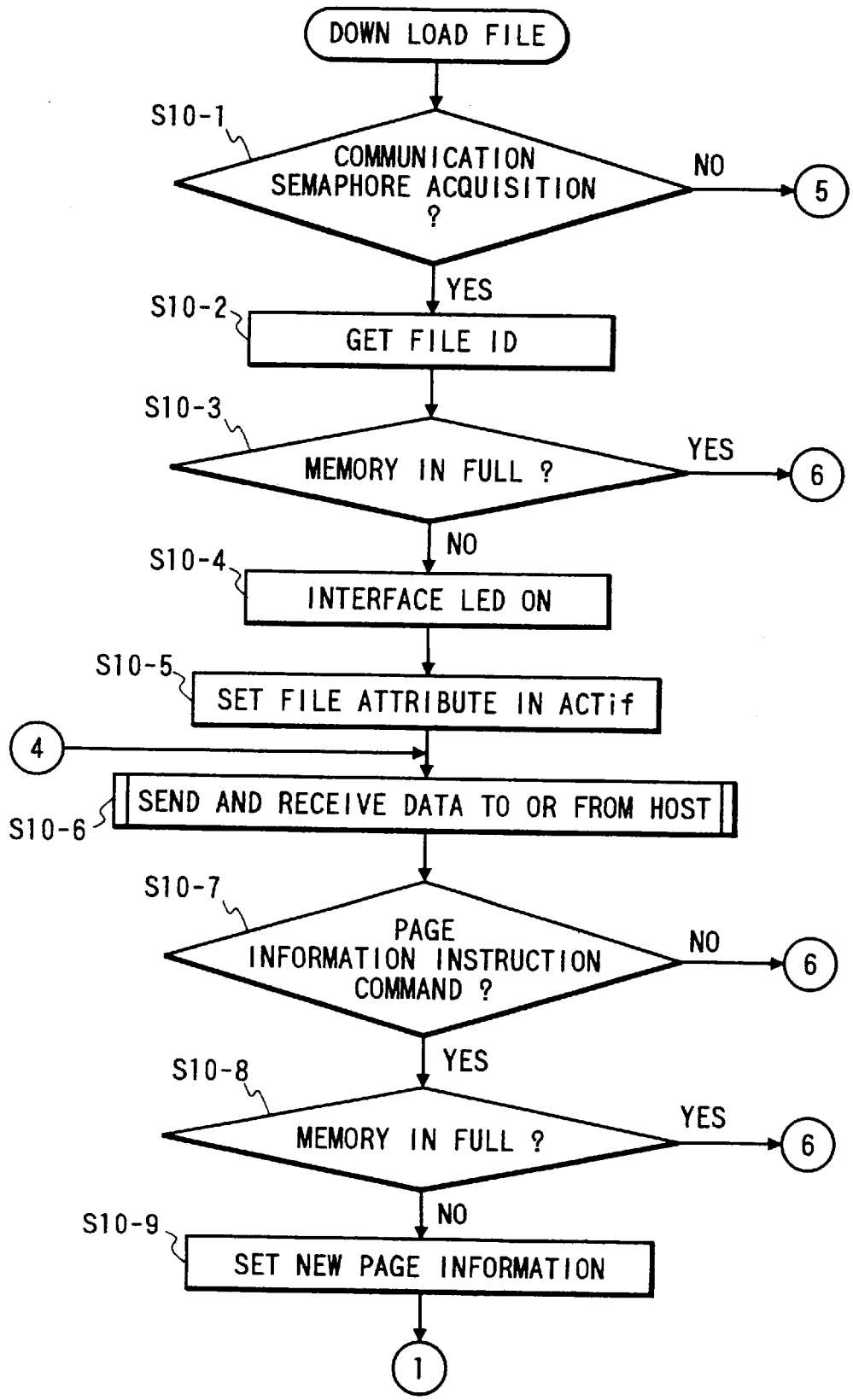
FIG. 10 is a flow chart showing the operation of download file processing.
Figure 11:
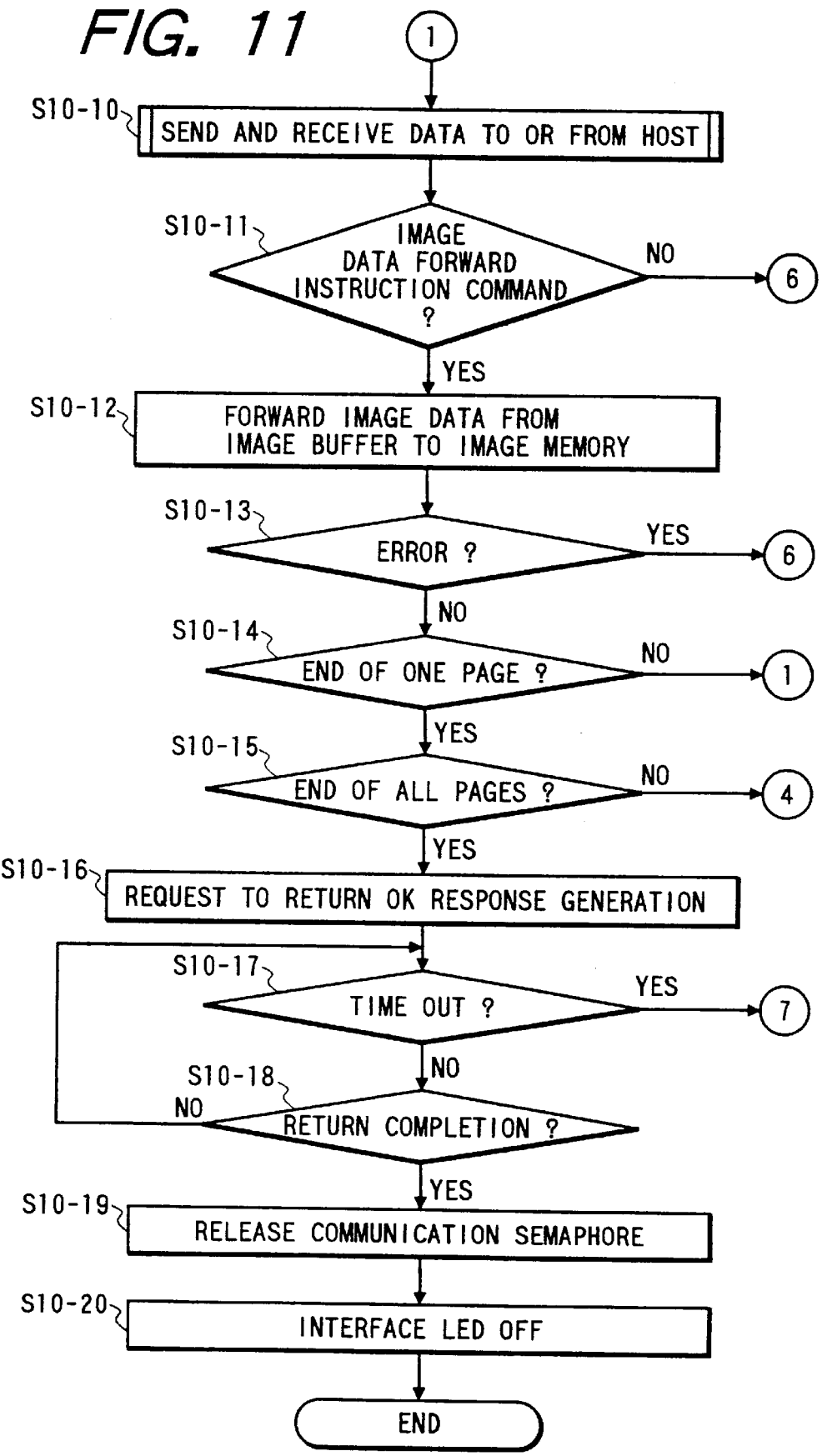
FIG. 11 is a flow chart showing the operation of the download file processing.

The detailed operation will be explained below with reference to FIGS. 10 and 11.

In step S10-1, a communication semaphore (communication resource) is acquired. The communication semaphore will be described below. The facsimile apparatus acquires the communication semaphore when it performs an operation using the communication unit, and releases the communication semaphore when it ends the operation. If the apparatus fails to acquire the communication semaphore, it cannot execute the operation (e.g., transmission, reception, or the like). Despite this limitation, the above-mentioned rule allows smooth simultaneous operations. If the communication semaphore can be acquired in step S10-1, the flow advances to step S10-2; otherwise, the flow branches to BUSY processing (to be described in detail later). In step S10-2, the file ID of image data to be downloaded is acquired. In the facsimile apparatus of this embodiment, serial numbers (file IDs) are assigned to image data stored in the image memory of the RAM 103, and the image data in the image memory of the RAM 103 are controlled on the basis of the file IDs. The file ID assumes a value falling within the range from 1 to 9,999, and is cyclically used. In step S10-3, it is checked if the image memory has an empty space. If the memory has a sufficient empty space, the flow advances to step S10-4. On the other hand, if the memory does not have a sufficient space, NG processing (to be described in detail later) is performed. In step S10-4, the interface LED is turned on to inform a user that the apparatus is in operation. During the ON period of the interface LED, any key input of the facsimile apparatus is inhibited. In step S10-5, the attribute of the image data to be downloaded is set in a file designated by the external information processing terminal. In step S10-6, data sending/receiving processing to/from a host (to be described in detail later) is performed so as to return, to the external information processing terminal, a message indicating that the facsimile apparatus can execute processing corresponding to the file forward instruction command, and to receive the next command from the external information processing terminal. If step S10-6 normally ends, the flow advances to step S10-7. It is checked in step S10-7 if the next command received from the external information processing terminal is a page information instruction command. If YES (Y) in step S10-7, the flow advances to step S10-8; otherwise, NG processing is performed. It is checked in step S10-8 if the image memory of the RAM 103 has an empty space. If the memory has a sufficient empty space, the flow advances to step S10-9. However, if the memory does not have an empty space, NG processing is performed. In step S10-9, new page information is set on the basis of the page information instruction command. In step S10-10, data sending/receiving processing to/from the host is performed to return, to the external information processing terminal, a message indicating that the operation is normally progressing, and to receive the next command from the external information processing terminal. If step S10-10 normally ends, the flow advances to step S10-11. It is checked in step S10-11 if the next command received from the external information processing terminal is an image data forward instruction command. If YES in step S10-11, the flow advances to step S10-12; otherwise, NG processing is performed. In step S10-12, data in the image buffer, which stores image data supplied from the external information processing terminal, is forwarded to the image memory. Since data reception from the external information processing terminal does not cause a transfer error unlike reception using a normal public telephone network, an error check of image data is not normally performed. Since compressed data received from the external information processing terminal is directly forwarded to the image memory without being decoded, the throughput can be improved. Since an image file controlled by the external information processing terminal can be forwarded to the facsimile apparatus by commonly using the buffer used in communications between facsimile apparatuses via a telephone line and the buffer used in data forward processing from the external information processing terminal, the RAM capacity required for buffering can be reduced.

On the other hand, upon completion of forwarding of data indicated by the forward image data length included in the image data forward instruction command, the flow advances to step S10-13. It is checked in step S10-13 if an error has occurred during execution of step S10-12. If NO (N) in step S10-13, the flow advances to step S10-14. On the other hand, if YES in step S10-13, NG processing is performed. It is checked in step S10-14 if forwarding of image data for one page from the external information processing terminal is completed. In this embodiment, image data for one page can be divisionally received on the basis of the transfer image data length included in the image data forward instruction command. Upon completion of forwarding of image data for one page, the flow advances to step S10-15. If forwarding of image data for one page is not completed yet, the flow returns to step S10-10 to continue the processing. It is checked in step S10-15 if forwarding of image data for all the pages from the external information processing terminal is completed. In this embodiment, image data for a plurality of pages can be received using a combination of the three commands (the file forward instruction command, page information instruction command, and image data forward instruction command). Upon completion of forwarding of image data for all the pages, the flow advances to step S10-16. If forwarding of image data for all the pages is not completed yet, the flow returns to step S10-6 to continue the processing. In step S10-16, an OK response to the interface control task is generated to request it to return to the external information processing terminal a message indicating that a normal operation is being performed. The interface control task executes the sending processing of the message.

In steps S10-17 and S10-18, it is checked if the interface control task has completed the return processing to the external information processing terminal. If the return processing has been completed, the flow advances to step S10-19. On the other hand, if the return processing has not been completed, and a time-out state has occurred in step S10-17, the flow branches to abnormality processing. In this embodiment, the time-out time is fixed, but may be changed by the registration operation by the facsimile apparatus or that by the external information processing terminal. In step S10-19, the communication semaphore acquired in step S10-1 is released. In step S10-20, the interface LED is turned off to inform the user that the DOWNLOAD FILE operation has ended. After the interface LED is turned off, a key input of the facsimile apparatus is permitted.

Figure 12:
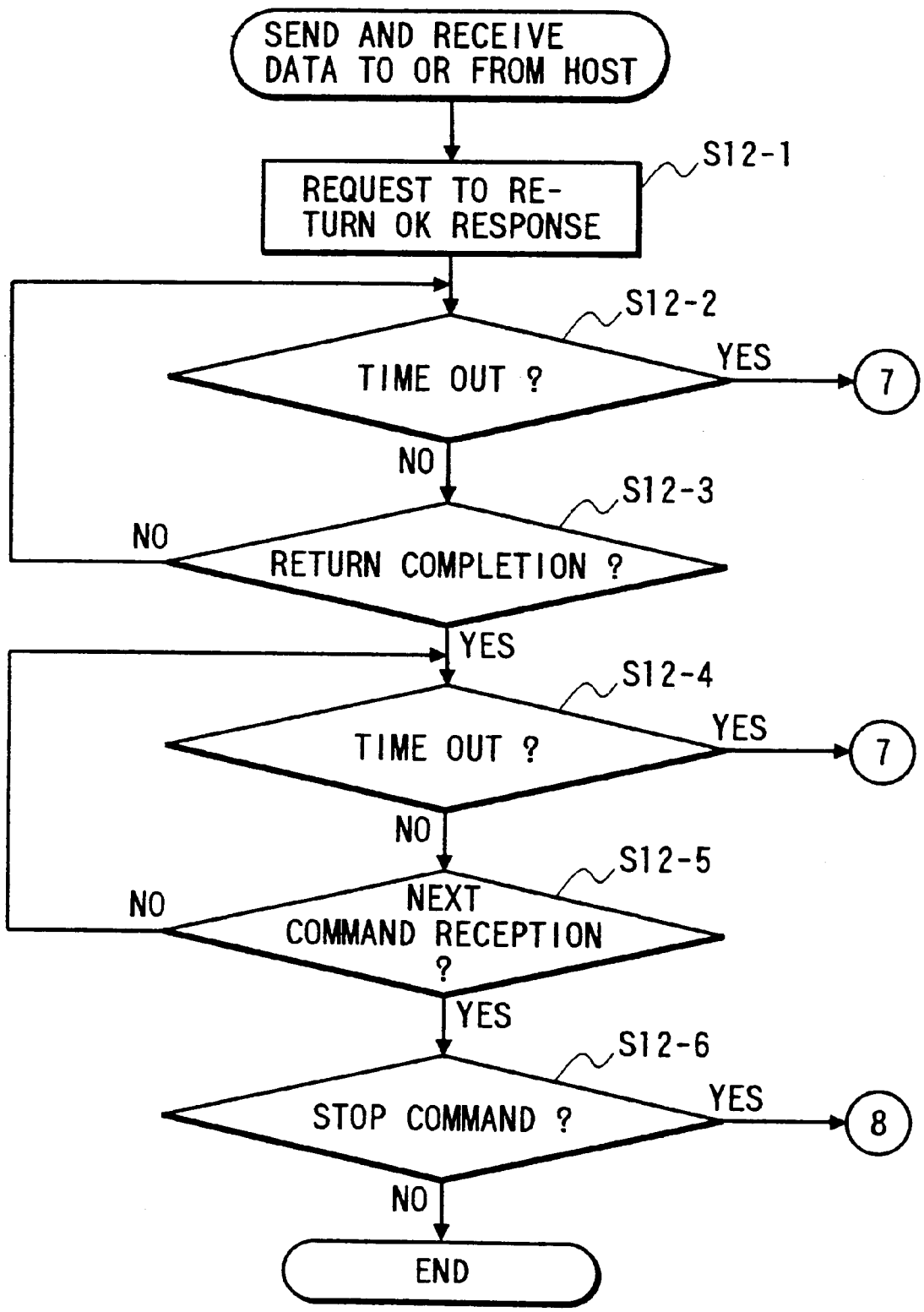
FIG. 12 is a flow chart showing in detail the data transmission/reception procedure with the external information processing terminal shown in FIGS. 10 and 11.

The data sending/receiving processing to/from the host (external information processing terminal) in steps S10-6 and S10-10 will be described in detail below with reference to FIG. 12.

In step S12-1, an OK response to the interface control task is generated to request it to return to the external information processing terminal a message indicating that a normal operation is being performed. The interface control task executes the sending processing of the message.

In steps S12-2 and S12-3, it is checked if the interface control task has completed the return processing to the external information processing terminal. If the return processing has been completed, the flow advances to step S12-4. If the return processing has not been completed, and a time-out state has occurred in step S12-2, the flow branches to abnormality processing. In this embodiment, the time-out time is fixed, but may be changed by the registration operation by the facsimile apparatus or that by the external information processing terminal.

In steps S12-4 and S12-5, the next command is received from the external information processing terminal. If the next command is received, the flow advances to step S12-6. If a time-out state has occurred in step S12-4 without receiving the next command, the flow branches to abnormality processing. In this embodiment, the time-out time is fixed, but may be changed by the registration operation by the facsimile apparatus or that by the external information processing terminal.

It is checked in step S12-6 if the received next command is a stop command. If NO in step S12-6, the processing normally ends. If YES in step S12-6, the flow branches to step S13-1.

Figure 13:
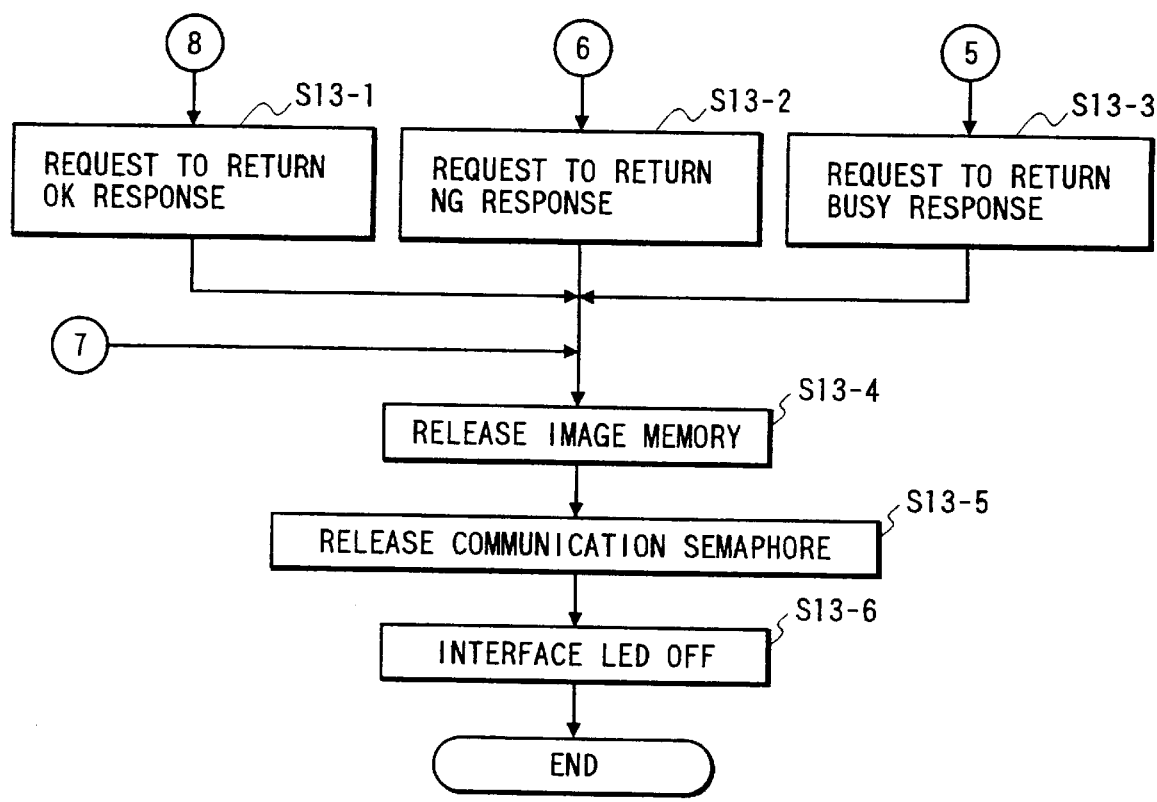
FIG. 13 is a flow chart showing in detail the post processing of FIGS. 10, 11, and 12.

The abnormality processing will be described in detail below with reference to FIG. 13.

When the flow branches to step S13-1, an OK response to the interface control task is generated to request it to return to the external information processing terminal a message indicating that a normal operation is being performed. The interface control task executes the sending processing of the message. On the other hand, when the flow branches to step S13-2, an NG response to the interface control task is generated to request it to return to the external information processing terminal a message indicating that the received command is not accepted due to its error. The interface control task executes the sending processing of the message. Also, when the flow branches to step S13-3, a BUSY response to the interface control task is generated to request it to return to the external information processing terminal a message indicating that the received command is not currently accepted since, e.g., another operation is being performed. The interface control task executes the sending processing of the message.

In step S13-4, the image memory to be used is released. In step S13-5, the communication semaphore acquired in step S10-1 is released. In step S13-6, the interface LED is turned off to inform the user that the DOWNLOAD FILE operation has ended. After the interface LED is turned off, a key input of the facsimile apparatus is permitted.

2. File Print (PRINT FILE) Processing

This operation is a function of recording a desired image, which is designated by the external information processing terminal and is stored in the image memory of the RAM 103 in the facsimile apparatus, by the facsimile apparatus.

The PRINT FILE function is realized by a file print instruction command. The file print instruction command is added with designation parameters such as a recording paper size, a file ID, and the like.

Normally, the PRINT FILE function is used together with the GET PRINT INFO. function.

An image that can be recorded by the PRINT FILE function is limited to a download image, a received image, or a scanned image designated by the external information processing terminal.

Figure 14:
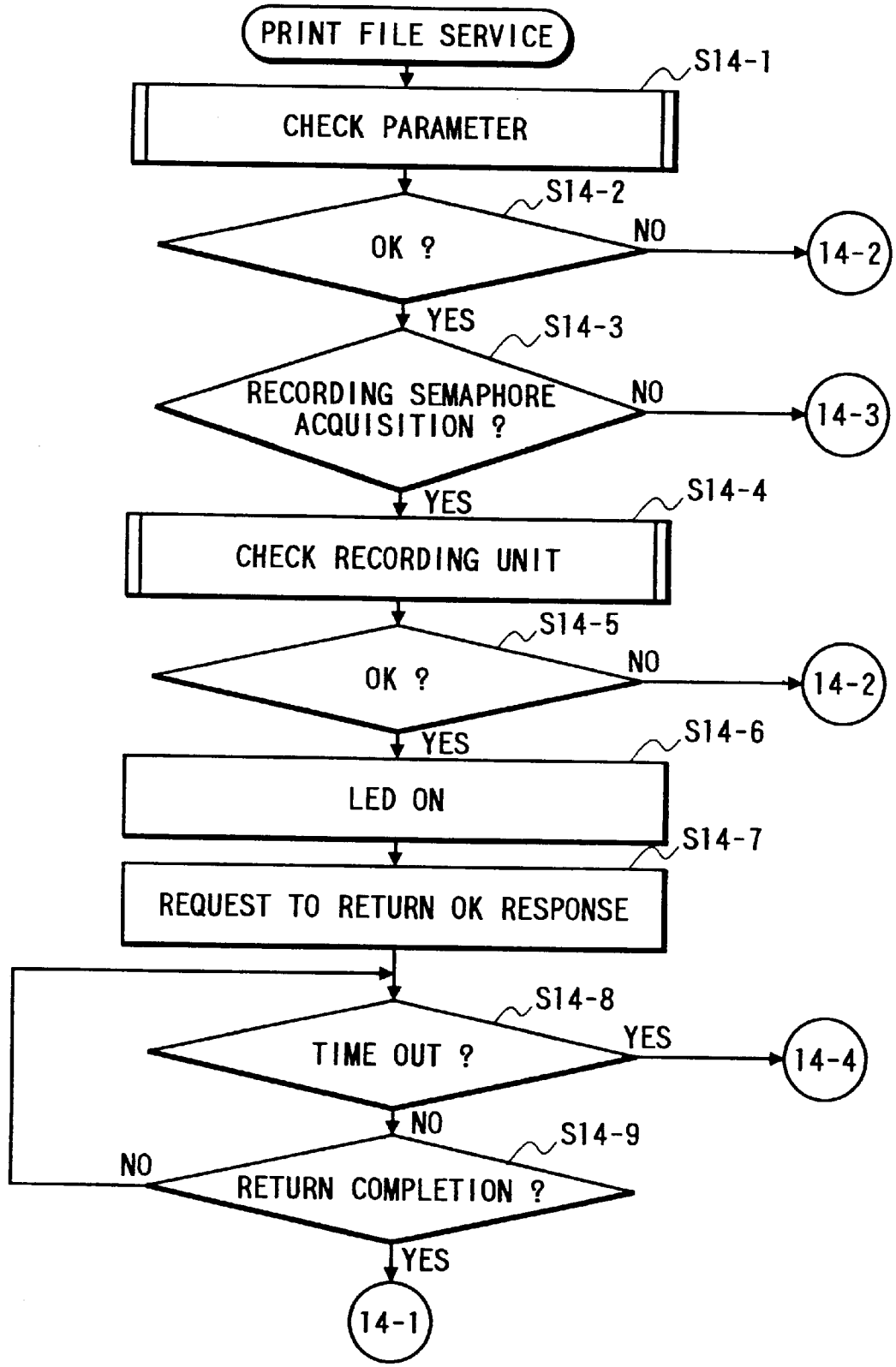
FIG. 14 is a flow chart showing the operation of file print processing.
Figure 15:
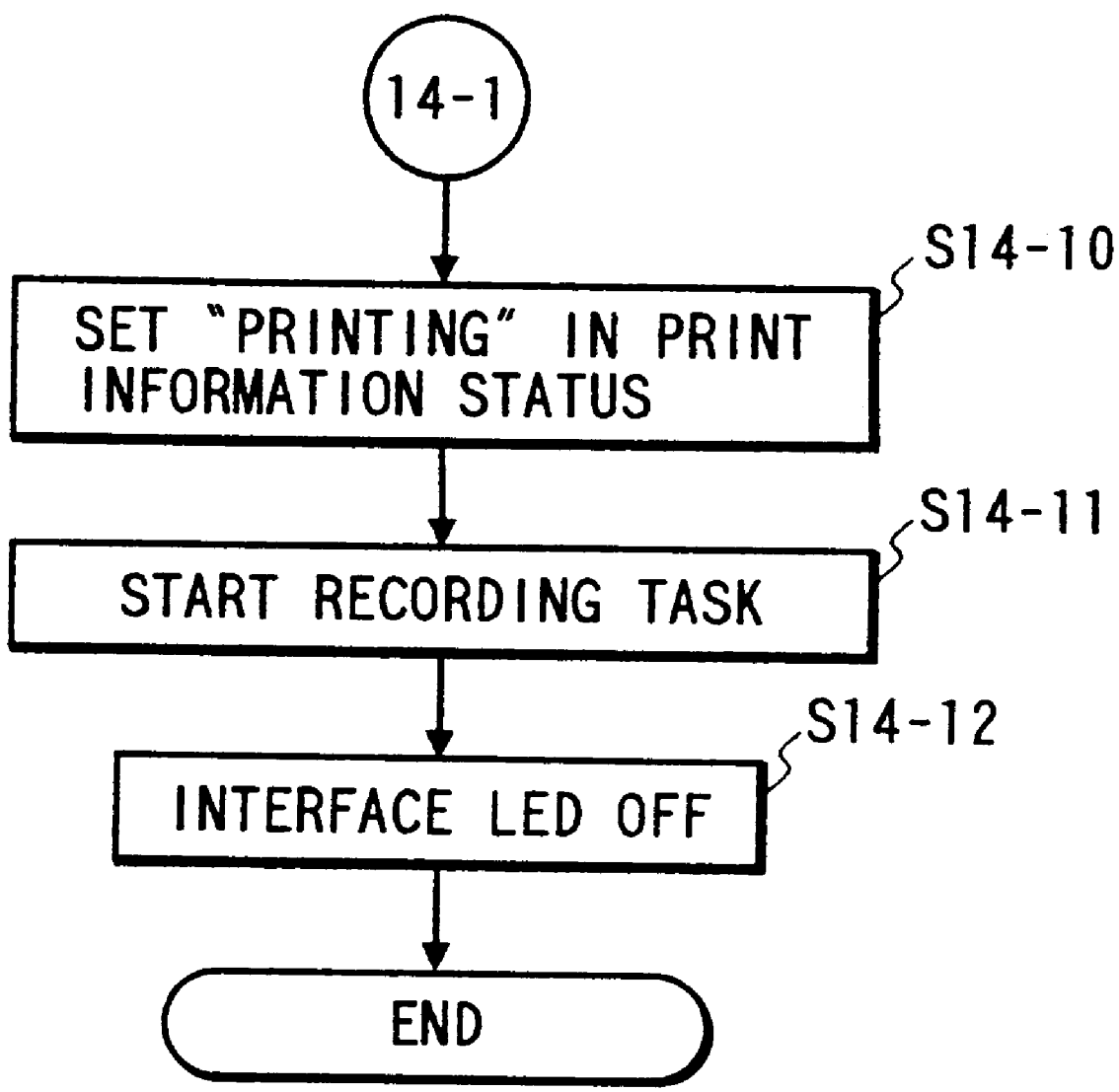
FIG. 15 is a flow chart showing the operation of the file print processing.

The detailed operation will be described below with reference to FIGS. 14 and 15.

When the command processing task determines the file print instruction command, the flow branches to step S14-1. In step S14-1, it is checked whether the receive parameter added to the file print instruction command is correct or not (to be described in detail later). The flow branches based on the discrimination result in step S14-2. If the discrimination result indicates that the parameter is correct, the flow advances step S14-3; otherwise, the flow branches to NG processing (to be described in detail later). In step S14-3, a recording semaphore (recording resource) is acquired. Since this functions performs a recording output operation, the recording semaphore must be acquired. The recording semaphore will be explained below. The facsimile apparatus acquires the recording semaphore when it operates using the recording unit, and releases the recording semaphore when it ends the operation. If the apparatus cannot acquire the recording semaphore, it cannot execute the operation (for example, recording of a received image, recording of a copy image, and the like). Despite this limitation, the above-mentioned rule allows smooth simultaneous operations (e.g., memory transmission during a copying operation). If the recording semaphore can be acquired in step S14-3, the flow advances to step S14-4; if the recording semaphore cannot be acquired, the flow branches to BUSY processing. In step S14-4, the recording unit is checked for any abnormality (to be described in detail later). The flow branches based on the discrimination result in step S14-5. If the discrimination result is OK, the flow advances to step S14-6; if an abnormality is found, the flow branches to NG processing. In step S14-6, the interface LED is turned on to inform a user that the apparatus is in operation. During the ON period of the interface LED, any key input of the facsimile apparatus is inhibited. In step S14-7, an OK response to the interface control task is generated to request it to return to the external information processing terminal a message indicating that a normal operation is being performed. The interface control task executes the sending processing of the message. It is checked in steps S14-8 and S14-9 if the interface control task has completed the return processing to the external information processing terminal. If the return processing has been completed, the flow advances to step S14-10. If the return processing has not been completed, and a time-out state has occurred in step S14-8, the flow branches to abnormality processing. In this embodiment, the time-out time is fixed, but may be changed by the registration operation by the facsimile apparatus or that by the external information processing terminal. In step S14-10, "printing" is set in the print information status. The print information status is assured on the work area of the RAM 103 in the facsimile unit 1, and is an information status for the GET PRINT INFO. processing. In step S14-11, the recording task is started to start a recording operation. The recording operation will be described later. In step S14-12, the interface LED is turned off to inform the user that the PRINT FILE operation has ended. After the interface LED is turned off, a key input of the facsimile apparatus is permitted.

Figure 16:
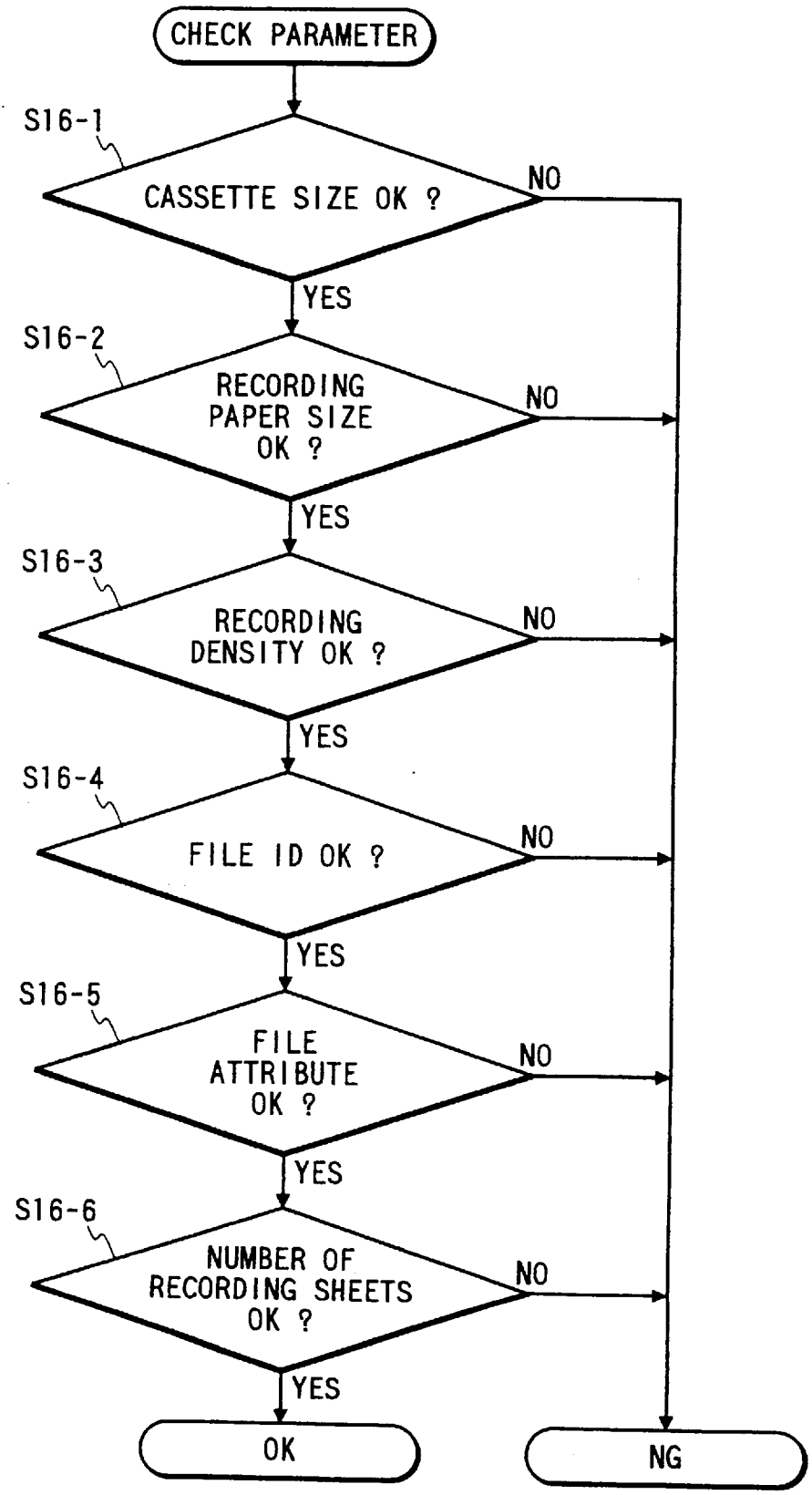
FIG. 16 is a flow chart showing in detail the parameter check processing shown in FIG. 14.

The receive parameter check processing in step S14-1 will be explained below with reference to FIG. 16.

The contents of the receive parameter include the following items having the following choices. When the contents of the receive parameter are different from the setting contents of the facsimile apparatus, a receive parameter error is generated. Alternatively, when the contents of the receive parameter are different from the setting contents of the facsimile apparatus, processing may be continued to "preferentially process the contents of the receive parameter" or to "preferentially process the setting contents of the facsimile apparatus" without generating any receive parameter error.

Recording paper cassette size: no check

Recording paper size: no check, letter, legal, A4

Recording density: standard, economy

File ID: 1 to 9999

Number of recording sheets: 1 to 99

In step S16-1, the recording paper cassette size is checked. Since the facsimile apparatus of this embodiment has a recording paper cassette (not shown) of only one size, if the contents of the receive parameter include "no check", the recording-paper cassette size is not checked, and the flow advances to step S16-2. Alternatively, a plurality of different recording paper cassettes may be mounted, and the recording paper cassette size may be checked. In step S16-2, the recording paper size is checked. The contents of the receive parameter are compared with the recording paper size registered by an operator, and if the two sizes coincide with each other, the flow advances to step S16-3. If the two sizes are different from each other, the processing abnormally ends. If the contents of the receive parameter include "no check", the flow advances to step S16-3 without any comparison. Alternatively, the recording paper size may be automatically read using, e.g., a mechanical sensor without requiring any registration by the operator. In step S16-3, the recording density is checked. The contents of the receive parameter are compared with the recording density registered by the operator, and if the two densities coincide with each other, the flow advances to step S16-4. If the two densities are different from each other, the processing abnormally ends. If the contents of the receive parameter include "no check", the flow advances to step S16-4 without any comparison. On the other hand, the recording density may be automatically set on the basis of the remaining amount of a recording ink, the density of an image, a facsimile transmission source, or the like without requiring any registration by the operator. In step S16-4, the file ID is checked. The file ID is one of serial numbers assigned to images input/output to/from the facsimile apparatus, and a desired image stored in the image memory of the RAM 103 is accessed on the basis of the file ID. In step S16-4, it is checked if an image corresponding to the file ID in the contents of the receive parameter is present in the image memory. If the corresponding image is present, the flow advances to step S16-5; otherwise, the processing abnormally ends. In step S16-5, the file attribute is checked. If the attribute of the image obtained in step S16-4 indicates a file designated by the external information processing terminal, the flow advances to step S16-6; otherwise, the processing abnormally ends. In step S16-6, the number of recording sheets is checked. If the contents of the receive parameter fall within the range from 1 to 99, the receive parameter check processing normally ends; otherwise, the processing abnormally ends.

Figure 17:
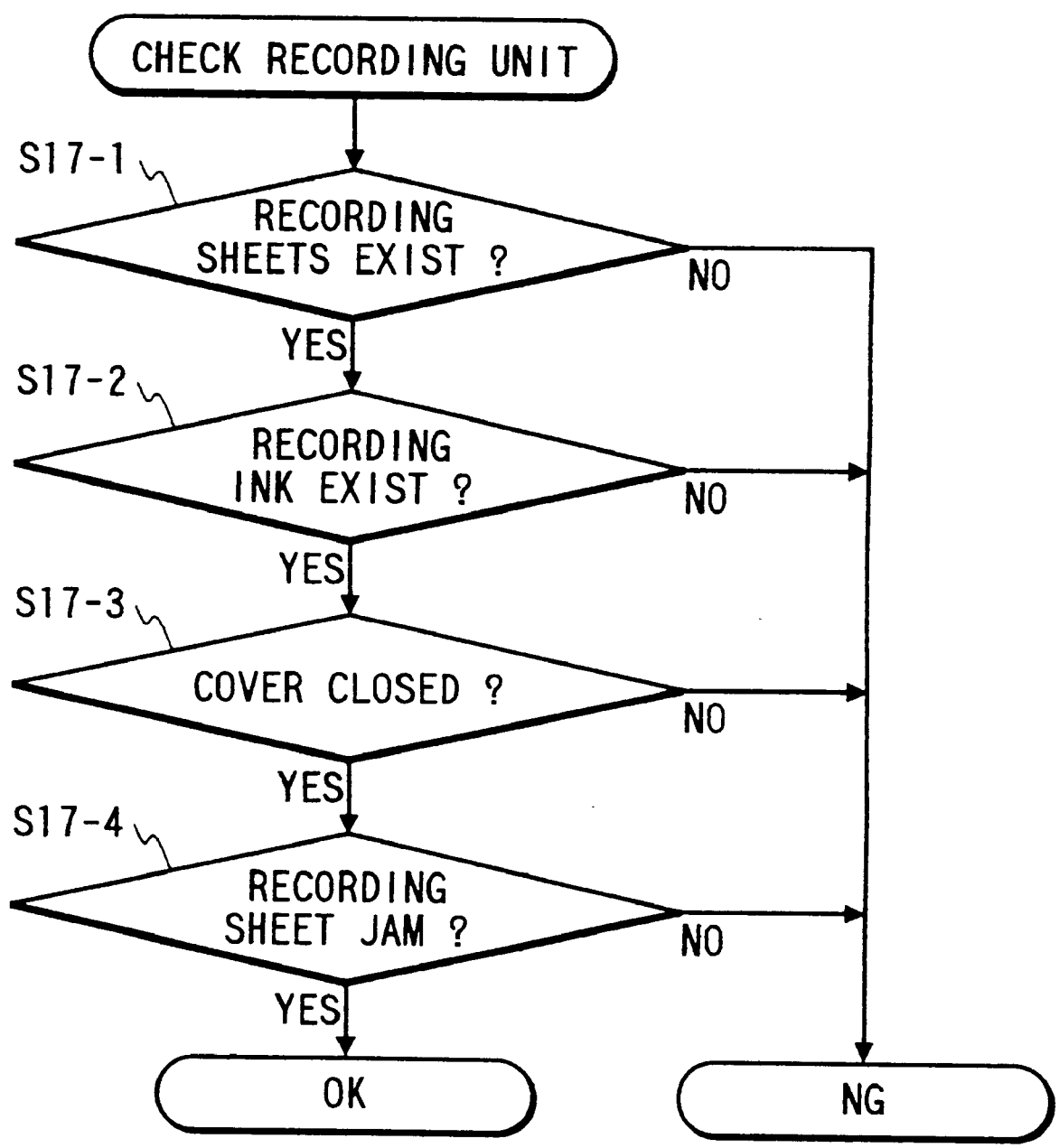
FIG. 17 is a flow chart showing in detail the recording unit check processing shown in FIG. 14.

The recording unit check processing in step S14-4 will be described below with reference to FIG. 17.

In step S17-1, the presence/absence of recording sheets is checked. Recording sheets in the recording paper cassette are detected by a recording paper sensor (not shown), and if recording sheets are detected, the flow advances to step S17-2. If no recording sheets are detected, the processing abnormally ends. In step S17-2, the presence/absence of a recording ink is checked. If the recording ink is present, the flow advances to step S17-3. If no recording ink is present, the processing abnormally ends. In this embodiment, the recording operation uses a recording ink. Alternatively, the present invention may be applied to a facsimile apparatus which uses a recording unit using, e.g., toner for laser recording. In step S17-3, it is checked if the recording cover is closed. If the recording cover is closed, the flow advances to step S17-4. On the other hand, if the recording cover is open, the processing abnormally ends. In step S17-4, the presence/absence of a recording sheet jam is checked. If no recording sheet jam is detected by the PE sensor 206 and the like, the recording unit check processing normally ends. On the other hand, if a recording sheet jam is detected by the PE sensor 206 and the like, the recording unit check processing abnormally ends.

Figure 18:
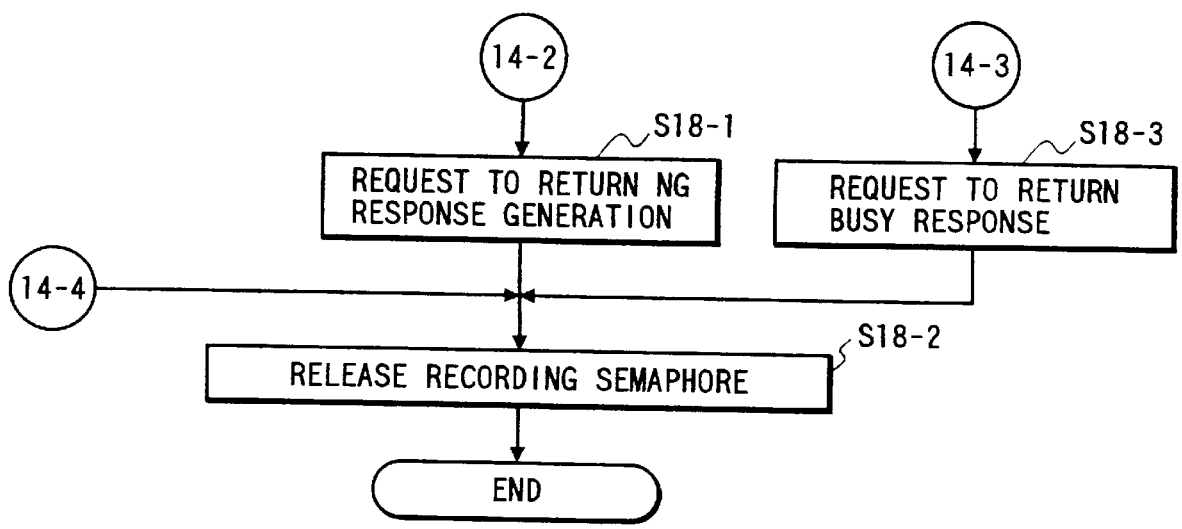
FIG. 18 is a flow chart showing the post processing of FIG. 14.

The abnormality processing will be described below with reference to FIG. 18.

If an NG state has occurred, an NG response to the interface control task is generated to request it to return to the external information processing terminal a message indicating that the processing has abnormally ended, in step S18-1. On the other hand, if a BUSY state has occurred, a BUSY response to the interface control task is generated to request it to return to the external information processing terminal a message indicating that the processing has abnormally ended, in step S18-3. The interface control task executes the sending processing of the message. In step S18-2, the recording semaphore is released, and the abnormality processing ends. If the recording semaphore is not acquired, the step of releasing the recording semaphore is skipped.

The differences between the conventional recording operation and the recording operation in this embodiment will be described below.

On a communication image in a conventional facsimile apparatus, so-called sending source recording is performed, i.e., the date of sending, the telephone number, the sender's name, and the number of pages are additionally recorded on the header portion of an image. Therefore, upon comparison between the sending length on the sending side and the receiving length on the receiving side, the sending length is normally larger than the receiving length. If the received image is recorded without any variable magnification processing, when the sending side sends an image having a standard paper size, the recording side cannot record the image within the standard paper size. In view of this problem, a technique for reducing an image at a predetermined magnification factor on the recording side to record the image within the standard paper size is known. However, when the recording side performs a size reduction, the sent image cannot be faithfully reproduced.

Also, a receiving information recording technique is known as well as the sending source recording. In the receiving information recording, the date of reception, the telephone number, the sender's name, and the number of pages are additionally recorded on the trailing end portion of an image received on the receiving side. When this function is used, and the received image is recorded within the standard paper size, the reduction factor must be further lowered.

On the other hand, an image received by the facsimile apparatus must be reliably recorded and output, not excepting a case wherein the recording ink is used up in a facsimile apparatus using a recording ink like in this embodiment. For this reason, a technique for performing ink remaining amount detection processing for discriminating if an image can be actually recorded upon completion of recording output is known. When it is determined that the recording ink is used up, received images are stored in the image memory to re-record these images later, and operator's intervention is prompted. However, in order to perform the ink remaining amount detection processing, a recording operation must be unnecessarily performed on a recorded image and a recording ink must be unnecessarily wasted. Also, the ink remaining amount detection processing lowers the throughput of the entire system. On the contrary, when the recording operation normally ends, images stored in the memory are forcibly deleted. In this case, if another set of received images are to be recorded, the recording sheets must be copied, thus deteriorating image quality.

On the other hand, in the recording operation of this embodiment, the same recording operation as in the conventional facsimile apparatus is performed in a conventional facsimile reception mode, and a recording operation that can solve the above-mentioned problems is performed upon recording of an image having file attributes designated by the external information processing terminal. More specifically, since extra processing operations such as reduced recording, ink remaining amount detection processing, recording of extra additional information, and receiving information recording, are inhibited for a file designated by the external information processing terminal, a sent image can be faithfully reproduced. On the other hand, a user can visually discriminate based only on the recording output sheet whether an image is recorded by the conventional recording operation or by the recording operation for a file designated by the external information processing terminal. After the recording operation for a file designated by the external information processing terminal, an image is held in the image memory independently of whether the processing ends normally or abnormally.

Figure 24:
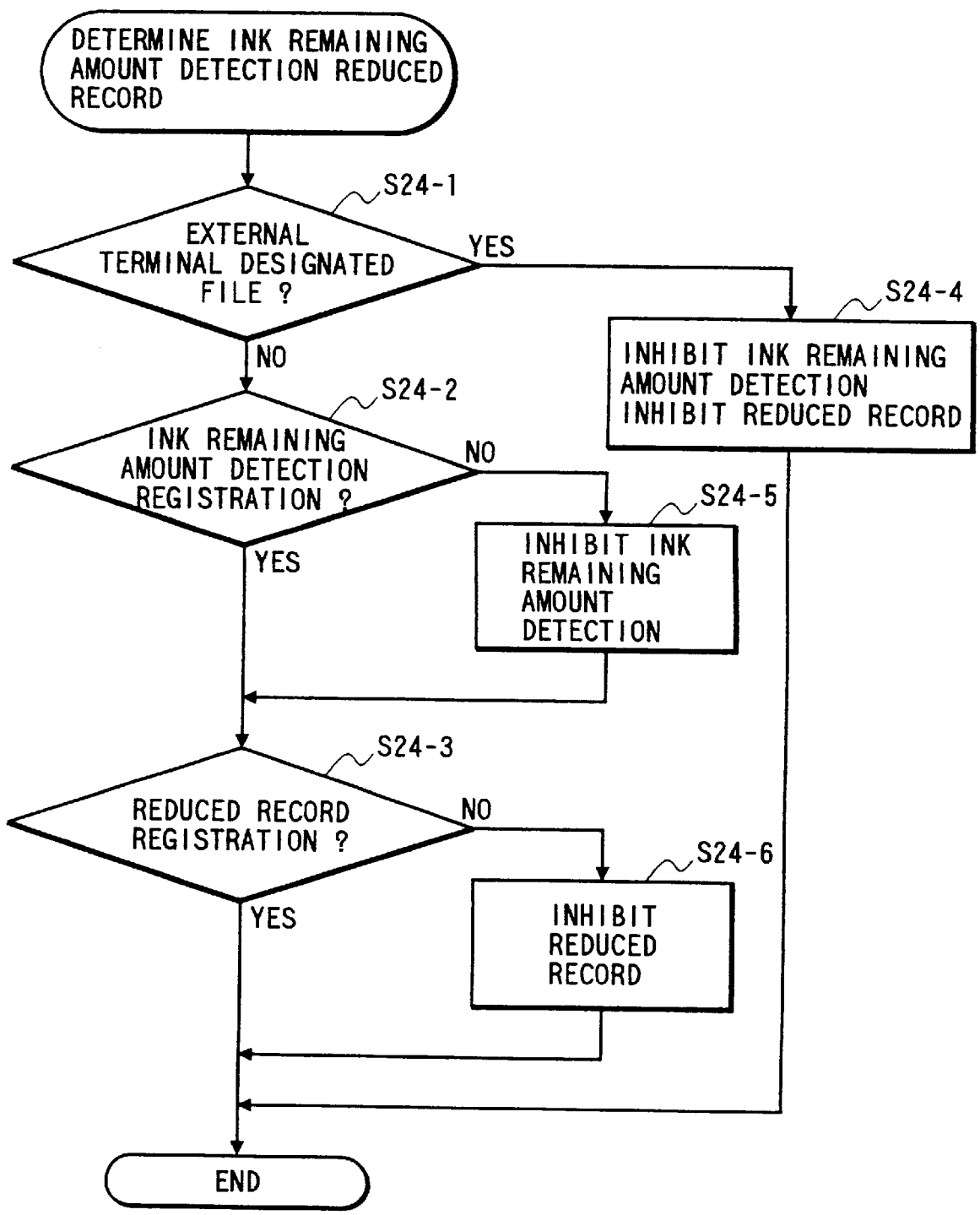
FIG. 24 is a flow chart showing in detail the operation determination processing in the ink remaining amount detection processing and reduced recording processing.

The determination processing as to whether the ink remaining amount detection processing and the reduced recording processing are performed or not will be described below with reference to FIG. 24.

It is checked in step S24-1 if the attribute of an image file to be recorded indicates a file designated by the external information processing terminal. If YES (Y) in step S24-1, the flow advances to step S24-2. If NO (N) in step S24-1, the flow advances to step S24-4, and a mode for inhibiting the ink remaining amount detection processing and the reduced recording processing is set, thus ending the processing. In step S24-2, the "ON/OFF" state of the ink remaining amount detection processing registered in the apparatus is checked. If the ink remaining amount detection processing is set in the "ON" state, the flow advances to step S24-3. On the other hand, if the ink remaining amount detection processing is set in the "OFF" state, the flow advances to step S24-5, and a mode for inhibiting the ink remaining amount detection processing is set. Thereafter, the flow advances to step S24-3. In step S24-3, the "ON/OFF" state of the reduced recording processing registered in the apparatus is checked. If the reduced recording processing is set in the "ON" state, the determination processing ends. On the other hand, if the reduced recording processing is set in the "OFF" state, the flow advances to step S24-6 and a mode for inhibiting the reduced recording processing is set, thus ending the processing.

The recording operation of this embodiment will be described in detail below.

Figure 19:
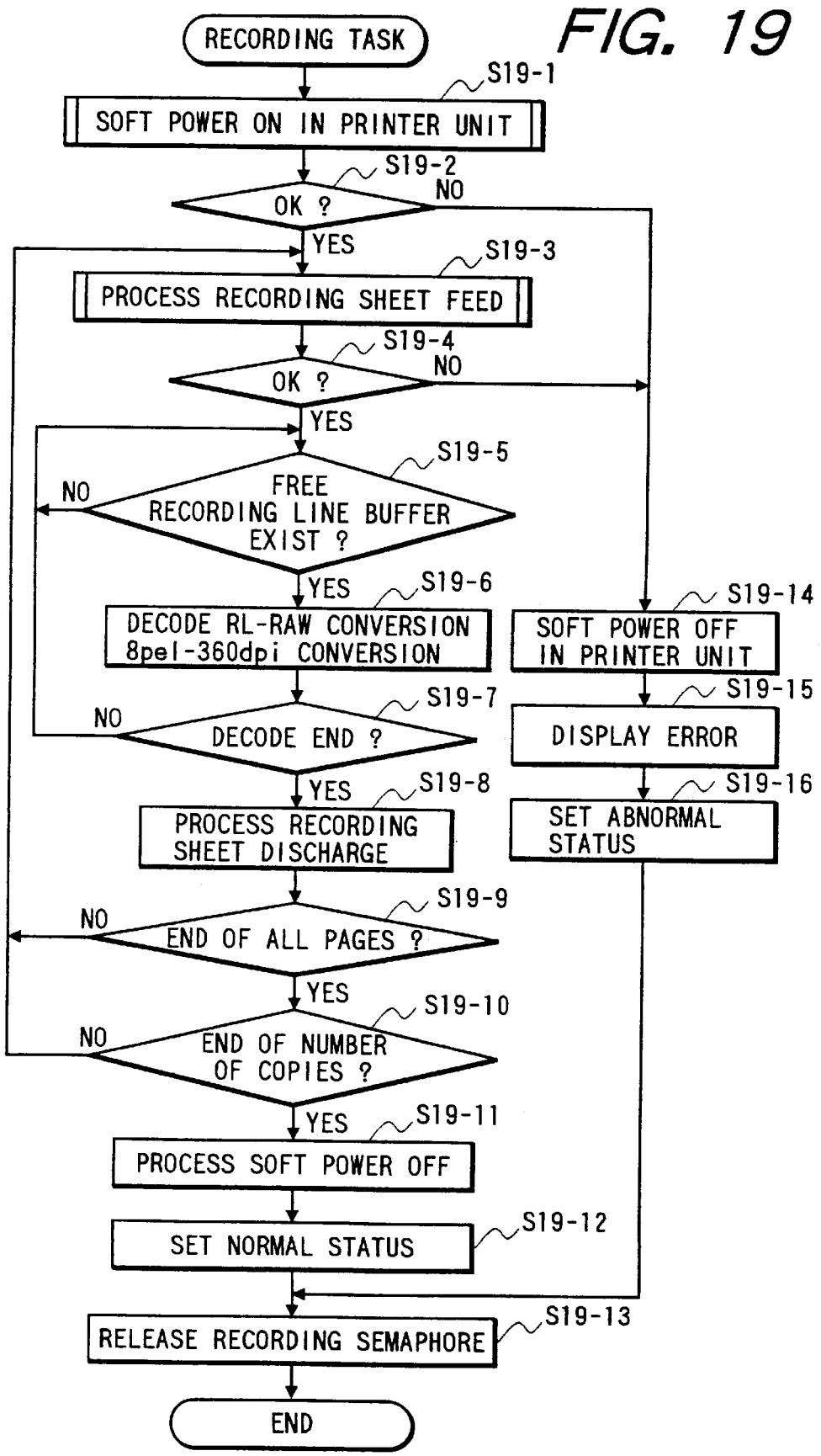
FIG. 19 is a flow chart showing in detail the recording processing task.

The recording task started in step S14-11 performs an operation shown in the flow chart shown in FIG. 19. In step S19-1, software power ON processing of the printer unit 2 is performed, and the flow advances to step S19-2. The software power ON/OFF processing will be described in detail later. In step S19-2, it is checked if the software power ON processing has ended normally or abnormally. If the processing has normally ended, the flow advances to step S19-3. On the other hand, if the processing abnormally ends, forced software power OFF processing is performed in step S19-14, and an error message is displayed on the display unit of the operation panel 112 in step S19-15. In step S19-16, error information is stored in print information status in the work area of the RAM 103 of the facsimile unit 1, and the flow then advances to step S19-13. In step S19-3, recording sheet feed processing (to be described in detail later) is performed, and the flow advances to step S19-4. In step S19-4, it is checked if the recording sheet feed processing has ended normally or abnormally. If the processing has normally ended, the flow advances to step S19-5. On the other hand, if the processing has abnormally ended, forced software power OFF processing is performed in step S19-14, and an error message is displayed on the display unit of the operation panel 112 in step S19-15. In step S19-16, error information is stored in print information status in the work area of the RAM 103 of the facsimile unit 1, and the flow then advances to step S19-13. In step S19-5, the presence/absence of a free recording line buffer on the RAM 103 is checked. In this embodiment, recording data to the printer unit 2 is controlled in units of lines, and cannot be generated unless a recording line buffer on the RAM 103 for generating the recording data becomes free. Normally, a plurality of line buffers are assured, and are cyclically used. If a free recording line buffer on the RAM 103 is detected, decoding, RL (run length)—RAW (raw) conversion, and resolution conversion (8 pel—360 dpi) are performed in step S19-6, and recording data is written in the recording line buffer on the RAM 103. The recording data is forwarded to the printer unit 2 in practice in the interrupt processing, and upon completion of forwarding of recording data, the recording line buffer on the RAM 103 is cleared. It is then checked in step S19-7 if the decoding processing for the first page has ended. If YES in step S19-7, the flow advances to step S19-8; otherwise, the flow returns to step S19-5 to repeat the above-mentioned processing. In step S19-8, the recorded recording sheet is discharged. In step S19-9, it is checked if recording operations of all the pages to be recorded have ended. If YES in step S19-9, the flow advances to step S19-10; otherwise, the flow returns to step S19-3 to repeat the above-mentioned processing from the recording sheet feed processing. It is checked in step S19-10 if the recording operations for all the number of copies to be recorded designated in the receive parameter in step S16-6 have ended. If YES in step S19-10, the flow advances to step S19-11; otherwise, the flow returns to step S19-3 to repeat the above-mentioned processing from the recording sheet feed processing. In step S19-11, the software power OFF processing of the printer unit 2 is performed, and the flow then advances to step S19-12. In step S19-12, normal end information is stored in the print information status in the work area on the RAM 103 of the facsimile unit 1, and the flow advances to step S19-13. In step S19-13, the recording semaphore acquired in step S14-3 is released. Thereafter, the recording task itself normally ends.

The software power ON processing in step S19-1 and the software power OFF processing in steps S19-11 and S19-14 will be described in detail below.

The facsimile apparatus according to this embodiment has three power supply states. The first state is a state wherein the power supply is OFF in a hardware manner, and no power supply voltage is supplied to the facsimile unit 1 and the printer unit 2 (hardware power OFF state). The second state is a state wherein the power supply is ON in a hardware manner and the power supply voltage is supplied to the facsimile unit 1 and the printer unit 2, but the state of the printer unit 2 is apparently equivalent to a power OFF state since it has just completed hardware power ON initialization processing and LEDs (not shown) and the like are OFF (software power OFF state). The third state is a state wherein the power supply is turned on in a hardware manner, the power supply voltage is supplied to the facsimile unit 1 and the printer unit 2, and the printer unit 2 is set in an operative state (software power ON state). The above-mentioned three states are provided for the following reasons. First, the printer unit 2 is normally set in the software power OFF state except for the recording operation so as to prevent the printer unit 2 from running away. Second, if the same initialization processing as that when the power supply is turned on is performed each time the printer unit 2 is activated, the throughput lowers. Third, if the LEDs of the printer unit 2 are kept ON irrespective of the recording operation, the consumption power is wasted. Fourth, if the LEDs of the printer unit 2 are kept ON, a user may erroneously recognize that the printer unit 2 is in operation. Fifth, when the processing of the printer unit 2 ends as an error, an error state can be easily canceled by the software power ON/OFF initialization processing.

Figure 20:
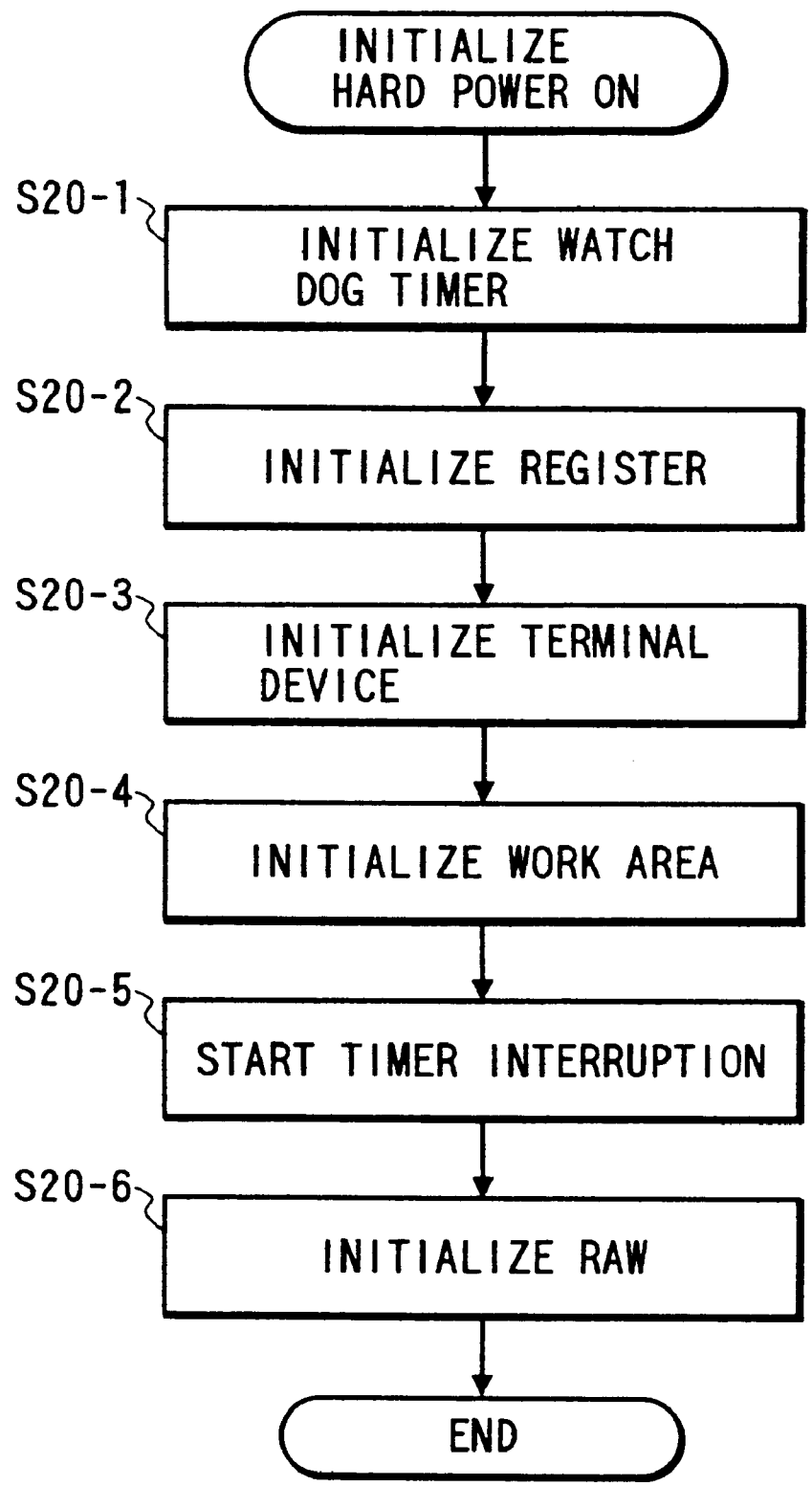
FIG. 20 is a flow chart showing in detail the initialization processing when the power supply of the recording unit is turned on in a hardware manner.
Figure 21:
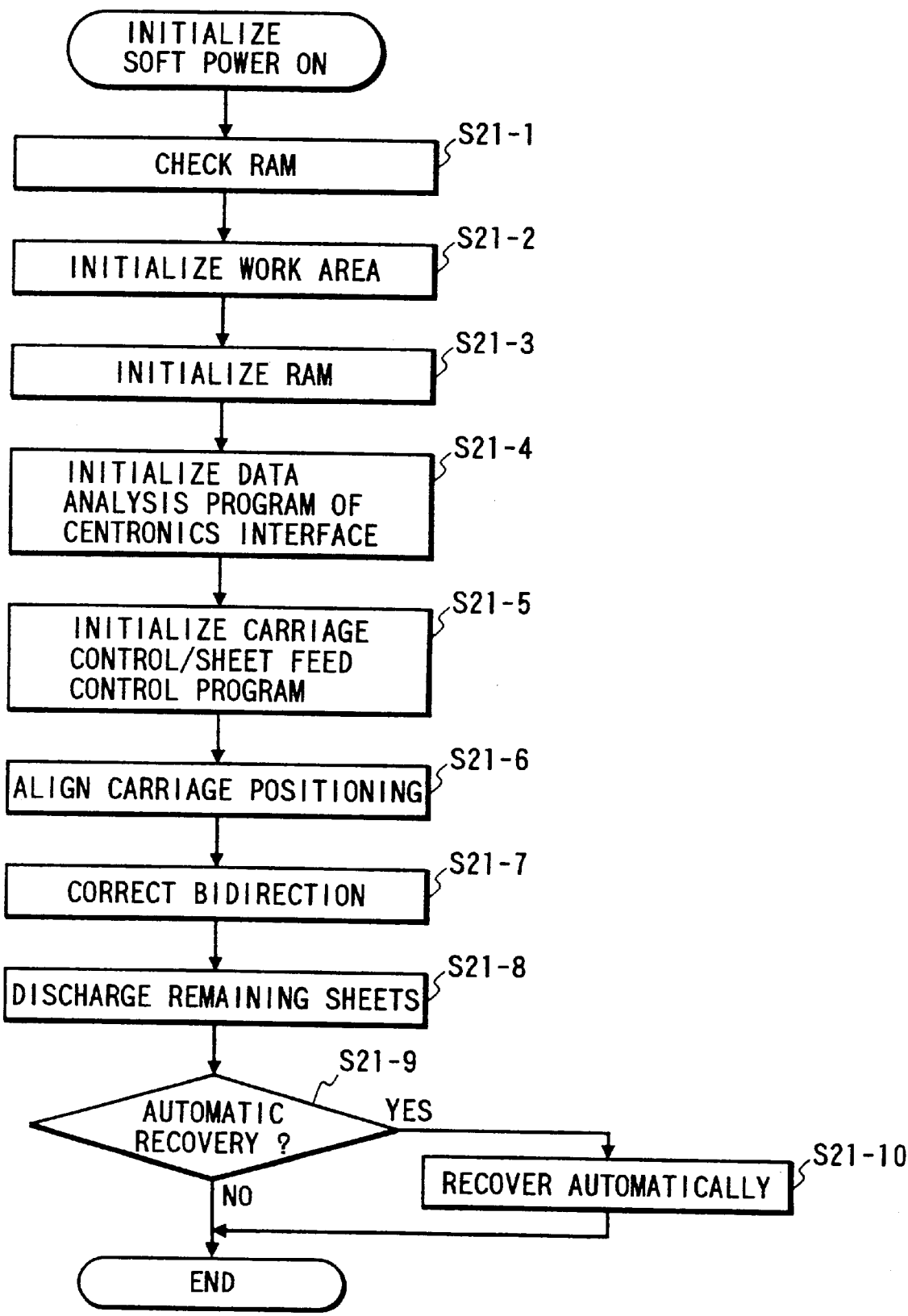
FIG. 21 is a flow chart showing in detail the initialization processing when the power supply of the recording unit is turned on in a software manner.

The hardware power ON initialization operation and the software power ON initialization operation will be described below with reference to FIGS. 20 and 21.

In the hardware power ON initialization operation, a watch dog timer for preventing the printer MPU 201 from running away is initialized (S20-1), and a register is then initialized to prevent an operation error of the printer MPU 201 (S20-2). Furthermore, peripheral devices or terminal devices such as the horizontal-vertical converter 204, the Centronics interface 302, and the like are initialized (S20-3). Subsequently, the work area of the RAM 203 is initialized to prevent an operation error of the printer MPU 201 and to set initial values of respective parameters (S20-4). Thereafter, a timer interruption is started (S20-5). Then, the RAM 203 is initialized to delete remaining data in the buffers (S20-6).

In the software power ON initialization processing, only resources used after the software power ON processing are initialized. First, the RAM 203 is checked (S21-1). Subsequently, initialization of the work area (S21-2), initialization of the RAM 203 (S21-3), initialization of a data analysis program sent from the Centronics interface (S21-4), and initialization of carriage control/sheet feed control programs (S21-5) are performed. The printer MPU 201 initializes the position of the carriage, i.e., the position of the printing head 205 using a home position sensor (not shown) (S21-6). In this processing, since the carriage position is recognized on the basis of the number of pulses applied to a pulse motor for driving the carriage, the reference position of the carriage is set using the home position sensor. Then, to attain bidirectional correction, the carriage is moved from the reference position by a predetermined amount in the forward direction and is then moved in the reverse direction so as to sample the state of the home position sensor (S21-7). The number of pulses required for movement in the forward direction and that required for movement in the reverse direction are counted, and a correction value in bidirectional printing is calculated on the basis of these count values. When this correction value exceeds a predetermined range, an error is generated, and the recording operation is disabled. It is then detected using, e.g., the PE sensor 206 if remaining sheets are present, and if remaining sheets are present, they are discharged (S21-8). It is checked if an automatic recovery operation is to be performed (S21-9). The automatic recovery operation is processing for preventing clogging of nozzles when the printing head 205 adopts an ink-jet system. If an automatic recovery operation is to be performed, the automatic recovery operation is performed (S21-10), and the initialization processing ends. If an automatic recovery operation is not performed, the initialization processing ends.

Figure 22:
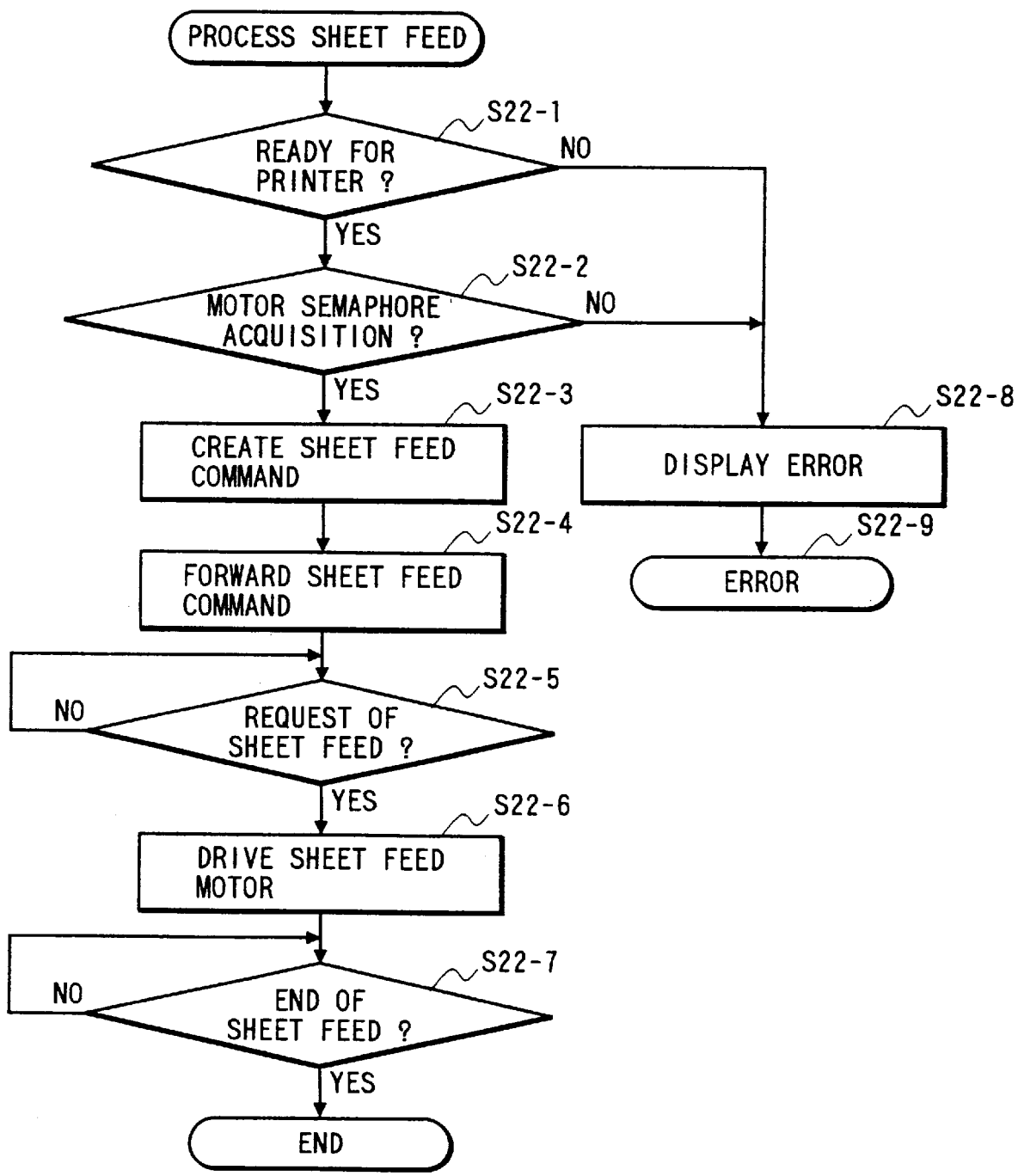
FIG. 22 is a flow chart showing in detail the recording sheet feed processing shown in FIG. 19.

The recording sheet feed processing in step S19-3 will be described in detail below with reference to FIG. 22.

Assume that the recording sheet feed processing includes processes in which the facsimile unit 1 creates a recording sheet feed command corresponding to user registration, and forwards it to the printer unit 2, and a recording sheet is fed to a printing start position by pickup rollers (not shown).

It is checked if the printer unit is ready (S22-1). If NO in step S22-1, an error message is displayed (S22-8), and the processing ends as an error (S22-9). On the other hand, if YES in step S22-1, a motor semaphore is acquired (S22-2). If the motor s emaph ore cannot be acquired, an error message is displayed (S22-8), and the processing ends as an error (S22-9). If the printer unit is ready, and the motor semaphore is acquired, a recording sheet feed command is created (S22-8). The recording sheet feed command is a set of the following commands:

printer reset
printing mode (normal or economy)

printer setting bidirectional print ing correction page mode footer printing bidirectional printing raster skip These commands are as follows.

More specifically, the printer unit is initialized by the printer reset command. The printing mode command follows the printing mode for an image printing operation in user registration. The printer setting command follows the contents of facsimile mode printer setting in user registration. The bidirectional printing correction command has a value inherent to the apparatus, and is set not by user registration but by service person registration. The page mode command includes a choice for ignoring data exceeding a predetermined page size or printing the data on the second or subsequent page, and is ON when a copy image or a non-transmitted image is printed; OFF when a received image or a normal report is printed. The footer printing command will be described later. The bidirectional printing command follows the bidirectional printing mode for an image printing operation in user registration. The raster skip command is a recording sheet feed start command.

Upon completion of the creation of the above-mentioned recording sheet feed command in the facsimile unit 1 (S22-3), the set of commands are simultaneously forwarded to the printer unit via the CENTRONICS I/F 302 (S22-4). Then, the facsimile unit 1 waits for a sheet feed request sent from the printer unit 2 (S22-5). On the other hand, upon reception of the recording sheet feed command, the printer unit 2 analyzes and executes the commands in turn. After the printer unit 2 analyzes the raster skip command at the end of the command, it issues a sheet feed request to the facsimile unit 1. Upon reception of the sheet feed request (S22-5), the facsimile unit 1 starts a sheet feed operation using the motor 111 (S22-6), and ends the sheet feed operation when the recording sheet is conveyed to the position of the PE sensor 206 (S22-7). The subsequent sheet feed operation to the printing start position is performed by the printer unit. The printer unit feeds the recording sheet to the printing start position in accordance with a predetermined feed amount.

The footer printing command will be described in detail below.

In the facsimile apparatus of this embodiment, after an image for one page is recorded, a footer mark used for detecting the presence/absence of an ink is recorded on the trailing end portion of a recording sheet and is detected by the footer sensor 207, and the presence/absence of an ink is discriminated on the basis of the detection result.

The footer printing command includes a parameter. The contents of the parameter are the "ON/OFF" state of the ink remaining amount detection mode, a receive information character string, and a footer mark character string. In the parameter for a normal recording operation of a received image, the ink remaining amount detection mode is set in the "ON" state. If this mode is set in the OFF state in this case, an image received when the ink is used up is lost since the re-recording operation cannot be performed. On the other hand, in the parameter for the recording operation of an image from the external information processing terminal, the ink remaining amount detection mode is set in the "OFF" state. In this case, even when the ink is used up upon recording of the image, the image can be re-recorded by receiving it from the external information processing terminal again. Since the ink remaining amount detection processing is not performed in the recording operation of an image from the external information processing terminal, an ink can be prevented from being wasted, and the throughput can be improved.

Figure 23:
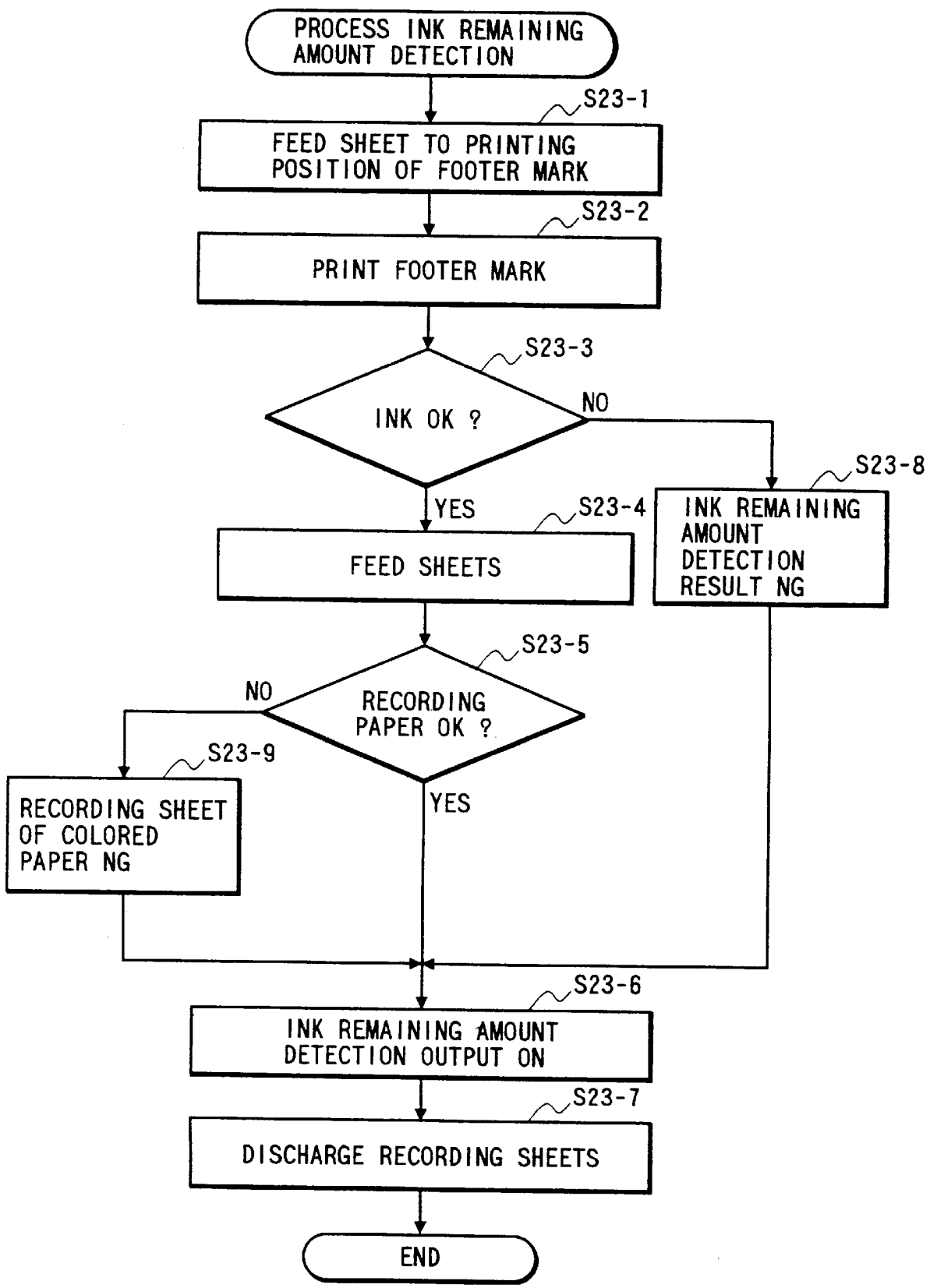
FIG. 23 is a flow chart showing in detail the ink remaining amount detection processing of the recording unit.

The ink remaining amount detection processing of the printer unit 2 in this embodiment will be described below with reference to FIG. 23.

When the "ON" state of the ink remaining amount detection processing is designated by the footer printing command from the facsimile unit 1, the printer unit 2 feeds a recording sheet to a printing position of the receive information character string and the footer mark character string after image data is recorded (S23-1). Then, footer character codes in the footer buffer which stores the character string of the footer printing command are printed (S23-2). If the printed ink remaining amount detection mark is not detected (S23-3), an NG ink remaining amount detection result is returned to the facsimile side (S23-8). On the other hand, if the ink remaining amount detection mark is detected (S23-3), the recording sheet is fed (S23-4), and it is detected if the recording sheet is color paper (S23-5). If it is determined that the recording sheet is color paper, an NG recording sheet detection result is returned to the facsimile side (S23-9). Upon completion of all the detection operations, an ink remaining amount detection output is set in the OK state to inform the facsimile unit of the message indicating this (S23-6). Upon completion of the ink remaining amount detection processing, the recording sheet of the first page is discharged (S23-7). If printing data of the next page is received, a recording sheet of the second page is fed, and the printing operation is continued.

As other ink detection methods, the following methods are known.

The remaining amount of an ink in an ink tank is detected using an optical sensor or a weight sensor to detect the presence/absence of an ink.

The presence/absence of an ink is detected when an ejected ink shields light emitted by an optical sensor.

An ink is ejected onto a thermistor to detect a change in temperature, thereby detecting the presence/absence of an ink.

The total number of times of ink ejection is counted to predict the presence/absence of an ink.

With the above-mentioned processing, an image processing apparatus which can automatically determine and perform a recording operation on the basis of the attribute and the like of an image can be provided. Reductions of the running cost and improvement of the throughput can be attained, and only a required image can be processed. A received image can be prevented from being lost before being recorded, and a received image for one page can be prevented from being divisionally recorded on two pages. An image file controlled by the external information processing terminal can be forwarded to the image processing apparatus by commonly using the buffer used in a communication between image processing apparatuses via, e.g., a telephone line, and the buffer used image data to be recorded is forwarded from the external information processing terminal. More specifically, the RAM capacity required for buffering can be reduced, and the file print function can be realized with low cost.

3. Print Information Acquisition (GET PRINT INFO.) Processing

This operation is a function of informing the external information processing terminal of the state of the recording operation by the PRINT FILE function instructed by the external information processing terminal, and is normally used in combination with the PRINT FILE function.

This operation is realized by the file information acquisition command.

This operation can be performed irrespective of the execution periods of the facsimile sending/receiving operation, copying operation, and registration operation as long as data can be sent/received to/from the external information processing terminal.

Figure 25:
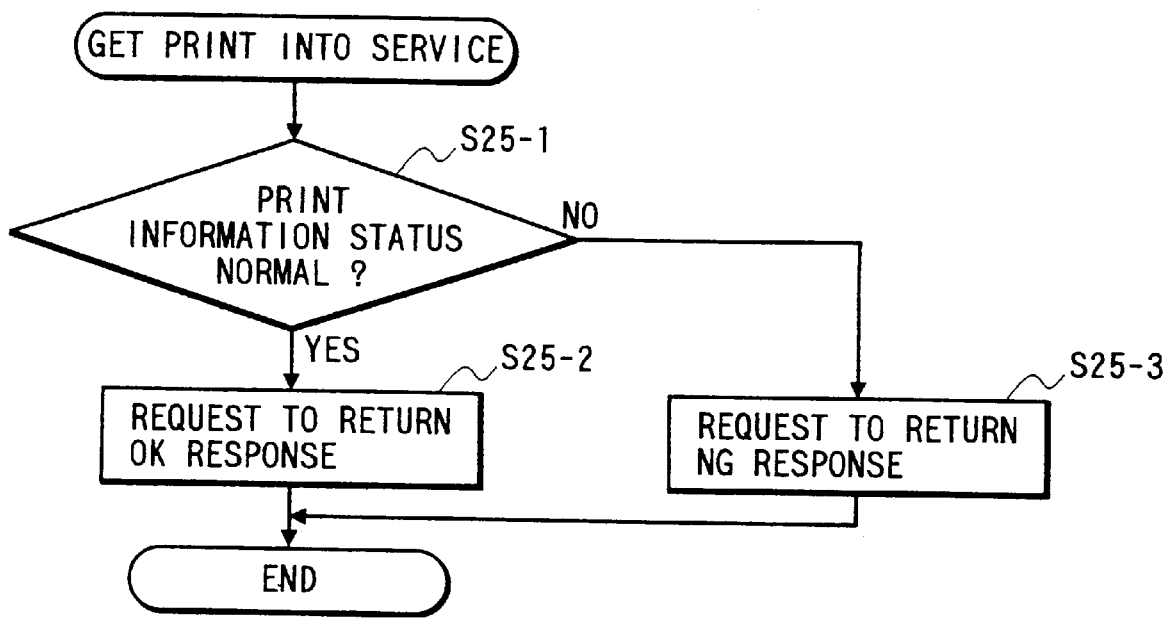
FIG. 25 is a flow chart showing the operation of print information acquisition processing.

The detailed operation will be described below with reference to FIG. 25.

When the command processing task determines reception of a file information acquisition command, the flow branches to step S25-1. In step S25-1, it is checked with reference to the print information status (its contents have already been described in detail in the paragraphs of the PRINT FILE function) in the work area of the RAM 103 in the facsimile apparatus if the recording operation by the PRINT FILE function has ended normally (during recording) or abnormally. If the recording operation has ended normally (during recording), the flow advances to step S25-2; otherwise, the flow branches to step S25-3. In step S25-2, an OK response to the interface control task is generated to request it to return to the external information processing terminal a message indicating that a normal operation is being performed. The interface control task executes the sending processing of the message. On the other hand, when the processing ends abnormally, an NG response to the interface control task is generated to request it to return to the external information processing terminal a message indicating that the operation has abnormally ended, in step S25-3. Then, the GET PRINT INFO. processing ends.

4. File Send (SEND FILE) Processing

This operation is a function of sending a desired image which is designated by the external information processing terminal and is stored in the image memory in the RAM 103 in the facsimile apparatus to a desired destination by the facsimile apparatus.

The SEND FILE function is realized by the file send instruction command and the receipt number acquisition command. The file send instruction command is a command supplied from the external information processing terminal to the facsimile apparatus, and is used for instructing a sending operation together with a designated parameter. The receipt number acquisition command is a command supplied from the external information processing terminal to the facsimile apparatus, and is used for returning a receipt number upon sending data in response to the file send instruction command. An image that can be sent by the SEND FILE function is limited to a download image, a received image, and a scan image designated by the external information processing terminal.

Figure 26:
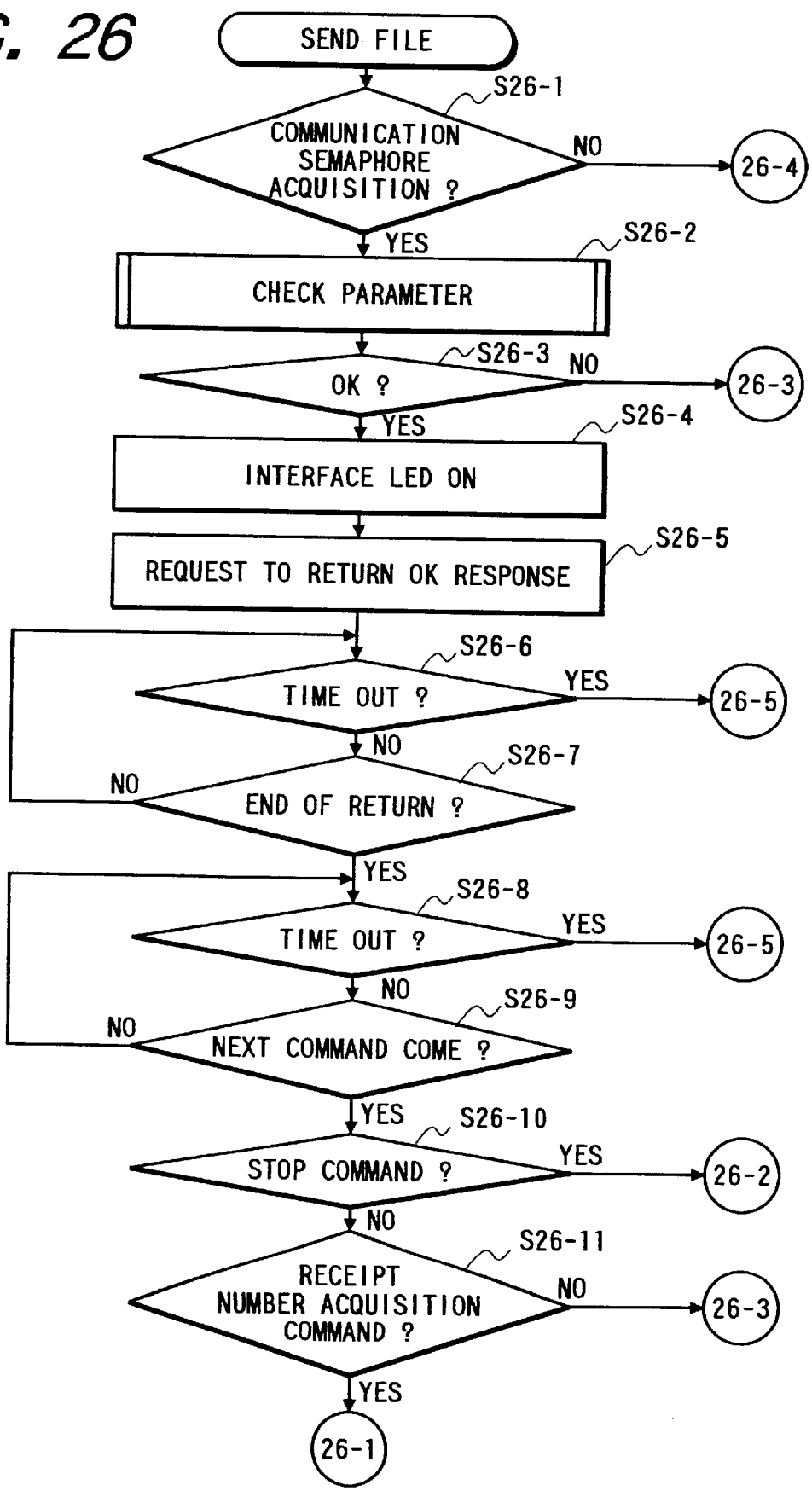
FIG. 26 is a flow chart showing the operation of file send processing.
Figure 27:
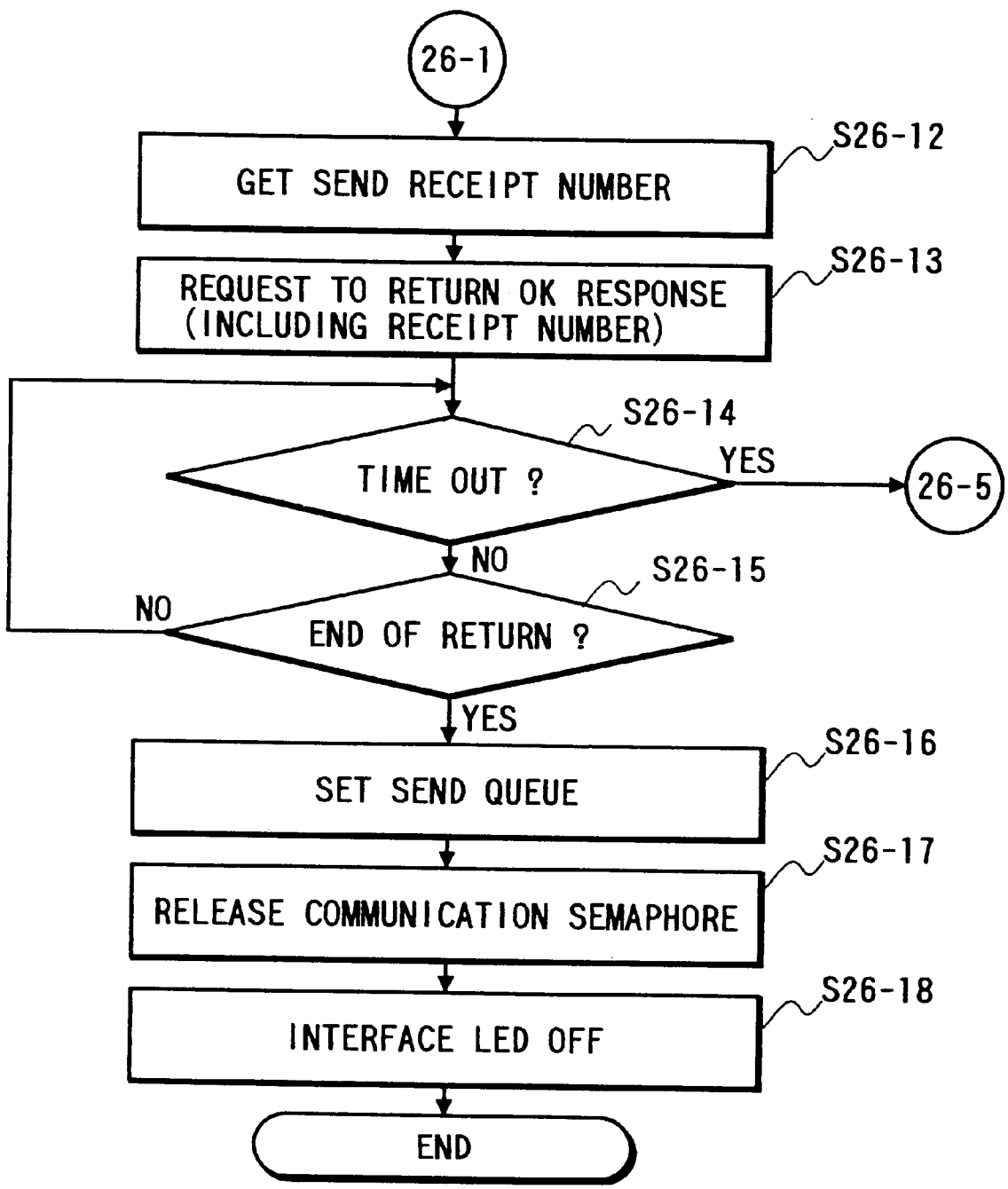
FIG. 27 is a flow chart showing the operation of the file send processing.

The detailed operation will be described in detail below with reference to FIGS. 26 and 27.

In step S26-1, a communication semaphore (communication resource) is acquired. The communication semaphore will be explained below. The facsimile apparatus acquires the communication semaphore when it performs an operation using the communication unit, and releases the communication semaphore when it completes the operation. If the apparatus fails to acquire the communication semaphore, it cannot execute the operation (e.g., transmission, reception, or the like). Despite this limitation, the above-mentioned rule allows smooth simultaneous operations. If the communication semaphore can be acquired in step S26-1, the flow advances to step S26-2; otherwise, the flow branches to BUSY processing (to be described in detail later). In step S26-2, it is checked if a receive parameter added to the file send instruction command is correct or not (to be described in detail later). The flow branches depending on the discrimination result in step S26-3. If the receive parameter is correct, the flow advances to step S26-4; otherwise, the flow branches to NG processing (to be described in detail later). In step S26-4, the interface LED is turned on to inform a user that the apparatus is in operation. During the ON period of the interface LED, any key input of the facsimile apparatus is inhibited. In step S26-5, an OK response to the interface control task is generated to request it to return to the external information processing terminal a message indicating that a normal operation is being performed. The interface control task executes the sending processing of the message. In steps S26-6 and S26-7, it is checked if the interface control task has completed return processing to the external information processing terminal. If the return processing has been completed, the flow advances to step S26-8. On the other hand, if the return processing has not been completed, and a time-out state has occurred in step S26-6, the flow branches to abnormality processing. In this embodiment, the time-out time is fixed, but may be changed by the registration operation by the facsimile apparatus or that by the external information processing terminal. In steps S26-8 and S26-9, the next command is received from the external information processing terminal. If the next command is received, the flow advances to step S26-10. On the other hand, if the next command is not received, and a time-out state has occurred in step S26-8, the flow branches to abnormality processing. In this embodiment, the time-out time is fixed, but may be changed by the registration operation by the facsimile apparatus or that by the external information processing terminal. It is checked in step S26-10 if the received next command is a stop command. If NO in step S26-10, the flow advances to step S26-11. If YES in step S26-10, the flow branches to suspension processing of the SEND FILE operation. It is checked in step S26-11 if the next command received from the external information processing terminal is a receipt number acquisition instruction command. If YES in step S26-11, the flow advances to step S26-12. On the other hand, if NO in step S26-11, NG processing is performed. In step S26-12, the receipt number (file ID) of image data to be sent is acquired. In the facsimile apparatus of this embodiment, serial numbers are assigned image data (files) stored in the image memory of the RAM 103, and image data in the image memory of the RAM 103 are controlled on the basis of the receipt numbers. The receipt number assumes a value ranging from 1 to 9,999, and is cyclically used. In step S26-13, an OK response to the interface control task and receipt number information are generated to request the interface control task to return to the external information processing terminal a message indicating that a normal operation is being performed and information concerning the receipt number acquisition instruction command. The interface control task executes the sending processing of the message. In steps S26-14 and S26-15, it is checked if the interface control task has completed return processing to the external information processing terminal. If the return processing has been completed, the flow advances to step S26-16. On the other hand, if the return processing has not been completed, and a time-out state has occurred in step S26-14, the flow branches to abnormality processing. In this embodiment, the time-out time is fixed, but may be changed by the registration operation by the facsimile apparatus or that by the external information processing terminal. In step S26-16, a send queue is set in a task (send execution task) for performing the sending operation. In step S26-17, the communication semaphore acquired in step S26-1 is released. When the send execution task executes the sending operation, it acquires or releases the communication semaphore again. In step S26-18, the interface LED is turned off to inform a user of the end of the SEND FILE operation. After the interface LED is turned off, a key input of the facsimile apparatus is permitted.

Figure 28:
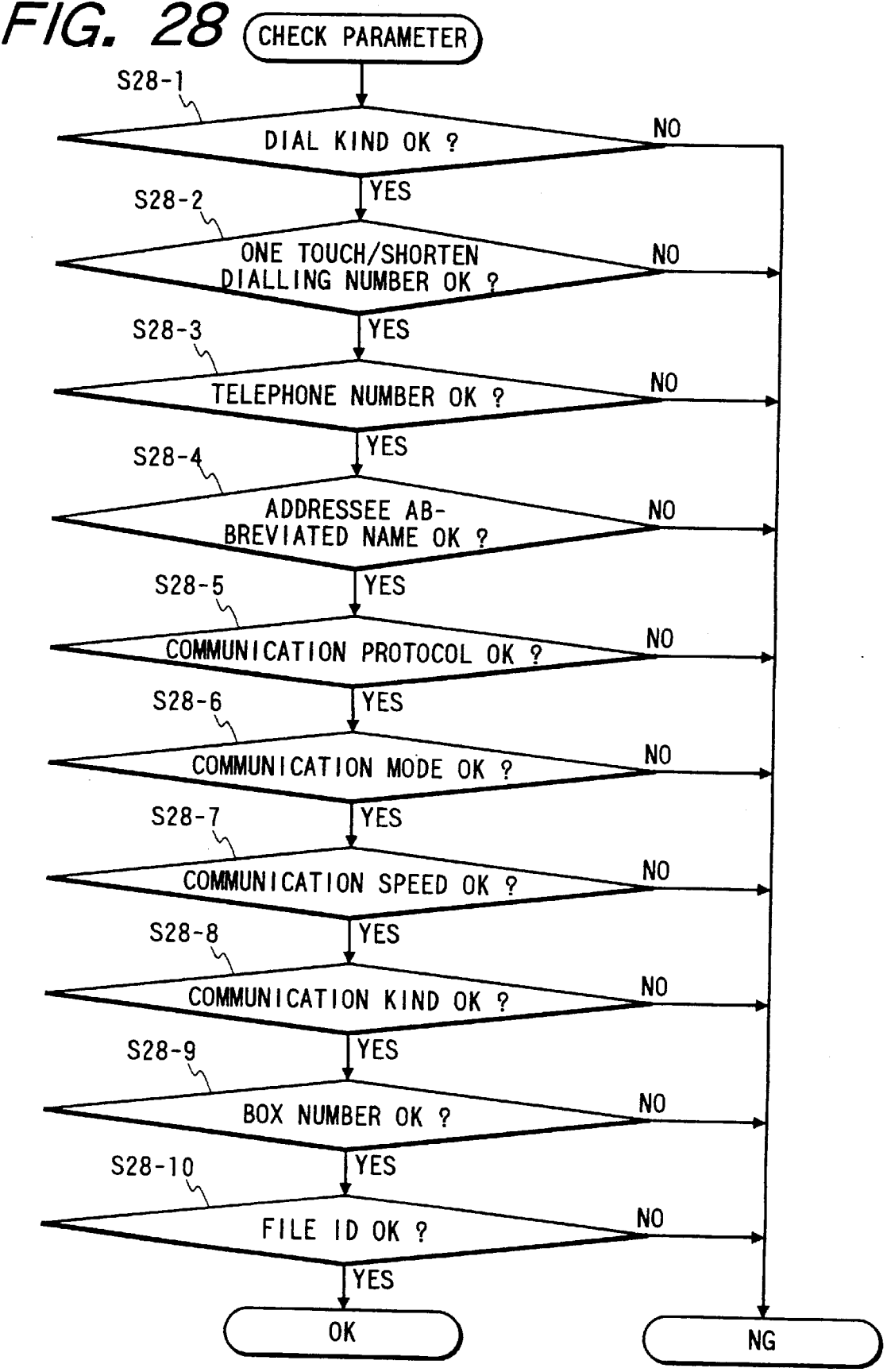
FIG. 28 is a flow chart showing in detail the parameter check processing shown in FIG. 26.

The receive parameter check processing in step S26-2 will be described in detail below with reference to FIG. 28.

The contents of the receive parameter include the following items having the following choices. When the contents of the receive parameter are different from the setting contents of the facsimile apparatus, a receive parameter error is generated. Alternatively, when the contents of the receive parameter are different from the setting contents of the facsimile apparatus, processing may be continued to "preferentially process the contents of the receive parameter" or to "preferentially process the setting contents of the facsimile apparatus" without generating any receive parameter error.

Dial kind: ten-key, one-touch, abbreviated One touch/shorten dialling number: 1 to 16 (one touch mode), 0 to 99 (shorten mode)

Telephone number: 32-digit or less ASCII character string (ten-key mode)

Addressee abbreviated name: ASCII character string

Communication protocol: no check, G3 (PSTN)

Communication mode: no check, international line (1), international line (2), international line (3)

Communication speed: no check, 4,800 bps, 9,600 bps

Communication kind: normal send, confidential send, relay instruction send

Box number: 0 to 99

File ID: 0 to 9,999

In step S28-1, the dial kind is checked. If the receive parameter includes one of the ten-key, one touch, and shorten dialling modes, OK is determined; otherwise, NG is determined. In step S28-2, the one touch/shorten dialling number is checked. This step is effective only when the one touch or shorten dialling mode is designated in step S28-1. If the receive parameter number falls within a predetermined range, and an addressee is registered in the designated number, OK is determined; if the designated number falls outside the range or no addressee is registered in the designated number, NG is determined. In step S28-3, the telephone number is checked. This step is effective only when the ten-key dialling mode is designated in step S28-1. If the receive parameter number consists of only an ASCII character string and has 32 digits or less, OK is determined; if the designated number consists of characters other than the ASCII character string, or has 33 digits or more, NG is determined. In step S28-4, the addressee abbreviated name is checked. If the receive parameter abbreviated name consists of only an ASCII character string, OK is determined; if the designated abbreviated name includes characters other than the ASCII character string, NG is determined. In step S28-5, the communication protocol is checked. If the receive parameter includes "no check" or "G3 (PSTN)", OK is determined; otherwise, NG is determined. In step S28-6, the communication mode is checked. If the receive parameter includes one of "no check", "international line (1)", "international line (2)", and "international line (3)", OK is determined; otherwise, NG is determined. In step S28-7, the communication speed is checked. If the receive parameter includes one of "no check", "4,800 bps", and "9,600 bps", OK is determined; otherwise, NG is determined. In step S28-8, the communication kind is checked. If the receive parameter includes one of "normal send", "confidential send", and "relay instruction send", OK is determined; otherwise, NG is determined. In step S28-9, the box number is checked. If the contents of the receive parameter fall within the range from 0 to 99, OK is determined; otherwise, NG is determined. In step S28-10, the file ID is checked. The file ID is a serial number assigned to each of images input/output to/from the facsimile apparatus, and a desired image stored in the image memory of the RAM 103 is accessed using the file ID. In step S28-10, it is checked if an image corresponding to the file ID in the receive parameter is present in the image memory. If YES in step S28-10, the file attribute is checked. If the attribute of an image indicates a file designated by the external information processing terminal, the processing normally ends. On the other hand, if an image corresponding to the file ID is not present in the image memory, or if the attribute of an image does not indicate a file designated by the external information processing terminal, NG is determined.

Figure 29:
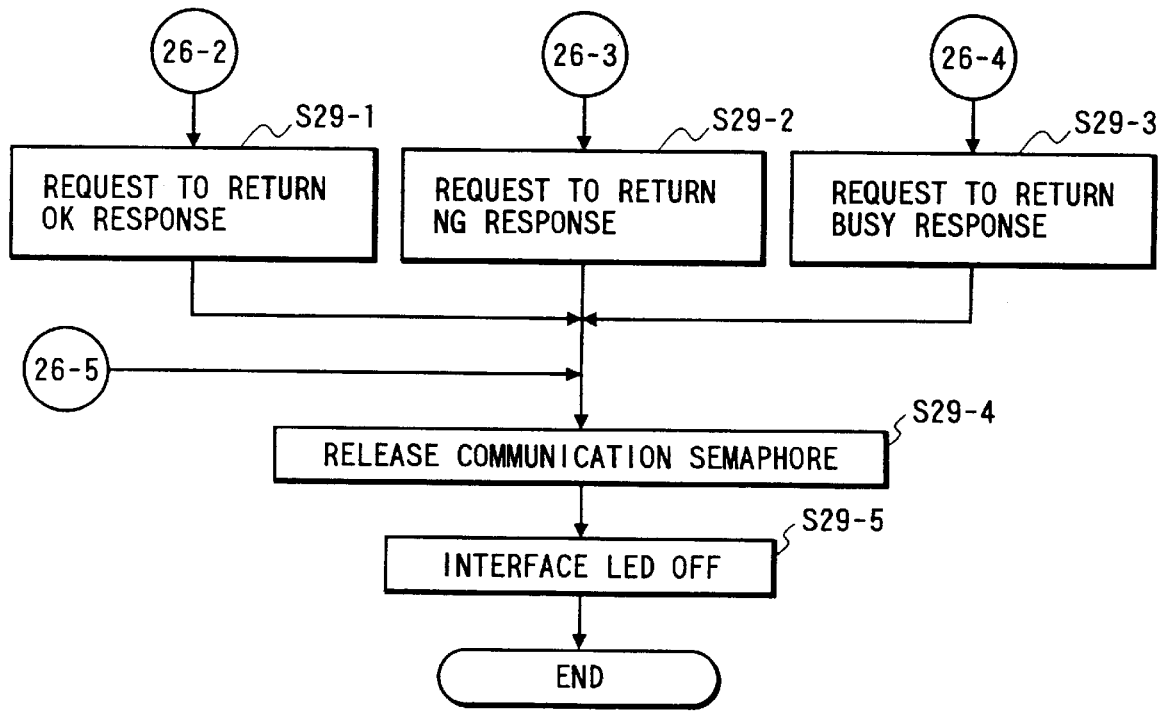
FIG. 29 is a flow chart showing in detail the post processing of FIGS. 26 and 27.

Abnormality processing will be described in detail below with reference to FIG. 29.

When the flow branches to step S29-1, an OK response to the interface control task is generated to request it to return to the external information processing terminal a message indicating that a normal operation is being performed. The interface control task executes the sending processing of the message. On the other hand, when the flow branches to step S29-2, an NG response to the interface control task is generated to request it to return to the external information processing terminal a message indicating that the received command is not accepted due to its error. The interface control task executes the sending processing of the message. Also, when the flow branches to step S29-3, a BUSY response to the interface control task is generated to request it to return to the external information processing terminal a message indicating that the received command is not currently accepted since, e.g., another operation is being performed. The interface control task executes the sending processing of the message. In step S29-4, the communication semaphore acquired in step S26-1 is released. In step S29-5, the interface LED is turned off to inform the user of the end of the SEND FILE operation. After the interface LED is turned off, a key input of the facsimile apparatus is permitted.

With the above-mentioned processing, since the processing is stopped when the interface does not become ready for transfer within a predetermined period of time, an image processing apparatus which uses a parallel interface allowing high-speed data transfer, and is easy to operate can be provided.

5. Send Information Acquisition (GET SEND INFO.) Processing

Figure 30:
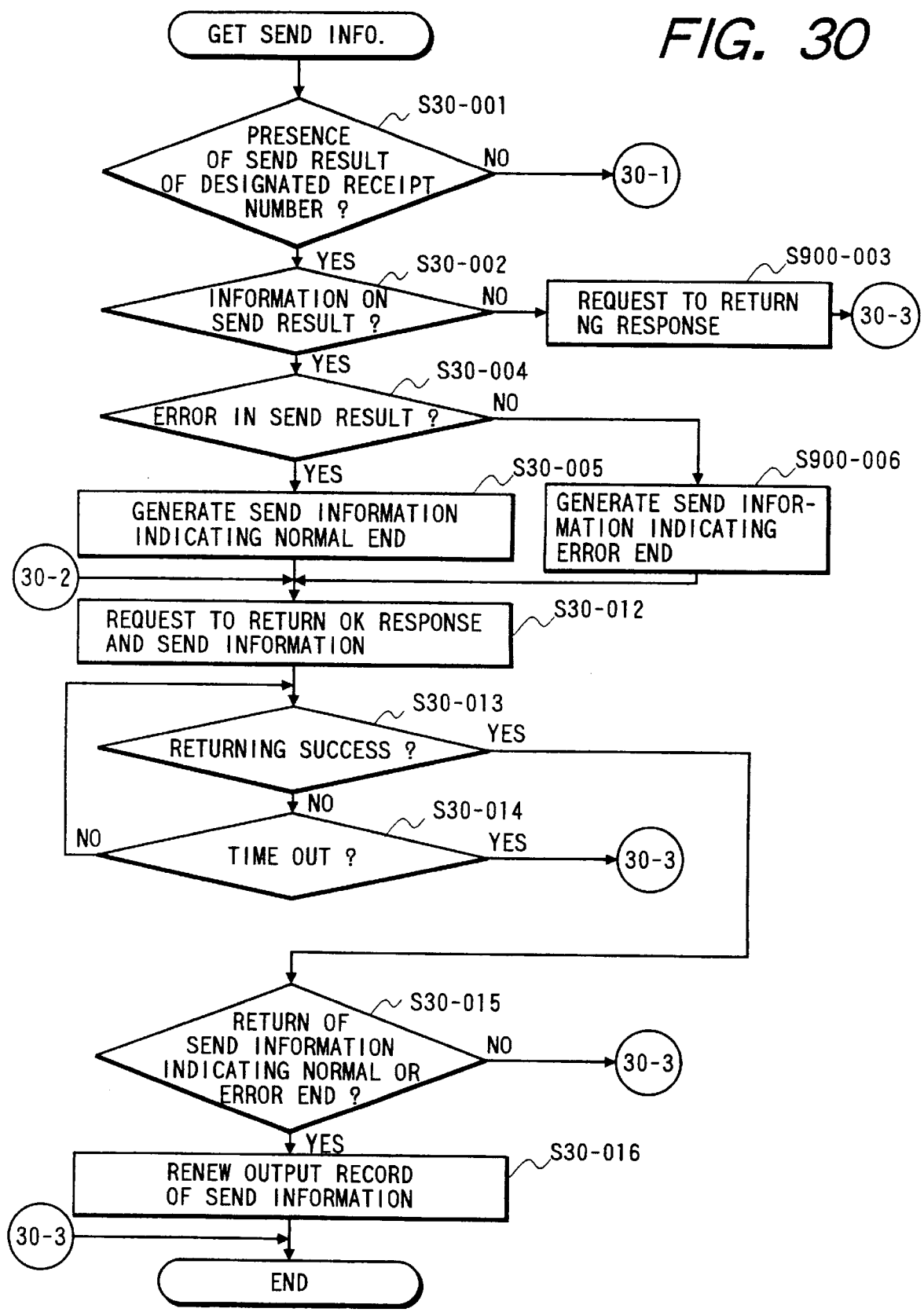
FIG. 30 is a flow chart showing the operation of send information acquisition processing.
Figure 31:
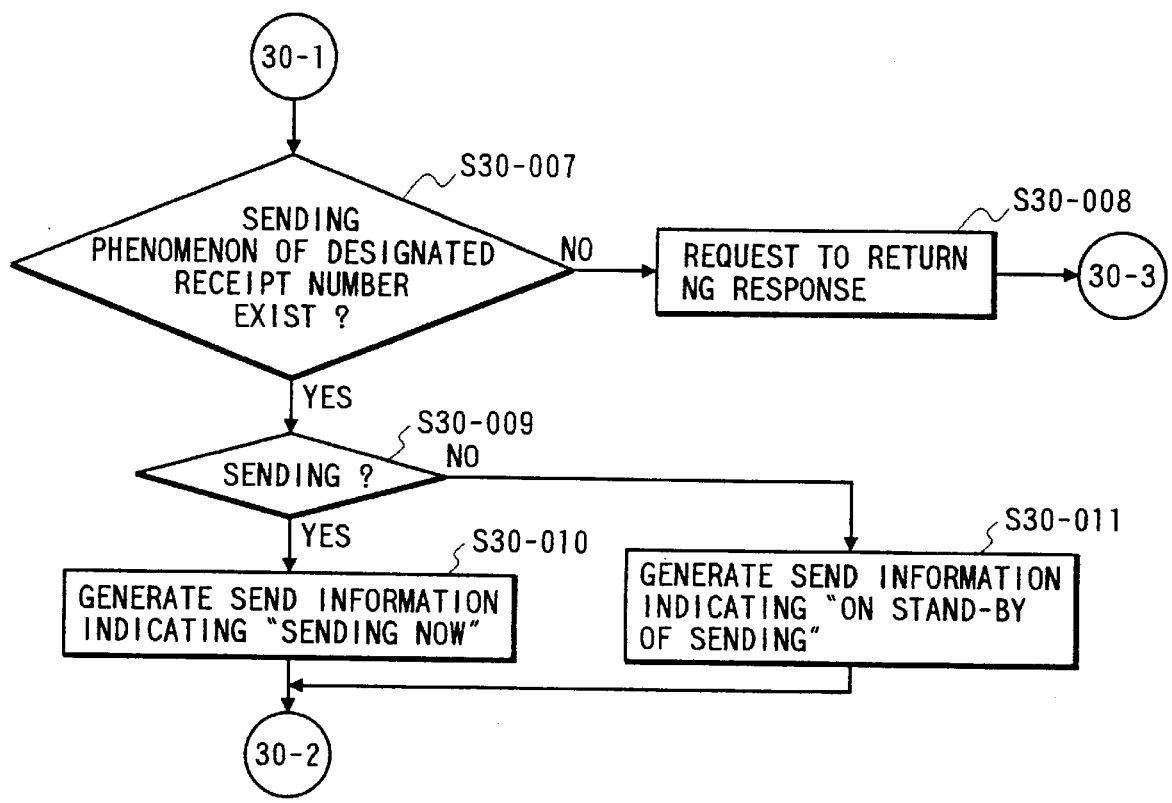
FIG. 31 is a flow chart showing the operation of the send information acquisition processing.

FIGS. 30 and 31 are flow charts showing the send information notifying operation for forwarding information associated with a sending operation of the facsimile apparatus in this embodiment to the information processing terminal 109.

Figures 8, 8A:
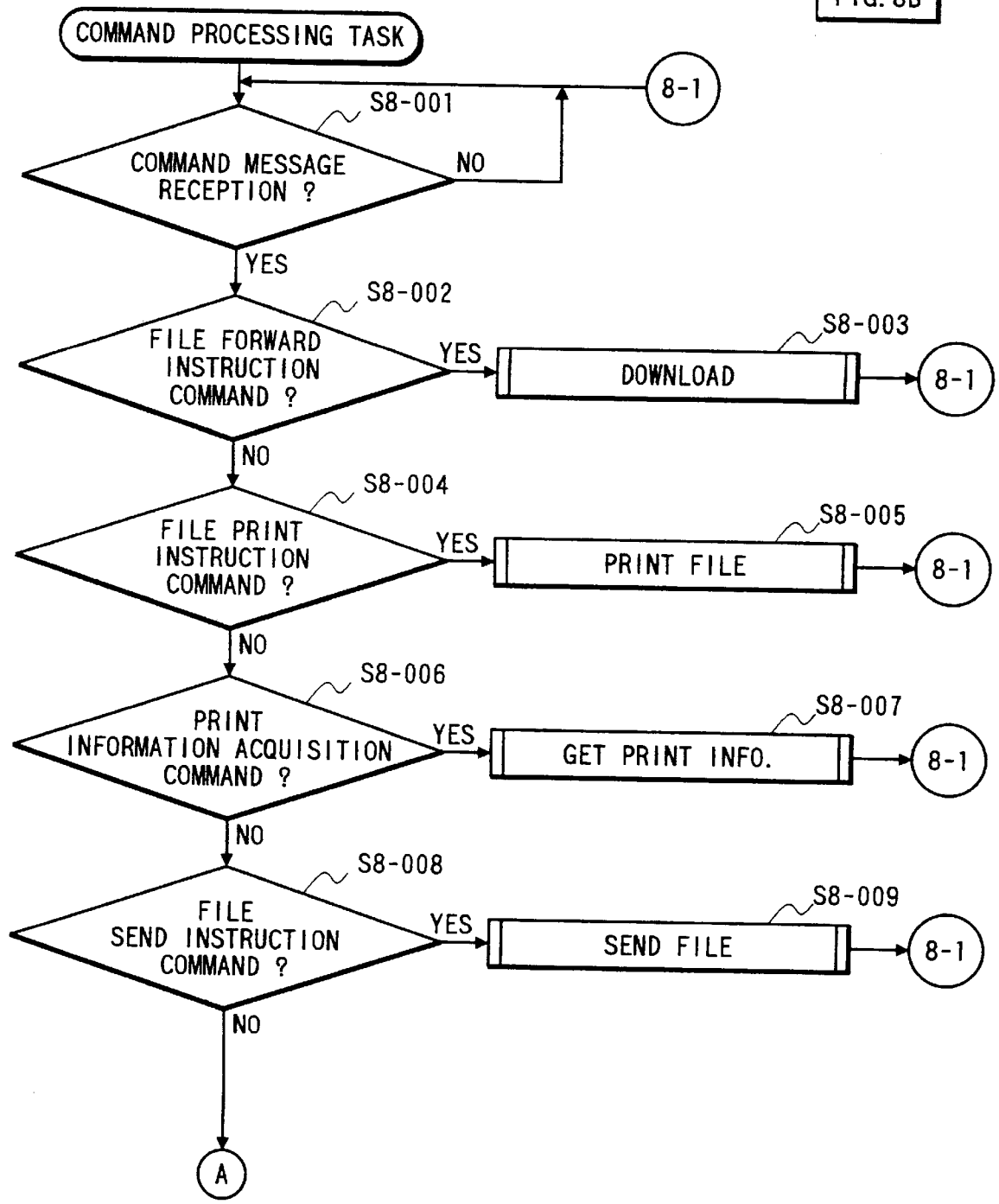
Figure 9B:
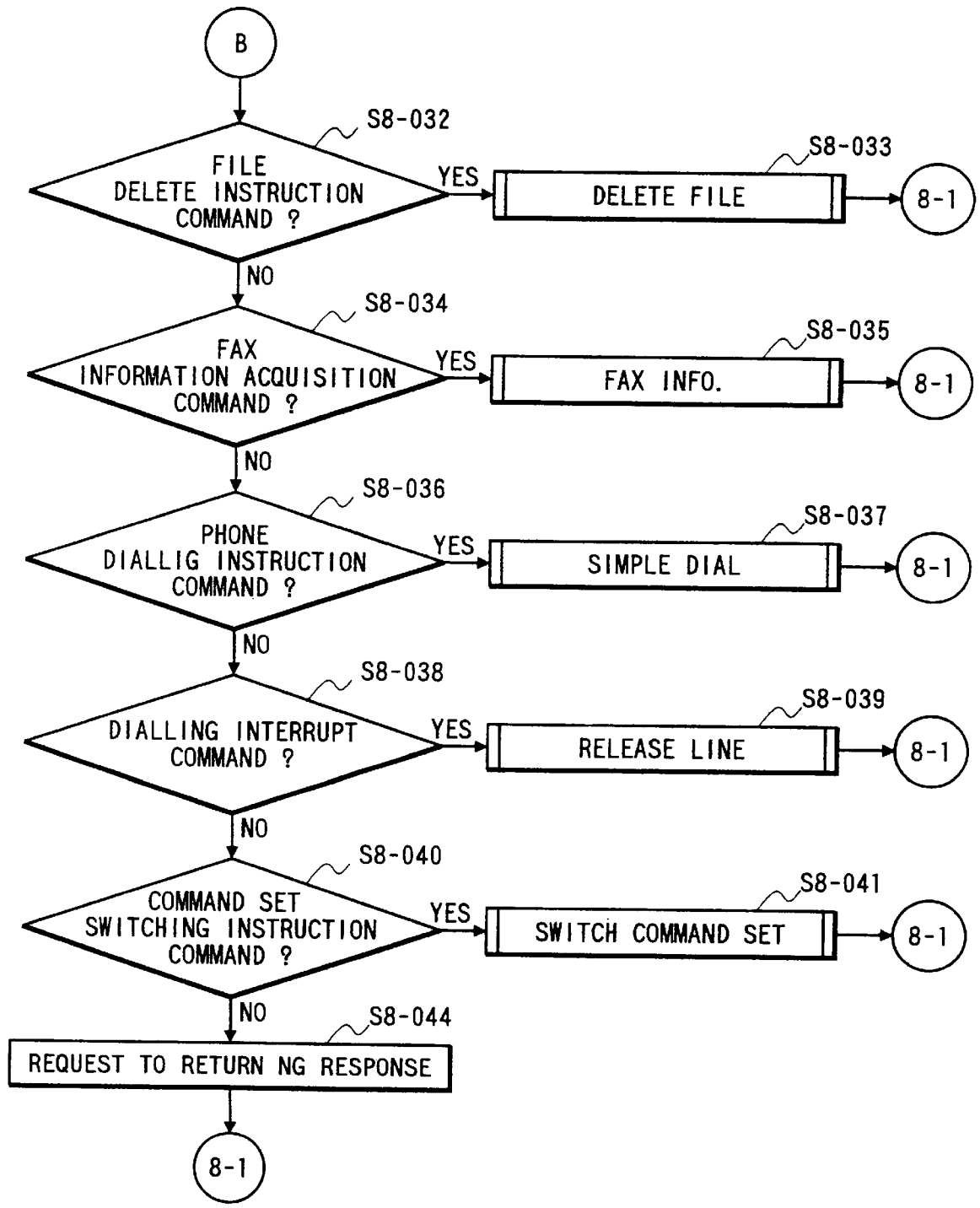

When the command processing task shown in FIG. 8 receives a message (command) from the interface control task, and the received command is a send information acquisition command, the GET SEND INFO. processing is executed.

In step S30-001, it is checked if the send result of the receipt number designated by the send information acquisition command from the information processing terminal 109 is present in communication control information. If a communication control number 44-001 in the communication control information shown in FIG. 44 coincides with the receipt number designated by the send information acquisition command, and a communication kind 44-005 therein indicates "send", the flow advances to step S30-002.

In step S30-002, it is checked if the communication control information found in step S30-001 is already notified or noticed as send information. If communication control report output record information 44-011 in the communication control information shown in FIG. 44 does not indicate that the send information is not notified yet, the flow advances to step S30-003.

In step S30-003, an NG response indicating the absence of a sending phenomenon of the designated receipt number is sent to the interface control task as a message, thus ending the GET SEND INFO. processing.

Figure 44:
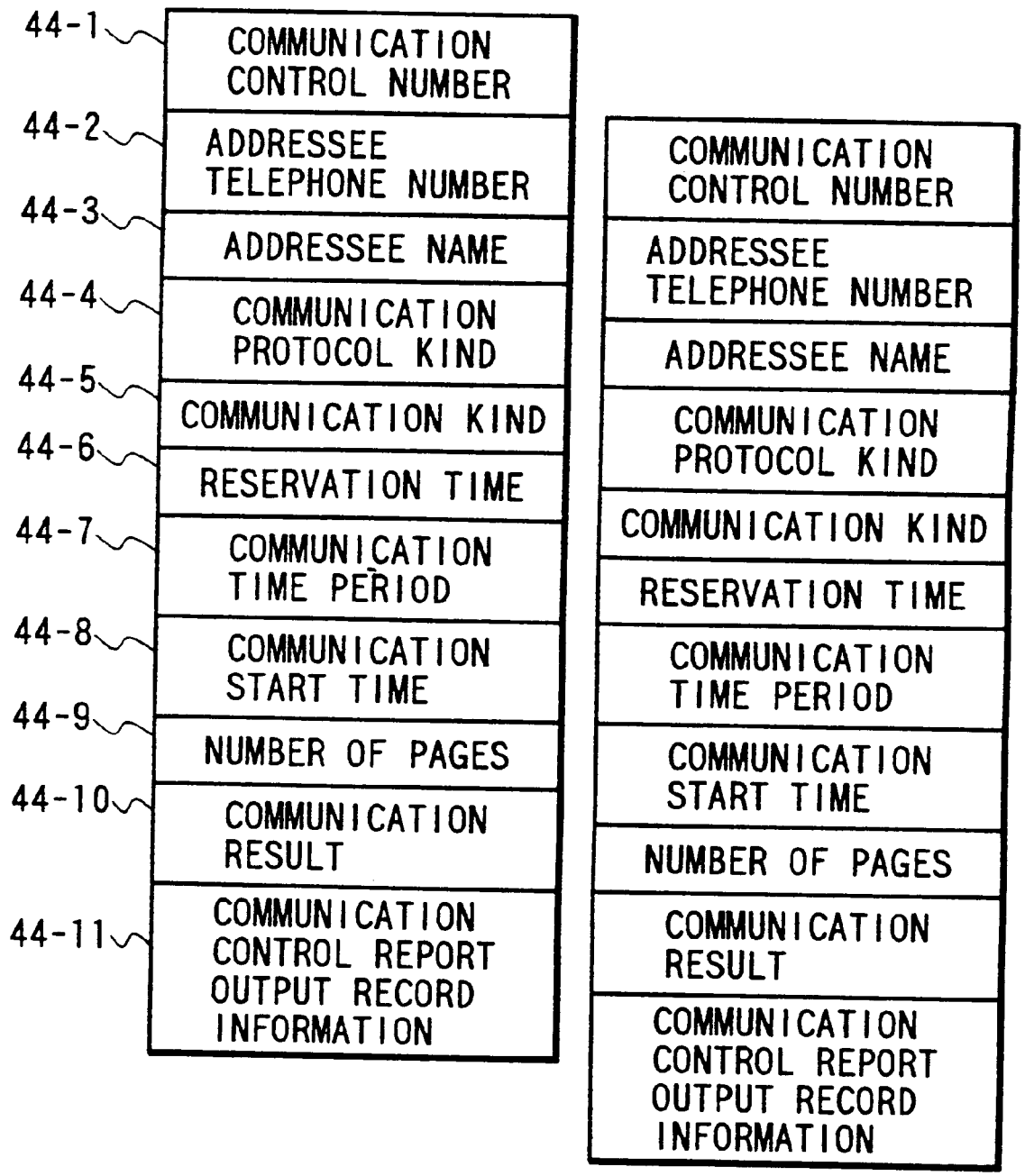
FIG. 44 is a view showing the format of communication control information stored in a RAM 103.

On the other hand, if it is determined in step S30-002 that the communication control information is not notified yet as the send information, i.e., if the communication control report output record information 44-011 in the communication control information shown in FIG. 44 indicates that the send information is not notified yet, the flow advances to step S30-004.

In step S30-004, it is checked if the communication result in the communication control information indicates an error. If a communication result 44-010 in the communication control information shown in FIG. 44 indicates "normal end", the flow advances to step S30-005.

In step S30-005, send information indicating "normal end" as a send state is generated, and the flow advances to step S30-012.

On the other hand, if it is determined in step S30-004 that the communication result 44-010 in the communication control information shown in FIG. 44 indicates "error end", the flow advances to step S30-006.

In step S30-006, send information indicating "error end" as a send state is generated, and the flow advances to step S30-012.

On the other hand, if it is determined in step S30-001 that the communication control number 44-001 in the communication control information shown in FIG. 44 does not coincide with the receipt number designated by the send information acquisition command, or the communication kind 44-005 in FIG. 44 does not indicate "send", the flow advances to step S30-007.

In step S30-007, it is checked if a sending phenomenon (event) of the receipt number designated by the send information acquisition command is present in the send queue. If no sending phenomenon of the receipt number designated by the send information acquisition command is present in the send queue, the flow advances to step S30-008.

In step S30-008, an NG response indicating the absence of a sending phenomenon of the designated receipt number is sent to the interface control task as a message, thus ending the GET SEND INFO. processing.

On the other hand, if it is determined in step S30-007 that the sending phenomenon of the receipt number designated by the send information acquisition command is present in the send queue, the flow advances to step S30-009.

In step S30-009, it is checked if the sending phenomenon is being executed. If the sending phenomenon is being executed, the flow advances to step S30-010; otherwise, the flow advances to step S30-011.

In step S30-010, send information indicating "sending now" as a send state is generated, and the flow advances to step S30-012. On the other hand, in step S30-011, send information indicating "on stand-by of sending" as a send state is generated, and the flow advances to step S30-012.

In step S30-012, the OK response and the send information generated in step S30-005, S30-006, S30-010, or S30-011 are sent to the interface control task as a message to request the interface control task to return the OK response and the send information. Thereafter, the flow advances to step S30-013.

If it is determined in step S30-013 that a message indicating that the OK response and the send information are successfully returned is received from the interface control task, the flow advances to step S30-015; otherwise, the flow advances to step S30-014.

If it is determined in step S30-014 that a message indicating that the returning processing of the OK response and the send information within a prescribed period of time is not successful is received from the interface control task, the GET SEND INFO. processing ends without any processing; otherwise, the flow returns to step S30-013.

It is checked in step S30-015 if the send information which is requested to be returned in step S30-012 is information indicating "normal end" or "error end". If the send information which is requested to be returned is information indicating "normal end" or "error end", the flow advances to step S30-016; otherwise, the GET SEND INFO. processing ends.

In step S30-016, the communication control report output record information 44-011 in the communication control information, which is referred to upon determination in step S30-004 as to whether or not the send result indicates an error, is updated to indicate that the send information has already been notified, and the GET SEND INFO. processing ends.

With the above-mentioned processing, the facsimile apparatus of this embodiment can inform the send information associated with the state "normal end", "error end", "sending now", or "on stand-by of sending" of each sending phenomenon, which is required upon control of the sending phenomenon requested in, e.g., the SEND FILE processing by the information processing terminal 109, without requiring any new information having a configuration different from the existing communication control information.

6. Upload File (UPLOAD FILE) Processing

Figure 32:
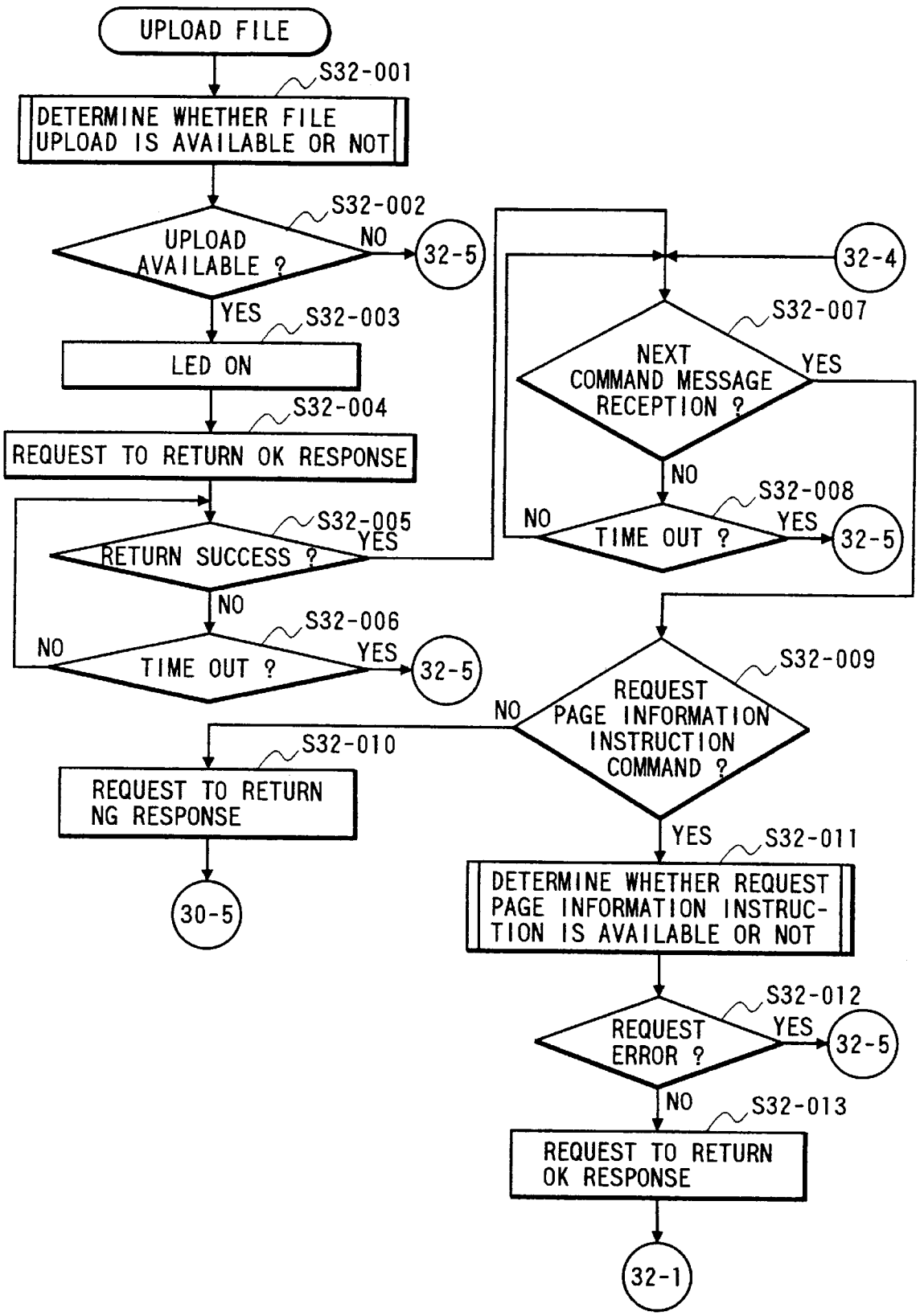
FIG. 32 is a flow chart showing the operation of upload file processing.
Figure 33:
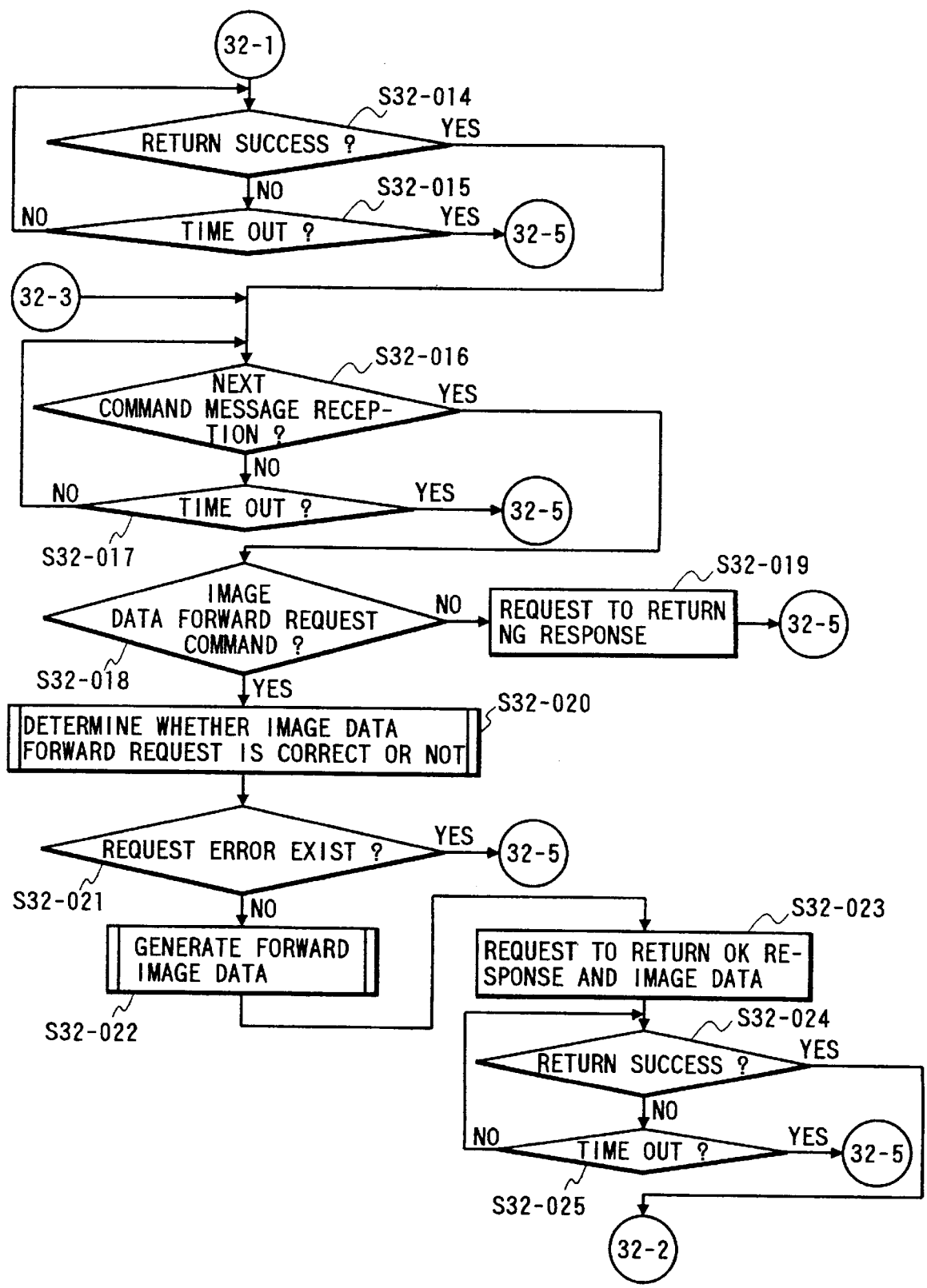
FIG. 33 is a flow chart showing the operation of the upload file processing.
Figure 34:
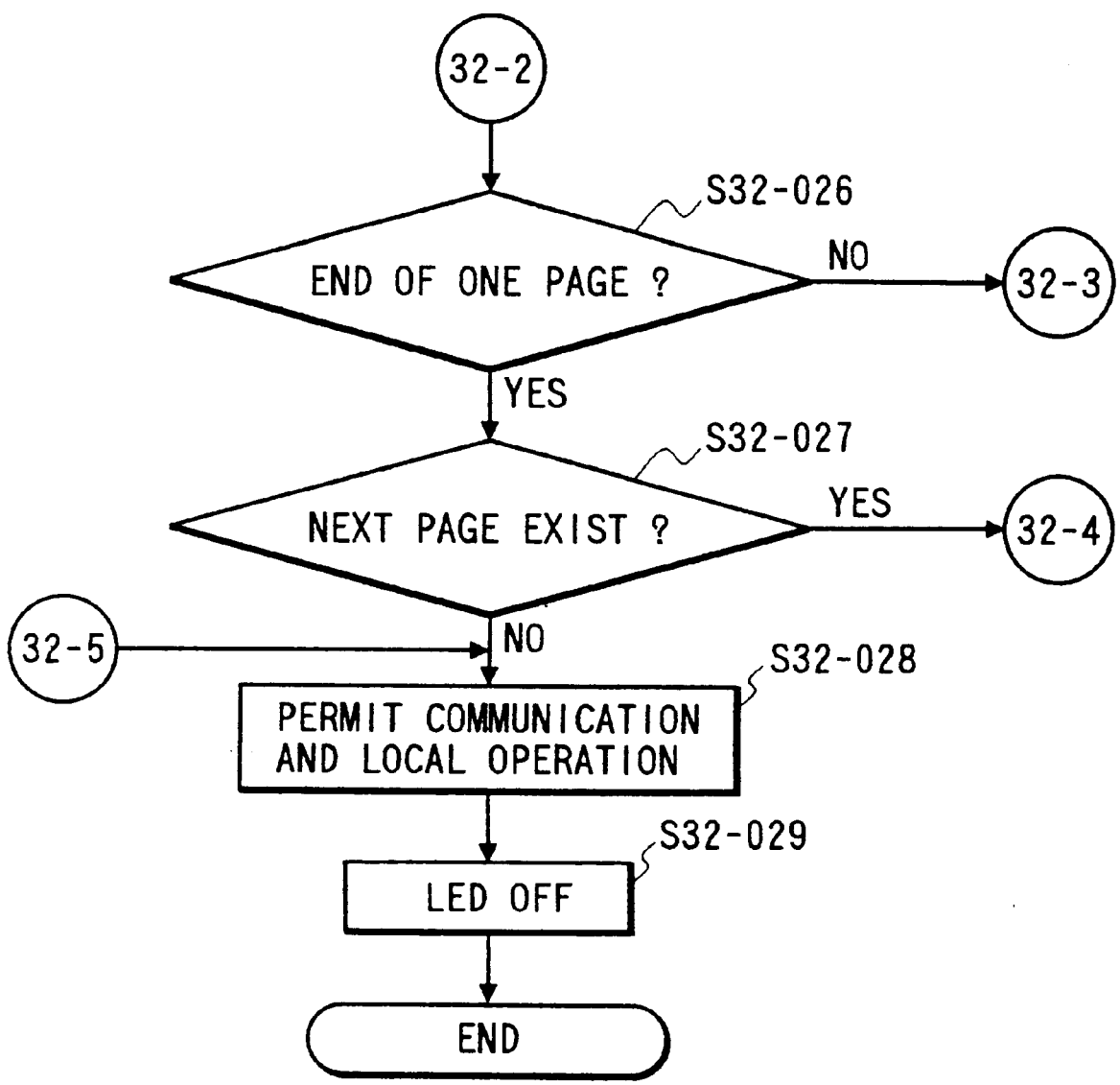
FIG. 34 is a flow chart showing the operation of the upload file processing.

FIGS. 32, 33, and 34 are flow charts showing the file upload operation for forwarding image data stored in the image memory on the RAM 103 in the facsimile apparatus of this embodiment to the information processing terminal 109 in units of files.

When the command processing task shown in FIG. 8 receives a message (command) from the interface control task, and the received command is a file forward request command, the UPLOAD FILE processing is executed.

Figure 35:
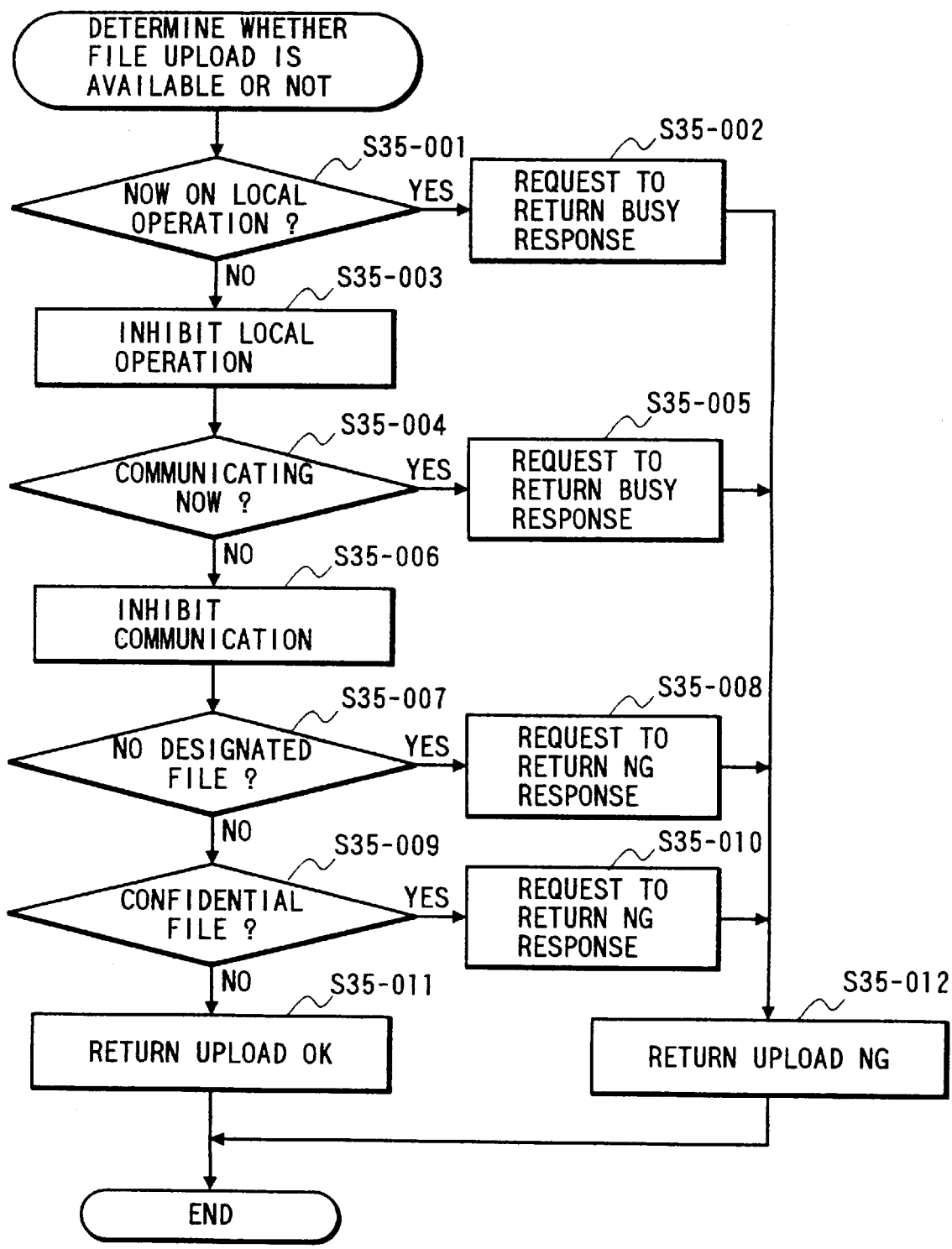
FIG. 35 is a flow chart showing in detail the processing (FIG. 32) for determining whether file upload is available or not.

It is checked in step S32-001 if file upload processing is available. This checking step is executed to prevent an operation error since the image buffer on the RAM 103 is commonly used in a communication and in data transfer to the information processing terminal 109. Note that this processing will be described in detail later (FIG. 35).

If it is determined in step S32-002 that the discrimination result in step S32-001 indicates OK, i.e., the file upload processing is available, the flow advances to step S32-003; otherwise, the flow advances to step S32-028.

In step S32-003, the interface LED is turned on to inform an operator that the command processing is being performed, and a local operation is inhibited, and the flow advances to step S32-004.

In step S32-004, an OK response is sent to the interface control task as a message to request the task to return the OK response. If it is determined in step S32-005 that a message indicating that the OK response is successfully returned is received from the interface control task, the flow advances to step S32-007; otherwise, the flow advances to step S32-006.

If it is determined in step S32-006 that a message indicating that the returning processing of the OK response is not successfully completed within a prescribed period of time is received from the interface control task, the flow advances to step S32-028; otherwise, the flow returns to step S32-005.

If it is determined in step S32-007 that a message indicating the next command from the interface control task is received, the flow advances to step S32-009; otherwise, the flow advances to step S32-008.

If it is determined in step S32-008 that the message indicating the next command from the interface control task cannot be received within a prescribed period of time, the flow advances to step S32-028; otherwise, the flow returns to step S32-007.

In step S32-009, it is checked if the message received in step S32-007 indicates a request page information instruction command. If NO (n) in step S32-009, the flow advances to step S32-010.

In step S32-010, an NG response indicating a sequence error is sent to the interface control task as a message, and the flow advances to step S32-028.

On the other hand, if it is determined in step S32-009 that the received message indicates the request page information instruction command, the flow advances to step S32-011.

In step S32-011, it is checked if a request page information instruction such as an encoding method, a resolution, and the like is available, and the flow advances to step S32-012. Note that this processing will be described in detail later.

If it is determined in step S32-012 that the discrimination result in step S32-011 includes no error, i.e., if the request page information instruction is available, the flow advances to step S32-013; otherwise, the flow advances to step S32-028.

In step S32-013, an OK response is sent to the interface control task as a message to request the task to return the OK response.

If it is determined in step S32-014 that a message indicating that the OK response is successfully returned is received from the interface control task, the flow advances to step S32-016; otherwise, the flow advances to step S32-015.

If it is determined in step S32-015 that a message indicating that the returning processing of the OK response is not successfully completed within a prescribed period of time is received from the interface control task, the flow advances to step S32-028; otherwise, the flow returns to step S32-014.

If it is determined in step S32-016 that a message indicating the next command from the interface control task is received, the flow advances to step S32-018; otherwise, the flow advances to step S32-017.

If it is determined in step S32-017 that the message indicating the next command from the interface control task cannot be received within a prescribed period of time, the flow advances to step S32-028; otherwise, the flow returns to step S32-016.

It is checked in step S32-018 if the message received in step S32-017 indicates an image data forward request command. If NO in step S32-018, the flow advances to step S32-019.

In step S32-019, an NG response indicating a sequence error is sent to the interface control task as a message, and the flow advances to step S32-028.

On the other hand, if it is determined in step S32-018 that the received message indicates an image data forward request command, the flow advances to step S32-020.

It is checked in step S32-020 whether the image data forward request is correct or not, and the flow then advances to step S32-021. Note that this processing will be described in detail later.

If it is determined in step S32-021 that the discrimination result in step S32-020 does not include any error, i.e., if the image data forward request is correct, the flow advances to step S32-022; otherwise, the flow advances to step S32-028.

In step S32-022, image data to be forwarded to the host is generated, and the flow advances to step S32-023. Note that this processing will be described in detail later.

In step S32-023, an OK response and the image data generated in step S32-022 are sent to the interface control task as a message to request the task to return the OK response and the image data.

If it is determined in step S32-024 that a message indicating that the returning processing of the OK response and image data is successful is received from the interface control task, the flow advances to step S32-026; otherwise, the flow advances to step S32-025. If it is determined in step S32-025 that a message indicating that the returning processing of the OK response and image data is not successfully completed within a prescribed period of time is received from the interface control task, the flow advances to step S32-028; otherwise, the flow returns to step S32-024.

It is checked in step S32-026 if the image data which is requested to be returned in step S32-023 is the final block of one page. If YES in step S32-026, i.e., if no next page is present, the flow advances to step S32-027; otherwise, the flow returns to step S32-016.

It is checked in step S32-027 if the image data which is requested to be returned in step S32-023 is the final block of the designated file. If YES in step S32-027, i.e., if no next page is present, the flow advances to step S32-028; otherwise, the flow returns to step S32-007.

In step S32-028, a communication and local operation, which have been inhibited, are permitted to allow a facsimile communication, and the flow advances to step S32-029.

In step S32-029, the interface LED, which is turned on in step S32-003, is turned off to inform the operator that a local operation is permitted, thus ending the UPLOAD FILE processing.

FIG. 35 is a flow chart showing in detail the processing in step S32-001 in FIG. 32 for determining if file upload processing is available.

It is checked in step S35-001 if the facsimile apparatus is now on a local operation. If YES (y) in step S35-001, the flow advances to step S35-002.

In step S35-002, a BUSY response is sent to the interface control task as a message, and the flow advances to step S35-012.

On the other hand, if it is determined in step S35-001 that the facsimile apparatus is not on a local operation, the flow advances to step S35-003.

In step S35-003, a new local operation is inhibited, and the flow advances to step S35-004.

It is checked in step S35-004 if the facsimile apparatus is communicating now. If YES in step S35-004, the flow advances to step S35-005.

In step S35-005, a BUSY response is sent to the interface control task as a message, and the flow advances to step S35-012.

On the other hand, if it is determined in step S35-004 that the facsimile apparatus is not communicating, the flow advances to step S35-006.

In step S35-006, a new communication is inhibited, and the flow advances to step S35-007.

It is checked in step S35-007 if a file designated by the file forward request command is present. If NO (n) in step S35-007, the flow advances to step S35-008.

In step S35-008, an NG response indicating the absence of the designated file is sent to the interface control task as a message, and the flow advances to step S35-012.

On the other hand, if it is determined in step S35-007 that the designated file is present, the flow advances to step S35-009.

It is checked in step S35-009 if the file designated by the file forward request command is a confidential file. If YES in step S35-009, the flow advances to step S35-010.

In step S35-010, an NG response indicating that the designated file is invalid is sent to the interface control task as a message, and the flow advances to step S35-012.

On the other hand, if it is determined in step S35-009 that the designated file is not a confidential file, the flow advances to step S35-011.

In step S35-011, a message indicating that the file upload processing is available is notified to the calling side processing, thus ending the processing for determining if the file upload processing is available.

In step S35-012, a message indicating that the file upload processing is not available is notified to the calling side processing, thus ending the processing for determining if the file upload processing is available.

Figure 36:
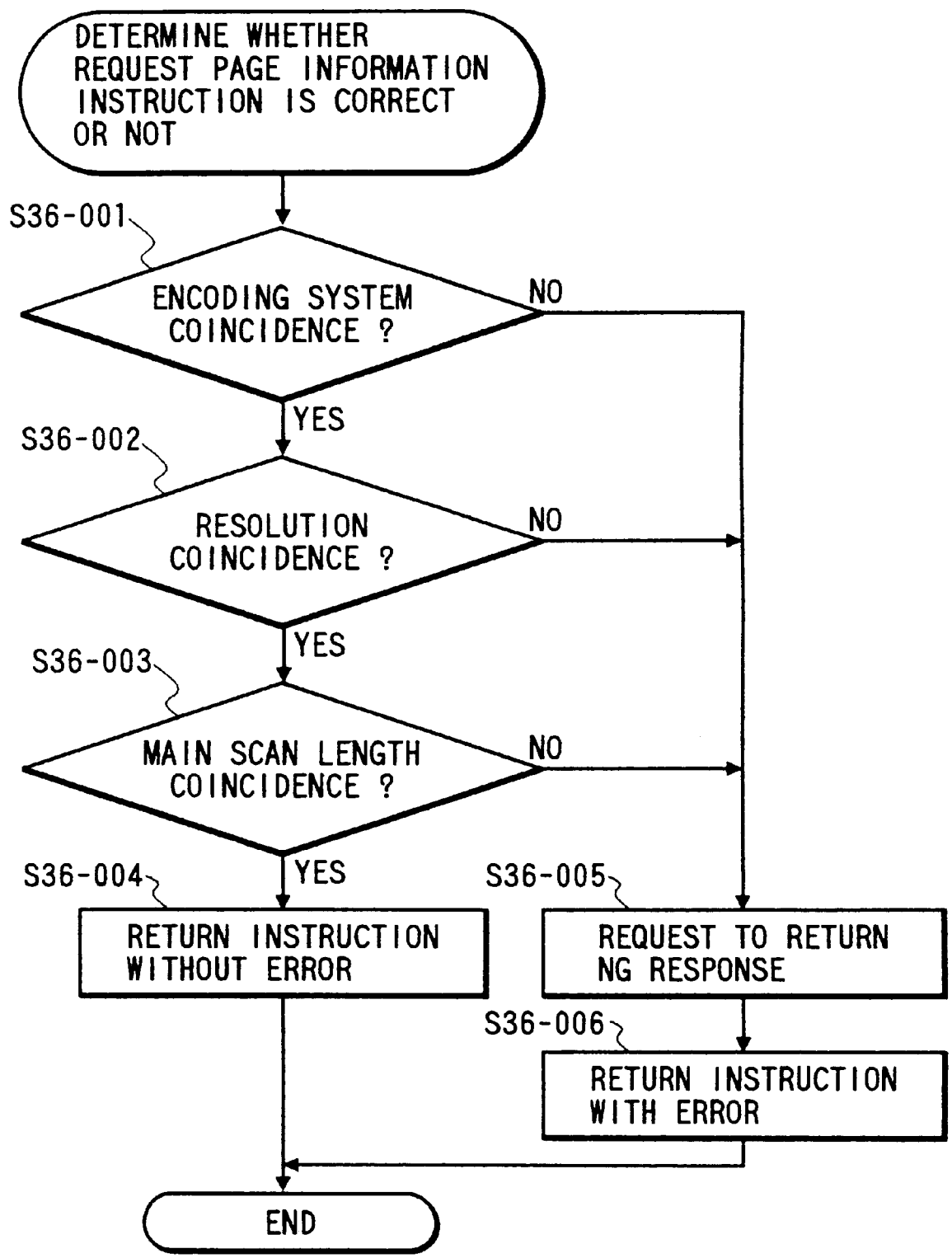
FIG. 36 is a flow chart showing in detail the processing (FIG. 32) for determining whether a request page information instruction is correct or not.

FIG. 36 is a flow chart showing in detail the processing in step S32-011 in FIG. 32 for determining whether the request page information instruction is correct or not.

It is checked in step S36-001 if the encoding system designated by the request page information instruction command coincides with that of an image file designated by the file forward request command stored in the facsimile apparatus. As the encoding systems, three systems, i.e., "MH", "MR", and "MMR" described in the ITU-T recommendations T.4 and T.30, are available. If NO (n) in step S36-001, the flow advances to step S36-005; otherwise, the flow advances to step S36-002.

It is checked in step S36-002 if the resolution designated by the request page information instruction command coincides with that of the corresponding page of the image file designated by the file forward request command stored in the facsimile apparatus. As the resolution modes, a "standard" mode having a main scan resolution of 8 [dots/mm] and a sub-scan resolution of 3.75 [lines/mm] and a "fine" mode having a main scan resolution of 8 [dots/mm] and a sub-scan resolution of 7.7 [lines/mm] described in the ITU-T recommendations T.4 and T.30 are available. If NO in step S36-002, the flow advances to step S36-005; otherwise, the flow advances to step S36-003.

It is checked in step S36-003 if the main scan length designated by the request page information instruction command coincides with that of the corresponding page of the image file designated by the file forward request command stored in the facsimile apparatus. The main scan length means a width when a paper sheet is placed vertically. As the main scan lengths, three lengths, i.e., "A4", "B4", and "A3" corresponding to main scan line lengths described in the ITU-T recommendations T.4 and T.30 are available. If NO in step S36-003, the flow advances to step S36-005; otherwise, the flow advances to step S36-004.

In step S36-004, a message indicating that the request page information instruction command has no error is notified to the calling side processing, thus ending the processing for determining if the request page information instruction is correct.

Step S36-005 is executed when a non-coincidence of the encoding system, resolution, or main scan length is found in step S36-001, S36-002, or S36-003, and an NG response indicating that the parameter is invalid is sent to the interface control task as a message. Then, the flow advances to step S36-006.

In step S36-006, a message indicating that the request page information instruction command has an error is notified to the calling side processing, thus ending the processing for determining if the request page information instruction is correct.

Figure 37:
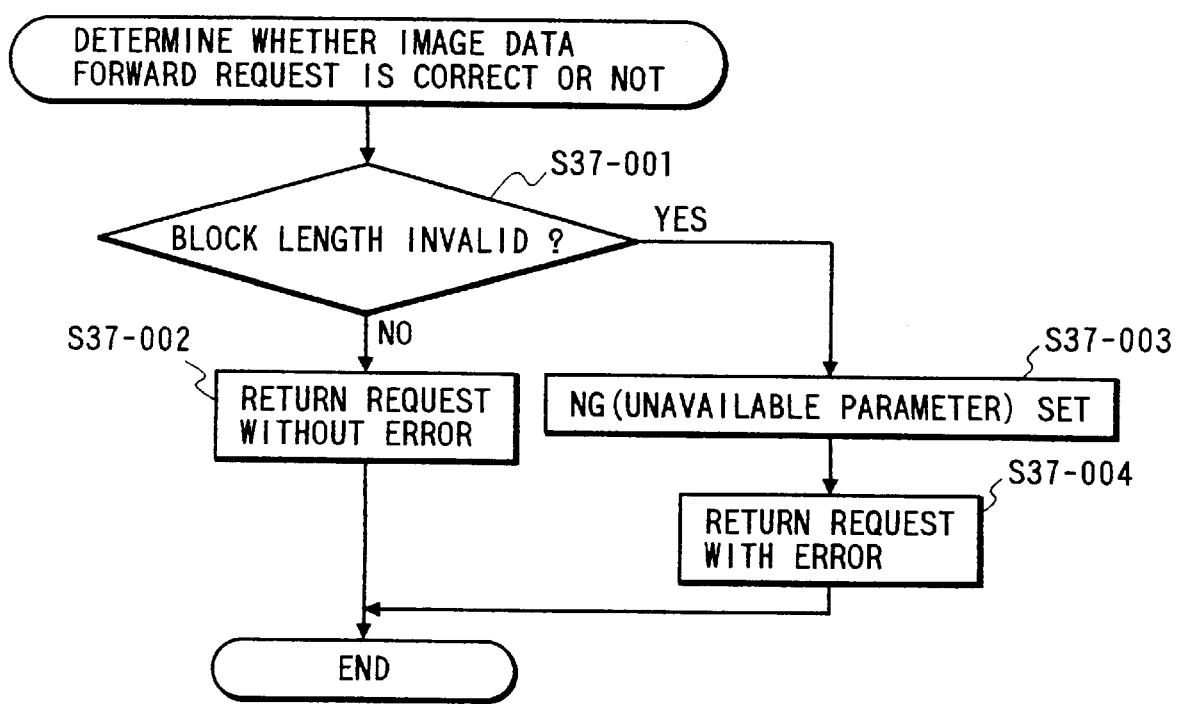
FIG. 37 is a flow chart showing in detail the processing (FIG. 33) for determining whether an image data transfer request is correct or not.

FIG. 37 is a flow chart showing in detail the processing in step S32-020 in FIG. 33 for determining whether the image data forward request is correct or not.

It is checked in step S37-001 if a block length designated by the image data forward-request command is valid. If the block length is larger than a header data length (to be described later), it is determined that the block length is valid, and the flow advances to step S37-002; otherwise, the flow advances to step S37-003.

In step S37-002, a message indicating that the image data forward request command has no error is notified to the calling side processing, thus ending the processing for determining if the image data forward request is correct.

On the other hand, in step S37-003, an NG response indicating that the block length is invalid is sent to the interface control task as a message, and the flow advances to step S37-004.

In step S37-004, a message indicating that the image data forward request command has an error is notified to the calling side processing, thus ending the processing for determining if the image data forward request is correct.

Figure 38:
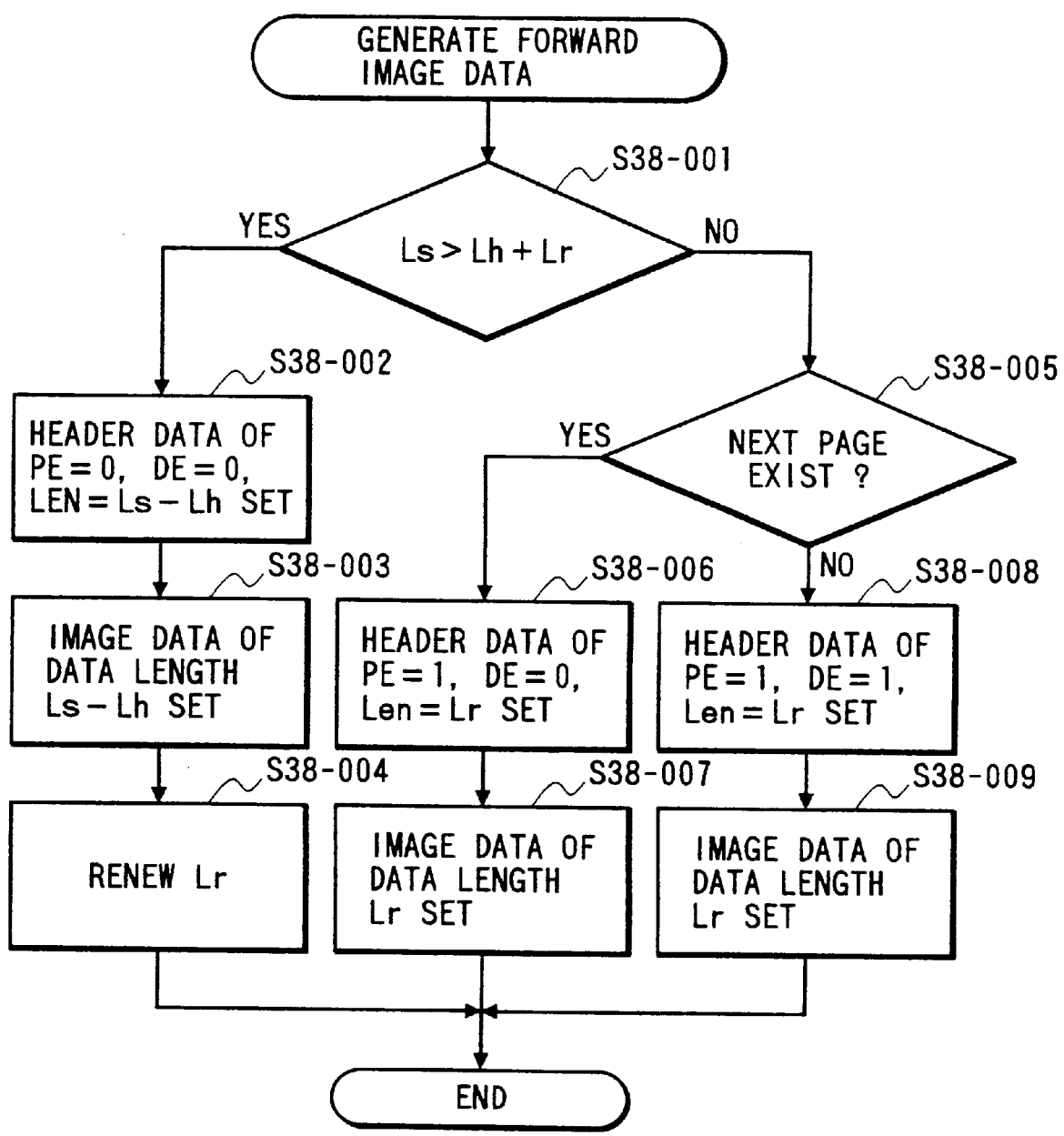
FIG. 38 is a flow chart showing in detail the generation processing of forward image data shown in FIG. 33.

FIG. 38 is a flow chart showing in detail the processing in step S32-022 in FIG. 33 for generating forward image data.

In step S38-001, the block length, Ls, designated by the image data forward request command is compared with a non-forwarded page data amount (remaining page data length) Lr. Let Lh be the data length of a header added immediately before each image data block. The header includes a PE flag indicating the end of a page, a DE flag indicating the end of a file, and an image data length LEN following the header. If Ls>Lh+Lr is true, i.e., if the block length designated by the image data forward request command is larger than the sum of the header data length and the remaining page data length, the flow advances to step S38-002.

In step S38-002, header data which includes PE=0 indicating that the current position is not the end of a page, DE=0 indicating that the current position is not the end of a file, and the image data length LEN=Ls−Lh following the header is set in the image buffer on the RAM 103 used for forwarding data to the information processing terminal 109, and the flow advances to step S38-003.

In step S38-003, image data is copied from the image memory on the RAM 103 to the image buffer on the RAM 103 used for forwarding data to the information processing terminal 109 so as to have the data length LEN=Ls−Lh, and the flow advances to step S38-004.

In step S38-004, the non-forwarded page data amount Lr is updated to Lr−LEN, thus ending the generation processing of forward image data.

On the other hand, if it is determined in step S38-001 that Ls>Lh+Lr is false, i.e., if the block length designated by the image data forward request command is equal to or smaller than the sum of the header data length and the remaining page data length, the flow advances to step S38-005.

It is checked in step S38-005 if the next page is present. If a new page is present next to the page currently being forwarded, the flow advances to step S38-006.

In step S38-006, header data which includes PE=1 indicating that the current position is the end of a page, DE=0 indicating that the current position is not the end of a file, and the image data length LEN=Lr following the header is set in the image buffer on the RAM 103 used for forwarding data to the information processing terminal 109, and the flow advances to step S38-007.

In step S38-007, remaining image data having a data length LEN=Lr is copied from the image memory on the RAM 103 to the image buffer on the RAM 103 used for forwarding data to the information processing terminal 109, thus ending the generation processing of forward image data.

On the other hand, if it is determined in step S38-005 that a new page is not present next to the page currently being forwarded, the flow advances to step S38-008.

In step S38-008, header data which includes PE=1 indicating that the current position is the end of a page, DE=1 indicating that the current position is the end of a file, and the image data length LEN=Lr following the header is set in the image buffer on the RAM 103 used for forwarding data to the information processing terminal 109, and the flow advances to step S38-009.

In step S38-009, remaining image data having a data length LEN=Lr is copied from the image memory on the RAM 103 to the image buffer on the RAM 103 used for forwarding data to the information processing terminal 109, thus ending the generation processing of forward image data.

With the above-mentioned processing, the facsimile apparatus of this embodiment forwards image data stored in the image memory on the RAM 103 to the information processing terminal 109 in units of files controlled by the facsimile apparatus while commonly using the image buffer on the RAM 103 in the communication and in data forwarding to the information processing terminal 109.

The facsimile apparatus of this embodiment divides image data of each page into blocks each having a size designated by the information processing terminal 109, and forwards the data in units of blocks.

Furthermore, the facsimile apparatus of this embodiment adds header data including information associated with the end of a page, information associated with the end of a file, and information of the size of actual image data following the header to a position immediately before image data upon forwarding of image data of each page, which is divided into blocks each having a size designated by the information processing terminal 109. By utilizing this header, if only non-forwarded data having a size smaller than the block size designated by the information processing terminal 109 is present in the facsimile apparatus, the facsimile apparatus forwards data having a size smaller than the block size designated by the information processing terminal 109 to the information processing terminal 109 by appropriately setting the information of the size of actual image data following the header.

According to the above-mentioned processing, an image file controlled by the facsimile apparatus can be forwarded to the external information processing terminal by commonly using the buffer used in a communication between facsimile apparatuses via, e.g., a telephone line, and the buffer used in forwarding of data to the external information processing terminal. More specifically, the RAM capacity required for buffering can be reduced, and the file upload function can be realized with low cost.

Since the file upload operation is inhibited during a local operation, the program architecture can become very simple, and the file upload function can be developed within a very short period of time.

The external information processing terminal can designate a block length when it requests forwarding of actual image data. More specifically, the external information processing terminal can state a block length that can be controlled in one request by the external information processing terminal irrespective of the facsimile apparatus, thus reducing the load on the external information processing terminal.

Upon request of forwarding of actual image data, the facsimile apparatus adds header data including information associated with the end of a page, information associated with the end of a file, and information of the size of actual image data following the header. For this reason, if only non-forwarded image data having a size smaller than the block size designated by the external information processing terminal is present in the facsimile apparatus, the facsimile apparatus can appropriately set information of the size of actual image data following the header, and can forward data having a size smaller than the block size designated by the external information processing terminal to the external information processing terminal. More specifically, forwarding of redundant data can be eliminated.

7. Receiving (RECEIVE) Processing

Figure 39:
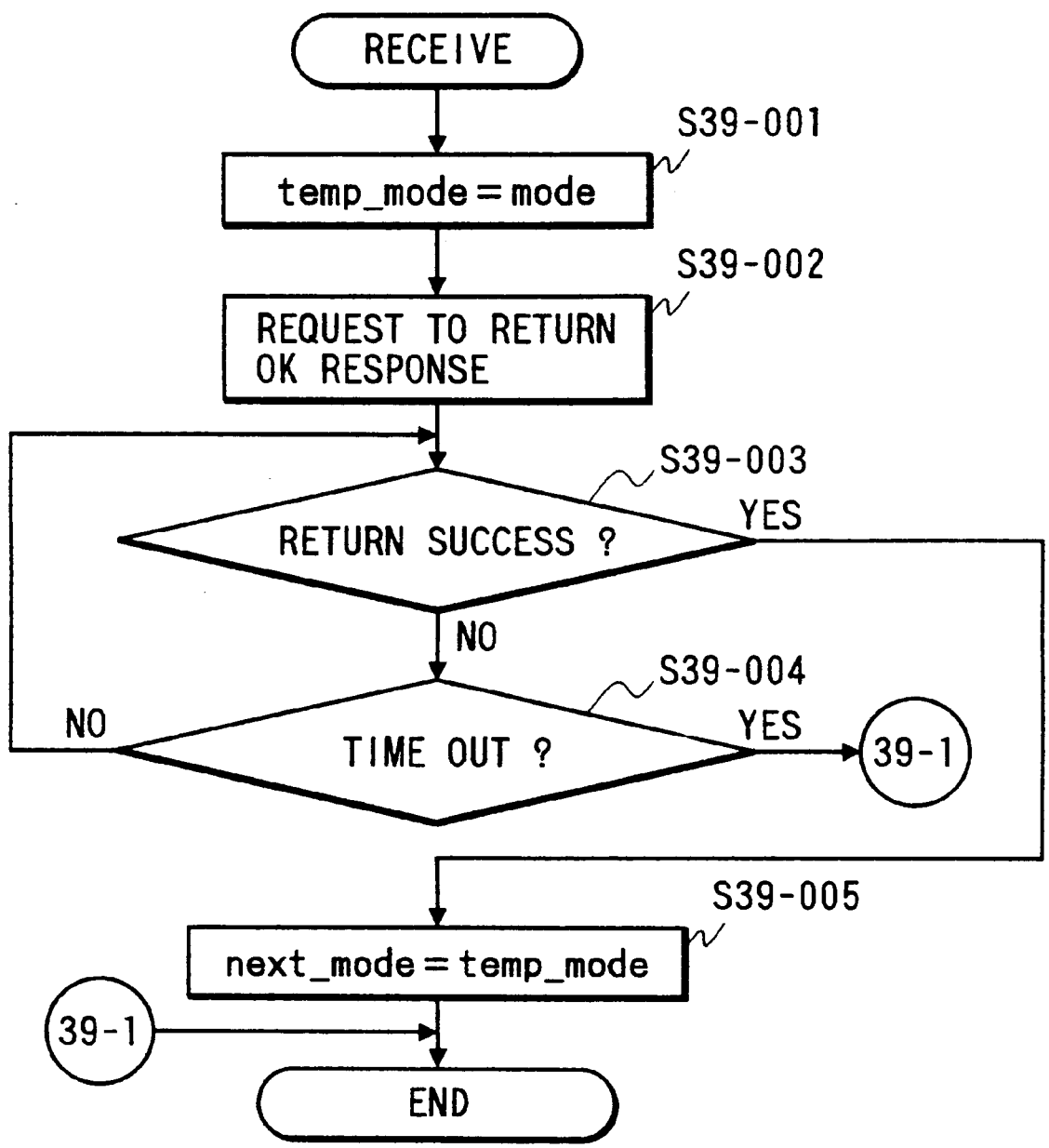
FIG. 39 is a flow chart showing the operation of receiving processing.

FIG. 39 is a flow chart showing the receiving mode change operation for changing the receiving mode of the facsimile apparatus of this embodiment to one of "standard receive", "memory receive", and "memory and record receive" modes.

When the command processing task shown in FIG. 8 receives a message (command) from the interface control task, and the received command is a receiving mode change instruction command, the RECEIVE processing is executed.

In step S39-001, a receiving mode "mode" designated by the receiving mode change instruction command is copied to a temporary receiving mode holding area temp_mode assured on the work area on the RAM 103, and the flow advances to step S39-002.

In step S39-002, an OK response is sent to the interface control task as a message so as to request the task to return the OK response, and the flow advances to step S39-003.

If it is determined in step S39-003 that a message indicating that the returning processing of the OK response is successful is received from the interface control task, the flow advances to step S39-005; otherwise, the flow advances to step S39-004.

If it is determined in step S39-004 that a message indicating that the returning processing of the OK response is not successfully completed within a prescribed period of time is received from the interface control task, the RECEIVE processing ends without any processing; otherwise, the flow returns to step S39-003.

In step S39-005, the contents of the temporary receiving mode holding area temp_mode are copied to a next receiving mode holding area next_mode assured on the work area on the RAM 103, thus ending the RECEIVE processing.

Figure 40:
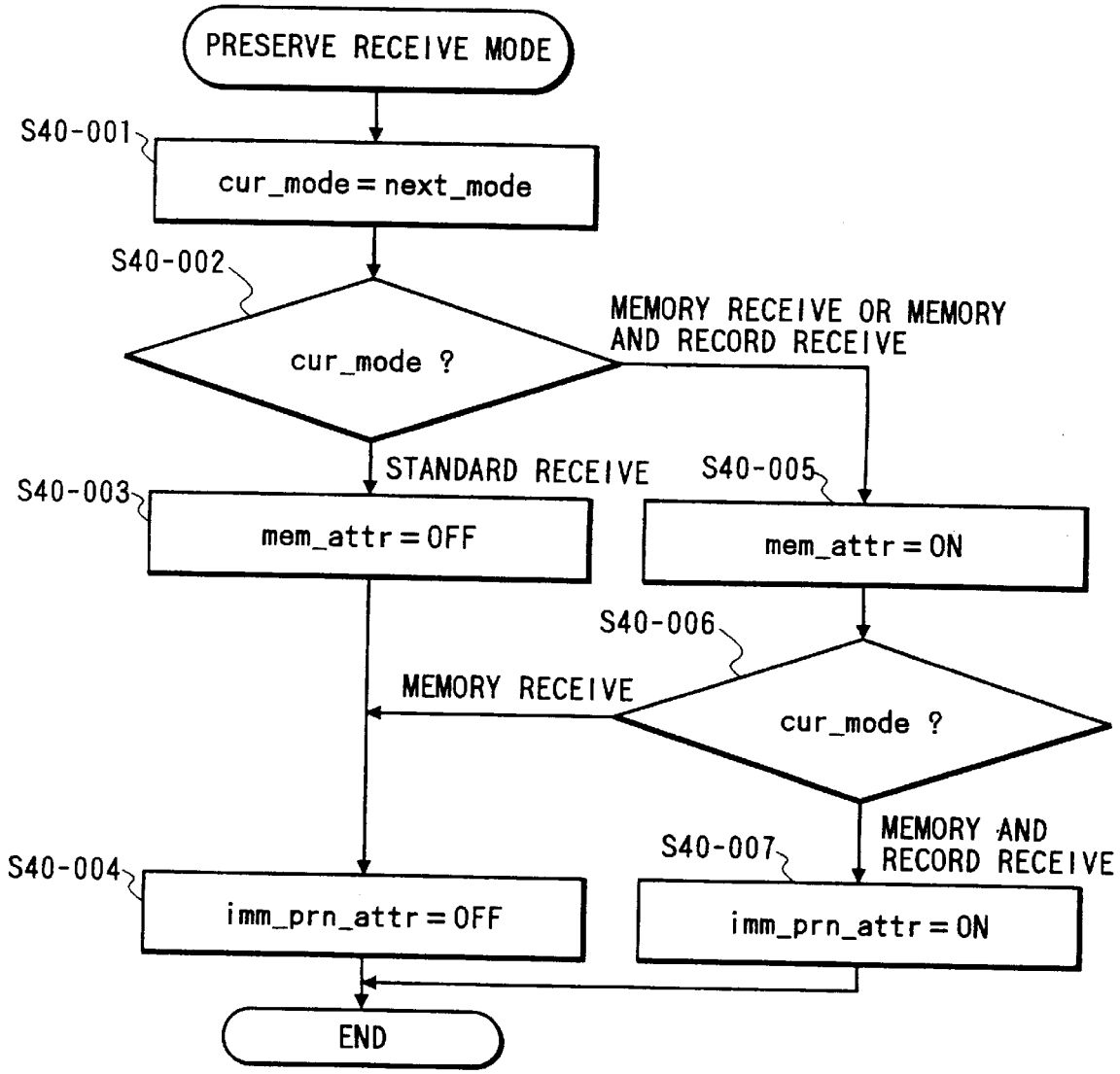
FIG. 40 is a flow chart showing the operation of receiving mode preservation processing.

FIG. 40 is a flow chart showing the receiving mode preservation operation for preserving a received image attribute indicating a receiving mode, in which the received image is generated, in each received image in the facsimile apparatus of this embodiment.

The receiving mode preservation processing is executed when the facsimile apparatus of this embodiment closes a line upon detection of a CI from a communication line, and starts a facsimile reception on the basis of the facsimile transmission procedure, or when a facsimile reception is started on the basis of a facsimile reception request from an operator.

In step S40-001, the contents of the next receiving mode holding area next_mode are copied to a current receiving mode holding area cu_mode assured on the work area on the RAM 103, and the flow advances to step S40-002.

In step S40-002, the receiving mode indicated by the current receiving mode holding area cur_mode is determined. If the current receiving mode is the "standard receive" mode, the flow advances to step S40-003.

In step S40-003, a memory receive attribute mem_attr of the received image of interest is set to be OFF to indicate that no memory receive is performed, and the flow advances to step S40-004.

In step S40-004, an immediate printing attribute imm_prn_attr upon memory receive of the received image of interest is set to be OFF to indicate that the immediate printing upon memory receive is not performed, thus ending the receiving mode preservation processing.

On the other hand, if it is determined in step S40-002 that the current receiving mode is not the "standard receive" mode, i.e., if the current receiving mode is the "memory receive" or "memory and record receive" mode, the flow advances to step S40-005.

In step S40-005, the memory receive attribute mem_attr of the received image of interest is set to be ON to indicate that the memory receive is performed, and the flow advances to step S40-006.

It is determined in step S40-006 which one of the "memory receive" and "memory and record receive" modes the current receiving mode holding area cur_mode indicates. If the current receiving mode is the "memory receive" mode, the flow advances to step S40-003, and the immediate printing attribute imm_prn_attr upon memory receive of the received image of interest is set to be OFF to indicate that the immediate printing upon memory receive is not performed, thus ending the receiving mode preservation processing, as described above.

On the other hand, if it is determined in step S40-006 that the current receiving mode is the "memory and record receive" mode, the flow advances to step S40-007.

In step S40-007, the immediate printing attribute imm_prn_attr upon memory receive of the received image of interest is set to be ON to indicate that the immediate printing upon memory receive is performed, thus ending the receiving mode preservation processing.

Figure 41:
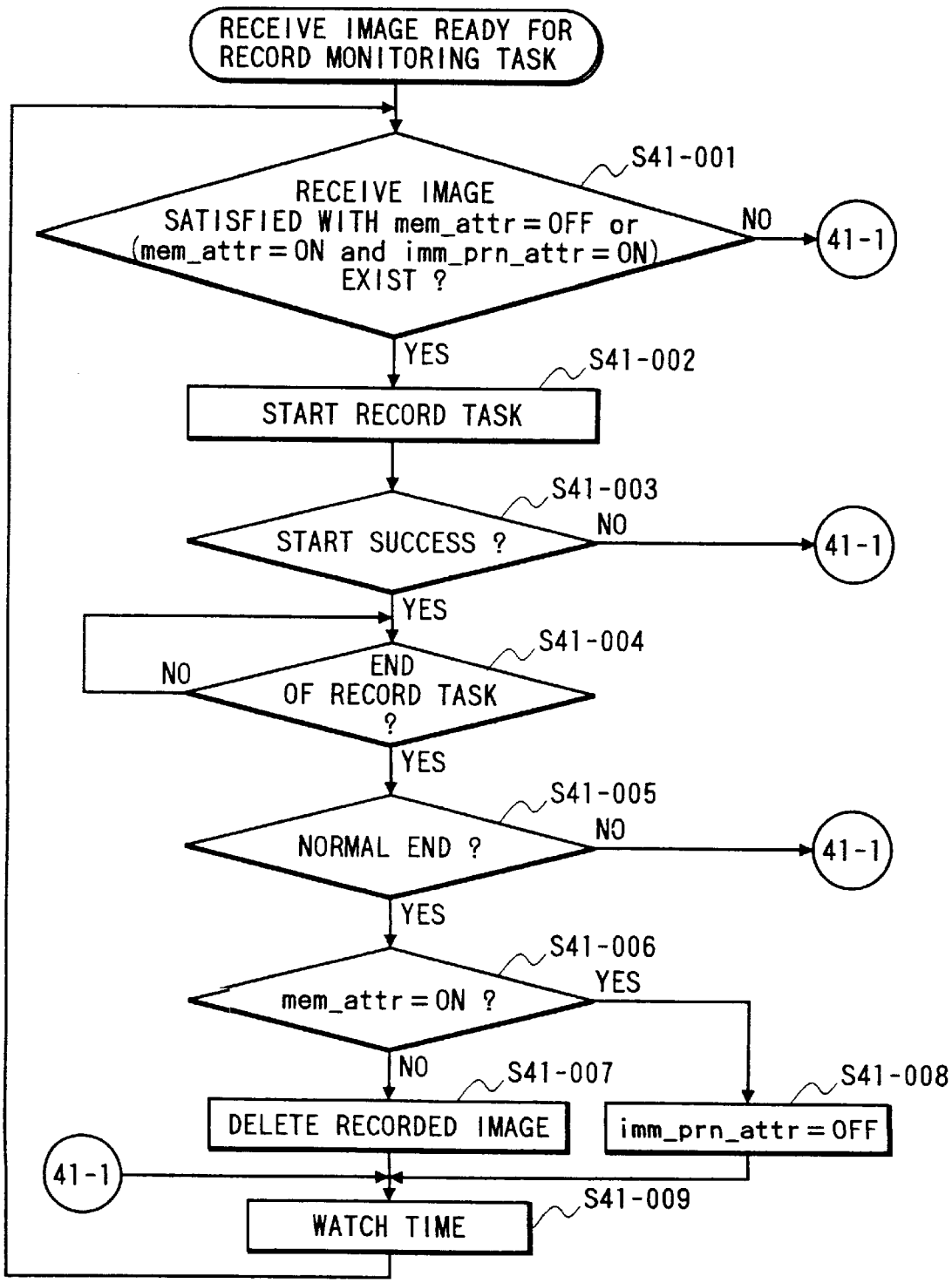
FIG. 41 is a flow chart showing the operation of processing for monitoring a receive image ready for recording.

FIG. 41 is a flow chart showing the ready-for-record received image monitoring task for periodically monitoring a received image ready for record in the facsimile apparatus of this embodiment.

In step S41-001, a received image ready for record is retrieved from a received image queue. If a received image satisfying the memory receive attribute mem_attr=OFF or a received image satisfying the memory receive attribute mem_attr=ON and the immediate printing attribute imm_prn_attr=ON upon memory receive is present, i.e., if an image received when the receiving mode is the "standard receive" mode, or an image received when the receive mode is the "memory and record receive" mode is present in a received image queue, the flow advances to step S41-002; otherwise, the flow advances to step S41-009.

In step S41-002, the record task (see FIG. 19) is started to request the task to record the received image of interest, and the flow advances to step S41-003.

It is checked in step S41-003 if the record task is successfully started in step S41-002. If YES (y) in step S41-003, the flow advances to step S41-004; otherwise, the flow advances to step S41-009.

If the record task is successfully started, the control waits for the end of the record task in step S41-004. Upon detection of the end of the record task, the flow advances to step S41-005.

It is checked in step S41-005 if the record task has normally ended. If YES in step S41-005, the flow advances to step S41-006; otherwise, the flow advances to step S41-009.

It is checked in step S41-006 if the memory receive attribute mem_attr of the received image of interest indicates the memory receive. If mem_attr=ON is false, i.e., if the received image of interest is an image received when the receiving mode is the "standard receive" mode, the flow advances to step S41-007; if mem_attr=ON is true, i.e., if the received image of interest is an image received when the receiving mode is the "memory and record receive" mode, the flow advances to step S41-008.

In step S41-007, the received image of interest received when the receiving mode is the "standard receive" mode is deleted from the image memory on the RAM 103, and the flow advances to step S41-009.

On the other hand, in step S41-008, the immediate printing attribute imm_prn_attr upon memory receive of the received image of interest received when the receiving mode is the "memory and record receive" mode is set to be OFF to indicate that the immediate printing upon memory receive is completed, and the flow advances to step S41-009.

In step S41-009, the ready-for-record received image monitoring task for periodically monitoring a received image ready for record is stopped for a predetermined period of time, and thereafter, the flow returns to step S41-001.

With this processing, the facsimile apparatus of this embodiment can always accept the receiving mode change instruction command from the information processing terminal 109 independently of, in particular, whether or not a receiving operation is being performed. Even when the receiving mode change request is detected during reception, the receiving phenomenon of interest is subjected to a facsimile reception on the basis of the receiving mode at the beginning of this phenomenon, and the next receiving phenomenon is subjected to a facsimile reception on the basis of the changed receiving mode.

According to the above-mentioned processing, the facsimile apparatus can select a mode in which a received image is stored in the memory and is output to the printer unit but is held after the printer unit completes recording, in addition to a mode in which a received image is temporarily stored in the memory, is output to the printer unit, and is deleted from the memory after the printer unit completes recording, and a mode in which all received images are stored in the memory without being recorded.

The above-mentioned modes can be changed by the information processing terminal.

Information associated with reception is separated from sending on the basis of an instruction from the information processing terminal, and can be notified as a receiving state during reception.

Information associated with the reception result, which has already been output, is prevented from being notified repetitively on the basis of an instruction from the information processing terminal.

The receiving mode is changed on the basis of an instruction from the information processing terminal only when a message indicating that the change processing of the receiving mode can be executed can be completely output to the information processing terminal. On the other hand, a timer is arranged, and when a message indicating that the change processing of the receiving mode can be executed cannot be output within a predetermined timer time, the change processing of the receiving mode is suspended.

When receive information is output on the basis of an instruction from the information processing terminal, completion of the notifying operation is stored only when the receive information can be completely output to the information processing terminal. On the other hand, a timer is arranged, and when the receive information cannot be output within a predetermined timer time, completion of the notifying operation is not stored.

8. Receive Information Acquisition (GET RECEIVE INFO.) Processing

Figure 42:
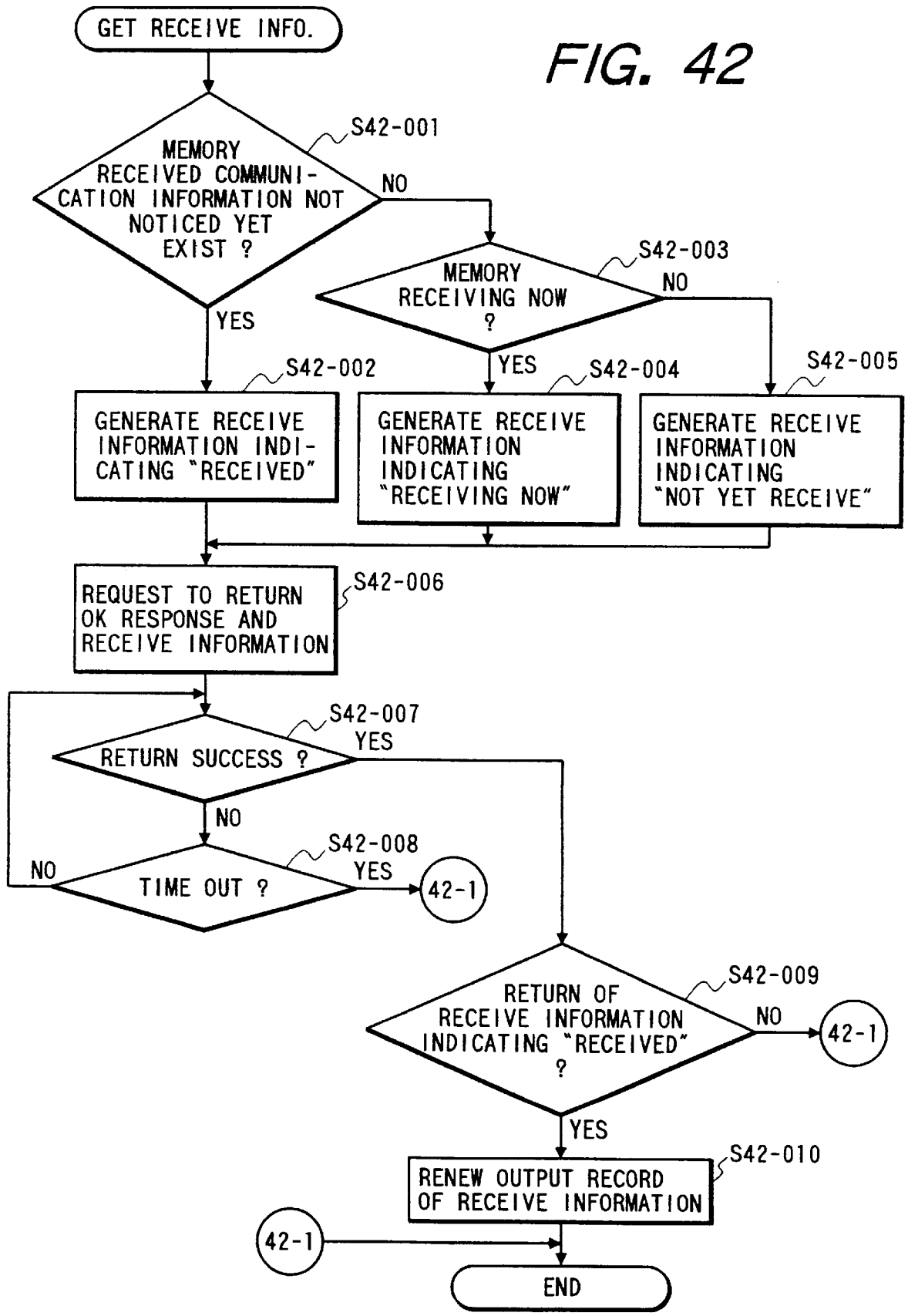
FIG. 42 is a flow chart showing the operation of receive information acquisition processing.

FIG. 42 is a flow chart showing the receive information acquisition (informing) operation for forwarding information associated with reception of the facsimile apparatus of this embodiment to the information processing terminal 109.

When the command processing task shown in FIG. 8 receives a message (command) from the interface control task, and the received command is a receive information acquisition command, the GET RECEIVE INFO. processing is executed.

It is checked in step S42-001 if communication information which is associated with memory receive and is not notified yet is present in the information processing terminal 109. If the communication control information (FIG. 44) in which the communication kind 44-005 indicates "receive" and "communication based on instruction from information processing terminal 109", and the communication control report output record information 44-011 indicates that receive information which is no t notified yet is present, the oldest communication control information is selected, and the flow a dvances to step S42-002. Note that data indicating "communication based on instruction from information processing terminal 109" on the communication kind 44-005 in the communication control information is automatically set upon updating of the communication control information in post processing of reception when the kind of communication is reception, and the memory receive attribute of the received image of interest indicates memory receive.

Figure 43:
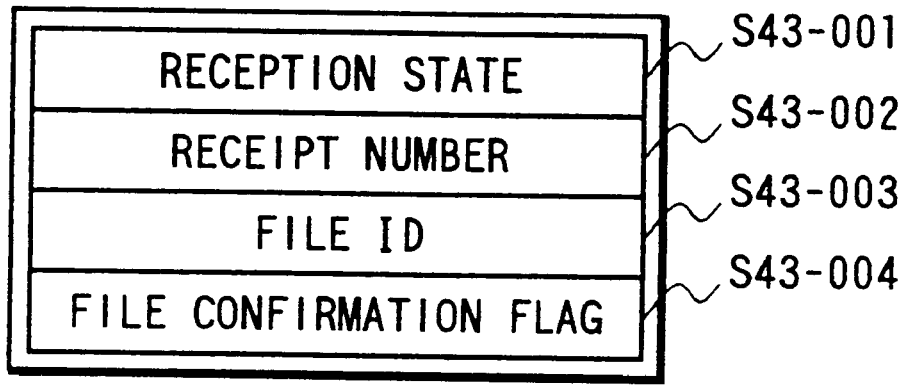
FIG. 43 is a view showing the format of receive information.

In step S42-002, receive information indicating "ireceived" is generated on the basis of the communication control information selected in step S42-001. Note that the receive information has a format, as shown in FIG. 43. In this step, a reception state 43-001 is set to be "received", and the contents of the communication control number 44-001 are copied to a receipt number 43-002. In the facsimile apparatus of this embodiment, since one received image file is generated in one reception, the communication control number is considered as a file ID. Therefore, the contents of the communication control number 44-001 are copied to the file ID 43-003. Furthermore, a file confirmation flag 43-004 is set to be "confirmed", and the flow then advances to step S42-006.

On the other hand, if it is determined in step S42-001 that no communication information which is associated with memory receive and is not notified yet is present in the information processing terminal 109, the flow advances to step S42-003.

It is checked in step S42-003 if a memory receive operation is being performed. If a memory receive operation is being performed, and the memory receive attribute of the received image indicates memory receive, the flow advances to step S42-004.

In step S42-004, receive information indicating "receiving now" is generated. More specifically, the reception state 43-001 is set to be "receiving now", the communication control number of the reception of interest is copied to the receipt number 43-002 and the file ID 43-003, and the file confirmation flag 43-004 is set to be "not confirmed". Then, the flow advances to step S42-006.

On the other hand, if it is determined in step S42-003 that a memory receive operation is not performed or if the memory receive attribute of the received image of interest does not indicate memory receive even during a memory receive operation, the flow advances to step S42-005.

In step S42-005, receive information indicating "not yet receive" is generated. More specifically, the reception state 43-001 is set to be "not yet receive", a value indicating the absence of data is copied to the receipt number 43-002 and the file ID 43-003, and the file confirmation flag 43-004 is set to be "not confirmed". Then, the flow advances to step S42-006.

In step S42-006, an OK response and the receive information generated in step S42-002, S42-004, or S42-005 are sent to the interface control task as a message so as to request the task to return the OK response and the receive information, and the flow then advances to step S42-007.

If it is determined in step S42-007 that a message indicating that the returning processing of the OK response and the receive information is successful is received from the interface control task, the flow advances to step S42-009; otherwise, the flow advances to step S42-008.

If it is determined in step S42-008 that a message indicating that the returning processing of the OK response and the receive information is not successfully completed within a prescribed period of time is received from the interface control task, the GET RECEIVE INFO. processing ends without any processing; otherwise, the flow returns to step S42-007.

It is checked in step S42-009 if the receive information which is requested to be returned in step S42-006 is information indicating "received". If YES (y) in step S42-009, the flow advances to step S42-010; otherwise, the GET RECEIVE INFO. processing ends. In step S42-010, the communication control report output record information 44-011 in the communication control information which is referred to upon generation of the receive information to be returned in step S42-002 is updated to indicate that the receive information is notified, and the GET RECEIVE INFO. processing ends.

With the above-mentioned processing, the facsimile apparatus of this embodiment notifies receive information associated with a receiving phenomenon in the "memory receive" or "memory and record receive" mode as the receiving mode, which information is required upon operation of image data by the information processing terminal 109, without requiring new information having a format different from the existing communication control information, while completely separating it from receive information associated with a receiving phenomenon in the "standard receive" mode as the receiving mode.

9. Communication Control Receipt Number Acquisition (GET ACTIVITY ID) Processing The communication control receipt number acquisition (GET ACTIVITY ID) processing will be explained below with reference to FIGS. 44 and 45.

Figure 45:
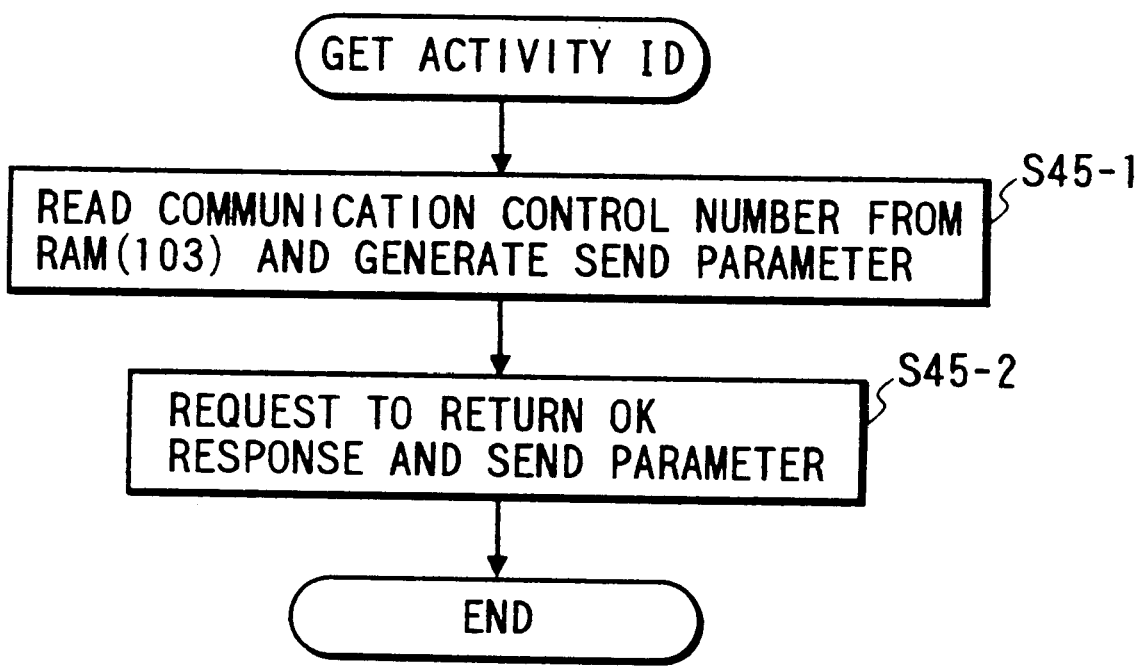
FIG. 45 is a flow chart showing the operation of communication control receipt number acquisition processing.

FIG. 44 shows the format of the communication control information stored in the RAM (103) of the facsimile apparatus, and FIG. 45 shows the control flow.

A group of data from the communication control number 44-1 to the communication control report output record 44-11 shown in FIG. 44 corresponds to a unit block that records communication control information for one communication, and an area for 20 communications is assured on the RAM 103 in the facsimile apparatus.

This communication control information is compatible for the newest twenty communication information, and if it becomes full, the earliest one is overwritten by the newest the one in order.

The communication control number 44-1 is an ID number assigned to each communication.

An addressee telephone number 44-2 is the telephone number of a communication addressee.

An addressee name 44-3 is the name of a communication addressee.

A communication protocol kind 44-4 is a communication protocol used in a communication, and includes G3, ECM, and G4.

The communication kind 44-5 is a communication classification, and consists of a combination of the following elements:

send
receive
polling
multi-address
confidential
relay
relay instruction
relay result
memory
timer
manual
F network
telephone
communication based on instruction from
information processing terminal 109

A reservation time 44-6 is a reservation time, which is effective for a reserved communication.

A communication time period 44-7 is a time period required for a communication (unit: seconds).

A communication start time 44-8 is the start time of a communication, and consists of the elements of year, month, day, hour, minute, and second.

The number of pages 44-9 is the number of pages of a communication.

The communication result 44-10 is a communication result, which assumes a value of either "normal end" or "error end".

The communication control report output record information 44-11 is information indicating whether or not the communication control information of the communication of interest was previously output to the communication control report.

The record information 44-11 independently has two different kinds of information, i.e., information for the communication control report of the facsimile main body, and information associated with sending of communication control information to the information processing terminal 109.

In step S45-1 in FIG. 45, the communication control number 44-1 shown in FIG. 44 is read out from the communication control information recorded in the work area in the RAM 103, and a send parameter is generated on the image buffer in the RAM 103. In step S45-2, the control requests the interface (I/F) control task to send this send parameter and an OK response, thus ending the processing.

10. Communication Control Information Acquisition (GET ACTIVITY INFO.) Processing This processing sends the communication control information to the information processing terminal 109 to realize a look-up operation of the communication control information on the information processing terminal 109.

In this processing, since the amount of data to be sent to the information processing terminal 109 is large, the send parameter is processed on the image buffer. When processing operations that utilize a plurality of image buffers are simultaneously executed, they may destroy each other's data. For this reason, during the GET ACTIVITY INFO. processing, another processing that utilizes the image buffer cannot be performed.

This processing will be described below with reference to FIG. 44 and FIGS. 46 to 48.

Figure 46:
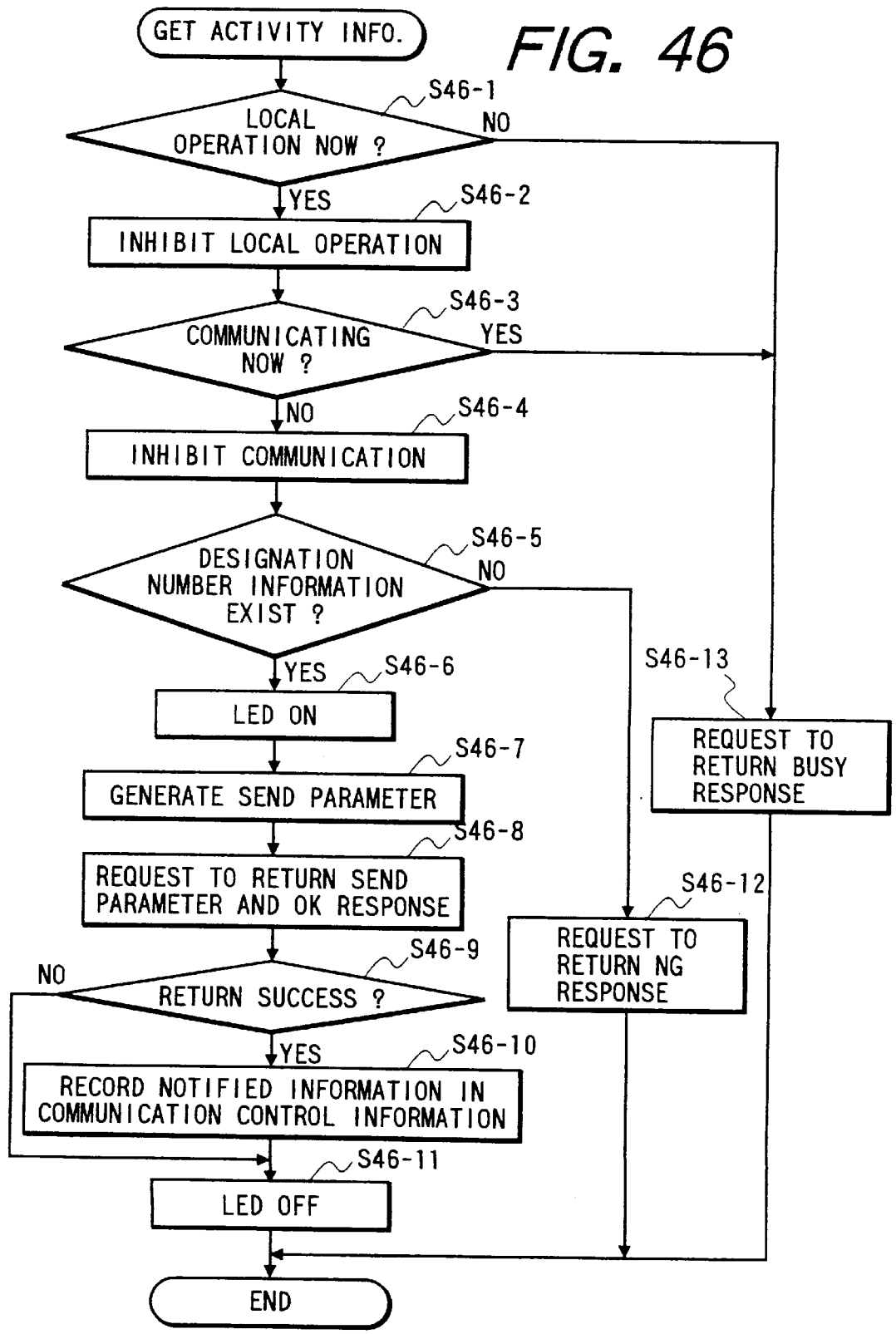
FIG. 46 is a flow chart showing the operation of communication control information acquisition processing.
Figure 47:
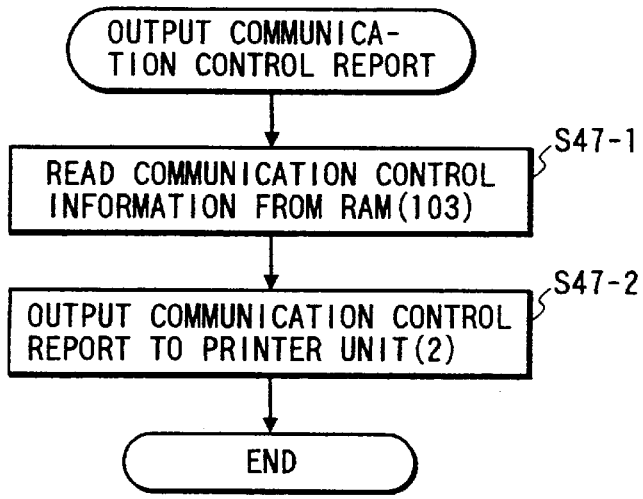
FIG. 47 is a flow chart showing the communication control report recording processing operation by an operation of the facsimile apparatus main body.

FIG. 44 shows the format of the communication control information recorded in the RAM 103 in the facsimile apparatus, FIGS. 46 and 47 show the control flow, and FIG. 48 shows a communication control report of the facsimile main body.

It is checked in step S46-1 in FIG. 46 if a local operation is being performed. If YES in step S46-1, since a communication may be started and may utilize the image buffer, the flow advances to step S46-13 to request the I/F control task to send a BUSY response, thus ending the processing.

On the other hand, if NO in step S46-1, a local operation is inhibited in step S46-2, and the flow advances to step S46-3 to check if a communication is being performed.

If YES in step S46-3, since the image buffer may be used, the flow advances to step S46-13 to request the I/F control task to send a BUSY response, thus ending the processing.

On the other hand, if NO in step S36-3, a communication is inhibited in step S46-4, and the flow advances to step S46-5. In step S46-5, it is checked if communication information having a communication control number designated by a received send parameter sent together with the command is present in the communication control information recorded in the RAM 103.

If NO in step S46-5, the flow advances to step S46-12 to request the I/F control task to send an NG response, thus ending the processing. On the other hand, if YES in step S46-5, the flow advances to step S46-6 to turn on the LED. Thereafter, the flow advances to step S46-7.

In step S46-7, a send parameter to be transferred to the I/F control task is generated on the image buffer in the RAM 103 on the basis of the communication control information recorded in the work area in the RAM 103, and the flow advances to step S46-8. The send parameter to be transferred to the I/F control task includes:

addressee telephone number
addressee name
communication protocol kind (ECM, G3)
communication kind (manual—automatic, receive—send, polling, relay, relay instruction, multi—address, timer, confidential, memory, communication instruction source (facsimile—information processing terminal 109), and the like)
reservation time
communication time period
communication start time (including date)
number of pages
communication result (successful—unsuccessful)
communication control report output record information (including distinction of facsimile main body—information processing terminal 109)

The communication instruction source in the communication kind 44-5 distinguishes between a communication based on an instruction from the operation panel of the facsimile main body and a communication based on an instruction from the information processing terminal 109.

The communication control report output record information 44-11 is record information indicating whether or not the communication control information of the communication of interest was previously output as a report from the facsimile main body, and whether or not the communication control information of the communication of interest was previously sent to the information processing terminal 109.

With these pieces of information, an operator can adequately recognize the use state of the facsimile apparatus.

In step S46-8, the control requests the I/F control task to send the send parameter generated in step S46-7 and an OK response.

In step S46-9, the control waits for a receive message which indicates that the information processing terminal 109 normally receives the OK response and the send parameter, and is supplied from the I/F control task.

If this message is not returned within a predetermined period of time, it is determined that the information processing terminal 109 has not normally received the OK response and the send parameter, and the flow advances to step S46-11.

If a receive message indicating that the send parameter and the OK response are normally received is received from the I/F control task, it is determined that the information processing terminal 109 has normally received the send parameter and the OK response, and the flow advances to step S46-10.

In step S46-10, for a communication whose communication information is normally notified to the information processing terminal 109, information indicating that the information is notified to the information processing terminal 109 is recorded in the communication control report output record information portion 44-11 in the communication control information recorded in the RAM 103, and the flow then advances to step S46-11.

In step S46-11, the LED is turned off, and the processing ends. FIG. 47 is a flow chart showing the processing for outputting a communication control report in the facsimile main body upon operation of the facsimile main body.

In step S47-1 in FIG. 47, communication control information is read out from the RAM 103 for each of all the communications whose communication control information is recorded.

In step S47-2, the communication control information is output from the printer unit 2 in the form of a report.

FIG. 48 shows the report of the communication control information.

An output mark * 48-1 in FIG. 48 is information indicating that the communication control information of the communication of interest was previously output from the facsimile main body.

The communication control report output record information is information associated with a report which was output to the facsimile main body upon operation of the facsimile main body.

The record as to whether or not the communication control information was sent to the information processing terminal 109 is distinguished from that output to the facsimile main body.

For this reason, not only an operator of the facsimile main body but also an operator of the information processing terminal 109 can recognize new information.

According to the above-mentioned processing, an operator can distinguish between the communication control information of a communication upon operation of the operation panel and the communication control information of a communication based on an instruction from the information processing terminal. Also, the operator can recognize whether or not the communication control information has been output to the communication control report of the facsimile main body, and whether or not the communication control information has been sent to the information processing terminal.

Since the buffer for temporarily storing image data is commonly used as the buffer for temporarily storing communication control information, the memory can be effectively used.

11. File ID Acquisition (GET FILE ID) Processing

Figure 49:
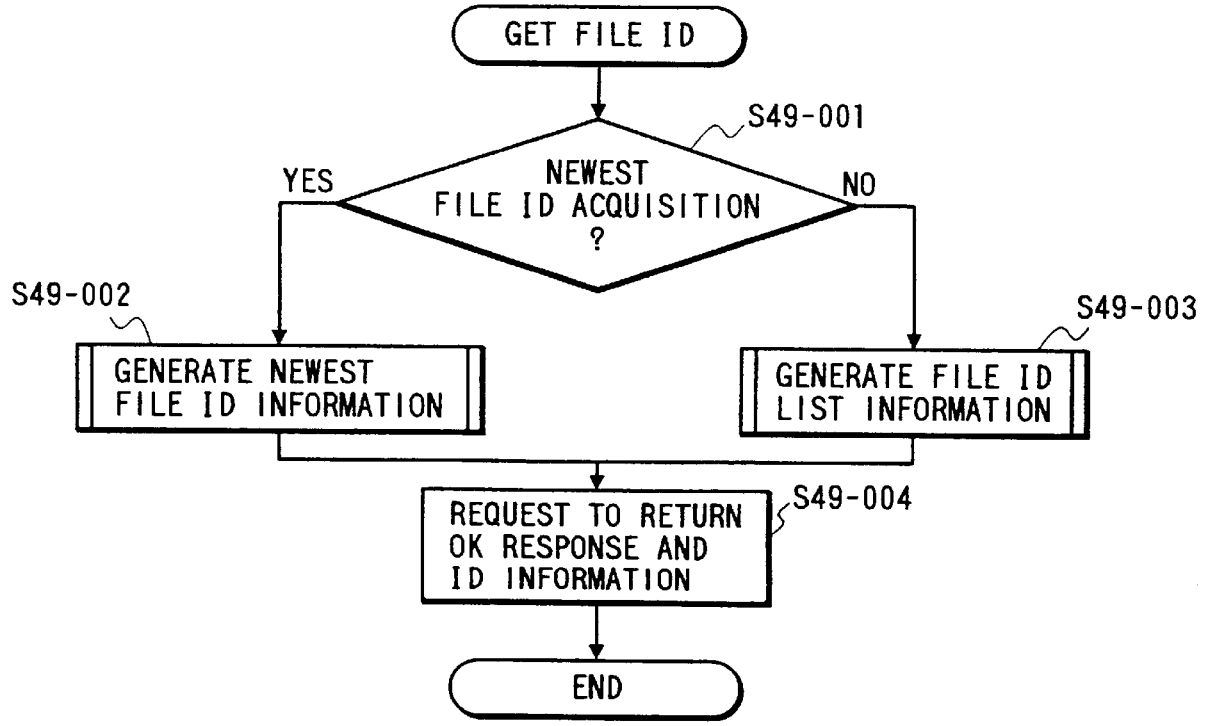
FIG. 49 is a flow chart showing the operation of file ID acquisition processing.

FIG. 49 is a flow chart showing the file ID forward operation for forwarding, to the information processing terminal 109, information associated with a file ID which is used for identifying an image file stored in the image memory on the RAM 103 in the facsimile apparatus of this embodiment.

When the command processing task shown in FIGS. 8 and 9 receives a message (command) from the interface control task, and the received command is a file ID acquisition command, the GET FILE ID processing is executed.

It is checked in step S49-001 if the file ID acquisition command requests acquisition of the newest file ID. If YES (y) in step S49-001, the flow advances to step S49-002.

In step S49-002, newest file ID information of the file type designated by the file ID acquisition command is generated, and the flow advances to step S49-004. Note that this processing will be described in detail later.

On the other hand, if it is determined in step S49-001 that the command does not request acquisition of the newest file ID, the flow advances to step S49-003.

In step S49-003, file ID list information of the file type designated by the file ID acquisition command is generated, and the flow advances to step S49-004. Note that this processing will be described in detail later.

In step S49-004, an OK response and the file ID information generated in step S49-002 or S49-003 are sent to the interface control task as a message so as to request the task to return the OK response and the file ID information, thus ending the GET FILE ID processing.

Figure 50:
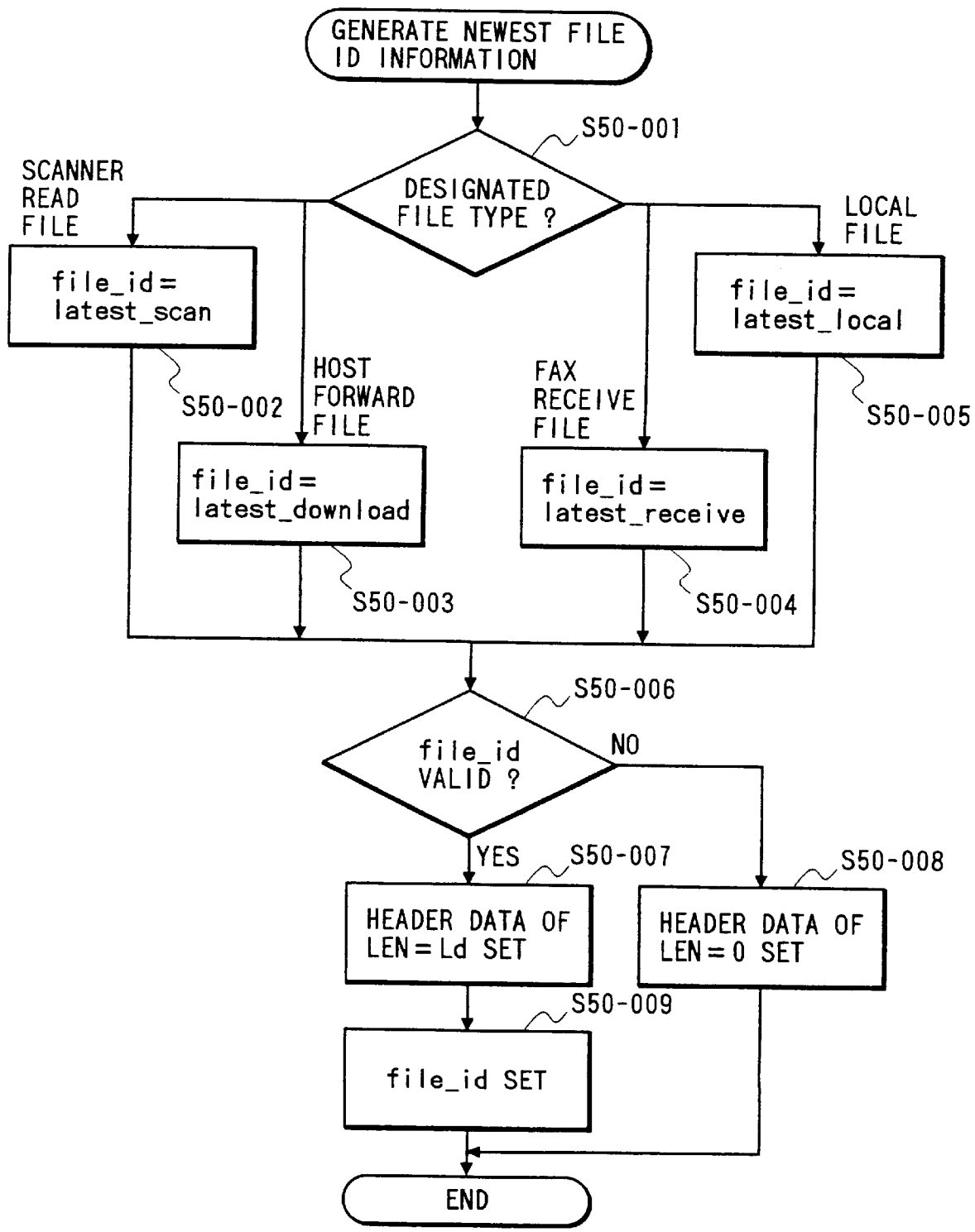
FIG. 50 is a flow chart showing in detail the generation processing of newest file ID information shown in FIG. 49.

FIG. 50 is a flow chart showing in detail the processing in step S49-002 in FIG. 49 for generating the newest file ID information.

It is determined in step S50-001 which one of "scanner read file", "host forward file", "FAX receive file", and "local file" the file ID acquisition command designates. These file types mean the following files, and when corresponding processing is executed, a value for identifying the file type is automatically set in each area of an image queue for controlling image files stored in the image memory in the RAM 103.

Scanner read file: a file read in accordance with a SCAN TO FAX instruction from the information processing terminal 109

Host forward file: a file forwarded in accordance with a DOWNLOAD instruction from the information processing terminal 109

FAX receive file: a file received when the receiving mode is set in the "memory receive" or "memory and record receive" mode in accordance with a RECEIVE instruction from the information processing terminal 109

Local file: a file other than the above-mentioned files, i.e., a file generated independently of an instruction from the information processing terminal 109

If it is determined in step S50-001 that the designated file type is "scanner read file", the flow advances to step S50-002; if the designated file type is "host forward file", the flow advances to step S50-003; if the designated file type is "FAX receive file", the flow advances to step S50-004; or if the designated file type is "local file", the flow advances to step S50-005.

In step S50-002, the contents of a newest scanner read file ID area latest_scan in the work area on the RAM 103, which area is automatically set upon execution of the SCAN TO FAX processing, are copied to a newest file ID area file_id prepared in the work area on the RAM 103, and the flow then advances to step S50-006.

In step S50-003, the contents of a newest host forward file ID area latest_down in the work area on the RAM 103, which area is automatically set upon execution of the DOWNLOAD FILE processing, are copied to the newest file ID area file_id prepared in the work area on the RAM 103, and the flow then advances to step S50-006.

In step S50-004, the contents of a newest FAX receive file ID area latest_receive in the work area on the RAM 103, which area is automatically set upon execution of the receiving processing when the receiving mode is set in the "memory receive" or "memory and record receive" mode in accordance with a RECEIVE instruction, are copied to the newest file ID area file_id prepared in the work area on the RAM 103, and the flow then advances to step S50-006.

In step S50-005, the contents of a newest local file ID area latest_local in the work area on the RAM 103, which area is automatically set upon execution of processing other than the above-mentioned processing, i.e., processing of a local operation independently of an instruction from the information processing terminal 109, are copied to the newest file ID area file_id prepared in the work area on the RAM 103, and the flow then advances to step S50-006.

It is checked in step S50-006 if the contents of the newest file ID area file_id copied in step S50-002, S50-003, S50-004, or S50-005 are valid. If YES in step S50-006, i.e., if the newest file is present, the flow advances to step S50-007. On the other hand, if NO in step S50-006, i.e., if no newest file is present since, for example, processing for generating an image file of the designated file type is not executed, the flow advances to step S50-008.

In step S50-007, header data to be added immediately before the file ID information is generated. This header data includes the length, LEN, of the file ID information following the header data, and since this data is added immediately before the file ID information, the information processing terminal 109 can easily acquire file ID information which may have a variable length. In this case, the header data in which the length LEN of the file ID information following the header is set to be a length Ld of one file ID information, is set in a file ID information area which is prepared in advance on the RAM 103, and is used in the return request in step S49-004 above, and thereafter, the flow advances to step S50-009.

On the other hand, in step S50-008, in order to indicate the absence of file ID information following the header, header data in which the length LEN is set to be 0 is set in the file ID information area which is prepared in advance on the RAM 103, and is used in the return request in step S49-004 above, thus ending the newest file ID information generation processing.

In step S50-009, the contents of the newest file ID area file_id are set in an area immediately before the area of the header data set in step S50-007, thus ending the newest file ID information generation processing.

Figure 51:
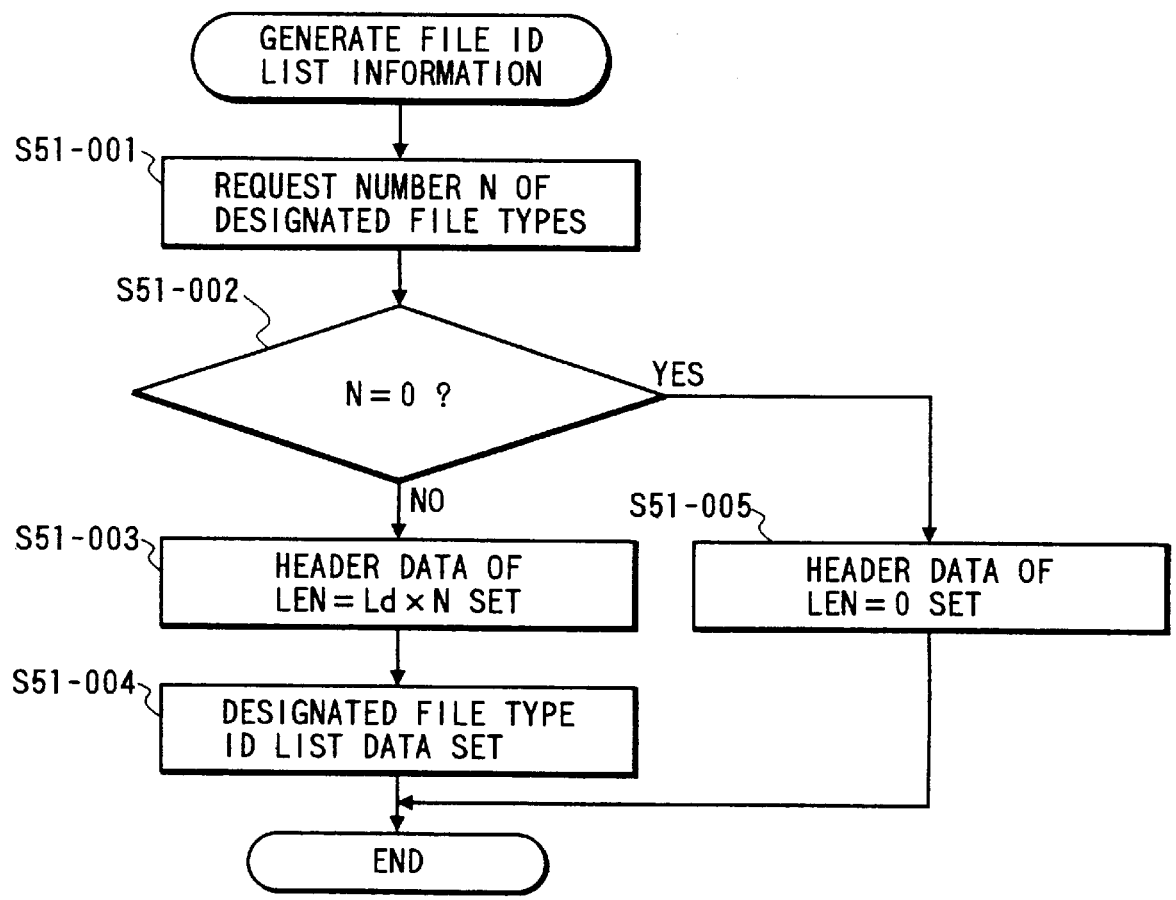
FIG. 51 is a flow chart showing in detail the generation processing of file ID list information shown in FIG. 49.

FIG. 51 is a flow chart showing in detail the file ID list information generation processing in step S49-003 in FIG. 49.

In step S51-001, an image queue for controlling image files stored in the image memory in the RAM 103 is searched to obtain the number, N, of image files having the value of the designated file type, and the flow advances to step S51-002. It is checked in step S51-002 if the number N of image files obtained in step S51-001 is a positive number. If N is a positive number, i.e., if image files of the designated file type are present, the flow advances to step S51-003; otherwise, i.e., if no image file is present since, for example, processing for generating an image file of the designated file type is not executed, the flow advances to step S51-004. In step S51-003, header data to be added immediately before file ID information is generated. The header data includes the length LEN of the file ID information following the header, and since this data is added immediately before the file ID information, the information processing terminal 109 can easily acquire file ID information which may have a variable length. In this case, the header data in which the length LEN of the file ID information following the header is set to be Ld×N indicating the presence of N pieces of file ID information each having the length Ld, is set in the file ID information area which is prepared in advance on the RAM 103, and is used in the return request in step S49-004 above, and thereafter, the flow advances to step S51-004.

In step S51-004, the image queue is searched again in the same manner as in step S51-001 to set a series of file IDs of image files having the value of the designated file type in an area immediately before the area of the header data set in step S50-007, thus ending the file ID list information generation processing.

On the other hand, in step S51-005, in order to indicate the absence of file ID information following the header, header data in which the length LEN is set to be 0 is set in the file ID information area which is prepared in advance on the RAM 103, and is used in the return request in step S49-004 above, thus ending the file ID list information generation processing.

With the above-mentioned processing, the facsimile apparatus of this embodiment forwards the newest file ID information or file ID list information designated by the information processing terminal 109 to the information processing terminal 109 in units of designated file types.

The facsimile apparatus of this embodiment adds header data including the data length of the file ID information data immediately before the file ID information so that the information processing terminal 109 can easily acquire the file ID information which may have a variable length, and forwards the designated newest file ID information or file ID list information to the information processing terminal 109 in units of designated file types.

According to the above-mentioned processing, since the facsimile apparatus controls a kind code indicating the generation process of each image file in addition to an identification code for identifying each image file, it can forward the identification code of an image file or list information of identification codes designated by the external information processing terminal to the external information processing terminal in units of designated kind codes.

Since the facsimile apparatus adds a code representing the length of information to be output to the information when it outputs information of the identification code on the basis of an instruction from the external information processing terminal, the external information processing terminal can acquire the information of the identification code, which may have a variable length, with a smaller load even when the terminal comprises a high-speed interface.

12. File Information Acquisition (GET FILE INFO.) Processing

Figure 52:
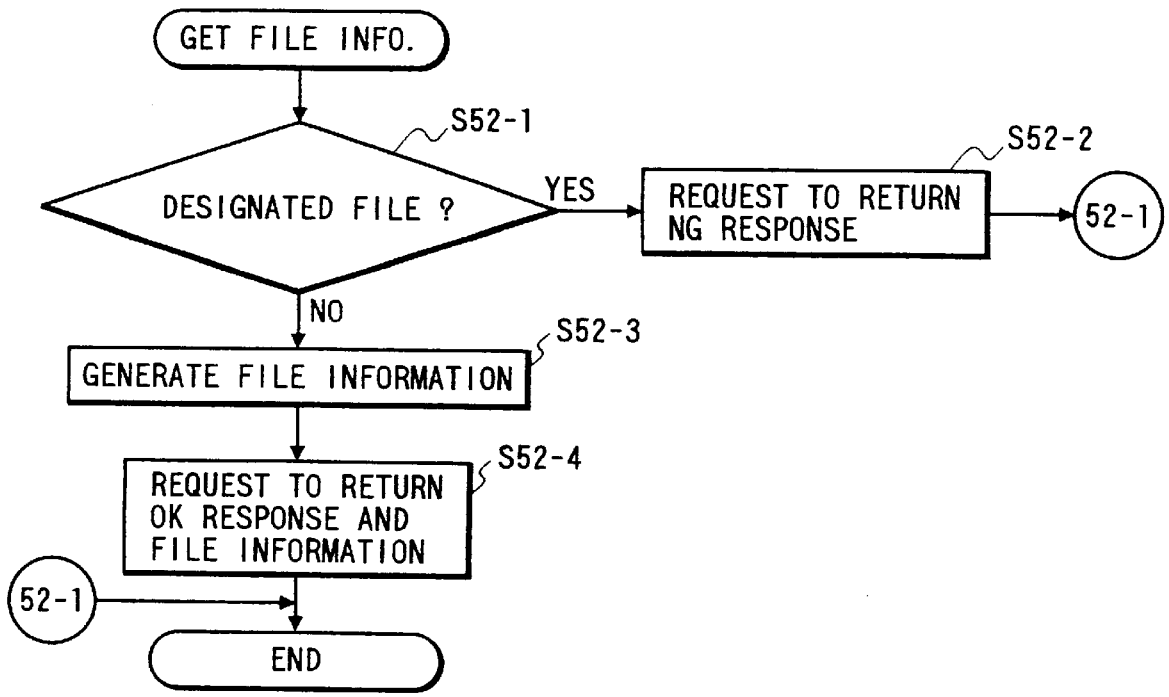
FIG. 52 is a flow chart showing the operation of file information acquisition processing.
Figure 53:
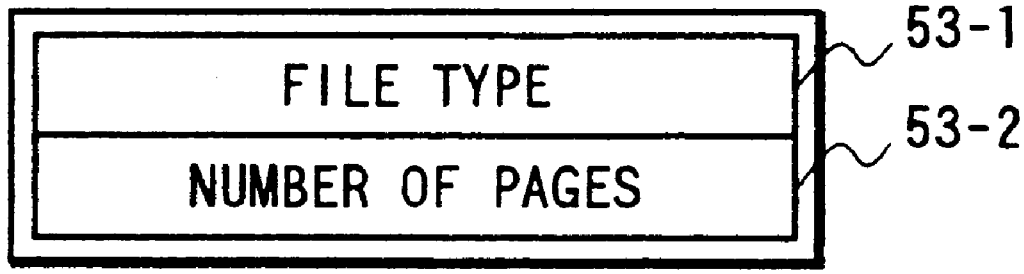
FIG. 53 is a view showing the format of file control information.

FIG. 52 is a flow chart showing the file information acquisition command operation for sending information in units of files of image data stored in the image memory on the RAM 103 in the facsimile apparatus of this embodiment to the information processing terminal. FIG. 53 shows the format of file information.

When the command processing task shown in FIG. 9 receives a message (command) from the interface control task, and the received command is a file information acquisition command, the GET FILE INFO. processing is executed.

It is checked in step S52-1 if a file designated by the file information acquisition command is present. If the designated file is not present, the flow advances to step S52-2.

In step S52-2, an NG response indicating the absence of the designated file is sent to the interface control task as a message, thus ending the processing.

On the other hand, if it is determined in step S52-1 that the designated file is present, the flow advances to step S52-3.

In step S52-3, file information having a format shown in FIG. 53 is generated based on the control information stored on the RAM 103 in the facsimile main body, and the flow advances to step S52-4. The file information includes the following elements:

file type 53-1: the type of designated file (scanner read file, host forward file, FAX receive file, or local file)

number of pages 53-2: the number of pages of the designated file

In step S52-4, an OK response and the file information generated in step S52-3 are sent to the interface control task as a message so as to request the task to return the OK response and the file information, thus ending the GET FILE INFO. processing.

13. Page Information Acquisition (GET PAGE INFO.) Processing

Figure 55:
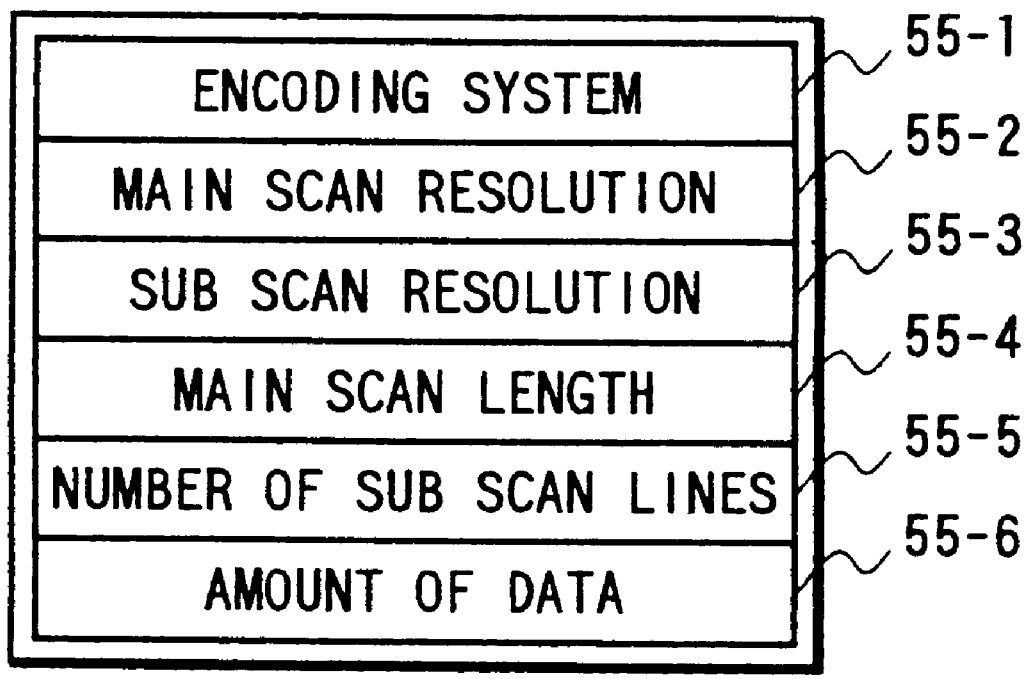
FIG. 55 is a view showing the format of page control information.
Figure 54:
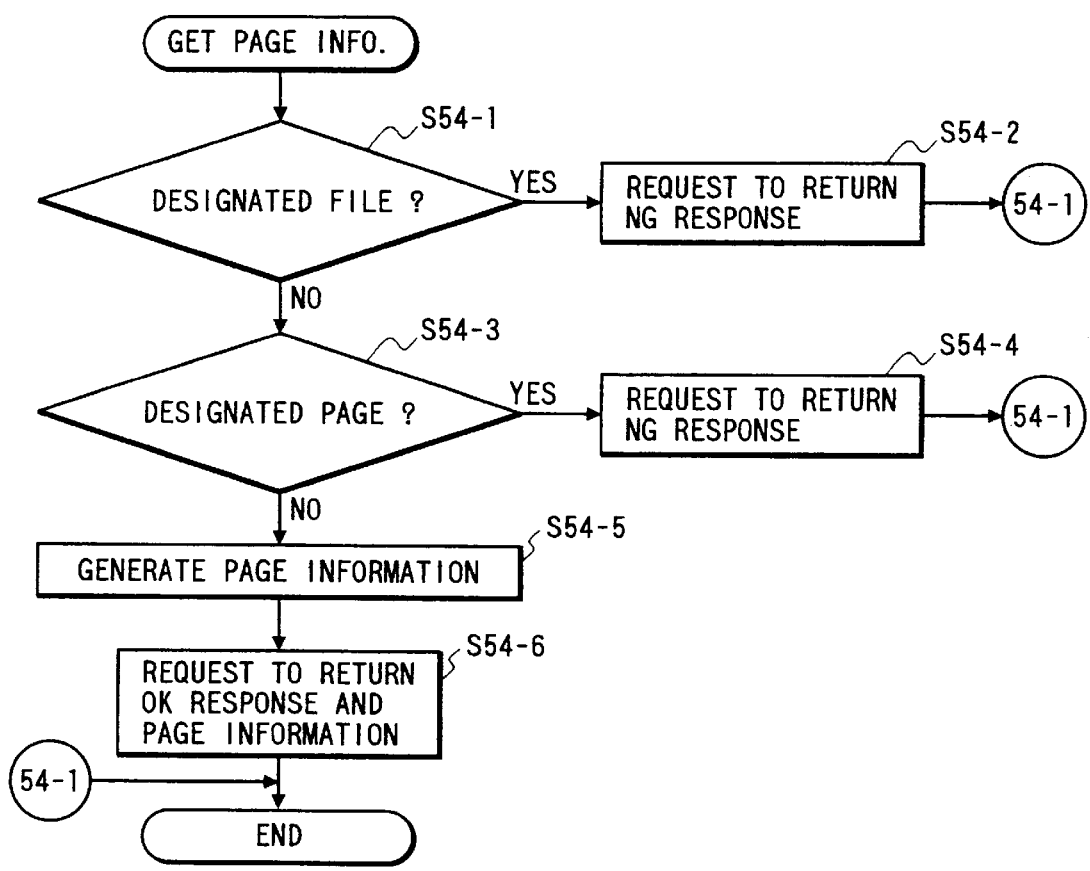
FIG. 54 is a flow chart showing the operation of page information acquisition processing.

FIG. 54 is a flow chart showing the page information acquisition command operation for sending information in units of pages of image data stored in the image memory on the RAM 103 in the facsimile apparatus of this embodiment to the information processing terminal. FIG. 55 shows the format of page information.

When the command processing task shown in FIG. 9 receives a message (command) from the interface control task, and the received command is a page information acquisition command, the GET PAGE INFO. processing is executed.

It is checked in step S54-1 if a file designated by the page information acquisition command is present. If the designated file is not present, the flow advances to step S54-2.

In step S54-2, an NG response indicating the absence of the designated file is sent to the interface control task as a message, thus ending the processing.

On the other hand, if it is determined in step S54-1 that the designated file is present, the flow advances to step S54-3.

It is checked in step S54-3 if a page designated by the page information acquisition command is present. If the designated page is not present, the flow advances to step S54-4.

In step S54-4, an NG response indicating the absence of the designated page is sent to the interface control task as a message, thus ending the processing.

On the other hand, if it is determined in step S54-3 that the designated page is present, the flow advances to step S54-5.

In step S54-5, page information having a format shown in FIG. 55 is generated based on the control information stored on the RAM 103 in the facsimile main body, and the flow advances to step S54-6. The page information includes the following elements:

encoding system 55-1: the encoding system of the designated page (MH, MR, MMR)

main scan resolution 55-2: the main scan resolution of the designated page (8 dots/mm)

sub scan resolution 55-3: the sub scan resolution of the designated page (7.7 or 3.85 dots/mm)

main scan length 55-4: the main scan image size of the designated page (A4)

number of sub scan lines 55-5: the number of sub scan lines of the designated page ("0" represents indefinite)

amount of data 55-6: the amount of data which is required for the facsimile apparatus to store the designated page and includes a redundant portion (this amount of data does not always coincide with the data length upon data forwarding)

In step S54-6, an OK response and the page information generated in step S54-5 are sent to the interface control task as a message so as to request the task to return the OK response and the page information, thus ending the GET PAGE INFO. processing.

14. File Delete (DELETE FILE) Processing

The DELETE FILE processing deletes an image file generated on the RAM 103 in the facsimile apparatus in accordance with an instruction from the information processing terminal 109. Image files generated by the information terminal include:

scanner read file: a file read in accordance with a SCAN TO FAX instruction from the information processing terminal 109 host forward file: a file forwarded in accordance with a DOWNLOAD instruction from the information processing terminal 109

FAX receive file: a file received when the receiving mode is set in the "memory receive" or "memory and record receive" mode in accordance with a RECEIVE instruction from the information processing terminal 109

FIG. 56 is a flow chart showing the FILE DELETE operation for deleting image data stored in the image memory on the RAM 103 in the facsimile apparatus of this embodiment in units of files controlled by the facsimile apparatus.

When the command processing task shown in FIG. 9 receives a message (command) from the interface control task, and the received command is a file delete instruction command, the DELETE FILE processing is executed.

It is checked in step S56-1 if a file designated by the file delete instruction command is present. If the designated file is not present, the flow advances to step S56-2.

In step S56-2, an NG response indicating the absence of the designated file is sent to the interface control task as a message, thus ending the processing.

On the other hand, if it is determined in step S56-1 that the designated file is present, the flow advances to step S56-3.

It is checked in step S56-3 if the designated file is a local file. If the designated file is a local file, the flow advances to step S56-4.

In step S56-4, an NG response indicating that the designated file is invalid is sent to the interface control task as a message, thus ending the processing.

On the other hand, if it is determined in step S56-3 that the designated file is not a local file, the flow advances to step S56-5.

With the processing in steps S56-3 and S56-4, a local file is inhibited from being deleted by the DELETE FILE processing. Similarly, a file generated by the information processing terminal cannot be deleted by a local operation.

It is checked in step S56-5 if the designated file is in recording. If the designated file is in recording, the flow advances to step S56-6.

In step S56-6, an NG response indicating that the designated file is invalid is sent to the interface control task as a message, thus ending the processing.

On the other hand, if it is determined in step S56-5 that the designated file is not in recording, the flow advances to step S56-7.

It is checked in step S56-7 if the designated file is in communicating. If the designated file is in communicating, the flow advances to step S56-8.

In step S56-8, an NG response indicating that the designated file is invalid is sent to the interface control task as a message, thus ending the processing.

On the other hand, if it is determined in step S56-7 that the designated file is not in communicating, the flow advances to step S56-9.

It is checked in step S56-9 if the designated file is under a stand-by state of recording or communication. If the designated file is under a stand-by state of recording or communication, the flow advances to step S56-10.

In step S56-10, an NG response indicating that the designated file is invalid is sent to the interface control task as a message, thus ending the processing.

On the other hand, if it is determined in step S56-9 that the designated file is not under a stand-by state of recording or communication, the flow advances to step S56-11.

In steps S56-5 to S56-10, if a file to be deleted is being accessed (in recording or communicating) or its access is reserved (its recording or communication is reserved), the delete operation is inhibited. When a file which is being accessed or whose access is reserved is different from a file to be deleted, the delete operation is not inhibited.

In step S56-11, an OK response is sent to the interface control task as a message so as to request the task to return the OK response, and the flow advances to step S56-12.

If it is determined in step S56-12 that a message indicating that the returning processing of the OK response is successful is received from the interface control task, the flow advances to step S56-14; otherwise, the flow advances to step S56-13.

If it is determined in step S56-13 that a message indicating that the returning processing of the OK response is not successfully completed within a prescribed period of time is received from the interface control task, the DELETE FILE processing ends without any processing; otherwise, the flow returns to step S56-12.

In step S56-14, the designated file is deleted from the image memory on the RAM 103, thus ending the DELETE FILE processing.

With the above-mentioned processing, the facsimile apparatus of this embodiment can inhibit the information processing terminal from deleting files which are in communicating and recording, and under a stand-by state of recording and communication, and files other than those generated in accordance with an instruction from the information processing terminal.

15. Facsimile Information Acquisition (FAX INFO.) Processing

This processing sends the ROM version, maker name, apparatus type, and I/F version with the information processing terminal, all of the facsimile apparatus, to the information processing terminal.

Since the ROM version and the I/F version with the information processing terminal, both of the facsimile apparatus, are independently controlled, and are sent to the information processing terminal, the information processing terminal can detect which I/F version with the information processing terminal the facsimile apparatus supports, without any correspondence table between the ROM version and the I/F version with the information processing terminal.

With this processing, an application software program which runs on the information processing terminal can detect based on its own version information and the above-mentioned I/F version information whether or not it can use the facsimile apparatus connected to the information processing terminal. Also, since the application software program which runs on the information processing terminal can detect the apparatus type, it can also detect functions supported by the apparatus type. In view of this, when the application software program which runs on the information processing terminal has the functions of all the apparatus types, the compatibility of the application software program which runs on the information processing terminal can be attained among different apparatus types.

Figure 57:
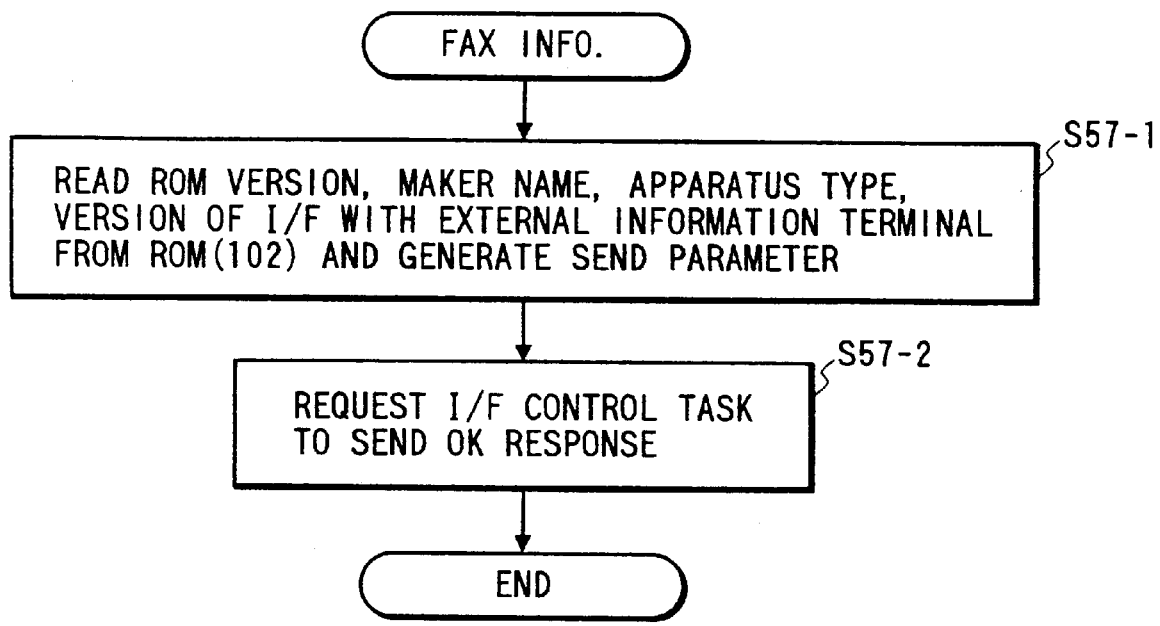
FIG. 57 is a flow chart showing the operation of facsimile information processing.

This processing will be described below with reference to FIG. 57.

In step S57-1, the ROM version, maker name, apparatus type, and I/F version with the information processing terminal, all of the facsimile apparatus, are read out from the ROM 102, and a send parameter is generated.

In step S57-2, the control requests the I/F control task to send an OK response, thus ending the processing.

16. Phone Dialling (SIMPLE DIAL) Processing

In this processing, the facsimile apparatus performs an on-hook dialling operation in accordance with an instruction from the information processing terminal 109.

The on-hook dialling operation is an operation for catching or capturing a line and performing dialling while a handset is kept in an on-hook state. In an operation on the operation panel of the facsimile main body, the on-hook dialling operation is executed by depressing an on-hook button, and then performing a dialling operation.

This processing will be described below with reference to FIGS. 58 to 63.

Figure 58:
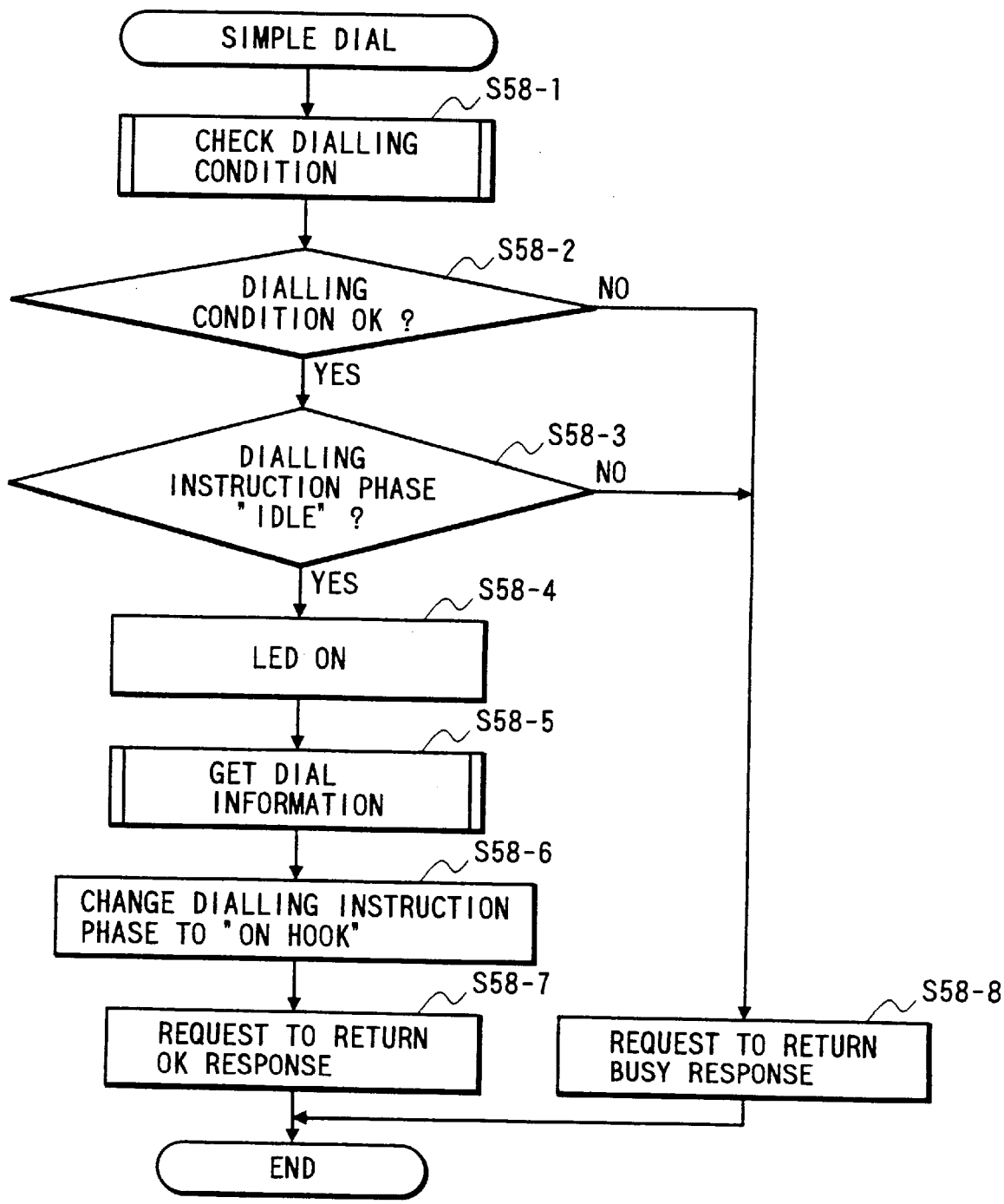
FIG. 58 is a flow chart showing the operation of phone dialling processing.
Figure 59:
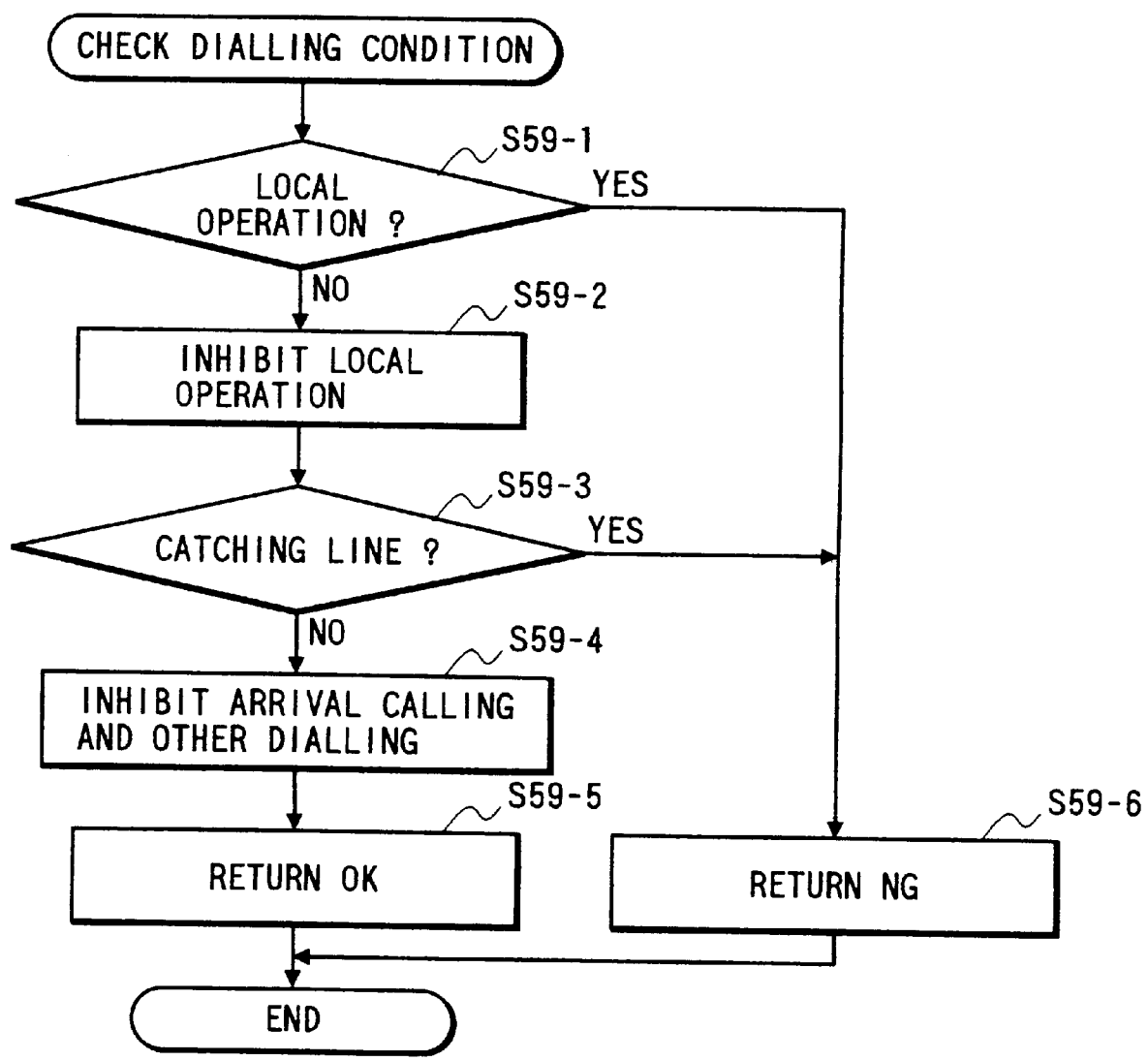
FIG. 59 is a flow chart showing in detail the dialling condition check processing shown in FIG. 58.
Figure 60:
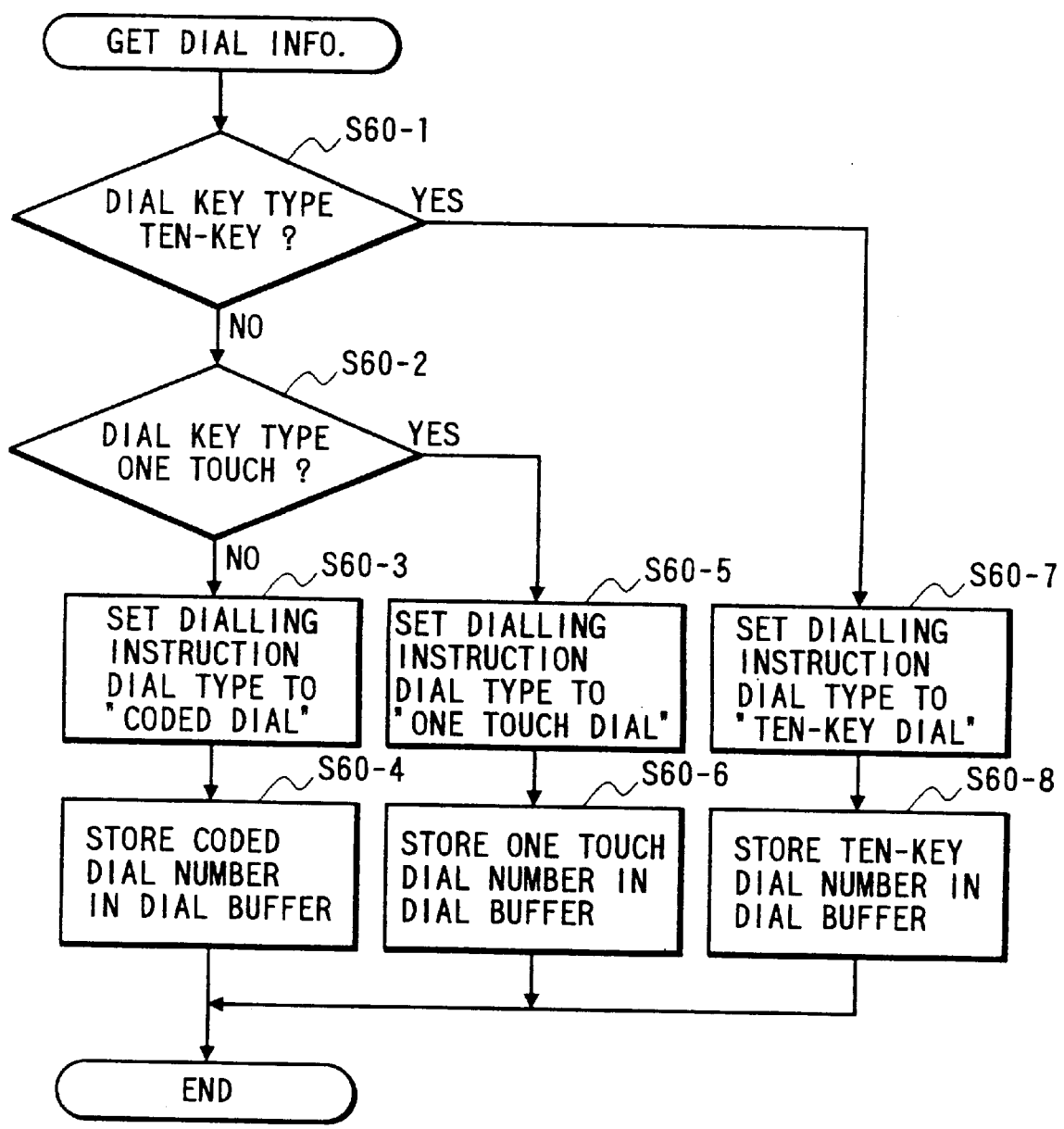
FIG. 60 is a flow chart showing in detail the dial information acquisition processing shown in FIG. 58.
Figure 61:
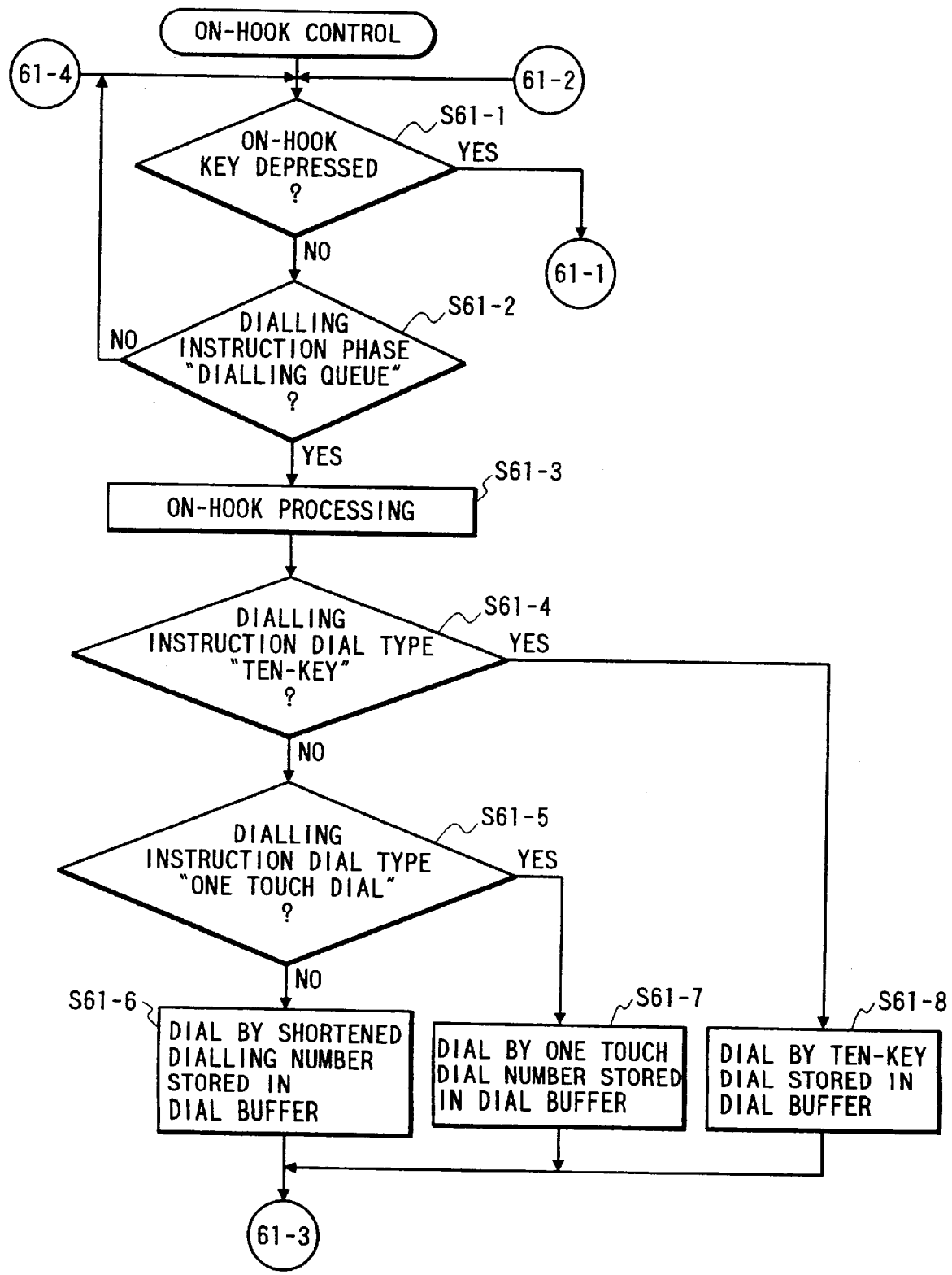
FIG. 61 is a flow chart showing the operation of on-hook control.
Figure 62:
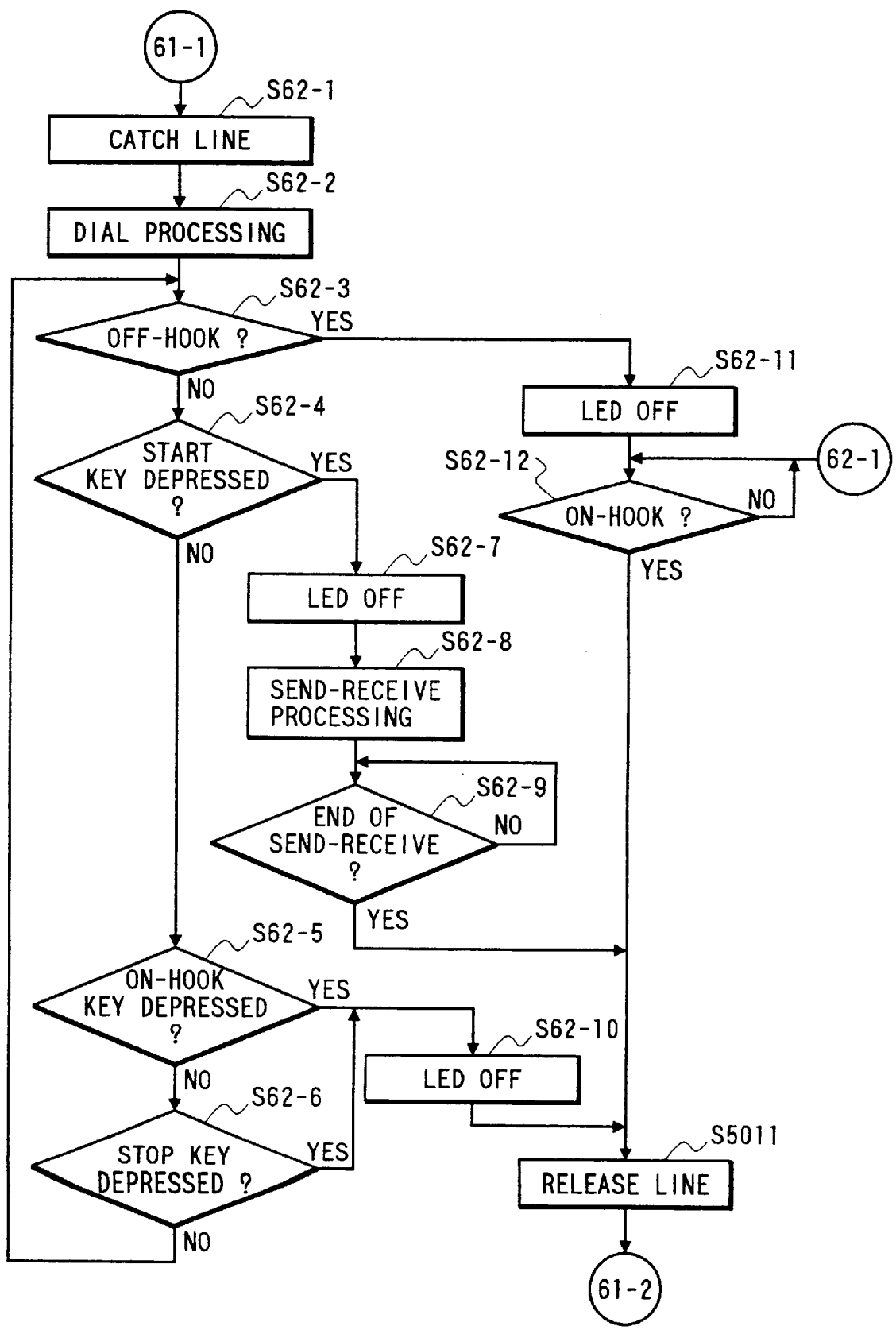
FIG. 62 is a flow chart showing the operation of the on-hook control.
Figure 63:
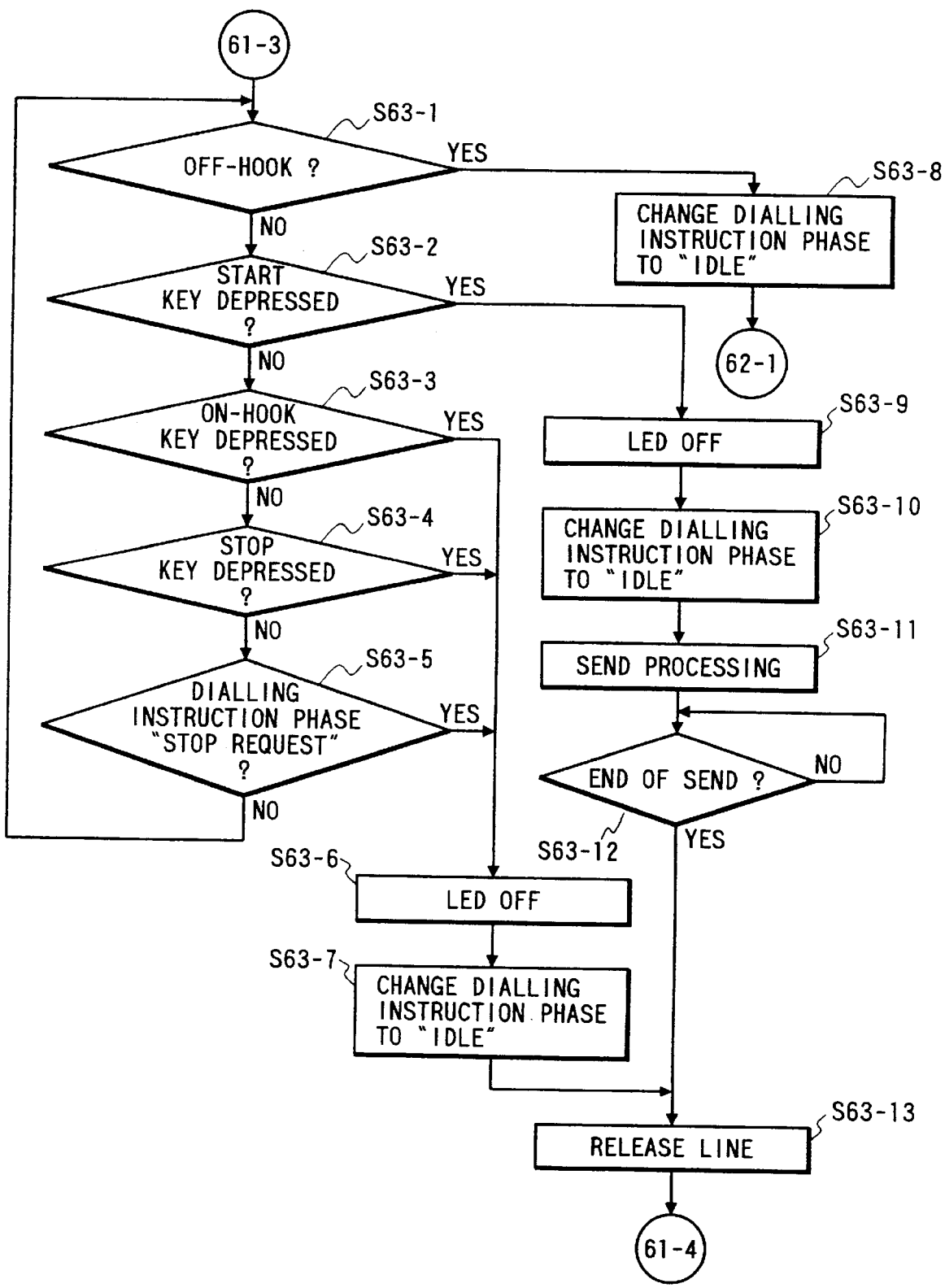
FIG. 63 is a flow chart showing the operation of the on-hook control.

FIGS. 58 to 60 are flow charts of the SIMPLE DIAL processing which is called when the received command is a SIMPLE DIAL command, and FIGS. 61 to 63 are flow charts of on-hook processing which is executed parallel to the SIMPLE DIAL processing.

In step S58-1 in FIG. 58, a "dialling condition check" (to be described in detail later) subroutine for checking whether or not an on-hook dialling operation can be performed is called.

If it is determined in step S58-2 as a result of checking in step S58-1 that an on-hook dialling operation cannot be performed, the control requests the I/F control task to send a BUSY response in step S58-8, thus ending the processing.

On the other hand, if it is determined in step S58-2 as a result of checking that an on-hook dialling operation can be performed, the flow advances to step S58-3 to check if the dialling instruction phase is "idle".

If NO in step S58-3, the control requests the I/F control task to send a BUSY response in step S58-8, thus ending the processing. On the other hand, if YES in step S58-3, the flow advances to step S58-4 to turn on the LED so as to inform an operator that a local operation is inhibited. Thereafter, the flow advances to step S58-5.

In step S58-5, a "dial information acquisition" (to be described in detail later) subroutine for fetching dial information from the receive parameter and recording the fetched information in the dial buffer in the RAM 103 is called.

In step S58-6, the dialling instruction phase is changed to "on-hook".

In step S58-7, the control requests the I/F control task to send an OK response, thus ending the processing.

FIG. 59 is a flow chart of the "dialling condition check" subroutine called in step S58-1.

In the dialling condition check subroutine, it is checked in step S59-1 if a local operation is being performed. If YES in step S59-1, the flow ends after an NG response is returned in step S59-6; otherwise, the flow advances to step S59-2.

In step S59-2, a local operation is inhibited, and the flow advances to step S59-3.

It is checked in step S59-3 if a line catching operation is being performed. If YES in step S59-3, the flow ends after an NG response is returned in step S59-6; otherwise, the flow advances to step S59-4.

In step S59-4, arrival calling and other dialling operations (e.g., time-designated send or send in a redialling queue) are inhibited, and the flow advances to step S59-5. In step S59-5, an OK response is returned, thus ending the processing.

FIG. 60 is a flow chart of the "dial information acquisition" subroutine called in step S58-5.

In the dial information acquisition subroutine, the flow branches depending on the dial key type in steps S60-1 and S60-2.

If the dial key type is "ten-key dial", "ten-key dial" is set in a dialling instruction dial type in step S60-7, the ten-key dial number is set in the dial buffer in step S60-8, and thereafter, the flow returns to the main routine.

If the dial key type is "one touch dial", "one touch dial" is set in the dialling instruction dial type in step S60-5, the one touch dial number is set in the dial buffer in step S60-6, and thereafter, the flow returns to the main routine.

If the dial key type is "coded dial", "coded dial" is set in the dialling instruction dial type in step S60-3, the coded dial number is set in the dial buffer in step S60-4, and thereafter, the flow returns to the main routine.

FIGS. 61 to 63 are flow charts of the task that realizes on-hook control.

In this task, it is checked in step S61-1 if the on-hook key is depressed, and it is checked in step S61-2 if the dialling instruction phase is changed to "dialling queue" by the SIMPLE DIAL processing. These two steps form a loop.

If the on-hook key is depressed, the flow advances from step S61-1 to S62-1.

In step S62-1, a line is caught. In step S62-2, dial processing is performed.

Upon completion of the processing in step S62-2, the control enters a loop from steps S62-3 to S62-6.

It is checked in step S62-3 if the handset is set in the off-hook state. If YES in step S62-3, the flow advances to step S62-11; otherwise, the flow advances to step S62-4.

In step S62-11, the LED is turned off, and the flow advances to step S62-12.

In step S62-12, the control waits until the handset is set in the on-hook state again. If YES in step S62-12, the flow advances to step S62-11 to release the line, and the flow returns to the loop of steps S61-1 and S61-2.

It is checked in step S62-4 if a start key is depressed. If YES in step S62-4, the flow advances to step S62-7; otherwise, the flow advances to step S62-5.

In step S62-7, the LED is turned off, and the flow advances to step S62-8.

In step S62-8, send or receive processing is performed, and the flow advances to step S62-9.

In step S62-9, the control waits until the send or receive processing is completed. If YES in step S62-9, the flow advances to step S62-11.

It is checked in step S62-5 if the on-hook key is depressed. If YES In step S62-5, the flow advances to step S62-10; otherwise, the flow advances to step S62-6.

It is checked in step S62-6 if a stop key is depressed. If YES In step S62-6, the flow advances to step S62-10; otherwise, the flow returns to step S62-3.

In step S62-10, the LED is turned off, and the flow advances to step S62-11.

In step S62-11, the line is released, and the flow returns to the loop of steps S61-1 and S61-2.

If it is determined in step S61-2 that the dialling instruction phase is "dialling queue", the flow advances to step S61-3.

In step S61-3, a line is caught, and the flow advances to step S61-4.

In steps S61-4 and S61-5, the flow branches depending on the dialling instruction dial type. If the dialling instruction dial type is "shortened", the shortened dialling number in the dial buffer is dialled in step S61-6; if the dialling instruction dial type is "one touch", the one touch dialling number in the dial buffer is dialled in step S61-7; and if the dialling instruction dial type is "ten-key", the ten-key dialling number in the dial buffer is dialled in step S61-8.

Upon completion of dialling, a ringing operation is started, and the control enters a loop of steps S63-1 to S63-5.

This loop monitors the off-hook state (S63-1), depression of the start key (S63-2), depression of the on-hook key (S63-3), depression of the stop key (S63-4), and whether or not the dialling instruction phase is "stop request" (S63-5).

If the addressee answers the call, since an operator takes up the handset and makes a speech communication, the flow advances to step S63-8.

In step S63-8, the dialling instruction phase is changed to "idle" to prevent the line from being released by RELEASE LINE processing (to be described later). Thereafter, the flow advances to step S62-12.

If the addressee does not answer the call, the operator can release the line using the on-hook key or stop key, or the RELEASE LINE processing (to be described later).

It is monitored in steps S63-3, S63-4, and S63-5 if the on-hook key is depressed, if the stop key is depressed, and if the dialling instruction phase is changed to "stop request" upon starting of the RELEASE LINE processing (to be described later).

If the conditions in these steps S63-3 to S63-5 are satisfied, the LED is turned off in step S63-6, the dialling instruction phase is changed to "idle" in step S63-7, and the line is released in step S63-13. Thereafter, the flow returns to the loop of steps S61-1 and S61-2.

When the addressee answers the call and thereafter, a facsimile send or receive operation is to be performed, the operator depresses the start key. Upon depression of the start key, the flow advances from step S63-2 to step S63-9.

The LED is turned off in step S63-9, the dialling instruction phase is changed to "idle" in step S63-10, the send or receive processing is performed in step S63-11, and the control waits in step S63-12 until the send or receive processing is completed. Upon completion of the processing, the flow advances to step S63-13 to release the line, and the flow then returns to step S61-1.

With the above-mentioned processing, the phone dialling operation from the information processing terminal can be realized.

17. Dialling Interrupt (RELEASE LINE) Processing

This processing cancels the dialling operation started by the SIMPLE DIAL processing.

In this case, even when the dialling operation is started by the SIMPLE DIAL processing, if an operator takes up the handset and the off-hook state is set after the dialling operation, the canceling operation by the RELEASE LINE processing is inhibited.

This processing will be described below with reference to FIG. 64.

Figure 64:
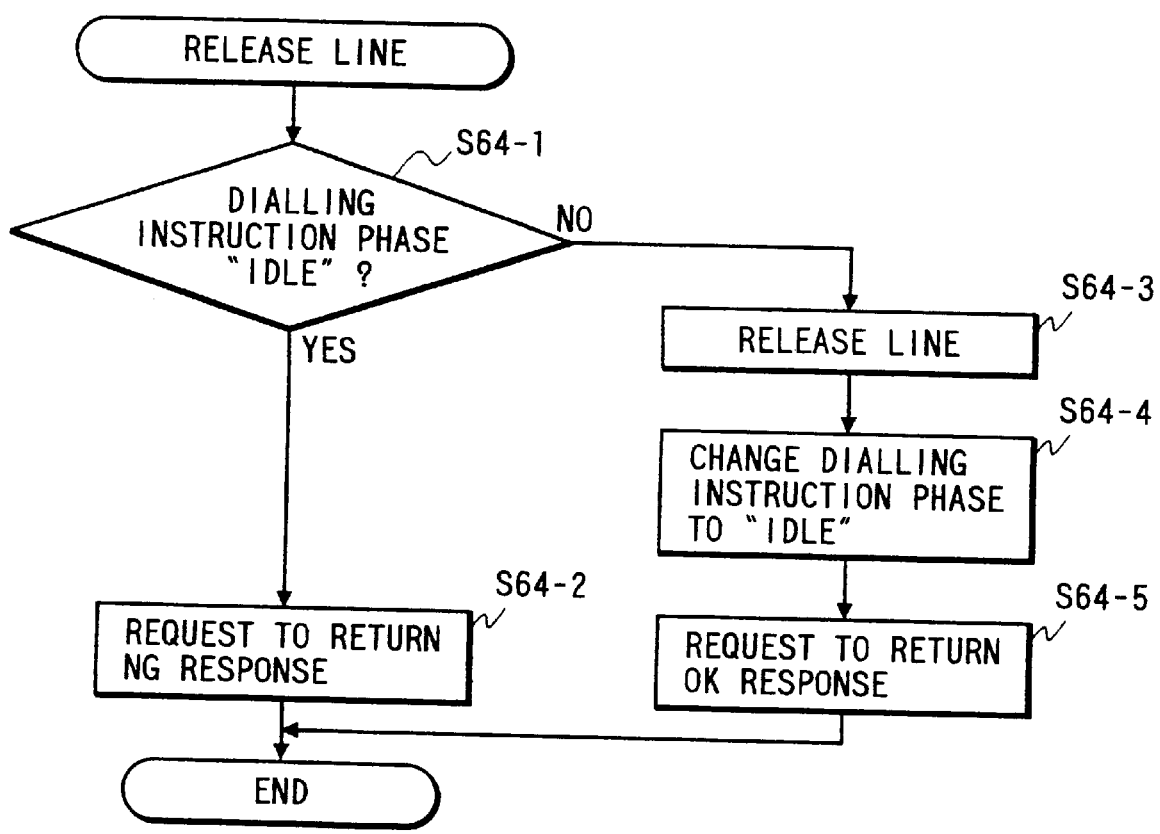
FIG. 64 is a flow chart showing the operation of release line processing.

FIG. 64 is a flow chart showing the RELEASE LINE processing. It is checked in step S64-1 in FIG. 64 if the dialling instruction phase is "idle".

If NO in step S64-1, since the facsimile apparatus is executing the dialling processing by the SIMPLE DIAL processing or is waiting for an answer of the addressee, the interrupt processing of the dialling operation started by the SIMPLE DIAL processing is performed in step S64-3 and the subsequent steps.

On the other hand, if YES in step S64-1, since the facsimile apparatus is neither performing the dialling processing by the SIMPLE DIAL processing nor is waiting for an answer of the addressee, the control requests the I/F control task to send an NG response indicating that there is no dialling to be interrupted in step S64-2, thus ending the processing.

In step S64-3, the line is released. In step S64-4, the dialling instruction phase is changed to "idle". In step S64-5, the control requests the I/F control task to send an OK response, thus ending the processing.

Upon combination of the above-mentioned processing with the SIMPLE DIAL processing, the operator can perform a dialling operation by operating the information processing terminal by the SIMPLE DIAL processing, and when the addressee does not answer, the operator can release the line by the RELEASE LINE processing.

More specifically, the operator can start and cancel a phone dialling operation by operating the information processing terminal while performing other operations using the information processing terminal, thus improving convenience.

18. Command Set Switching (SWITCH COMMAND SET) Processing

This operation is a function of switching a command set used by the external information processing terminal to control the facsimile apparatus in accordance with an instruction from the external information processing terminal.

A command set is one determined in advance between the external processing terminal and an apparatus connected thereto. Normally, since the external processing terminal is connected to an apparatus to have a one-to-one correspondence therebetween, only one type of command set is required. However, in the case of the facsimile apparatus of this embodiment, since the external information processing terminal is connected to another apparatus (the printer unit in the facsimile apparatus in the printer mode), another predetermined command set must be prepared to use the communication function of the facsimile apparatus, the scanner, and the memory in the facsimile unit between the external information processing terminal and the printer unit. This function selects one of the plurality of command sets to directly connect the external information processing terminal and the printer unit. On the other hand, this function can select the other one of the command sets. By selectively using this function, the facsimile apparatus can perform the facsimile function such as send and receive operations, and the printer unit in the facsimile apparatus can perform high-resolution recording beyond the facsimile resolution.

The detailed operation will be described below with reference to FIGS. 65 and 66.

Figure 65:
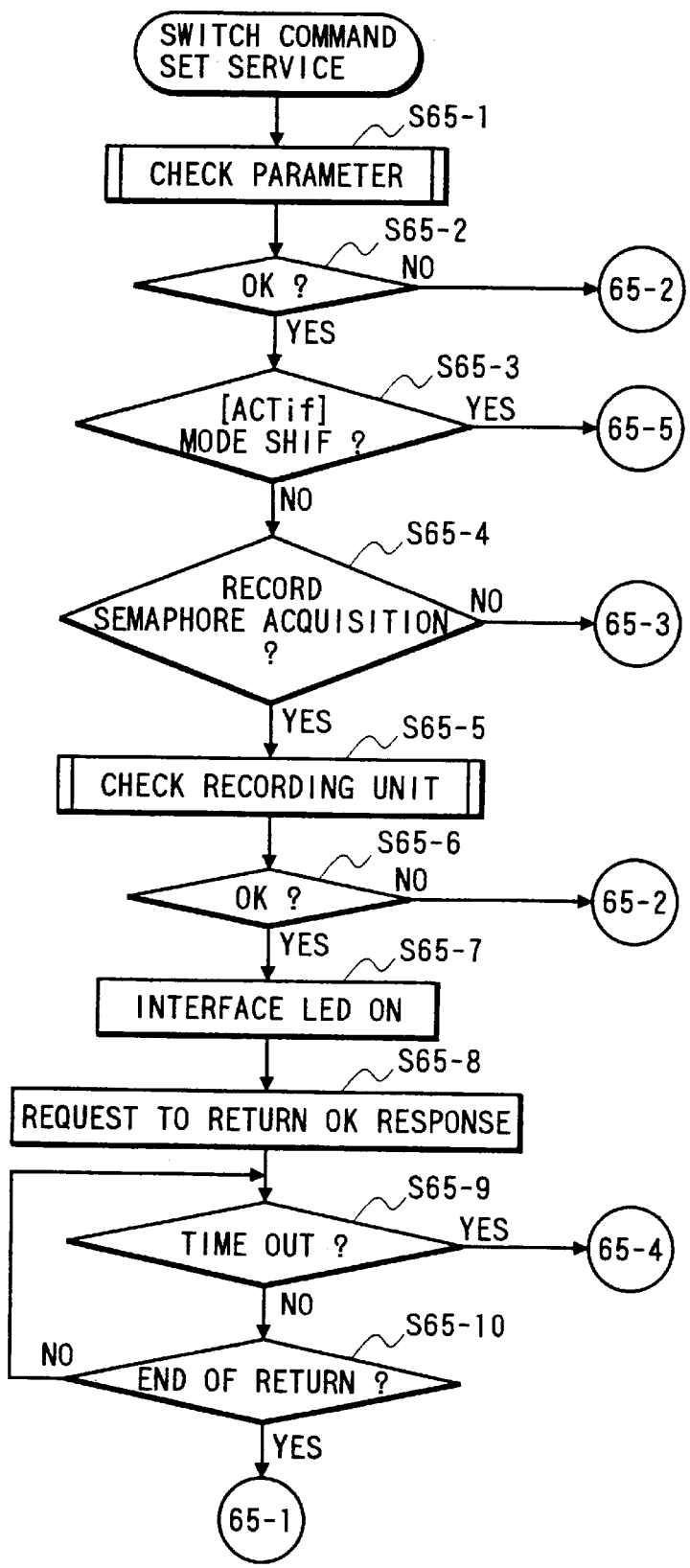
FIG. 65 is a flow chart showing the operation of command set switch processing.
Figure 66:
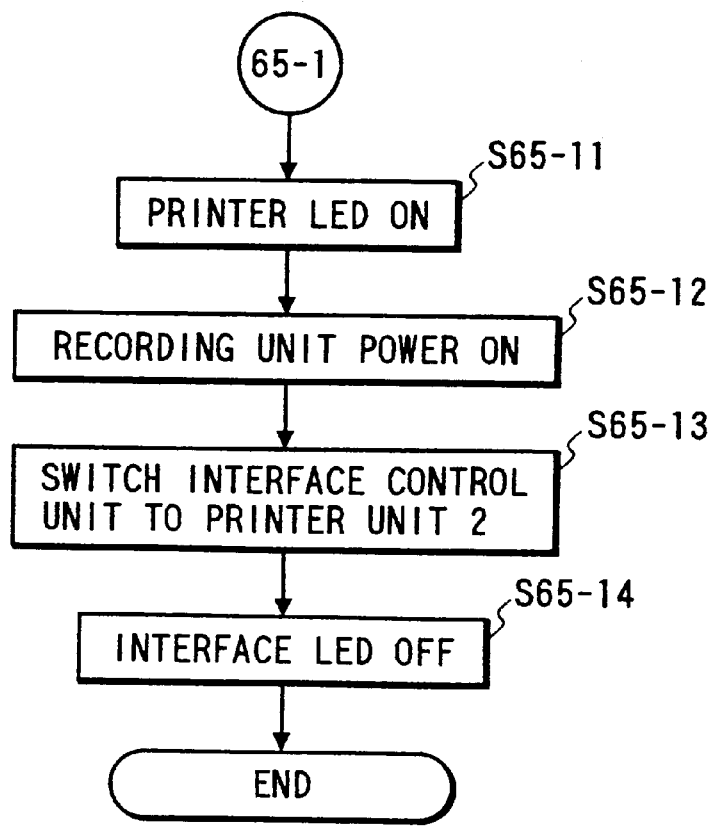
FIG. 66 is a flow chart showing the operation of the command set switch processing.

In the processing shown in FIGS. 8A and 8B, when the command processing task determines a command set switching instruction command, the processing shown in FIG. 65 is executed.

It is checked in step S65-1 if a receive parameter (for designating a command set) added to the command set switching instruction command is correct (to be described in detail later). The flow branches in step S65-2 depending on the checking result in step S65-1. If the checking result indicates OK, the flow advances to step S65-3; otherwise, the flow branches to NG processing (to be described in detail later). It is checked in step S65-3 which one of a command set designated by the external information processing terminal or a printer emulation command set the receive parameter designates. If the receive parameter designates the command set designated by the external information processing terminal, the flow branches to step S69-1 (to be described in detail later); if the receive parameter designates the printer emulation command set, the flow advances to step S65-4. In step S65-4, a recording semaphore (recording resource) is acquired.

The recording semaphore will be explained below.

The facsimile apparatus acquires the recording semaphore when it operates using the printer unit, and releases when it ends the operation. If the apparatus cannot acquire the recording semaphore, it cannot execute the operation (e.g., receive record, copy record, and the like). Despite this limitation, the above-mentioned rule allows smooth simultaneous operations.

If the recording semaphore can be acquired in step S65-4, the flow advances to step S65-5; otherwise, the flow branches to BUSY processing. In step S65-5, the presence/absence of an abnormality of the printer unit is checked (to be described in detail later). The flow branches in step S65-6 depending on the checking result in step S65-5. If the checking result indicates OK, the flow advances to step S65-7; if an abnormality such as the absence of recording sheets, a sheet jam, or the like is found, the flow branches to NG processing. In this case, if an abnormality is found, the command set is inhibited from being switched. This is because the printer unit normally sets the interface in an off-line mode at the time of occurrence of an abnormality such as the absence of recording sheets, and can no longer accept commands from the interface. For this reason, it is nonsense to switch the command set to the printer emulation command mode.

In step S65-7, the interface LED is turned on to inform the operator that the apparatus is in operation. During the ON period of the interface LED, any key input of the facsimile apparatus is inhibited. In step S65-8, an OK response to the interface control task is generated to request it to return to the external information processing terminal a message indicating that a normal operation is being performed. The interface control task executes the sending processing of the message. In steps S65-9 and S65-10, it is checked if the interface control task has completed the returning processing to the external information processing terminal. If the returning processing has been completed, the flow advances to step S65-11. On the other hand, if the returning processing has not been completed, and a time-out state has occurred in step S65-9, the flow branches to abnormality processing. In this embodiment, the time-out time is fixed, but may be changed by the registration operation by the facsimile apparatus or that by the external information processing terminal. In step S65-11, a printer LED (not shown) on the operation panel 112 is turned on to indicate that the printer emulation command set is selected. In step S65-12, software power ON processing of the printer unit 2 is performed. The software power ON processing is one for coping with, e.g., the following problem. That is, when record requests for copy record and receive record from the facsimile MPU 101 are involved, and the printer MPU 201 runs away or an error is generated due to data remaining on the memory in the printer unit, error processing corresponding to an error state rather makes the program complicated. More specifically, the software power ON processing is one for initializing the printer unit. In step S65-13, the interface control unit 108 is switched from the connection state (the external information processing terminal 109—the facsimile MPU 101) (the facsimile MPU 101—the printer unit 2) to the connection state (the external information processing terminal 109—the printer unit 2). With the above-mentioned operation, data from the external information processing terminal 109 is directly sent to the printer unit 2, i.e., the same operation as a unidirectional Centronics interface in a conventional apparatus is performed. In step S65-14, the interface LED is turned off to inform the operator of the end of PRINT FILE operation. After the interface LED is turned off, a key input of the facsimile apparatus is permitted.

Figure 67:
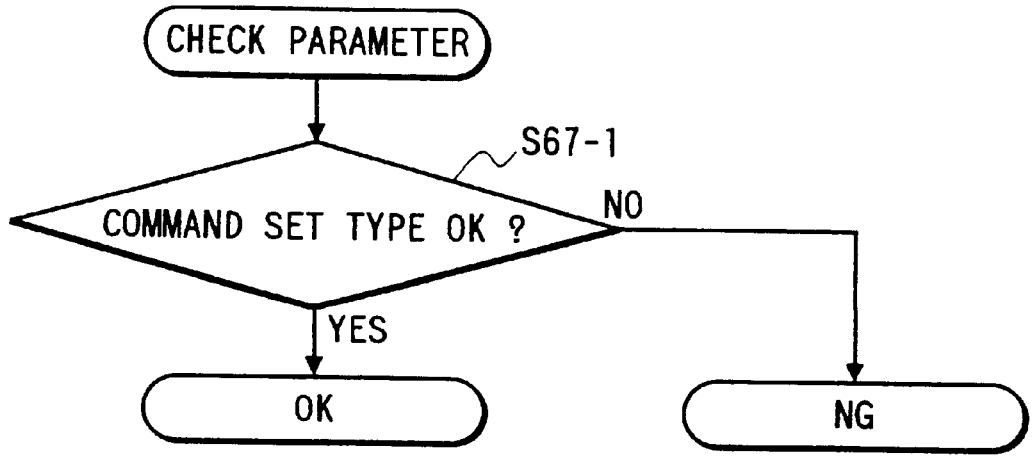
FIG. 67 is a flow chart showing in detail the parameter check processing shown in FIG. 65.

The receive parameter check routine in step S65-1 will be explained below with reference to FIG. 67.

The contents of the receive parameter include the following items having the following choices. When the contents of the receive parameter are different from the setting contents of the facsimile apparatus, a receive parameter error is generated. Alternatively, when the contents of the receive parameter are different from the setting contents of the facsimile apparatus, processing may be continued to "preferentially process the contents of the receive parameter" or to "preferentially process the setting contents of the facsimile apparatus" without generating any receive parameter error.

Command set: "print emulation", "designated by external information processing terminal".

In step S67-1, the command set is checked. If the contents of the receive parameter indicate "print emulation" or "designated by external information processing terminal", the receive parameter check routine normally ends. Otherwise, this routine abnormally ends.

Figure 68:
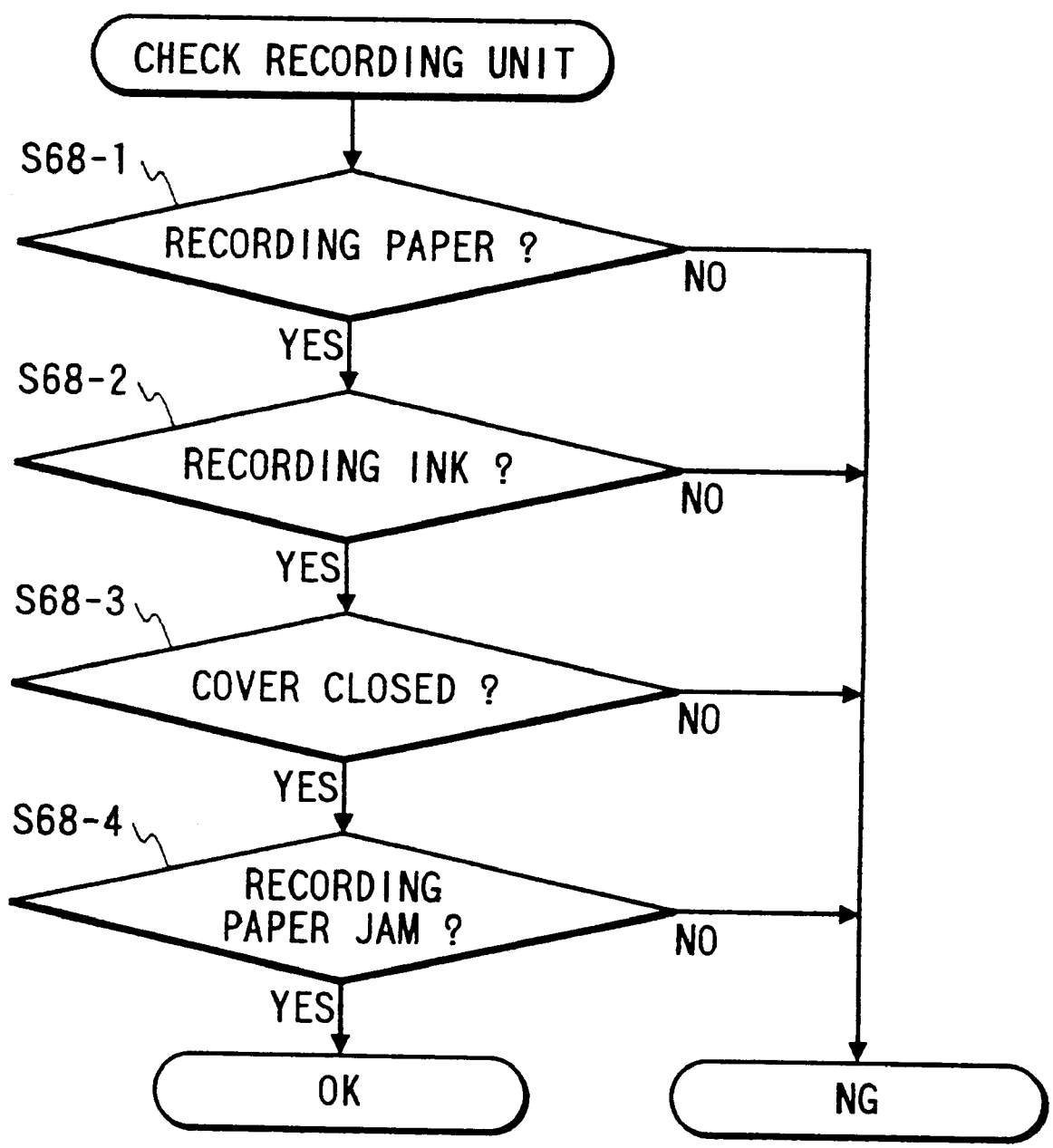
FIG. 68 is a flow chart showing in detail the recording check processing shown in FIG. 65.

The printer unit check routine in step S65-5 will be described below with reference to FIG. 68.

In step S68-1, the presence/absence of recording sheets is checked. The presence/absence of recording sheets in a recording paper cassette is checked using a recording paper sensor (not shown), and if recording sheets are detected, the flow advances to step S68-2; otherwise, the routine abnormally ends. In step S68-2, the presence/absence of a recording ink is checked. If a recording ink is present, the flow advances to step S68-3; otherwise, the routine abnormally ends. In this embodiment, the recording operation uses a recording ink. Alternatively, the present invention may be applied to a facsimile apparatus which uses a recording unit using, e.g., toner for laser recording. In step S68-3, it is checked if the recording cover is closed. If YES (Y) in step S68-3, the flow advances to step S68-4; otherwise, the routine abnormally ends. In step S68-4, the presence/absence of a recording paper jam is checked. If no recording paper jam is detected by, e.g., the PE sensor 206, the printer unit check routine normally ends. On the other hand, if a recording paper jam is detected by, e.g., the PE sensor 206, the printer unit check routine abnormally ends.

Figure 69:
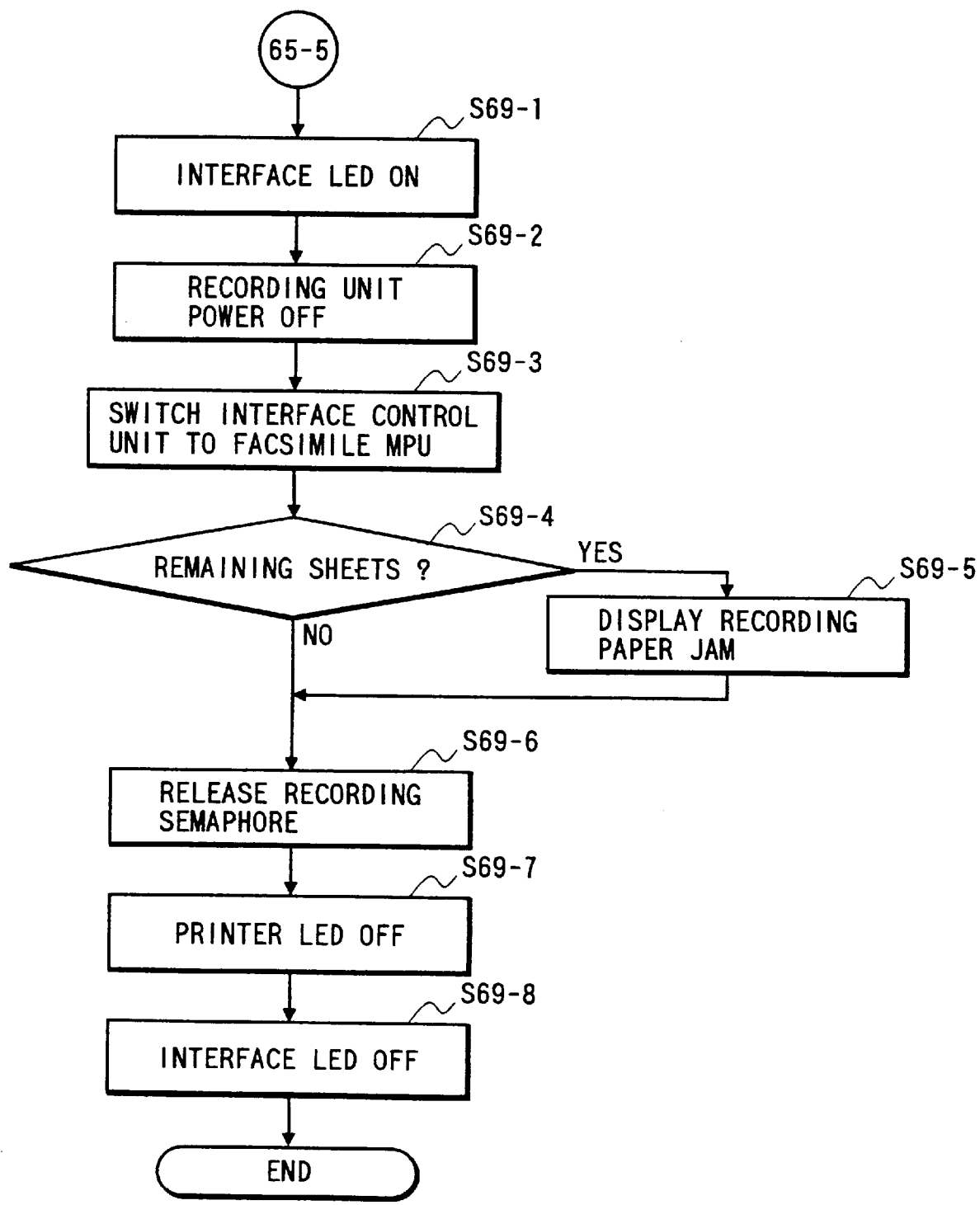
FIG. 69 is a flow chart showing the operation of the command set switch processing.

The operation in step S69-1 and the subsequent steps, which operation is branched from step S65-3, will be described below with reference to FIG. 69.

In step S69-1, the interface LED is turned on to inform the operator that the apparatus is in operation. During the ON period of the interface LED, any key input of the facsimile apparatus is inhibited. In step S69-2, software power OFF processing of the printer unit 2 is performed. In step S69-3, the interface control unit 108 is switched from the connection state (the external information processing terminal 109—the printer unit 2) to the connection state (the external information processing terminal 109—the facsimile MPU 101) (the facsimile MPU 101—the printer unit 2). In step S69-4, the presence/absence of remaining sheets in the apparatus is checked using the PE sensor 206. If no remaining sheets are detected, the flow advances to step S69-6. If remaining sheets are detected, a recording paper jam display is made in step S69-5, and the flow then advances to step S69-6. In step S69-6, the recording semaphore acquired in step S65-4 is released. In step S69-7, the printer LED (not shown), which indicates that the command set designated by the external information processing terminal is selected, on the operation panel 112 is turned off. In step S69-8, the interface LED is turned off to inform the operator of the end of the SWITCH COMMAND SET operation. After the interface LED is turned off, a key input of the facsimile apparatus is permitted.

Figure 70:
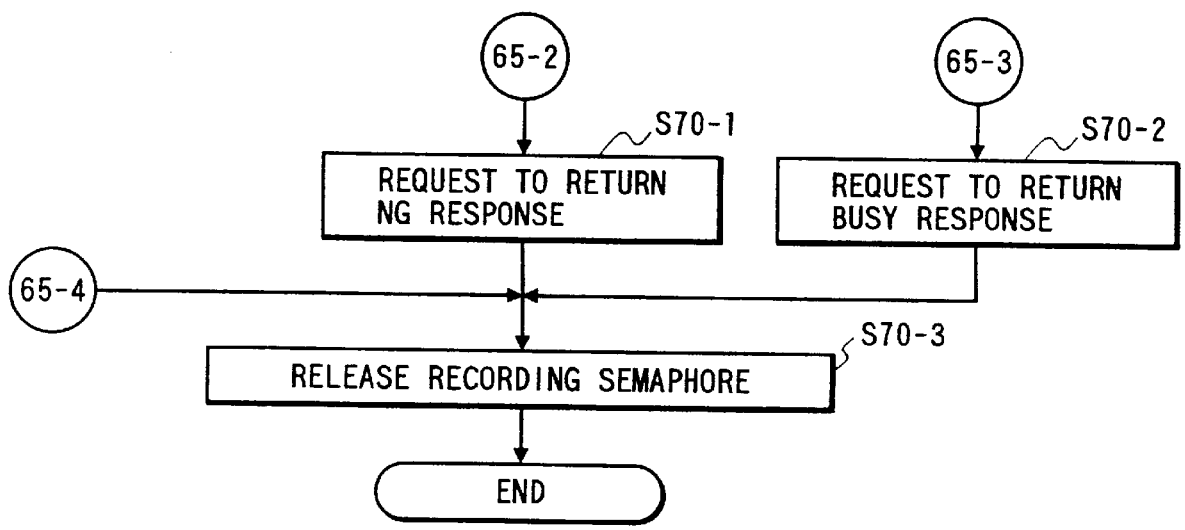
FIG. 70 is a flow chart showing in detail the post processing of FIG. 65.

The abnormality processing will be described below with reference to FIG. 70.

When an NG state has occurred, an NG response to the interface control task is generated to request it to return to the external information processing terminal a message indicating that the operation has abnormally ended, in step S70-1. On the other hand, when a BUSY state has occurred, a BUSY response to the interface control task is generated to request it to return to the external information processing terminal a message indicating that the operation has abnormally ended, in step S70-2. The interface control task executes the sending processing of the message. In step S70-3, the recording semaphore is released, and the abnormality processing ends. If the recording semaphore is not acquired, the step of releasing the recording semaphore is skipped.

19. Facsimile Storage Scan (SCAN TO FAX) Processing

Figures 71, 71A:
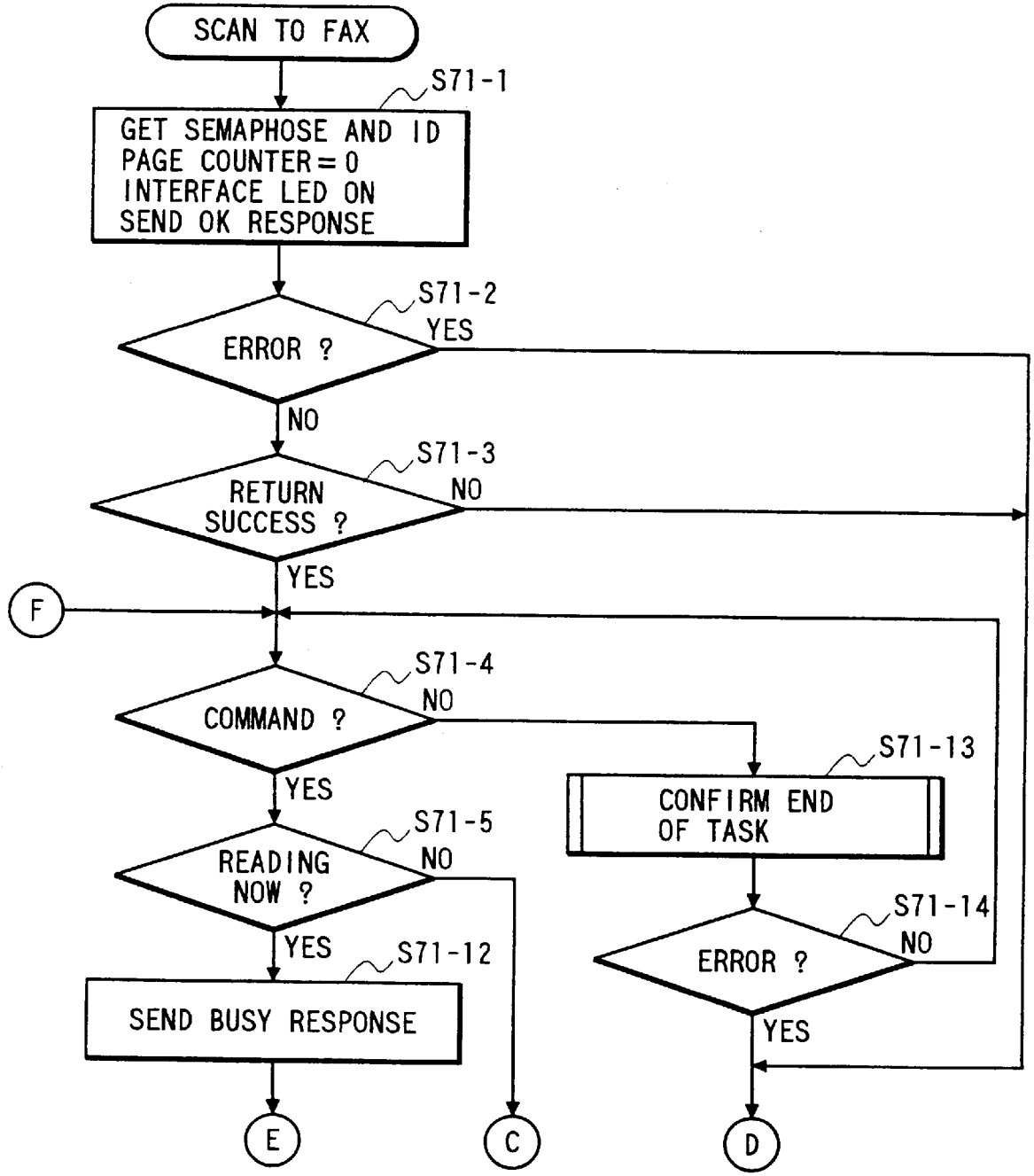
FIG. 71, comprising
FIGS. 71A and 71B, is a flow chart showing the operation of facsimile storing scan processing.
Figure 71B:
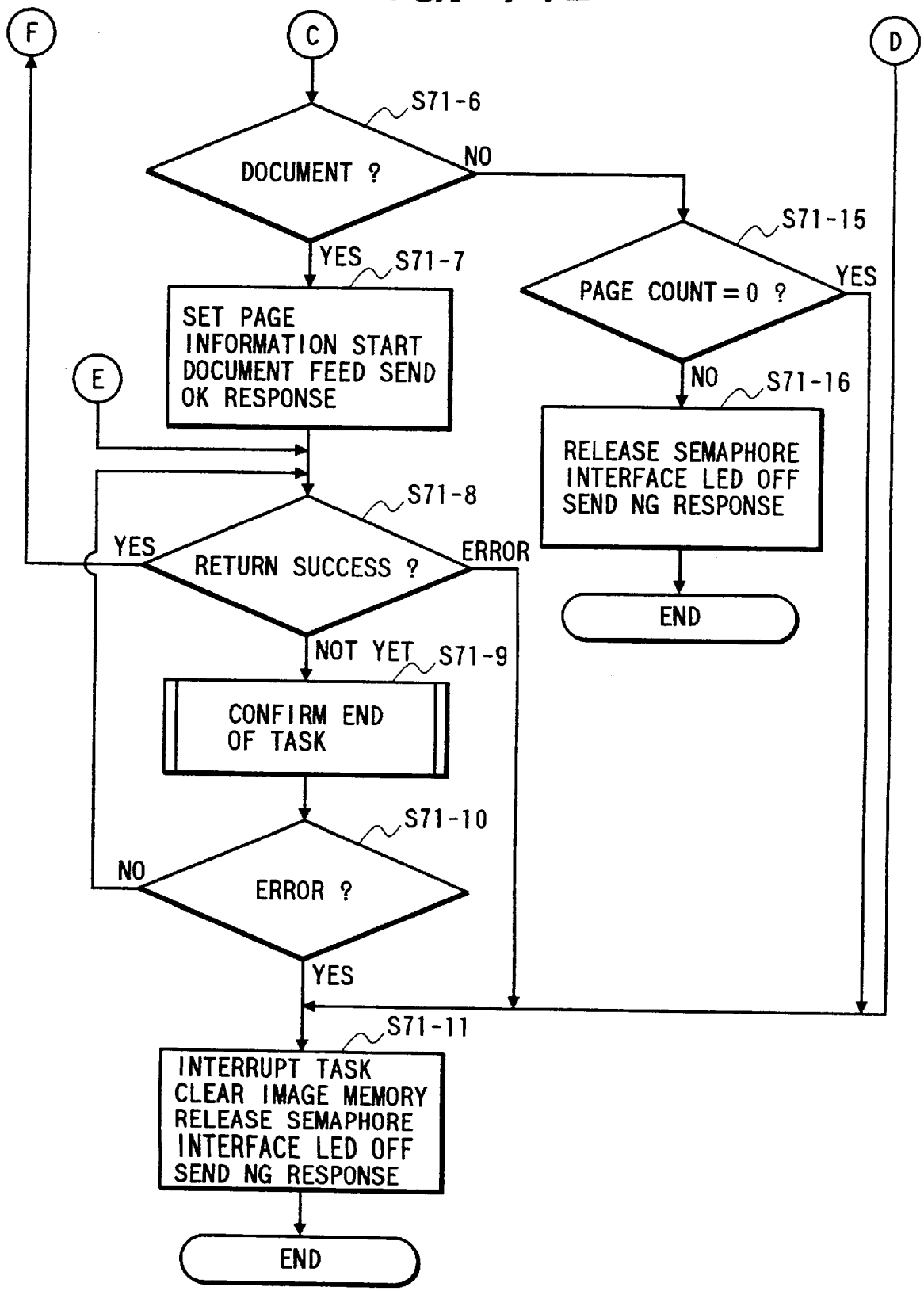
Figure 72:
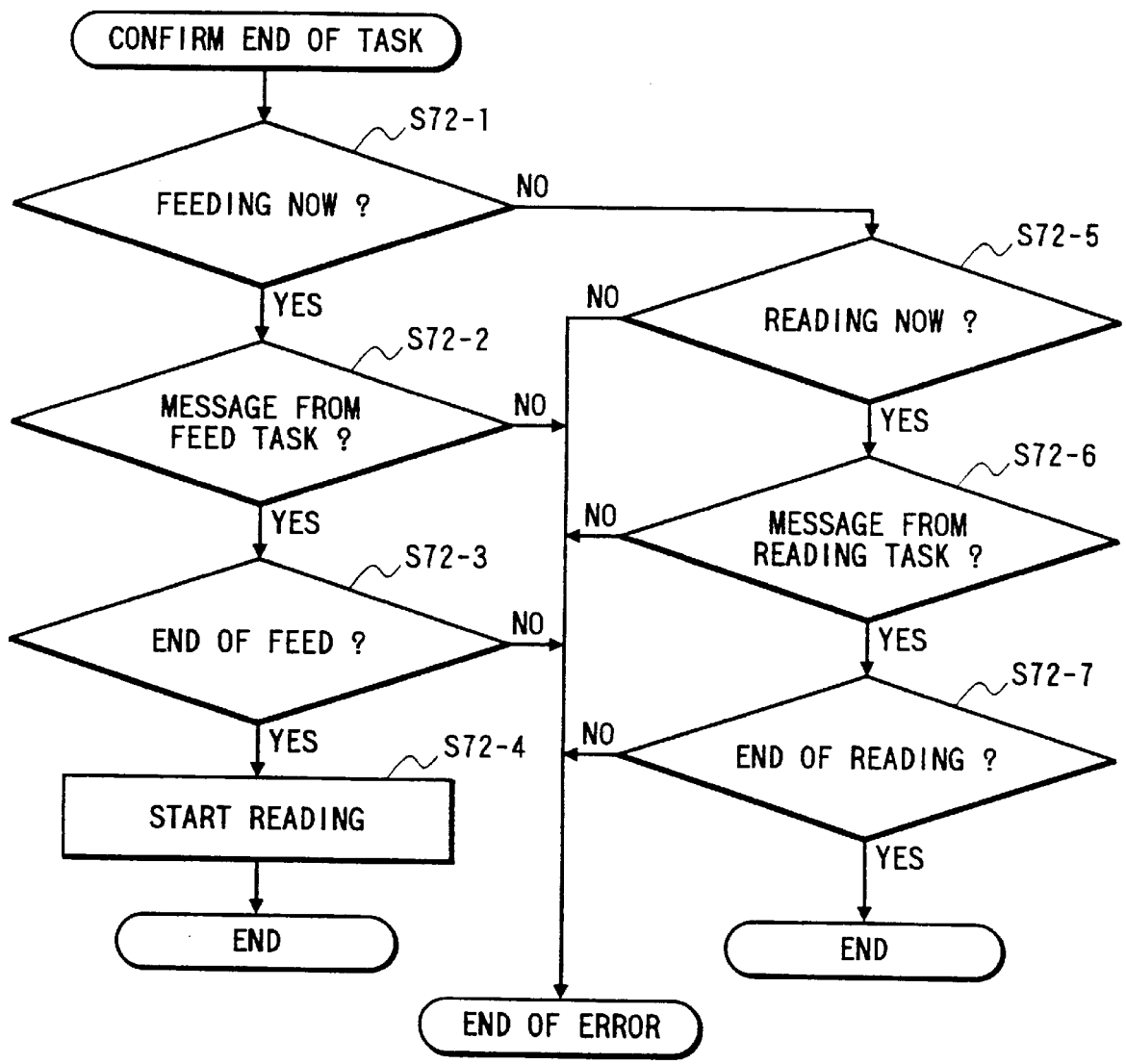
FIG. 72 is a flow chart showing in detail the task end confirmation processing shown in FIGS. 71A and 71B.

FIGS. 71A, 71B and 72 are flow charts showing the facsimile storage scan (SCAN TO FAX) processing operation for storing read image data in the image memory area in the RAM 103.

In step S71-1, after the validity of the command is checked, a reading semaphore and a reading motor semaphore are acquired, the newest image file ID is acquired, an image memory area is assured, the page counter is cleared to 0, the interface LED on the operation panel 112 is turned on, and an OK response is sent to the I/F control task.

At this time, if the command is not valid, the reading semaphore or reading motor semaphore cannot be acquired, or the image memory area cannot be assured, an error is determined in step S71-2, and the flow advances to step S71-11 to execute error processing.

If an OK response is normally sent to the I/F control task, the control waits for a response send completion message from the I/F control task in step S71-3. If an error has occurred, the flow advances to step S71-11; otherwise, the flow advances to step S71-4.

In step S71-4, the control waits for the next command from the I/F control task and messages from the feed task and the reading task.

If the next command is received from the I/F control task, it is checked in step S71-5 if the previous page is being fed or read. If the reading unit 105 is in operation, a BUSY response is sent to the I/F control task in step S71-12, and the flow advances to step S71-8.

If the reading unit is not in operation, the flow advances to step S71-6 to check if a document to be read is present on the reading unit 105.

If a document to be read is present on the reading unit 105, the flow advances to step S71-7. In step S71-7, the page counter is incremented, page information (sub scan resolution, reading mode, reading density) from the I/F control task is set for each page, the feed task is started to feed the document, and an OK response is sent to the I/F control task.

After the OK response is sent to the I/F control task, the flow advances to step S71-8, and the control waits for a response send completion message from the I/F control task. If an error has occurred, the flow advances to step S71-11; if the sending processing has been completed without any error, the flow advances to step S71-4 to wait for the next command from the I/F control task. If the sending processing is not completed yet, the end of the feed task or the reading task is confirmed in step S71-9.

It is confirmed in step S71-10 if an error has occurred in the feed task or the reading task. If an error has occurred, the flow advances to step S71-11; otherwise, the flow advances to step S71-8.

If a message is received from the feed task or the reading task in step S71-4, the flow advances to step S71-13 to confirm the end of the feed task or the reading task.

It is confirmed in step S71-14 if an error has occurred in the feed task or the reading task. If an error such as a feed error, an image memory overflow, or the like has occurred, the flow advances to step S71-11; otherwise, the flow returns to step S71-4.

If it is determined in step S71-6 that a document to be read is not present on the reading unit 105, the flow advances to step S71-15 to confirm if the page counter is 0.

If the page counter is 0, the flow advances to step S71-11; otherwise, the flow advances to step S71-16. In step S71-16, the reading semaphore and the reading motor semaphore are released, the interface LED on the operation panel 112 is turned off, and an NG response is sent to the I/F control task, thus ending the processing.

In step S71-11, as error processing, the feed task or the reading task is interrupted, the image memory area is cleared, the reading semaphore and the reading motor semaphore are released, the interface LED on the operation panel 112 is turned off, and an NG response is sent to the I/F control task, thus ending the processing.

It is confirmed in step S72-1 if the reading unit 105 is feeding a document now. If the reading unit 105 is feeding a document now, the flow advances to step S72-2 to confirm if the message is a message received from the feed task.

If the message is a message received from the feed task, it is checked in step S72-3 if the message from the feed task is a feed end message. If the message from the feed task is a feed end message, the reading task is started to start reading of a document present on the reading unit 105 in step S72-4.

On the other hand, if it is determined in step S72-1 that the reading unit 105 is not feeding a document, the flow advances to step S72-5 to check if the reading unit 105 is reading a document now. If the reading unit 105 is reading a document now, the flow advances to step S72-6 to check if the message is a message received from the reading task.

If the message is a message received from the reading task, it is checked in step S72-7 if the message from the reading task is a reading end message. If the message from the reading task is a reading end message, the processing ends normally.

The processing abnormally ends if it is determined in step S72-2 that the message is not one from the feed task, if it is determined in step S72-3 that the message from the feed task is not a feed end message, if it is determined in step S72-5 that the reading unit 105 is not reading a document now, if it is determined in step S72-6 that the message is not one from the reading task, or if it is determined in step S72-7 that the message from the reading task is not a reading end message.

In the reading task, image RAW data read from the reading unit 105 is converted into RL data by the RL-RAW converter 106, and the RL data is stored in an encode buffer in the RAM 103. In addition, MMR encoding is performed based on the RL data, and MMR-encoded data is stored in the image memory area, assured in step S71-1, in the image memory in the RAM 103.

At this time, the communication buffer in the RAM 103 is not used.

With the above-mentioned processing, since processing is interrupted when the interface does not become ready for transfer within a predetermined period of time, an image communication apparatus which uses a parallel interface allowing high-speed data transfer and is easy to operate can be provided.

When a document image is stored in the memory in accordance with an instruction from the information processing terminal, if an error has occurred during the storage operation, the image data is immediately deleted from the memory to effectively use the memory, thus realizing a low-cost product.

Since combinations of the operations based on an instruction from the external information processing terminal, operations from the operation panel, and the operation of the apparatus itself are limited, the entire control of the apparatus is simplified, thus realizing a low-cost product.

Since a state wherein the apparatus cannot be used is indicated, an image communication apparatus which is easy to use can be provided.

20. Document Send (SEND DOC) Processing

Figure 73:
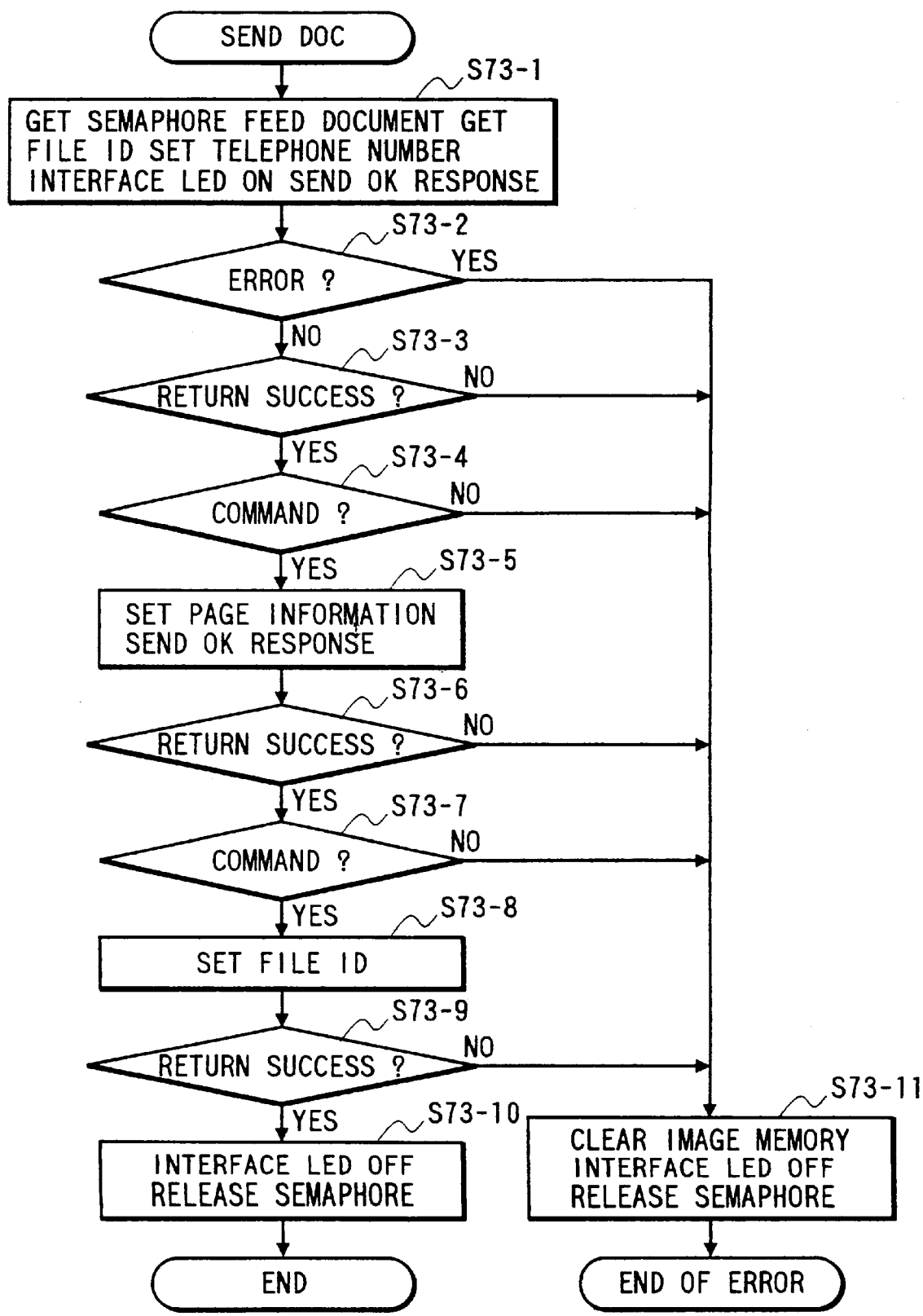
FIG. 73 is a flow chart showing the operation of document send processing.

FIG. 73 is a flow chart showing the operation of the document send (SEND DOC) processing.

In step S73-1, after the validity of the command is checked, a reading motor semaphore and a communication semaphore are acquired, a document set on the reading unit 105 is fed, the newest image file ID is acquired, an image memory area is assured, telephone number data from the I/F control task is set, the interface LED on the operation panel 112 is turned on, and an OK response is sent to the I/F control task.

At this time, if the command is not valid, the reading motor semaphore or communication semaphore cannot be acquired, or the image memory area cannot be assured, an error is determined in step S73-2, and the flow advances to step S73-11 to execute error processing.

If the OK response is normally sent to the I/F control task, the control waits for a response send completion message from the I/F control task in step S73-3. If an error has occurred, the flow advances to step S73-11; otherwise, the flow advances to step S73-4.

In step S73-4, the control waits for the next command from the I/F control task. If the command is not valid, the flow advances to step S73-11 to execute error processing.

If the next command is received from the I/F control task, page information (sub scan resolution, reading mode, reading density) from the I/F control task is set in a document mode LED and the like on the operation panel 112 as information for the first page, and an OK response is sent to the I/F control task in step S73-5.

After the OK response is sent to the I/F control task, the flow advances to step S73-6 to wait for a response send completion message from the I/F control task. If an error has occurred, the flow advances to step S73-11; if the sending processing has been completed without any error, the flow advances to step S73-7 to wait for the next command from the I/F control task.

If the next command is received from the I/F control task, file ID information with respect to the I/F control task is set, and an OK response is sent to the I/F control task, in step S73-8.

If the command is not valid, the flow advances to step S73-11 to execute error processing.

If the OK response is normally sent to the I/F control task, the control waits for a response send completion message from the I/F control task in step S73-9. If an error has occurred, the flow advances to step S73-11; otherwise, the flow advances to step S73-10.

In step S73-10, the interface LED on the operation panel 112 is turned off, and the communication semaphore and the reading motor semaphore are released, thus normally ending the processing.

In step S73-11, as the error processing, the feed task is interrupted, the image memory area is cleared, the interface LED on the operation panel 112 is turned off, the communication semaphore and the reading motor semaphore are released, and an NG response is sent to the I/F control task, thus ending the processing.

When the interface LED on the operation panel 112 is turned off, and the communication semaphore and the reading motor semaphore are released, the communication task is started using the image memory area assured in step S73-1 in a stand-by state.

After the communication task is started, the same operation as a normal document send operation is executed on the basis of document reading mode information such as the document mode LED and the like on the operation panel 112.

The document reading mode for the second or subsequent page is not changed from the information processing terminal 109 but is changed by a user's operation on the operation panel 112 as in the normal document send operation.

As described above, when interface control is attained between the external information processing terminal and the printer unit and between the external information processing terminal and the data processing unit, a plurality of command sets can be switched automatically or manually. In addition, the state of the printer unit can be detected. Thus, an image processing apparatus which can be freely operated from the external information processing terminal can be provided.

The present invention is not limited to the above-mentioned embodiment, and various changes and modifications may be made within the spirit and scope of the invention.

What is claimed is:

1. A facsimile apparatus including a printer unit for printing information on a recording paper and a facsimile unit for preforming facsimile communication, comprising:

interface means for sending/receiving information to/from an external information processing terminal; and selection instruction reception means for receiving a selection instruction from the external information processing terminal to select one of a first command set for controlling the printer unit based on instructions from the external information processing terminal and a second command set for controlling the facsimile unit based on instructions from the external information processing terminal.

2. A facsimile apparatus including a printer unit for printing information on a recording paper and a facsimile unit for performing facsimile communication, comprising:

interface means for sending/receiving information to/from an external information processing terminal; and instruction means for instructing selection of one of a first command set for controlling the printer unit from the external information processing terminal and a second command set for controlling the facsimile unit from the external information processing terminal on the basis of an input from an operation section of the facsimile unit.

3. A facsimile apparatus according to claim 2, wherein said instruction means includes a key, and instructs to switch of the one command sets upon depression of said key.

4. A facsimile apparatus including a printer unit for printing information on a recording paper and a facsimile unit for performing facsimile communication, comprising:

interface means for sending/receiving information to/from an external information processing terminal;

detection means for detecting a state of the printer unit;

accepting means for accepting an instruction of selection of one of a first command set for controlling the printer unit from the external information processing terminal and a second set for controlling the facsimile unit from the external information processing terminal;

setting means for setting one of the first and second command sets on the basis of the instruction accepted by said accepting means; and limiting means for limiting a setting operation of said setting means when said accepting means accepts the instruction and said detection means detects a predetermined state of the printer unit.

5. A facsimile apparatus according to claim 4, wherein the predetermined state is an in-use state of the printer unit.

6. A facsimile apparatus according to claim 4, wherein the predetermined state is an abnormality state of the printer unit.

7. A facsimile apparatus according to claim 4, wherein the accepting means accepts a selection instruction of one of the first and second command sets from the external information processing terminal.

8. A facsimile apparatus according to claim 4, wherein said accepting means accepts a selection instruction of one of the first and second command sets from an operation section of the facsimile unit.

9. A facsimile apparatus according to claim 4, wherein said setting means includes an initialization means for initializing the printer unit to set one of the first and second command sets.

10. A facsimile apparatus according to claim 4, further comprising key input means, and means for limiting a key input by said key input means during a setting operation of one of the first and second command sets by said setting means.

11. A facsimile apparatus according to claim 10, further comprising notifying means for notifying an operator of a state, wherein the key input by said key input means is limited, during a setting operation of one the first and second command sets by said setting means.

12. A method of controlling a facsimile apparatus including a printer unit for printing information on a recording paper and a facsimile unit for performing facsimile communication, the facsimile apparatus being connected to an external information processing terminal, comprising the steps of:

sending/receiving information to/from the external information processing terminal; and receiving a selection instruction from the external information processing terminal to select one of a first command set for controlling the printer unit from the external information processing terminal and a second command set for controlling the facsimile unit from the external information processing terminal.

13. A method of controlling a facsimile apparatus including a printer unit for printing information on a recording paper and a facsimile unit for performing facsimile communication, the facsimile apparatus being connected to an external information processing terminal, comprising the steps of:

sending/receiving information to/from the external information processing terminal; and selecting one of a first command set for controlling the printer unit based on instructions from the external information processing terminal and a second command set for controlling the facsimile unit based on instructions from the external information processing terminal on the basis of an input from an operation section of the facsimile unit.

14. A method of controlling a facsimile apparatus including a printer unit for printing information on a recording paper and a facsimile unit for performing facsimile communication, the facsimile apparatus being connected to an external information processing terminal, comprising the steps of:

sending/receiving information to/from the external information processing terminal;

detecting a state of the printer unit;

accepting an instruction of selection from one of a first command set for controlling the printer unit from the external information processing terminal and a second command set for controlling the facsimile unit from the external information processing terminal;

setting one of the first and second command sets on the basis of the instruction accepted in said accepting step; and limiting a setting operation by said setting step when said accepting step accepts the instruction and said detecting step detects a predetermined state of the printer unit.

15. A method according to claim 14, wherein the predetermined state is an in-use state of the printer unit.

16. A method according to claim 14, wherein the predetermined state is an abnormality state of the printer unit.

17. A method according to claim 14, wherein said accepting step accepts a selection instruction of one of the first and second command sets from the external information processing terminal.

18. A method according to claim 14, wherein said setting step initializes the printer unit to set one of the first and second command sets.

19. A method according to claim 14, further comprising the step of limiting a key input by a key input means of the facsimile unit during a setting operation of one of the first and second command sets by said setting step.

20. A method according to claim 14, further comprising a notifying step for notifying an operator of a state, wherein a key input by a key input means of the facsimile unit is limited, during a setting operation of one of the first and second command sets by said setting step.

* * * * *

UNITED STATES PATENT AND TRADEMARK OFFICE
CERTIFICATE OF CORRECTION

PATENT NO.   : 5,930,004
DATED        : July 27, 1999
INVENTOR(S)  : TAKASHI IMAI ET AL.

It is certified that error appears in the above-identified patent and that said Letters Patent is hereby corrected as shown below:

COLUMN 8

Line 46, "unit I" should read --unit 1--.

COLUMN 22

Line 51, "advances" should read --advances to--.

COLUMN 23

Line 56, "recording-paper" should read --recording paper--.

COLUMN 28

Line 59, "s emaph ore" should read --semaphore--.

COLUMN 29

Line 2, "print ing" should read --printing--.

UNITED STATES PATENT AND TRADEMARK OFFICE
CERTIFICATE OF CORRECTION

PATENT NO.    : 5,930,004
DATED         : July 27, 1999
INVENTOR(S)   : TAKASHI IMAI ET AL.

It is certified that error appears in the above-identified patent and that said Letters Patent is hereby corrected as shown below:

COLUMN 33

Line 22, "abbreviated One touch/" should read --abbreviated ¶ One touch/--.

COLUMN 45

Line 34, "no t" should read --not--; and
Line 36, "a dvances" should read --advances--.

COLUMN 47

Line 7, "the" should be deleted.

COLUMN 58

Line 5, "In" should read --in--; and
Line 8, "In" should read --in--.

COLUMN 66

Line 24, "of" should read --off--.

UNITED STATES PATENT AND TRADEMARK OFFICE
CERTIFICATE OF CORRECTION

PATENT NO.    : 5,930,004
DATED         : July 27, 1999
INVENTOR(S)   : TAKASHI IMAI ET AL.

It is certified that error appears in the above-identified patent and that said Letters Patent is hereby corrected as shown below:

COLUMN 67

Line 1, "one" should read --one of--.

Signed and Sealed this

Twenty-seventh Day of June, 2000

Q. TODD DICKINSON

Attest:

Attesting Officer          Director of Patents and Trademarks